US012514858B2

(12) United States Patent
Kulkarni et al.

(10) Patent No.: US 12,514,858 B2
(45) Date of Patent: Jan. 6, 2026

(54) CD38 INHIBITORS

(71) Applicant: Astellas Engineered Small Molecules US, Incorporated, Cambridge, MA (US)

(72) Inventors: Santosh S. Kulkarni, Bangalore (IN); Bharat Lagu, Acton, MA (US); Xinyuan Wu, Chestnut Hill, MA (US)

(73) Assignee: Astellas Engineered Small Molecules US, Incorporated, Cambridge, MA (US)

( * ) Notice: Subject to any disclaimer, the term of this patent is extended or adjusted under 35 U.S.C. 154(b) by 525 days.

(21) Appl. No.: 17/916,230

(22) PCT Filed: Apr. 6, 2021

(86) PCT No.: PCT/US2021/025953
§ 371 (c)(1),
(2) Date: Sep. 30, 2022

(87) PCT Pub. No.: WO2021/207186
PCT Pub. Date: Oct. 14, 2021

(65) Prior Publication Data
US 2023/0158024 A1 May 25, 2023

(30) Foreign Application Priority Data
Apr. 7, 2020 (IN) .............................. 202041015255

(51) Int. Cl.
*A61K 31/506* (2006.01)
*A61P 35/00* (2006.01)
*A61P 43/00* (2006.01)
*C07D 401/04* (2006.01)
*C07D 401/14* (2006.01)
*C07D 403/14* (2006.01)
*C07D 417/04* (2006.01)

(52) U.S. Cl.
CPC ............ *A61K 31/506* (2013.01); *A61P 43/00* (2018.01)

(58) Field of Classification Search
CPC .. C07D 401/04; C07D 417/14; C07D 401/14; C07D 403/04; C07D 403/14; C07D 417/04; A61K 31/506; A61K 31/4439; A61P 27/02; A61P 21/00; A61P 43/00; A61P 1/16; A61P 3/00; A61P 9/00; A61P 13/12; A61P 25/00; A61P 13/00; A61P 35/00
See application file for complete search history.

(56) References Cited

U.S. PATENT DOCUMENTS

| | | | | |
|---|---|---|---|---|
| 2005/0075356 A1* | 4/2005 | Di Francesco | .... | C07D 239/557 544/309 |
| 2010/0022546 A1* | 1/2010 | Jimenenz | ................ | A61P 25/16 544/131 |
| 2010/0249092 A1 | 9/2010 | Singh et al. | | |
| 2013/0072469 A1 | 3/2013 | Singh et al. | | |
| 2014/0079666 A1* | 3/2014 | Webb | ..................... | A61K 38/21 424/85.4 |
| 2014/0275024 A1* | 9/2014 | Maxwell | .............. | C07D 405/12 544/122 |
| 2018/0161336 A1* | 6/2018 | Maxwell | .............. | C07D 413/12 |

FOREIGN PATENT DOCUMENTS

| | | | | |
|---|---|---|---|---|
| JP | 2017-516833 A | 6/2017 | | |
| JP | 2018-501215 A | 1/2018 | | |
| WO | WO-2007129195 A2 * | 11/2007 | ........... | C07D 403/14 |
| WO | 2013/002879 A1 | 1/2013 | | |
| WO | 2014/180544 A1 | 11/2014 | | |
| WO | 2016/087975 A1 | 6/2016 | | |
| WO | 2016/118638 A1 | 7/2016 | | |
| WO | 2019/101641 A1 | 5/2019 | | |
| WO | 2020/239123 A1 | 12/2020 | | |

OTHER PUBLICATIONS

Database Registry, Chemical Abstracts Service, Columbus, Ohio, US; Dec. 16, 2009, XP55811805, retrieved from STN Database accession no. 1197530-39-4, CAS Registry No. 1197530-39-4, one page.
Database Registry, Chemical Abstracts Service, Columbus, Ohio, US; Mar. 17, 2013, XP55811807, retrieved from STN Database accession No. 1424597-49-8, CAS Registry No. 1424597-49-8, one page.
International Search Report and Written Opinion for Application No. PCT/US2021/025953, dated Jun. 17, 2021, 11 pages.
STN Accession No. 1030135-63-7, 1 page, Jun. 24, 2008.
STN Accession No. 1197926-42-3, 1 page, Dec. 16, 2009.
STN Accession No. 1252181-43-3, 1 page, Nov. 10, 2010.

(Continued)

*Primary Examiner* — Brian-Yong S Kwon
(74) *Attorney, Agent, or Firm* — McCarter & English, LLP; Wei Song; James M. Alburger

(57) ABSTRACT

One embodiment of the invention is a compound represented by Formula I: or a pharmaceutically acceptable salt thereof. The variables in Formula I are defined herein. Compounds of Formula I are CD38 inhibitors, which can be used to treat a disease or condition in a subject that benefits from an increase in NAD+ or to treat a mitochondrial disorder in a subject.

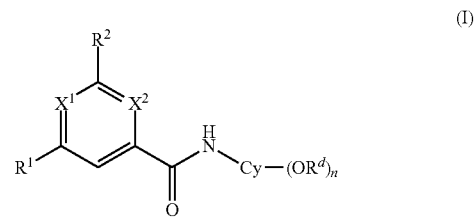

18 Claims, 4 Drawing Sheets

(56) References Cited

OTHER PUBLICATIONS

STN Accession No. 1252190-56-9, 1 page, Nov. 10, 2010.
STN Accession No. 1252461-32-7, 1 page, Nov. 10, 2010.
STN Accession No. 1359352-34-3, 1 page, Mar. 2, 2012.
STN Accession No. 1359360-24-9, 1 page, Mar. 2, 2012.
STN Accession No. 1625407-04-6, 1 page, Sep. 24, 2014.
STN Accession No. 2058736-07-3, 1 page, Jan. 25, 2017.
STN Accession No. 2058967-56-7, 1 page, Jan. 25, 2017.
STN Accession No. 2059115-23-8, 1 page, Jan. 25, 2017.
STN Accession No. 2059873-09-3, 1 page, Jan. 26, 2017.
STN Accession No. 2060286-37-3, 1 page, Jan. 27, 2017.
STN Accession No. 2060575-64-4, 1 page, Jan. 27, 2017.
STN Accession No. 2061325-22-0, 1 page, Jan. 29, 2017.
STN Accession No. 2071888-11-2, 1 page, Feb. 17, 2017.
STN Accession No. 2072189-87-6, 1 page, Feb. 19, 2017.
STN Accession No. 2072869-48-6, 1 page, Feb. 20, 2017.
STN Accession No. 2127060-42-6, 1 page, Feb. 13, 2017.
STN Accession No. 2177638-16-1, 1 page, Feb. 21, 2018.
STN Accession No. 2178599-96-5, 1 page, Feb. 22, 2018.
STN Accession No. 2178706-40-4, 1 page, Feb. 22, 2018.
STN Accession No. 2186338-24-7, 1 page, Mar. 7, 2018.
STN Accession No. 2188223-62-1, 1 page, Mar. 9, 2018.
STN Accession No. 2188505-83-9, 1 page, Mar. 11, 2018.
STN Accession No. 2189193-50-6, 1 page, Mar. 12, 2018.
STN Accession No. 2193291-93-7, 1 page, Mar. 18, 2018.
STN Accession No. 2194085-24-8, 1 page, Mar. 19, 2018.
STN Accession No. 2195895-97-5, 1 page, Mar. 21, 2018.
STN Accession No. 2209988-59-8, 1 page, Apr. 11, 2018.
STN Accession No. 2216482-70-9, 1 page, Apr. 20, 2018.
STN Accession No. 2371738-15-5, 1 page, Sep. 2, 2019.
STN Accession No. 2371956-65-7, 1 page, Sep. 2, 2019.
STN Accession No. 2372189-45-0, 1 page, Sep. 2, 2019.
STN Accession No. 2372377-07-4, 1 page, Sep. 2, 2019.
STN Accession No. 2372489-53-5, 1 page, Sep. 2, 2019.
STN Accession No. 2372513-19-2, 1 page, Sep. 2, 2019.
STN Accession No. 2372531-55-8, 1 page, Sep. 3, 2019.
STN Accession No. 2372563-59-0, 1 page, Sep. 3, 2019.
STN Accession No. 2372604-67-4, 1 page, Sep. 3, 2019.
STN Accession No. 2373160-53-1, 1 page, Sep. 3, 2019.
STN Accession No. 2373489-37-1, 1 page, Sep. 4, 2019.
STN Accession No. 2373569-60-7, 1 page, Sep. 4, 2019.
STN Accession No. 2373681-72-0, 1 page, Sep. 4, 2019.
STN Accession No. 2373836-61-2, 1 page, Sep. 4, 2019.
STN Accession No. 2389701-52-2, 1 page, Dec. 12, 2019.
STN Accession No. 2394953-45-6, 1 page, Dec. 20, 2019.

\* cited by examiner

CD38 INHIBITORS

CROSS-REFERENCE TO RELATED APPLICATIONS

This application is a 35 U.S.C. § 371 national stage filing of International Application No. PCT/US2021/025953 filed on Apr. 6 2021, which in turn claims priority to Indian Patent Application number 202041015255, filed Apr. 7, 2020. The entire contents of each of the foregoing applications which are included herein by reference in their entirety.

FIELD OF THE INVENTION

This application is directed to CD38 inhibitors, and methods for their use, such as to control the activity of CD38 in a subject.

BACKGROUND OF THE INVENTION

Nicotinamide Adenine Dinucleotide ($NAD^+$) is a biochemical found in all cells that was first characterized over 100 years ago due to its role in oxidoreductase reactions. Since then, $NAD^+$ and its related pyridine nucleotides NADH, $NADP^+$, and NADPH are recognized as the major redox carriers in all organisms. These pyridine dinucleotides regulate the cytosolic and mitochondrial redox state and are key participants monitoring the metabolic status of the cell. This is because $NAD^+$ and NADH act as hydride accepting and donating cofactors for metabolic enzymes involved in glycolysis, the TCA cycle, and the respiratory chain and thereby redistribute reducing equivalents generated from these catabolic processes into the de novo synthesis of new biomolecules. (Houtkooper et al *Endo Reviews* (2010) 31:194-223; Koch-Nolte et al *Science Signaling* (2009) 2:mr1; Houtkooper and Auwerx *J. Cell Biol* (2012) 199:205-209; Berger et al *Trends in Bioch Sci* (2004) 29:111-18).

In addition to its long recognized role as a cofactor for oxidoreductases, more recent research demonstrates that $NAD^+$ is also a substrate for various enzymes, where it is consumed in the process of donating its ADP ribose to acceptor molecules. The enzymes that are the major consumers of $NAD^+$ are the ADP ribosyl transferases (i.e., PARP and ART family of enzymes), the sirtuins (Sirt1-7), and the ADP ribosyl cyclases/hydrolases (CD38/CD157). These enzymes are involved in pathways that regulate $Ca^{++}$ signaling, gene transcription, DNA repair, cell survival, energy metabolism, and oxidative stress. Thus, $NAD^+$ and its phosphorylated relatives NADP and NAADP, both of which are derived from $NAD^+$, also act as signaling molecules. $NAD^+$ is also a key component of the circadian cycle with daily oscillations that tie cellular metabolism to chromatin remodeling and gene transcription. It is known that exercise and caloric restriction elevate $NAD^+$ levels, while aging and obesity decrease cellular $NAD^+$ levels. Restoring $NAD^+$ levels in disease states that consume significant amounts of $NAD^+$ will likely have medical benefits as the cell strives to maintain its energy status during stress. (Tevy et al *Trends in Endo and Metab* (2013) 24:229-237; Pugh et al *Aging Cell* (2013) 12:672-681; Massudi et al *PLoS ONE* (2012) 7:e42357; Xu and Sauve (2010) *Mech of Ageing and Development* 131:287-298).

Cellular $NAD^+$ is produced by either the de novo synthesis pathway from tryptophan or by a salvage synthesis pathway from precursors such as nicotinic acid (niacin) and nicotinamide, both of which are obtained from dietary sources. A third way to modulate cellular $NAD^+$ levels is to block consumption of NAD+ by inhibiting enzymes that consume NAD+.

CD38 is one such consumer of NAD+. Also known as ADP ribosyl cyclase, CD38 is a type II membrane-anchored enzyme. It efficiently catalyzes the breakdown of NAD+ to nicotinamide and ADPR and hydrolyzes NAADP to ADPRP. CD38 can also act as a cyclase converting NAD+ to cADPR, although it is 100-fold less efficient as a cyclase than as a hydrolase. CD38 was first characterized as a surface antigen on immune cells and is broadly distributed throughout most tissues in the body. It exists on the plasma membrane and on the membranes of intracellular organelles such as the nucleus and mitochondria. As predicted from its function as a NAD+ glycohydrolase, CD38 KO mice have elevated $NAD^+$ levels relative to wild-type controls. Likewise, inhibitors of CD38 enzyme activity also modulate NAD+ tissue levels and would be useful in treating various diseases where CD38 is over expressed or where cellular $NAD^+$ levels are depressed or desynchronized. (Malavasi et al (2008) 88:841-886)

Compounds which inhibit CD38 and thereby raise $NAD^+$ levels are useful in treating diseases or conditions indicated to benefit from NAD+ including mitochondrial-related diseases or disorders. Diseases which can be treated by raising $NAD^+$ levels are disclosed in WO2016/087975 and WO2017/079195.

SUMMARY OF THE INVENTION

Provided herein are compounds and compositions which inhibit CD38, thereby increasing the amount of $NAD^+$ in cells. For example, the $IC_{50}$ values for inhibition of CD38 provided in Example 66 demonstrate that these compounds are potent inhibitors of CD38.

Also disclosed are methods of using the disclosed compounds and compositions for treating mitochondrial-related diseases or disorders and disease which can benefit from increasing $NAD^+$ levels in cells.

In one embodiment, compounds represented by Formula (I) are provided herein.

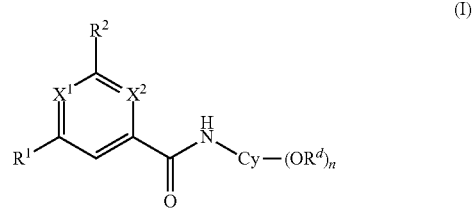

or a pharmaceutically acceptable salt thereof.

In a first aspect, the variables represented in Formula (I) are defined as follows:

$X_1$ and $X_2$ are independently CH or N, provided that $X_1$ and $X_2$ are not both CH;

Cy is $C_{3-7}$cycloalkyl optionally substituted with an oxo group or with one or two $R^x$ groups, wherein $R^x$ is halo, $C_{1-4}$alkyl, $C_{1-4}$haloalkyl, $C_{1-4}$hydroxyalkyl, —$NHSO_2C_1$-$C_4$alkyl, or —$SO_2C_1$-$C_4$alkyl;

$R^1$ is —H, —$NR^aR^b$, halo, —CN, —C(=O)$NH_2$, —COOH, $C_1$-$C_4$alkyl, $C_1$-$C_4$haloalkyl), $C_1$-$C_4$hydroxyalkyl, $C_2$-$C_4$alkenyl, $C_1$-$C_4$alkoxy, $C_1$-$C_4$alkoxyalkyl, $C_1$-$C_4$alkylthio, $C_1$-$C_4$alkylsulfone, $C_1$-$C_4$alkoxyalkylthio, $C_1$-$C_4$haloalkylthio, $C_1$-$C_4$haloalkoxy, $C_3$-$C_4$cycloalkyl, or a 5-membered heteroaryl, wherein the 5-membered heteroaryl is optionally substituted with one, two or three $C_{1-4}$alkyl groups;

$R^2$ is a 5-membered heteroaryl optionally substituted with one, two or three deuterium or $C_{1-4}$alkyl groups;

$R^d$ is H, $C_{1-4}$haloalkyl, $C_{1-4}$hydroxyalkyl, or $C_{1-4}$alkyl optionally substituted with $C_{1-4}$alkoxy;

$R^a$ and $R^b$ independently are —H or $C_1$-$C_4$alkyl; and n is 0 or 1.

In a second aspect, the variables represented in Formula (I) are defined as follows:

$X_1$ and $X_2$ are independently CH or N, provided that $X_1$ and $X_2$ are not both CH;

Cy is $C_{3-7}$cycloalkyl optionally substituted with an oxo group or with one or two $R^x$ groups, wherein $R^x$ is halo, $C_{1-4}$alkyl, $C_{1-4}$haloalkyl, $C_{1-4}$hydroxyalkyl or $SO_2Me$;

$R^1$ is —H, —$NR^aR^b$, halo, —CN, $C_1$-$C_4$alkyl, $C_1$-$C_4$haloalkyl, $C_1$-$C_4$alkoxy, $C_1$-$C_4$alkoxyalkyl, $C_1$-$C_4$alkylthio, $C_1$-$C_4$alkoxyalkylthio, $C_1$-$C_4$haloalkylthio, $C_1$-$C_4$haloalkoxy or a 5-membered heteroaryl, wherein the 5-membered heteroaryl is optionally substituted with one, two or three $C_{1-4}$alkyl groups;

$R^2$ is a 5-membered heteroaryl optionally substituted with one, two or three $C_{1-4}$alkyl groups;

$R^d$ is H or $C_{1-4}$alkyl optionally substituted with $C_{1-4}$alkoxy;

$R^a$ and $R^b$ independently are —H or $C_1$-$C_4$alkyl; and n is 0 or 1.

Another embodiment of the invention is a pharmaceutical composition comprising an acceptable carrier or excipient and a compound disclosed herein or a pharmaceutically acceptable salt thereof.

Another embodiment of the invention is method of treating a disease or condition in a subject that benefits from an increase in NAD⁺ (or treating a mitochondrial disorder), comprising administering to the subject an effective amount of a compound disclosed herein or a pharmaceutically acceptable salt thereof or a pharmaceutical composition comprising the compound(s).

Another embodiment of the invention is the use of a compound disclosed herein or a pharmaceutically acceptable salt thereof or a pharmaceutical composition comprising the compound(s), for the preparation of a medicament for treating a disease or condition in a subject that benefits from an increase in NAD⁺ (or treating a mitochondrial disorder).

Another embodiment of the invention is a compound disclosed herein or a pharmaceutically acceptable salt thereof or a pharmaceutical composition comprising the compound(s), for use in treating a disease or condition in a subject that benefits from an increase in NAD⁺ (or treating a mitochondrial disorder).

DETAILED DESCRIPTION

Figure 1:
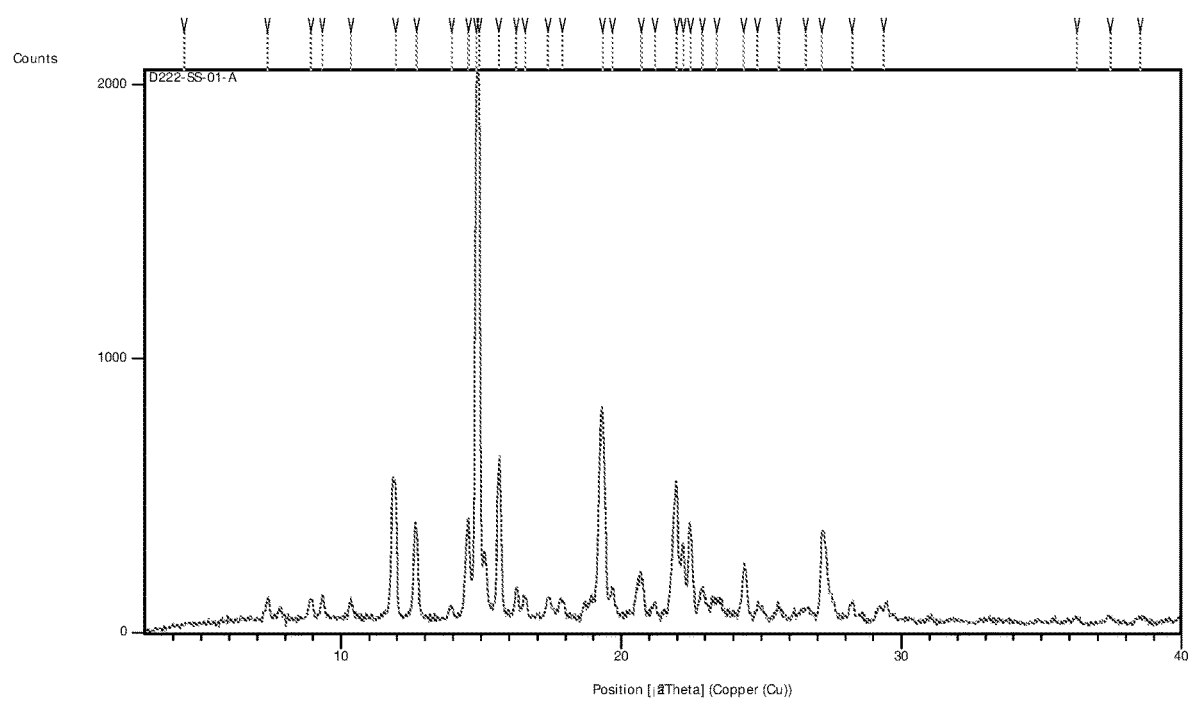
FIG. 1 is an X-ray powder diffraction (XRPD) pattern of 2-(1H-imidazol-1-yl)-N-((1r,4r)-4-(2-methoxyethoxy)cyclohexyl)-6-methylpyrimidine-4-carboxamide Polymorph Type A.

The disclosed compounds are CD38 inhibitors, which can be used for treating a disease or condition in a subject that benefits from an increase in NAD⁺ or for treating a mitochondrial disorder. Such diseases or disorders include a muscle structure disorder, a neuronal activation disorder, a muscle fatigue disorder, a muscle mass disorder, a metabolic disease, a cancer, a vascular disease, an ocular vascular disease, a muscular eye disease, or a renal disease. More specifically, a disease or condition for which a therapeutic benefit can be achieved from an increase in NAD⁺ (or a mitochondrial disorder) include non-alcoholic fatty liver disease (NAFLD), non-alcoholic steatohepatitis (NASH), renal ischemia/reperfusion injury (IRI), Duchenne & Becker muscular dystrophy, diabetes (type I or type II), obesity, and sarcopenia. In another embodiment, "a disease or condition for which a therapeutic benefit can be achieved from an increase in NAD⁺" or "a mitochondrial-related disease or disorder" is selected from Alpers's Disease, CPEO-Chronic progressive external ophthalmoplegia, Kearns-Sayra Syndrome (KSS), Leber Hereditary Optic Neuropathy (LHON), MELAS-Mitochondrial myopathy, encephalomyopathy, lactic acidosis, stroke-like episodes, MERRF-Myoclonic epilepsy and ragged-red fiber disease, NARP-neurogenic muscle weakness, ataxia, retinitis pigmentosa, Pearson Syndrome, platinum-based chemotherapy induced ototoxicity, Cockayne syndrome, xeroderma pigmentosum A, Wallerian degeneration, and HIV-induced lipodystrophy.

In a first embodiment, the invention is a compound represented by Formula I, or a pharmaceutically acceptable salt thereof. The variables in Formula I are described above as the first aspect of Formula I and the second aspect of Formula I.

In a second embodiment, the invention is a compound represented by Formula IIa, IIb or IIc:

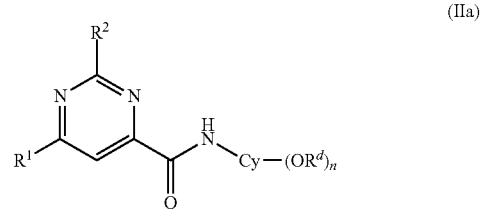

(IIa)

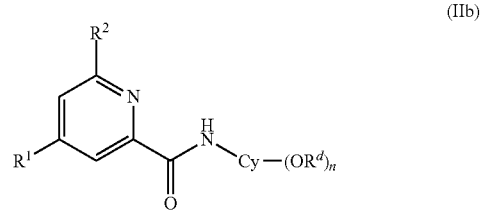

(IIb)

-continued

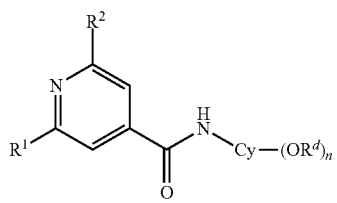
(IIc)

or a pharmaceutically acceptable salt thereof. The variables in Formulas IIa, IIb and IIc are described above for Formula I (first and second aspects).

In a third embodiment, the invention is a compound represented by Formula IIIa, IIIb or IIIc:

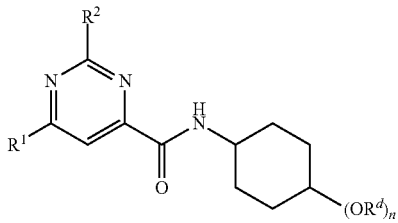
(IIIa)

(IIIb)

(IIIc)

or a pharmaceutically acceptable salt thereof. The variables in Formulas IIIa, IIIb and IIIc are described above for Formula I (first and second aspects).

In a fourth embodiment, the invention is a compound represented by Formula IVa, IVb or IVc:

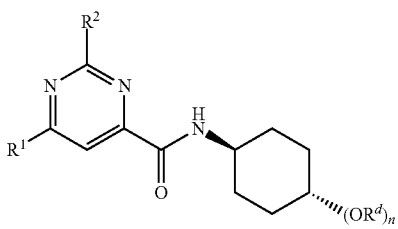
(IVa)

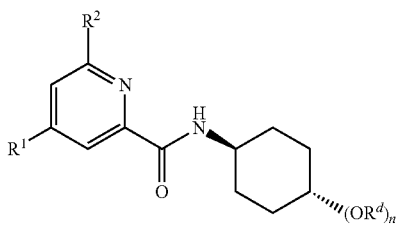
(IVb)

(IVc)

or a pharmaceutically acceptable salt thereof. The variables in Formulas IVa, IVb and IVc are described above for Formula I (first and second aspects).

In a fifth embodiment, the invention is a compound represented by Formula I, IIa, IIb, IIc, IIIa, IIIb, IIIc, IVa, IVb or IVc, or a pharmaceutically acceptable salt thereof, wherein n is 1. The remainder of the variables in Formulas I, IIa, IIb, IIc, IIIa, IIIb, IIIc, IVa, IVb and IVc are described above for Formula I (first and second aspects).

In a sixth embodiment, the invention is a compound represented by Formula I, IIa, IIb, IIc, IIIa, IIIb, IIIc, IVa, IVb or IVc, or a pharmaceutically acceptable salt thereof, wherein $R^d$ is $C_{1-4}$alkyl optionally substituted with $C_{1-4}$alkoxy. The remainder of the variables in Formulas I, IIa, IIb, IIc, IIIa, IIIb, IIIc, IVa, IVb and IVc are described above for Formula I (first and second aspects) or in the fifth embodiment.

In a seventh embodiment, the invention is a compound represented by Formula I, IIa, IIb, IIc, IIIa, IIIb, IIIc, IVa, IVb or IVc, or a pharmaceutically acceptable salt thereof, wherein $R^d$ is $C_{1-4}$alkyl substituted with $C_{1-4}$alkoxy. Alternatively, $R^d$ is —CH$_2$CH$_2$OCH$_3$. The remainder of the variables in Formulas I, IIa, IIb, IIc, IIIa, IIIb, IIIc, IVa, IVb and IVc are described above for Formula I (first and second aspects) or in the fifth embodiment.

In an eighth embodiment, the invention is a compound represented by Formula I, IIa, IIb, IIc, IIIa, IIIb, IIIc, IVa, IVb or IVc, or a pharmaceutically acceptable salt thereof, wherein n is 0 or 1, and when n is 1 then $R^d$ is —H, —CH$_3$ or —CH$_2$CH$_2$OCH$_3$. The remainder of the variables in Formulas I, IIa, IIb, IIc, IIIa, IIIb, IIIc, IVa, IVb and IVc are described above for Formula I (first and second aspects).

In a ninth embodiment, the invention is a compound represented by Formula I, IIa, IIb, IIc, IIIa, IIIb, IIIc, IVa, IVb or IVc, or a pharmaceutically acceptable salt thereof, wherein $R^1$ is a 5-membered heteroaryl optionally substituted with one, two or three $C_{1-4}$alkyl groups. The remainder of the variables in Formulas I, IIa, IIb, IIc, IIIa, IIIb, IIIc, IVa, IVb and IVc are described above for Formula I (first and second aspects), or in the fifth, sixth, seventh or eight embodiments.

In a tenth embodiment, the invention is a compound represented by Formula I, IIa, IIb, IIc, IIIa, IIIb, IIIc, IVa, IVb or IVc, or a pharmaceutically acceptable salt thereof, wherein $R^1$ is imidazole, pyrazole, triazole, thiazole, isothiazole, oxazole, isoxazole, thiadiazole or oxadiazole, optionally substituted with one, two or three $C_{1-4}$alkyl groups. The remainder of the variables in Formulas I, IIa, IIb, IIc, IIIa, IIIb, IIIc, IVa, IVb and IVc are described above for Formula I (first and second aspects), or in the fifth, sixth, seventh or eight embodiments.

In a eleventh embodiment, the invention is a compound represented by Formula I, IIa, IIb, IIc, IIIa, IIIb, IIIc, IVa, IVb or IVc, or a pharmaceutically acceptable salt thereof, wherein $R^1$ is selected from the group consisting of

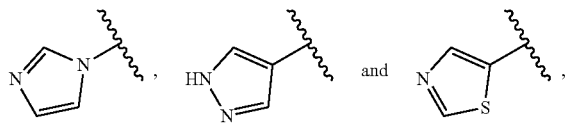 [SMILES: *n1ccnc1 ; *c1cn[nH]c1 ; *c1cncs1]

each optionally substituted with one, two or three $C_{1-4}$alkyl groups. Alternatively $R^1$ is

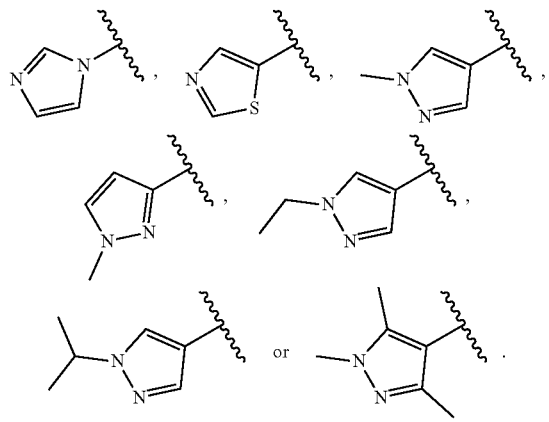

The remainder of the variables in Formulas I, IIa, IIb, IIc, IIIa, IIIb, IIIc, IVa, IVb and IVc are described above for Formula I (first and second aspects), or in the fifth, sixth, seventh or eight embodiments.

In a twelfth embodiment, the invention is a compound represented by Formula I, IIa, IIb, IIc, IIIa, IIIb, IIIc, IVa, IVb or IVc, or a pharmaceutically acceptable salt thereof, wherein $R^1$ is —H, —$NR^aR^b$, halo, —CN, $C_1$-$C_4$alkyl, $C_1$-$C_4$haloalkyl, $C_1$-$C_4$alkoxy, $C_1$-$C_4$alkoxyalkyl, $C_1$-$C_4$alkylthio, $C_1$-$C_4$alkoxyalkylthio or $C_1$-$C_4$haloalkylthio. The remainder of the variables in Formulas I, IIa, IIb, IIc, IIIa, IIIb, IIIc, IVa, IVb and IVc are described above for Formula I (first and second aspects), or in the fifth, sixth, seventh or eight embodiments.

In a thirteenth embodiment, the invention is a compound represented by Formula I, IIa, IIb, IIc, IIIa, IIIb, IIIc, IVa, IVb or IVc, or a pharmaceutically acceptable salt thereof, wherein $R^1$ is —H, —$NH_2$, halo, $C_1$-$C_4$alkyl, $C_1$-$C_4$haloalkyl, $C_1$-$C_4$alkoxy, $C_1$-$C_4$haloalkyl, $C_1$-$C_4$haloalkoxy or $C_1$-$C_4$alkylthio. Alternatively $R^1$ is —H, —$CH_3$, —$CF_3$, —$OCH_3$, —$SCH_3$, —F, —Cl, —Br or —$NH_2$. Alternatively $R^1$ is —$CH_3$. The remainder of the variables in Formulas I, IIa, IIb, IIc, IIIa, IIIb, IIIc, IVa, IVb and IVc are described above for Formula I (first and second aspects), or in the fifth, sixth, seventh or eight embodiments.

In a fourteenth embodiment, the invention is a compound represented by Formula I, IIa, IIb, IIc, IIIa, IIIb, IIIc, IVa, IVb or IVc, or a pharmaceutically acceptable salt thereof, $R^2$ is imidazole, pyrazole, triazole, thiazole, isothiazole, oxazole, isoxazole, thiadiazole or oxadiazole, optionally substituted with one, two or three $C_{1-4}$alkyl groups. The remainder of the variables in Formulas I, IIa, IIb, IIc, IIIa, IIIb, IIIc, IVa, IVb and IVc are described above for Formula I (first and second aspects), or in the fifth, sixth, seventh, eight, ninth, tenth, eleventh, twelfth or thirteenth embodiments.

In a fifteenth embodiment, the invention is a compound represented by Formula I, IIa, IIb, IIc, IIIa, IIIb, IIIc, IVa, IVb or IVc, or a pharmaceutically acceptable salt thereof, wherein $R^2$ is selected from the group consisting of

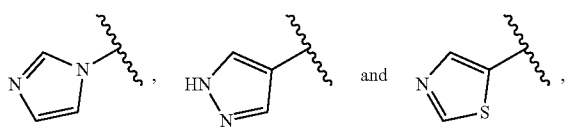 [SMILES: *n1ccnc1 ; *c1cn[nH]c1 ; *c1cncs1]

each optionally substituted with one, two or three $C_{1-4}$alkyl groups. Alternatively $R^2$ is

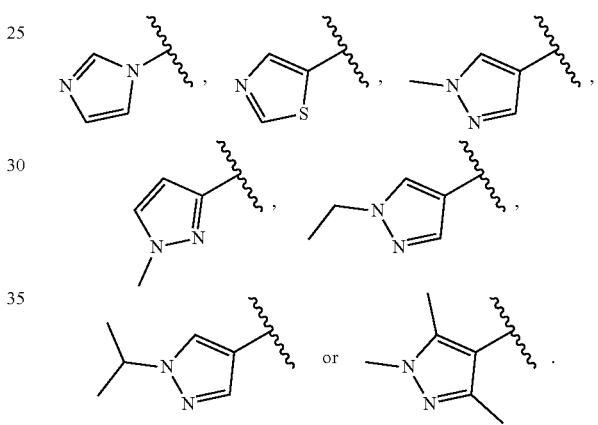

Alternatively $R^2$ is

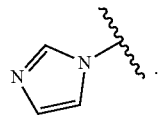

The remainder of the variables in Formulas I, IIa, IIb, IIc, IIIa, IIIb, IIIc, IVa, IVb and IVc are described above for Formula I (first and second aspects), or in the fifth, sixth, seventh, eight, ninth, tenth, eleventh, twelfth or thirteenth embodiments.

In a sixteenth embodiment, the invention is a compound represented by Formulas I, IIa, IIb, IIc, IIIa, IIIb, IIIc, IVa, IVb or IVc, or a pharmaceutically acceptable salt thereof, wherein $R^1$ is —C(=O)$NH_2$, —COOH, $C_1$-$C_4$haloalkyl, $C_1$-$C_4$hydroxyalkyl, $C_2$-$C_4$alkenyl, —CN, $C_1$-$C_4$alkylsulfone, or $C_3$-$C_4$cycloalkyl. The remainder of the variables are as described above for Formula I (first aspect), or in the fifth, sixth, seventh, eighth, fourteenth or fifteenth embodiments.

In a seventeenth embodiment, the invention is a compound represented by Formulas I, IIa, IIb, IIc, IIIa, IIIb, IIIc, IVa, IVb or IVc, or a pharmaceutically acceptable salt thereof, wherein $R^1$ is —C(=O)NH$_2$, —COOH, —CHF$_2$, —CH$_2$F, —CH(OH)CH$_3$, —C(OH)(CH$_3$)$_2$, —CH$_2$OH, —CH=CH$_2$, —SO$_2$Me, or cyclopropyl. The remainder of the variables are as described above for Formula I (first aspect), or in the fifth, sixth, seventh, eighth, fourteenth, fifteenth or sixteenth embodiments.

In an eighteenth embodiment, the invention is a compound represented by Formulas I, IIa, IIb, IIc, IIIa, IIIb, IIIc, IVa, IVb or IVc, or a pharmaceutically acceptable salt thereof, wherein $R^2$ is a 5-membered heteroaryl (e.g., an imidazole) substituted with one, two, or three deuterium. The remainder of the variables are described above for Formula I (first aspect), or in the fifth, sixth, seventh, eighth, ninth, tenth, eleventh, twelfth, thirteenth, sixteenth, or seventeenth embodiments.

In a nineteenth embodiment, the invention is a compound represented by Formulas I, IIa, IIb, IIc, IIIa, IIIb, IIIc, IVa, IVb or IVc, or a pharmaceutically acceptable salt thereof, wherein, wherein $R^d$ is $C_{1-4}$haloalkyl or $C_{1-4}$hydroxyalkyl. The remainder of the variables are as described above for Formula I (first aspect), or in the fifth, ninth, tenth, eleventh, twelfth, thirteenth, fourteenth, fifteenth, sixteenth, seventeenth or eighteenth embodiments.

In a twentieth embodiment, the invention is a compound represented by Formula I, IIa, IIb, IIc, IIIa, IIIb, IIIc, IVa, IVb or IVc, or a pharmaceutically acceptable salt thereof, wherein, wherein $R^d$ is —CHF$_2$ or —CH$_2$CH$_2$OH. The remainder of the variables are as described above for Formula I (first aspect), or in the fifth, ninth, tenth, eleventh, twelfth, thirteenth, fourteenth, fifteenth, sixteenth, seventeenth, eighteenth, or nineteenth embodiments.

In a twenty-first embodiment, the invention is a compound represented by Formula I IIa, IIb or IIc, or a pharmaceutically acceptable salt thereof, wherein Cy is cyclohexyl substituted with —NHSO$_2$(C$_1$-C$_4$alkyl) (—NHSO$_2$Et). The remainder of the variables are as described above for Formula I (first aspect), or in the fifth, sixth, seventh, eighth, ninth, tenth, eleventh, twelfth, thirteenth, fourteenth, fifteenth, sixteenth, seventeenth, eighteenth, nineteenth, or twentieth embodiments.

The invention also includes the compounds depicted in the Table 3 and the compounds prepared in the Exemplification. Both pharmaceutically acceptable salts and the neutral form of these compounds are included. In another embodiment, the invention is directed to a hydrate or solvate and/or crystal polymorph of the compound of Formula I, IIa, IIb, IIc, IIIa, IIIb, IIIc, IVa, IVb or IVc or a pharmaceutically acceptable salt thereof. In another embodiment, the invention is directed to the anhydrous form (i.e., not a solvate or hydrate) of the compound of Formula I, IIa, IIb, IIc, IIIa, IIIb, IIIc, IVa, IVb or IVc or a pharmaceutically acceptable salt thereof. In another embodiment, the present invention is directed to the compound of Formula I, IIa, IIb, IIc, IIIa, IIIb, IIIc, IVa, IVb or IVc or a pharmaceutically acceptable salt thereof that is enriched at one or more positions with a radioactive or non-radioactive isotope. In another embodiment, the present invention is directed to the compound of Formula I, IIa, IIb, IIc, IIIa, IIIb, IIIc, IVa, IVb or IVc or a pharmaceutically acceptable salt thereof that is enriched at one or more positions with deuterium.

Included in the present teachings are pharmaceutically acceptable salts of the compounds disclosed herein. Compounds of the present teachings with basic groups can form pharmaceutically acceptable salts with pharmaceutically acceptable acid(s). Suitable pharmaceutically acceptable acid addition salts of the compounds described herein include salts of inorganic acids (such as hydrochloric acid, hydrobromic, phosphoric, nitric, and sulfuric acids) and of organic acids (such as acetic acid, benzenesulfonic, benzoic, methanesulfonic, and p-toluenesulfonic acids). Compounds of the present teachings with acidic groups can form pharmaceutically acceptable salts with pharmaceutically acceptable base(s). Suitable pharmaceutically acceptable basic salts include ammonium salts, alkali metal salts (such as sodium and potassium salts) and alkaline earth metal salts (such as magnesium and calcium salts).

As used herein, the term "pharmaceutically acceptable salt" refers to pharmaceutical salts that are, within the scope of sound medical judgment, suitable for use in contact with the tissues of humans and lower animals without undue toxicity, irritation, and allergic response, and are commensurate with a reasonable benefit/risk ratio. Pharmaceutically-acceptable salts are well known in the art. For example, S. M. Berge et al. describes pharmacologically acceptable salts in *J. Pharm. Sci.* (1977) 66:1-19.

The term "alkyl" used alone or as part of a larger moiety, such as "alkoxy", "haloalkyl", "haloalkoxy", "hydroxyalkyl", "alkoxyalkyl", "alkylthio", "alkoxyalkylthio", "haloalkylthio" and the like, means a saturated aliphatic straight-chain or branched monovalent hydrocarbon radical. Unless otherwise specified, an alkyl group typically has 1 to 4 carbon atoms, i.e., $C_1$-$C_4$alkyl. As used herein, a "$C_1$-$C_4$alkyl" group means a radical having from 1 to 4 carbon atoms in a linear or branched arrangement, such as methyl, ethyl, propyl, isopropyl, butyl, isobutyl, tert-butyl, and the like.

"Alkoxy" means an alkyl radical attached through an oxygen linking atom, represented by —O-alkyl. For example, "$C_1$-$C_4$alkoxy" includes methoxy, ethoxy, propoxy, butoxy and isopropoxy.

The terms "haloalkyl" and "haloalkoxy" mean alkyl or alkoxy, as the case may be, substituted with one or more halogen atoms. In some embodiments, "haloalkyl" and "haloalkoxy" means alkyl or alkoxy, as the case may be, substituted with one or more fluorine atoms.

The terms "halogen" and "halo" mean fluorine or fluoro (F), chlorine or chloro (Cl), bromine or bromo (Br), or iodine or iodo (I).

The term "hydroxyalkyl" means alkyl substituted with one or more hydroxyl groups.

For example, "$C_1$-$C_4$hydroxyalkyl" includes, but is not limited to, hydroxyethyl and hydroxypropyl.

The term "alkoxyalkyl" means alkyl substituted with an alkoxy group.

The term "alkylthio" means an alkyl radical attached through a sulfur linking atom, represented by —S-alkyl.

The term "alkoxyalkylthio" means alkylthio substituted with an alkoxy group.

The term "haloalkylthio" means alkylthio substituted with one or more halogen atoms, e.g., one or more fluorine atoms.

"Cycloalkyl" means a saturated aliphatic monocyclic hydrocarbon radical. Unless otherwise specified, a cycloalkyl has 3-7 ring carbon atoms, alternatively 3-6 ring carbon atoms. For example, "$C_3$-$C_6$cycloalkyl" means a radical having from 3 to 6 carbon atoms arranged in a monocyclic ring. A $C_3$-$C_6$cycloalkyl includes, but is not limited to, cyclopropyl, cyclobutyl, cyclopentyl, and cyclohexyl.

The term "5-membered heteroaryl" refers to monocyclic aromatic ring groups having five ring atoms selected from carbon and at least one (typically 1 to 3, more typically 1 or 2) heteroatoms (e.g., oxygen, nitrogen or sulfur).

Examples of 5-membered heteroaryl groups include furanyl (e.g., 2-furanyl, 3-furanyl), imidazolyl (e.g., N-imidazolyl, 2-imidazolyl, 4-imidazolyl, 5-imidazolyl), isoxazolyl (e.g., 3-isoxazolyl, 4-isoxazolyl, 5-isoxazolyl), oxadiazolyl (e.g., 2-oxadiazolyl, 5-oxadiazolyl), oxazolyl (e.g., 2-oxazolyl, 4-oxazolyl, 5-oxazolyl), pyrazolyl (e.g., 3-pyrazolyl, 4-pyrazolyl), pyrrolyl (e.g., 1-pyrrolyl, 2-pyrrolyl, 3-pyrrolyl), thiazolyl (e.g., 2-thiazolyl, 4-thiazolyl, 5-thiazolyl), triazolyl (e.g., 2-triazolyl, 5-triazolyl) and thienyl (e.g., 2-thienyl, 3-thienyl).

If a group is described as being "substituted", a non-hydrogen substituent is in the place of a hydrogen substituent on a carbon, sulfur or nitrogen of the group. Thus, for example, a substituted alkyl is an alkyl wherein at least one non-hydrogen substituent is in the place of a hydrogen substituent on the alkyl group. To illustrate, monofluoroalkyl is an alkyl substituted with a fluoro substituent, and difluoroalkyl is an alkyl substituted with two fluoro substituents. It should be recognized that if there is more than one substitution on a substituent, each non-hydrogen substituent can be identical or different (unless otherwise stated).

If a group is described as being "optionally substituted", the substituent can be either (1) not substituted, or (2) substituted.

If a group is described as being optionally substituted with up to a particular number of non-hydrogen substituents, that group can be either (1) not substituted; or (2) substituted by up to that particular number of non-hydrogen substituents or by up to the maximum number of substitutable positions on the substituent, whichever is less. Thus, for example, if a group is described as a cycloalkyl optionally substituted with up to 3 non-hydrogen substituents, then any cycloalkyl with less than 3 substitutable positions would be optionally substituted by up to only as many non-hydrogen substituents as the cycloalkyl has substitutable positions.

Compounds having one or more chiral centers can exist in various stereoisomeric forms. Stereoisomers are compounds that differ only in their spatial arrangement.

Stereoisomers include all diastereomeric, enantiomeric, and epimeric forms as well as racemates and mixtures thereof. A "geometric isomer" refers to isomers that differ in the orientation of substituent group in relationship to a cycloalkyl ring, i.e., cis or trans isomers. "Cis" refers to substituents oriented on the same side of the ring, whereas trans refers to substituents oriented on opposite sides of the ring.

When a disclosed compound is named or depicted by structure without indicating stereochemistry, it is understood that the name or the structure encompasses one of the possible stereoisomers or geometric isomers free of the others, or a mixture of the encompassed stereoisomers or geometric isomers.

When a geometric isomer or a stereoisomer is depicted by name or structure, it is to be understood that the named or depicted isomer exists to a greater degree than its corresponding isomer, that is that the geometric isomeric purity of the named or depicted geometric isomer is greater than 50%, such as at least 60%, 70%, 80%, 90%, 99% or 99.9% pure by weight. Geometric isomeric purity is determined by dividing the weight of the named or depicted geometric isomer in the mixture by the total weight of all of the geometric isomers in the mixture.

Racemic mixture means 50% of one enantiomer and 50% of its corresponding enantiomer. When a compound with one chiral center is named or depicted without indicating the stereochemistry of the chiral center, it is understood that the name or structure encompasses both possible enantiomeric forms (e.g., both enantiomerically-pure, enantiomerically-enriched or racemic) of the compound. When a compound with two or more chiral centers is named or depicted without indicating the stereochemistry of the chiral centers, it is understood that the name or structure encompasses all possible diastereomeric forms (e.g., diastereomerically pure, diastereomerically enriched and equimolar mixtures if one or more diastereomers e.g., racemic mixtures) of the compound.

Enantiomeric mixtures can be resolved into their component enantiomers by well-known methods, such as chiral-phase gas chromatography, chiral-phase high performance liquid chromatography, crystallizing the compound as a chiral salt complex, or crystallizing the compound in a chiral solvent. Enantiomers also can be obtained from enantiomerically-pure intermediates, reagents, and catalysts by well-known asymmetric synthetic methods.

When a compound is designated by a name or structure that indicates a single enantiomer, unless indicated otherwise, the compound is at least 60%, 70%, 80%, 90%, 99% or 99.9% optically pure (also referred to as "enantiomerically pure"). Optical purity is the weight in the mixture of the named or depicted enantiomer divided by the total weight in the mixture of both enantiomers.

When the stereochemistry of a disclosed compound is named or depicted by structure, and the named or depicted structure encompasses more than one stereoisomer (e.g., as in a diastereomeric pair), it is to be understood that one of the encompassed stereoisomers or any mixture of the encompassed stereoisomers are included. It is to be further understood that the stereoisomeric purity of the named or depicted stereoisomers is at least 60%, 70%, 80%, 90%, 99% or 99.9% by weight. The stereoisomeric purity in this case is determined by dividing the total weight in the mixture of the stereoisomers encompassed by the name or structure by the total weight in the mixture of all of the stereoisomers.

Methods of treating a mitochondria-related disease or condition in a subject are disclosed. Also disclosed herein are methods of treating a disease or disorder that would benefit from increased $NAD^+$ levels, for example by increasing in vivo levels of $NAD^+$ (e.g. intracellular $NAD^+$ levels, levels of $NAD^+$ in tissues or plasma, and/or overall $NAD^+$ levels in an organism). The methods can include administering to the subject an effective amount of one or more compounds or compositions provided herein.

Diseases and disorders that can be treated by the disclosed compounds and pharmaceutical compositions include diseases or disorders related to aging or stress, diabetes, obesity, neurodegenerative diseases, cardiovascular disease, blood clotting disorders, inflammation, cancer, and/or flushing, etc.

In one embodiment, the diseases or disorders includes, but is not limited to, Alpers's Disease, CPEO-Chronic progressive external ophthalmoplegia, Kearns-Sayra Syndrome (KSS), Leber Hereditary Optic Neuropathy (LHON), MELAS-Mitochondrial myopathy, encephalomyopathy, lactic acidosis, stroke-like episodes, MERRF-Myoclonic epilepsy and ragged-red fiber disease, NARP-neurogenic muscle weakness, ataxia, retinitis pigmentosa, Pearson Syndrome, platinum-based chemotherapy induced ototoxicity, Cockayne syndrome, xeroderma pigmentosum A, Wallerian degeneration, and HIV-induced lipodystrophy.

In one embodiment, the mitochondrial-related disease or disorder or disease or disorder that would benefit from increased $NAD^+$ levels is a muscle structure disorder, a neuronal activation disorder, a muscle fatigue disorder, a muscle mass disorder, a metabolic disease, a cancer, a vascular disease, an ocular vascular disease, a muscular eye disease, or a renal disease.

The muscle structure disorder is selected from Bethlem myopathy, central core disease, congenital fiber type disproportion, distal muscular dystrophy (MD), Duchenne & Becker MD, Emery-Dreifuss MD, facioscapulohumeral MD, hyaline body myopathy, limb-girdle MD, a muscle sodium channel disorders, myotonic chondrodystrophy, myotonic dystrophy, myotubular myopathy, nemaline body disease, oculopharyngeal MD, and stress urinary incontinence.

The neuronal activation disorder is selected from amyotrophic lateral sclerosis, Charcot-Marie-Tooth disease, Guillain-Barre syndrome, Lambert-Eaton syndrome, multiple sclerosis, myasthenia gravis, nerve lesion, peripheral neuropathy, spinal muscular atrophy, tardy ulnar nerve palsy, and toxic myoneural disorder.

The muscle fatigue disorder is selected from chronic fatigue syndrome, diabetes (type I or II), glycogen storage disease, fibromyalgia, Friedreich's ataxia, intermittent claudication, lipid storage myopathy, MELAS, mucopolysaccharidosis, Pompe disease, and thyrotoxic myopathy; the muscle mass disorder is selected from cachexia, cartilage degeneration, cerebral palsy, compartment syndrome, critical illness myopathy, inclusion body myositis, muscular atrophy (disuse), sarcopenia, steroid myopathy, and systemic lupus erythematosus.

The beta oxidation disease is selected from systemic carnitine transporter, carnitine palmitoyltransferase (CPT) II deficiency, very long-chain acyl-CoA dehydrogenase (LCHAD or VLCAD) deficiency, trifunctional enzyme deficiency, medium-chain acyl-CoA dehydrogenase (MCAD) deficiency, short-chain acyl-CoA dehydrogenase (SCAD) deficiency, and riboflavin-responsive disorders of β-oxidation (RR-MADD).

The metabolic disease is selected from hyperlipidemia, dyslipidemia, hyperchlolesterolemia, hypertriglyceridemia, HDL hypocholesterolemia, LDL hypercholesterolemia and/or HLD non-cholesterolemia, VLDL hyperproteinemia, dyslipoproteinemia, apolipoprotein A-I hypoproteinemia, atherosclerosis, disease of arterial sclerosis, disease of cardiovascular systems, cerebrovascular disease, peripheral circulatory disease, metabolic syndrome, syndrome X, obesity, diabetes (type I or II), hyperglycemia, insulin resistance, impaired glucose tolerance, hyperinsulinism, diabetic complication, cardiac insufficiency, cardiac infarction, cardiomyopathy, hypertension, Non-alcoholic fatty liver disease (NAFLD), Nonalcoholic steatohepatitis (NASH), thrombus, Alzheimer disease, neurodegenerative disease, demyelinating disease, multiple sclerosis, adrenal leukodystrophy, dermatitis, psoriasis, acne, skin aging, trichosis, inflammation, arthritis, asthma, hypersensitive intestine syndrome, ulcerative colitis, Crohn's disease, and pancreatitis.

The vascular disease is selected from peripheral vascular insufficiency, peripheral vascular disease, intermittent claudication, peripheral vascular disease (PVD), peripheral artery disease (PAD), peripheral artery occlusive disease (PAOD), and peripheral obliterative arteriopathy.

The ocular vascular disease is selected from age-related macular degeneration (AMD), stargardt disease, hypertensive retinopathy, diabetic retinopathy, retinopathy, macular degeneration, retinal haemorrhage, and glaucoma.

The muscular eye disease is selected from strabismus, progressive external ophthalmoplegia, esotropia, exotropia, a disorder of refraction and accommodation, hypermetropia, myopia, astigmatism, anisometropia, presbyopia, disorders of accommodation, and internal ophthalmoplegia.

The renal disease is selected from glomerulonephritis, glomerulosclerosis, nephrotic syndrome, hypertensive nephrosclerosis, acute nephritis, recurrent hematuria, persistent hematuria, chronic nephritis, rapidly progressive nephritis, acute renal failure (also known as acute kidney injury), chronic renal failure, diabetic nephropathy, and Bartter's syndrome.

In another embodiment, the mitochondrial-related disease or condition or disease or disorder that would benefit from increased $NAD^+$ levels is selected from genetic lipodystrophy, non-alcoholic fatty liver disease (NAFLD), non-alcoholic steatohepatitis (NASH), renal ischemia/reperfusion injury (IRI), cardiac ischemia/reperfusion injury, Duchenne & Becker muscular dystrophy, diabetes (type I or type II), obesity, and sarcopenia.

In another embodiment, the compounds of the invention and pharmaceutical compositions thereof may be used to treat cells useful for transplantation or cell therapy, including, for example, solid tissue grafts, organ transplants, cell suspensions, stem cells, bone marrow cells, etc. The cells or tissue may be an autograft, an allograft, a syngraft or a xenograft. The cells or tissue may be treated using the compounds of the invention and pharmaceutical compositions thereof prior to administration/implantation, concurrently with administration/implantation, and/or post administration/implantation into a subject. The cells or tissue may be treated prior to removal of the cells from the donor individual, ex vivo after removal of the cells or tissue from the donor individual, or post implantation into the recipient. For example, the donor or recipient individual may be treated systemically with the CD38 inhibitor preparations or pharmaceutical compositions of the invention, or may have a subset of cells/tissue treated locally with the compounds of the invention and pharmaceutical compositions thereof. In certain embodiments, the cells or tissue (or donor/recipient individuals) may additionally be treated with another therapeutic agent useful for prolonging graft survival, such as, for example, an immunosuppressive agent, a cytokine, an angiogenic factor, etc.

In yet other embodiments, the compounds of the invention and/or a pharmaceutical composition thereof can be used to treat skin conditions. Exemplary skin conditions that may be treated in accordance with the methods described herein include disorders or diseases associated with or caused by inflammation, sun damage or natural aging. For example, the compositions find utility in the treatment of contact dermatitis (including irritant contact dermatitis and allergic contact dermatitis), atopic dermatitis (also known as allergic eczema), actinic keratosis, keratinization disorders (including eczema), epidermolysis bullosa diseases (including penfigus), exfoliative dermatitis, seborrheic dermatitis, erythemas (including erythema multiforme and erythema nodosum), scleroderma, damage caused by the sun or other light sources, discoid lupus erythematosus, dermatomyositis, psoriasis, skin cancer and the effects of natural aging. In another embodiment, the compounds of the invention and pharmaceutical compositions thereof may be used for the treatment of wounds and/or burns to promote healing, including, for example, first-, second- or third-degree burns and/or thermal, chemical or electrical burns.

The compounds of the invention and pharmaceutical compositions thereof can also be administered to subjects for treatment of diseases, e.g., chronic diseases, associated with cell death, in order to protect the cells from cell death. Exemplary diseases include those associated with neural cell death, neuronal dysfunction, or muscular cell death or dysfunction, such as Parkinson's disease, Alzheimer's disease, multiple sclerosis, amyotropic lateral sclerosis, and muscular dystrophy; AIDS; fulminant hepatitis; diseases linked to degeneration of the brain, such as Creutzfeld-Jakob disease, retinitis pigmentosa and cerebellar degeneration; myelodysplasis such as aplastic anemia; ischemic diseases such as myocardial infarction and stroke; hepatic diseases such as alcoholic hepatitis, hepatitis B and hepatitis C; joint-diseases such as osteoarthritis; atherosclerosis; alopecia; damage to the skin due to UV light; lichen planus; atrophy of the skin; cataract; and graft rejections. Cell death can also be caused by surgery, drug therapy, chemical exposure or radiation exposure.

The compounds of the invention and pharmaceutical compositions thereof can also be administered to a subject suffering from an acute disease, e.g., damage to an organ or tissue, e.g., a subject suffering from stroke or myocardial infarction or a subject suffering from a spinal cord injury. The compounds of the invention and pharmaceutical compositions thereof may also be used to repair an alcoholic's liver.

In another embodiment, the invention provides a method for treating a cardiovascular disease by administering to a subject in need thereof one or more of the compounds of the invention and/or a pharmaceutical composition thereof. Cardiovascular diseases that can be treated using the compounds of the invention and pharmaceutical compositions thereof include cardiomyopathy or myocarditis, such as idiopathic cardiomyopathy, metabolic cardiomyopathy, alcoholic cardiomyopathy, drug-induced cardiomyopathy, ischemic cardiomyopathy, complications associated with percutaneous coronary intervention, and hypertensive cardiomyopathy. Also treatable using compositions and methods described herein are atheromatous disorders of the major blood vessels (macrovascular disease) such as the aorta, the coronary arteries, the carotid arteries, the cerebrovascular arteries, the renal arteries, the iliac arteries, the femoral arteries, and the popliteal arteries. Other vascular diseases that can be treated include those related to platelet aggregation, the retinal arterioles, the glomerular arterioles, the vasa nervorum, cardiac arterioles, and associated capillary beds of the eye, the kidney, the heart, and the central and peripheral nervous systems. The compounds of the invention and pharmaceutical compositions thereof may also be used for increasing HDL levels in plasma of an individual.

The compounds of the invention and pharmaceutical compositions thereof may be administered to subjects who have recently received or are likely to receive a dose of radiation or toxin. In one embodiment, the dose of radiation or toxin is received as part of a work-related or medical procedure, e.g., working in a nuclear power plant, flying an airplane, an X-ray, CAT scan, or the administration of a radioactive dye for medical imaging; in such an embodiment, the compound is administered as a prophylactic measure. In another embodiment, the radiation or toxin exposure is received unintentionally, e.g., as a result of an industrial accident, habitation in a location of natural radiation, terrorist act, or act of war involving radioactive or toxic material. In such a case, the compounds of the invention and pharmaceutical compositions thereof is preferably administered as soon as possible after the exposure to inhibit apoptosis and the subsequent development of acute radiation syndrome.

In another embodiment, the compounds of the invention and pharmaceutical compositions thereof may be useful for treating age-related disorders, such as, for example, cancer.

Exemplary cancers that may be treated using the compounds of the invention and pharmaceutical compositions thereof include those of the brain and kidney; hormone-dependent cancers including breast, prostate, colon, large intestine, skin, lung, testicular, pancreas, and ovarian cancers; lymphomas, and leukemias. Other diseases that can be treated include autoimmune diseases, e.g., systemic lupus erythematosus, systemic scleroderma, and arthritis, in which autoimmune cells should be removed. Viral infections such as herpes, HIV, adenovirus, coronavirus, influenza, and HTLV-1 associated malignant and benign disorders can also be treated by administration of one or more of the compounds of the invention and pharmaceutical compositions thereof.

In another embodiment, the compounds of the invention and pharmaceutical compositions thereof may be useful for accelerated aging disorders, such as, for example, Hutchinson-Gilford progeria syndrome, Werner syndrome, telomere deficiency syndromes or telomeropathies, and dyskeratosis gongenita. Additional diseases that can be treated include those associated with stress-induced premature senescence, which may include extrapulmonary complications of COPD such as cardiovascular disease, osteoporosis, and dementia, and diseases where "inflammaging" or secreted factors from senescent cells alter the balance of NAD synthesis and consumption.

In certain aspects, the compounds of the invention and pharmaceutical compositions thereof can be used to treat patients suffering from neurodegenerative diseases, and traumatic or mechanical injury to the central nervous system (CNS) or peripheral nervous system (PNS). Examples of neurodegenerative diseases include, but are not limited to, Alzheimer's disease (AD), Parkinson's disease (PD), Huntington disease (HD), amyotrophic lateral sclerosis (ALS; Lou Gehrig's disease), diffuse Lewy body disease, chorea-acanthocytosis, primary lateral sclerosis, ocular diseases (ocular neuritis), chemotherapy-induced neuropathies (e.g., from vincristine, paclitaxel, bortezomib), diabetes-induced neuropathies and Friedreich's ataxia. The compounds of the invention and pharmaceutical compositions thereof can be used to treat these disorders and others as described below.

In an exemplary embodiment, the compounds of the invention and pharmaceutical compositions thereof may be used to treat multiple sclerosis (MS), including relapsing MS and monosymptomatic MS, and other demyelinating conditions, such as, for example, chronic inflammatory demyelinating polyneuropathy (CIDP), or symptoms associated therewith.

In yet another embodiment, the compounds of the invention and pharmaceutical compositions thereof may be used to treat trauma to the nerves, including, trauma due to disease, injury (including surgical intervention), or environmental trauma (e.g., neurotoxins, alcoholism, etc.).

The compounds of the invention and pharmaceutical compositions thereof may also be useful to treat and alleviate symptoms of various peripheral nervous system (PNS) disorders. PNS disorders include a wide range of disorders in which the nerves outside of the brain and spinal cord—peripheral nerves—have been damaged. Peripheral neuropathy may also be referred to as peripheral neuritis, or if many nerves are involved, the terms polyneuropathy or polyneuritis may be used. PNS disorders may be the result of, for example, leprosy, diabetes, Guillain-Barre syndrome, and others.

Other PNS diseases treatable with the compounds of the invention and pharmaceutical compositions thereof include Brachial Plexus Neuropathies (diseases of the cervical and first thoracic roots, nerve trunks, cords, and peripheral nerve components of the brachial plexus). Clinical manifestations include regional pain, paresthesia; muscle weakness, and decreased sensation in the upper extremity. These disorders may be associated with trauma, including birth injuries; thoracic outlet syndrome; neoplasms, neuritis, radiotherapy; and other conditions (see Adams et al., *Principles of Neurology*, 6th ed. pp. 1351-2). Also included are Diabetic Neuropathies (peripheral, autonomic, and cranial nerve disorders that are associated with diabetes mellitus). These conditions usually result from diabetic microvascular injury involving small blood vessels that supply nerves (vasa nervorum). Relatively common conditions which may be associated with diabetic neuropathy include third nerve palsy; mononeuropathy; mononeuropathy multiplex; diabetic amyotrophy; a painful polyneuropathy; autonomic neuropathy; and thoracoabdominal neuropathy (see Adams et al., *Principles of Neurology*, 6th ed., p. 1325). PNS diseases also include mononeuropathies (disease or trauma involving a single peripheral nerve in isolation, or out of proportion to evidence of diffuse peripheral nerve dysfunction). Mononeuropathy multiplex refers to a condition characterized by multiple isolated nerve injuries. Mononeuropathies may result from a wide variety of causes, including ischemia; traumatic injury; compression; connective tissue diseases; cumulative trauma disorders; and other conditions. Also included are Neuralgia (intense or aching pain that occurs along the course or distribution of a peripheral or cranial nerve); Peripheral Nervous System Neoplasms (neoplasms which arise from peripheral nerve tissue, this includes neurofibromas; Schwannomas; granular cell tumors; and malignant peripheral nerve sheath tumors, see DeVita Jr et al., Cancer: Principles and Practice of Oncology, 5th ed, ppl 750-1); and Nerve Compression Syndromes (mechanical compression of nerves or nerve roots from internal or external causes, these may result in a conduction block to nerve impulses, due to, for example, myelin sheath dysfunction, or axonal loss; the nerve and nerve sheath injuries may be caused by ischemia; inflammation; or a direct mechanical effect); and Neuritis (a general term indicating inflammation of a peripheral or cranial nerve). Clinical manifestation may include pain; paresthesias; paresis; or hyperthesia; Polyneuropathies (diseases of multiple peripheral nerves). The various forms are categorized by the type of nerve affected (e.g., sensory, motor, or autonomic), by the distribution of nerve injury (e.g., distal vs. proximal), by nerve component primarily affected (e.g., demyelinating vs. axonal), by etiology, or by pattern of inheritance.

The compounds of the invention and pharmaceutical compositions thereof can also be used to treat blood coagulation disorders (or hemostatic disorders). As used interchangeably herein, the terms "hemostasis", "blood coagulation," and "blood clotting" refer to the control of bleeding, including the physiological properties of vasoconstriction and coagulation.

The present invention also provides anticoagulation and antithrombotic treatments aiming at inhibiting the formation of blood clots in order to treat blood coagulation disorders, such as myocardial infarction, stroke, loss of a limb by peripheral artery disease or pulmonary embolism.

As used interchangeably herein, "modulating or modulation of hemostasis" and "regulating or regulation of hemostasis" includes the induction (e.g., stimulation or increase) of hemostasis, as well as the inhibition (e.g., reduction or decrease) of hemostasis.

In one aspect, the invention provides a method for reducing or inhibiting hemostasis in a subject by administering the compounds of the invention and pharmaceutical compositions thereof. The compositions and methods disclosed herein are useful for the treatment of thrombotic disorders. As used herein, the term "thrombotic disorder" includes any disorder or condition characterized by excessive or unwanted coagulation or hemostatic activity, or a hypercoagulable state. Examples of thrombotic disorders include, but are not limited to, thromboembolism, deep vein thrombosis, pulmonary embolism, stroke, myocardial infarction, miscarriage, thrombophilia associated with anti-thrombin III deficiency, protein C deficiency, protein S deficiency, resistance to activated protein C, dysfibrinogenemia, fibrinolytic disorders, homocystinuria, pregnancy, inflammatory disorders, myeloproliferative disorders, arteriosclerosis, angina, e.g., unstable angina, disseminated intravascular coagulation, thrombotic thrombocytopenic purpura, cancer metastasis, sickle cell disease, glomerular nephritis, and drug induced thrombocytopenia (including, for example, heparin induced thrombocytopenia).

In addition, the compounds of the invention and pharmaceutical compositions thereof may be administered to reduce thrombotic events or to reduce re-occlusion during or after therapeutic clot lysis or procedures such as angioplasty or surgery.

The compounds of the invention and pharmaceutical compositions thereof may also be used for treating or reducing weight gain or obesity in a subject. For example, the compounds of the invention and pharmaceutical compositions thereof may be used to treat hereditary obesity, dietary obesity, hormone related obesity, obesity related to the administration of medication, to reduce the weight of a subject, or to reduce weight gain in a subject. A subject in need of such a treatment may be a subject who is obese, likely to become obese, overweight, or likely to become overweight. Subjects who are likely to become obese or overweight can be identified, for example, based on family history, genetics, diet, activity level, medication intake, or various combinations thereof.

In yet other embodiments, the compounds of the invention and pharmaceutical compositions thereof may be administered to subjects suffering from a variety of other diseases and conditions that may be treated by promoting weight loss in the subject. Such diseases include, for example, high blood pressure, hypertension, high blood cholesterol, dyslipidemia, type 2 diabetes, insulin resistance, glucose intolerance, hyperinsulinemia, coronary heart disease, angina pectoris, congestive heart failure, stroke, gallstones, cholecystitis and cholelithiasis, gout, osteoarthritis, obstructive sleep apnea and respiratory problems, some types of cancer (such as endometrial, breast, prostate, and colon), complications of pregnancy, poor female reproductive health (such as menstrual irregularities, infertility, irregular ovulation), bladder control problems (such as stress incontinence); uric acid nephrolithiasis; psychological disorders (such as depression, eating disorders, distorted body image, and low self-esteem). Stunkard A J, Wadden T A. (Editors) Obesity: theory and therapy, Second Edition. New York: Raven Press, 1993. Finally, patients with AIDS can develop lipodystrophy or insulin resistance in response to combination therapies for AIDS. In another embodiment, the compounds of the invention and pharmaceutical compositions thereof may be used for inhibiting adipogenesis or fat cell differentiation, whether in vitro or in vivo. In particular, high circulating levels of insulin and/or insulin like growth factor (IGF) 1 will be prevented from recruiting preadipocytes to differentiate into adipocytes. Such methods may be used for treating obesity.

In other embodiments, the compounds of the invention and pharmaceutical compositions thereof may be used for reducing appetite and/or increasing satiety, thereby causing weight loss or avoidance of weight gain. A subject in need of such a treatment may be a subject who is overweight, obese or a subject likely to become overweight or obese. The method may comprise administering daily or, every other day, or once a week, a dose, e.g., in the form of a pill, to a subject. The dose may be an "appetite reducing dose."

In other embodiments, the compounds of the invention and pharmaceutical compositions thereof may be used to treat a subject who has cachexia or may be likely to develop cachexia. A method may further comprise monitoring in the subject the state of the disease. Methods for promoting appetite and/or weight gain may include, for example, prior identifying a subject as being in need of decreased fat or lipid metabolism, e.g., by weighing the subject, determining the BMI of the subject. The method may also include monitoring the subject, e.g., during and/or after administration of the compounds of the invention and pharmaceutical compositions thereof. The administering can include one or more dosages, e.g., delivered in boluses or continuously. Monitoring can include evaluating a hormone or a metabolite. Exemplary hormones include leptin, adiponectin, resistin, and insulin. Exemplary metabolites include triglycerides, cholesterol, and fatty acids.

In another embodiment, the compounds of the invention and pharmaceutical compositions thereof may be administered to reduce drug-induced weight gain. For example, the compounds of the invention and pharmaceutical compositions thereof may be administered as a combination therapy with medications that may stimulate appetite or cause weight gain, in particular, weight gain due to factors other than water retention.

Examples of medications that may cause weight gain, include for example, diabetes treatments, including, for example, sulfonylureas (such as glipizide and glyburide), thiazolidinediones (such as pioglitazone and rosiglitazone), meglitinides, nateglinide, repaglinide, sulphonylurea medicines, and insulin; anti-depressants, including, for example, tricyclic antidepressants (such as amitriptyline and imipramine), irreversible monoamine oxidase inhibitors (MAOIs), selective serotonin reuptake inhibitors (SSRIs), bupropion, paroxetine, and mirtazapine; steroids, such as, for example, prednisone; hormone therapy; lithium carbonate; valproic acid; carbamazepine; chlorpromazine; thiothixene; beta blockers (such as propranolol); alpha blockers (such as clonidine, prazosin and terazosin); and contraceptives including oral contraceptives (birth control pills) or other contraceptives containing estrogen and/or progesterone (Depo-Provera, Norplant, Ortho), testosterone or Megestrol. In another exemplary embodiment, the compounds of the invention and pharmaceutical compositions thereof may be administered as part of a smoking cessation program to reduce weight gain or reduce weight already gained.

In another aspect, the compounds of the invention and pharmaceutical compositions thereof may be used for treating a metabolic disorder, such as insulin-resistance, a pre-diabetic state, type II diabetes, and/or complications thereof.

Administration of the compounds of the invention and pharmaceutical compositions thereof may increase insulin sensitivity and/or decrease insulin levels in a subject. A subject in need of such a treatment may be a subject who has insulin resistance or other precursor symptom of type II diabetes, who has type II diabetes, or who is likely to develop any of these conditions. For example, the subject may be a subject having insulin resistance, e.g., having high circulating levels of insulin and/or associated conditions, such as hyperlipidemia, dyslipogenesis, hypercholesterolemia, impaired glucose tolerance, high blood glucose sugar level, other manifestations of syndrome X, hypertension, atherosclerosis and lipodystrophy.

The compounds of the invention and pharmaceutical compositions thereof can also be used to treat a disease or disorder associated with inflammation. Exemplary inflammatory conditions include, for example, multiple sclerosis, rheumatoid arthritis, psoriatic arthritis, degenerative joint disease, spondouloarthropathies, gouty arthritis, systemic lupus erythematosus, juvenile arthritis, rheumatoid arthritis, osteoarthritis, osteoporosis, diabetes (e.g., insulin dependent diabetes mellitus or juvenile onset diabetes), menstrual cramps, cystic fibrosis, inflammatory bowel disease, irritable bowel syndrome, Crohn's disease, mucous colitis, ulcerative colitis, gastritis, esophagitis, pancreatitis, peritonitis, Alzheimer's disease, shock, ankylosing spondylitis, gastritis, conjunctivitis, pancreatitis (acute or chronic), multiple organ injury syndrome (e.g., secondary to septicemia or trauma), myocardial infarction, atherosclerosis, stroke, reperfusion injury (e.g., due to cardiopulmonary bypass or kidney dialysis), acute glomerulonephritis, vasculitis, thermal injury (i.e., sunburn), necrotizing enterocolitis, granulocyte transfusion associated syndrome, and/or Sjogren's syndrome. Exemplary inflammatory conditions of the skin include, for example, eczema, atopic dermatitis, contact dermatitis, urticaria, scleroderma, psoriasis, and dermatosis with acute inflammatory components.

In another embodiment, the compounds of the invention and pharmaceutical compositions thereof may be used to treat allergies and respiratory conditions, including asthma, bronchitis, pulmonary fibrosis, allergic rhinitis, oxygen toxicity, emphysema, chronic bronchitis, acute respiratory distress syndrome, and any chronic obstructive pulmonary disease (COPD). The compounds may be used to treat chronic hepatitis infection, including hepatitis B and hepatitis C.

Additionally, the compounds of the invention and pharmaceutical compositions thereof may be used to treat autoimmune diseases and/or inflammation associated with autoimmune diseases such as organ-tissue autoimmune diseases (e.g., Raynaud's syndrome), scleroderma, myasthenia gravis, transplant rejection, endotoxin shock, sepsis, psoriasis, eczema, dermatitis, multiple sclerosis, autoimmune thyroiditis, uveitis, systemic lupus erythematosus, Addison's disease, autoimmune polyglandular disease (also known as autoimmune polyglandular syndrome), and Grave's disease.

The compounds of the invention and pharmaceutical compositions thereof may also be used for reducing the incidence or severity of flushing and/or hot flashes which are symptoms of a disorder. In one embodiment, the compounds of the invention and pharmaceutical compositions thereof may be used to reduce flushing side effects of a vasodilator or an antilipemic agent (including anticholesteremic agents and lipotropic agents).

In another representative embodiment, the method involves the use of the compounds of the invention and pharmaceutical compositions thereof to reduce flushing side effects of antidepressants or anti-psychotic agent. For instance, the compounds of the invention and pharmaceutical compositions thereof can be used in conjunction (administered separately or together) with a serotonin reuptake inhibitor, a 5HT2 receptor antagonist, an anticonvulsant, a norepinephrine reuptake inhibitor, an alpha-adrenoreceptor antagonist, an NK-3 antagonist, an NK-1 receptor antagonist, a PDE4 inhibitor, an Neuropeptide Y5 Receptor Antagonists, a D4 receptor antagonist, a 5HT1 A receptor antagonist, a 5HT1D receptor antagonist, a CRF antagonist, a monoamine oxidase inhibitor, or a sedative-hypnotic drug.

In certain embodiments, the compounds of the invention and pharmaceutical compositions thereof may be used as part of a treatment with a serotonin reuptake inhibitor (SRI) to reduce flushing. In certain preferred embodiments, the SRI is a selective serotonin reuptake inhibitor (SSRI), such as a fluoxetinoid (fluoxetine, norfluoxetine) or a nefazodonoid (nefazodone, hydroxynefazodone, oxonefazodone). Other exemplary SSRIs include duloxetine, venlafaxine, milnacipran, citalopram, fluvoxamine, paroxetine and sertraline. The compounds of the invention and pharmaceutical compositions thereof can also be used as part of a treatment with sedative-hypnotic drug, such as selected from the group consisting of a benzodiazepine (such as alprazolam, chlordiazepoxide, clonazepam, chlorazepate, clobazam, diazepam, halazepam, lorazepam, oxazepam and prazepam), Zolpidem, and barbiturates. In still other embodiments, the compounds of the invention and pharmaceutical compositions thereof may be used as part of a treatment with a 5-HT1 A receptor partial agonist, such as selected from the group consisting of buspirone, flesinoxan, gepirone and ipsapirone. The compounds of the invention and pharmaceutical compositions thereof can also be used as part of a treatment with a norepinephrine reuptake inhibitor, such as selected from tertiary amine tricyclics and secondary amine tricyclics. Exemplary tertiary amine tricyclics include amitriptyline, clomipramine, doxepin, imipramine and trimipramine.

Exemplary secondary amine tricyclics include amoxapine, desipramine, maprotiline, nortriptyline and protriptyline. In certain embodiments, the compounds of the invention and pharmaceutical compositions thereof may be used as part of a treatment with a monoamine oxidase inhibitor, such as selected from the group consisting of isocarboxazid, phenelzine, tranylcypromine, selegiline and moclobemide.

In still another representative embodiment, the compounds of the invention and pharmaceutical compositions thereof may be used to reduce flushing side effects of chemotherapeutic agents, such as cyclophosphamide, and tamoxifen. Similarly, the compounds can be used to reduce the cardiotoxicity associated with antineoplastic drugs, including anthracyclines, taxanes, and treatments that target hEGFR2/HER2, such as Trastuzumab.

In another embodiment, the compounds of the invention and pharmaceutical compositions thereof may be used to reduce flushing side effects of calcium channel blockers, such as amlodipine.

In another embodiment, the compounds of the invention and pharmaceutical compositions thereof may be used to reduce flushing side effects of antibiotics. For example, the compounds of the invention and pharmaceutical compositions thereof can be used in combination with levofloxacin. Levofloxacin is used to treat infections of the sinuses, skin, lungs, ears, airways, bones, and joints caused by susceptible bacteria.

When administered together with another therapeutic agent, the disclosed compounds can be administered simultaneously in the same pharmaceutical formulation or simultaneously in separate pharmaceutical formulations. Alternatively, when administered together with another therapeutic agent, the disclosed compounds can be administered at separate times, depending the dosing requirements of the second therapeutic agent.

Pharmaceutical compositions are disclosed that include one or more compounds provided herein (such as the compound of Formulas I, IIa, IIb, IIc, IIIa, IIIb, IIIc, IVa, IVb or IVc), and optionally at least one additional substance, such as an excipient, a known therapeutic other than those of the present disclosure, and combinations thereof. In some embodiments, the disclosed compounds can be used in combination with other agents known to have beneficial activity targeting diseases or disorders listed above. For example, disclosed compounds can be administered alone or in combination with one or more compounds selected from the group consisting of: PPAR S agonists, AMPK activators, PARP inhibitors, SIRT-activating compounds, nicotinamide N-methyl transferase (NNMT) inhibitors, niacin, nicotinamide, or nicotinamide riboside and its derivatives, and acetyl-CoA carboxylase inhibitors, and the pharmaceutically acceptable salts of these compounds.

The terms "administer", "administering", "administration", and the like, as used herein, refer to methods that may be used to enable delivery of compositions to the desired site of biological action. These methods include, but are not limited to, intraarticular (in the joints), intravenous, intramuscular, intratumoral, intradermal, intraperitoneal, subcutaneous, orally, topically, intrathecally, inhalationally, transdermally, rectally, and the like.

Administration techniques that can be employed with the agents and methods described herein are found in e.g., Goodman and Gilman, The Pharmacological Basis of Therapeutics, current ed.; Pergamon; and *Remington's, Pharmaceutical Sciences* (current edition), Mack Publishing Co., Easton, Pa.

A "subject" is a mammal, preferably a human, but can also be an animal in need of veterinary treatment, e.g., companion animals (e.g., dogs, cats, and the like), farm animals (e.g., cows, sheep, pigs, horses, and the like) and laboratory animals (e.g., rats, mice, guinea pigs, and the like).

The precise amount of compound administered to provide an "effective amount" to the subject will depend on the mode of administration, the type, and severity of the disease or condition, and on the characteristics of the subject, such as general health, age, sex, body weight, and tolerance to drugs. The skilled artisan will be able to determine appropriate dosages depending on these and other factors. When administered in combination with other therapeutic agents, e.g., when administered in combination with an anti-cancer agent, an "effective amount" of any additional therapeutic agent(s) will depend on the type of drug used. Suitable dosages are known for approved therapeutic agents and can be adjusted by the skilled artisan according to the condition of the subject, the type of condition(s) being treated and the amount of a compound of the invention being used by following, for example, dosages reported in the literature and recommended in the *Physician's Desk Reference* (57th ed., 2003).

The term "effective amount" means an amount when administered to the subject which results in beneficial or desired results, including clinical results, e.g., inhibits, suppresses or reduces the symptoms of the condition being treated in the subject as compared to a control. For example, a therapeutically effective amount can be given in unit dosage form (e.g., 0.1 mg to about 50 g per day, alternatively from 1 mg to about 5 grams per day; and in another alternatively from 10 mg to 1 gram per day).

The particular mode of administration and the dosage regimen will be selected by the attending clinician, taking into account the particulars of the case (e.g. the subject, the disease, the disease state involved, the particular treatment, and whether the treatment is prophylactic). Treatment can involve daily or multi-daily or less than daily (such as weekly or monthly etc.) doses over a period of a few days to months, or even years. However, a person of ordinary skill in the art would immediately recognize appropriate and/or equivalent doses looking at dosages of approved compositions for treating a mitochondria-related disease using the disclosed compounds for guidance.

The pharmaceutical composition of the invention is formulated to be compatible with its intended route of administration. In an embodiment, the composition is formulated in accordance with routine procedures as a pharmaceutical composition adapted for intravenous, subcutaneous, intramuscular, oral, intranasal, or topical administration to human beings. In preferred embodiments, the pharmaceutical composition is formulated for intravenous administration.

"Pharmaceutically acceptable excipient" and "pharmaceutically acceptable carrier" refer to a substance that aids the formulation and/or administration of an active agent to and/or absorption by a subject and can be included in the compositions of the present disclosure without causing a significant adverse toxicological effect on the subject. Non-limiting examples of pharmaceutically acceptable excipients include water, NaCl, normal saline solutions, lactated Ringer's, normal sucrose, normal glucose, binders, fillers, disintegrants, lubricants, coatings, sweeteners, flavors, salt solutions (such as Ringer's solution), alcohols, oils, gelatins, carbohydrates such as lactose, amylose or starch, fatty acid esters, hydroxymethycellulose, polyvinyl pyrrolidine, and colors, and the like. Such preparations can be sterilized and, if desired, mixed with auxiliary agents such as lubricants, preservatives, stabilizers, wetting agents, emulsifiers, salts for influencing osmotic pressure, buffers, coloring, and/or aromatic substances and the like that do not deleteriously react with or interfere with the activity of the compounds provided herein. One of ordinary skill in the art will recognize that other pharmaceutical excipients are suitable for use with disclosed compounds.

EXEMPLIFICATION

Abbreviations

Ac acetyl
ACN acetonitrile
aq aqueous
Boc tert-butyloxycarbonyl
Boc-anhydride di-tert-butyl dicarbonate
Bn benzyl
CuI copper iodide
DCM dichloromethane
DIPEA diisopropylethylamine
DMF N,N-dimethylformamide
DMSO dimethyl Sulfoxide
dppf 1,1'-bis(diphenylphosphino)ferrocene
EDC 3-(3-dimethylaminopropyl)-1-ethylcarbodiimide
Et ethyl
EtOAc ethyl acetate
FWHM Full width at half maximum
h hour
HATU 1-[Bis(dimethylamino)methylene]-1H-1,2,3-triazolo[4,5-b]pyridinium 3-oxide hexafluorophosphate
HOBt 1-hydroxybenzotriazole
HPLC high-performance liquid chromatography
$K_2CO_3$ Potassium carbonate
LCMS liquid chromatography-mass spectrometry
M concentration expressed in mol/L
Me methyl
MeOH methanol
MEK methylethyl ketone
MIBK methyl isobutyl ketone
MTBE methyl tert-butyl ether
$Na_2SO_4$ Sodium Sulfate
NaOH Sodium hydroxide
Ph phenyl
Prep. HPLC preparative high-performance liquid chromatography
Rel. Int. Relative intensity
RT room temperature
TFA trifluoroacetic acid
THF tetrahydrofuran
TLC thin layer chromatography
$^1$H NMR (DMSO-$d_6$) δ (ppm) of peak in $^1$H NMR in DMSO-$d_6$
s singlet (spectrum)
d doublet (spectrum)
t triplet (spectrum) q quartet (spectrum)
dd doublet of doublets (spectrum)
br broad peak (spectrum)
m multiplet (spectrum).
mg milligram
mM millimolar
nM nanomolar
°2Th 2θ angle or the angle between transmitted beam and reflected beam General Information LCMS Analysis Condition:
Instrument name: Agilent Technologies 1290 infinity 11.
Method A: Method: A-0.1% TFA in $H_2O$, B-0.1% TFA in ACN; flow rate: 2.0 mL/min; column: XBridge C8 (50×4.6 mm, 3.5 μm).
Method B: Method: A-10 mM $NH_4HCO_3$ in $H_2O$, B-ACN; flow rate: 1.0 mL/min; column: XBridge C8 (50×4.6 mm, 3.5 μm).
Method C: Method: A-0.1% HCOOH in $H_2O$, B-0.1% FA in ACN; flow rate: 1.5 mL/min; column: ZORBAX XDB C-18 (50×4.6 mm, 3.5 μm).
Method D: Method: A-10 mM Ammonium acetate in $H_2O$, B-ACN; flow rate: 1.0 mL/min; column: XBridge C8 (50×4.6 mm, 3.5 μm).
HPLC Analysis Condition:
Instrument name: Agilent 1260 Infinity II.
Method A: Method: A-0.1% TFA in $H_2O$, B-0.1% TFA in ACN; flow rate: 2.0 mL/min; column: XBridge C8 (50×4.6 mm, 3.5 μm).
Method B: Method: A-10 mM $NH_4HCO_3$ in $H_2O$, B-ACN; flow rate: 1.0 mL/min; column: XBridge C8 (50×4.6 mm, 3.5 μm).
Prep-HPLC Purification Condition:
Method A: A-0.1% TFA in $H_2O$, B-MeOH or ACN; column: Sunfire $C_8$ (19×250 mm, 5 μm) or Sunfire C18 (30×250 mm, 10 μm).
Method B: A-10 mM $NH_4HCO_3$ in $H_2O$, B-MeOH or ACN, Column: Sunfire $C_8$ (19×250 mm, 5 μm) or Sunfire C18 (30×250 mm, 10 μm).
Method C: A-0.1% Formic Acid in $H_2O$, B-MeOH or ACN, Column: Sunfire $C_8$ (19×250 mm, 5 μm) or Sunfire C18 (30×250 mm, 10 μm).
X-Ray Powder Diffraction (XRPD)
X-ray powder diffraction data were collected under ambient conditions on a Bruker D2 PHASER diffractometer with a low power X-ray generator of 300 W. Powder patterns were collected on a zero background sample holder with a 0.15 s/step with a total step of 1837, two theta at 0.02° per step at 30 kV and 10 mA. The X-ray tube of Cu (Kα) was employed, with the Kα2/Kα1 intensity ratio of 0.50 (1.54439 Å/1.5406 Å).

Thermogravimetric Analysis (TGA)

Thermogravimetric analysis data were collected with a TA Discovery series TGA. A few milligrams of material were heated from room temperature to 300° C. with a heating rate of 10° C. per minute under nitrogen protection.

Differential Scanning Calorimetry (DSC)

Differential scanning calorimetry was performed with a TA Discovery series DSC using approximately a few milligrams of material in a Tzero aluminum pan sealed with a Tzero hermetic lid. Samples were analyzed using a heating rate of 10° C. per minute under 25 mL per minute of nitrogen flow.

7.2.4 Polarized Light Microscopy (PLM)

Photomicrographs were taken using an Olympus BX53M polarized light microscope at room temperature.

Ex. 1: N-((1r,4r)-4-(2-methoxyethoxy)cyclohexyl)-2-(thiazol-5-yl)-6-(1H-imidazol-1-yl)isonicotinamide

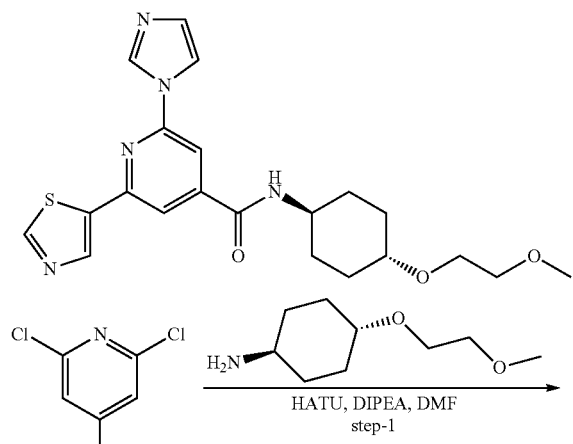

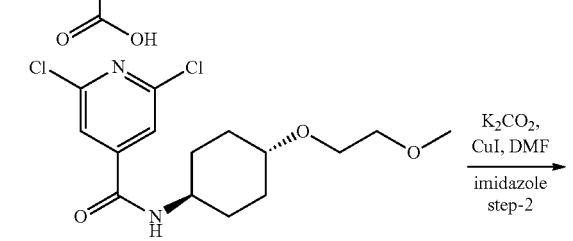

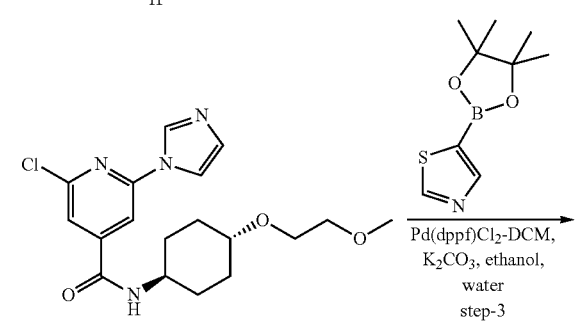

Step 1: 2,6-dichloro-N-((1r,4r)-4-(2-methoxyethoxy)cyclohexyl)isonicotinamide

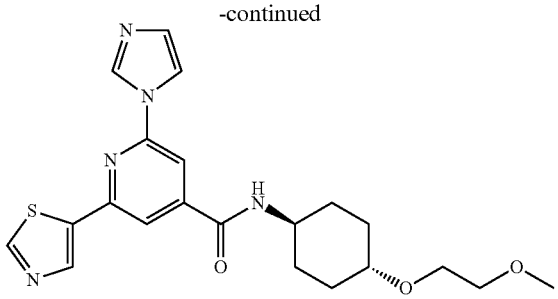

To a stirred solution of 2,6-dichloroisonicotinic acid (0.5 g, 2.61 mmol) in DMF (5 mL) at RT were added HATU (1.69 g, 4.45 mmol) and DIPEA (1.07 mL, 7.85 mmol). After stirring for 5 min at RT, (1r,4r)-4-(2-methoxyethoxy) cyclohexan-1-amine (589 mg, 3.40 mmol) was added at RT and the reaction mixture was stirred at RT overnight. After completion, the reaction mixture was diluted with water (50 mL) and the resulting solid was filtered and dried to afford the title compound. Yield: 44% (400 mg, white solid). $^1$H NMR (400 MHz, DMSO-$d_6$): δ 8.66 (d, J=7.6 Hz, 1H), 7.88 (s, 2H), 3.75-3.67 (m, 1H), 3.54-3.51 (m, 2H), 3.43-3.40 (m, 2H), 3.31-3.21 (m, 4H), 2.02-1.99 (m, 2H), 1.88-1.85 (m, 2H), 1.37-1.21 (m, 4H). LCMS: (Method A) 347.1 [M+H], Rt. 2.34 min.

Step 2: 2-chloro-6-(1H-imidazol-1-yl)-N-((1r,4r)-4-(2-methoxyethoxy)cyclohexyl) isonicotinamide

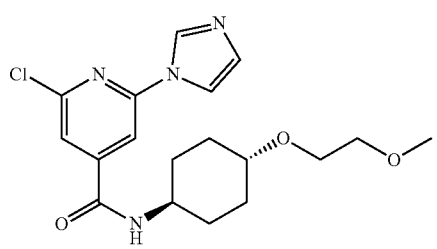 [SMILES: COCCO[C@H]1CC[C@H](NC(=O)c2cc(Cl)nc(-n3ccnc3)c2)CC1]

A stirred suspension of 2,6-dichloro-N-((1r,4r)-4-(2-methoxyethoxy)cyclohexyl)isonicotinamide (320 mg, 0.92 mmol), imidazole (63 mg, 0.92 mmol), CuI (17.5 mg, 0.09 mmol) and K$_2$CO$_3$ (383 mg, 2.77 mmol) in DMF (5 mL) was heated to 125° C. overnight. The reaction mixture was diluted with ethyl acetate (50 mL), washed with water (10 mL), brine (10 mL), dried over anhydrous Na$_2$SO$_4$ and the solvent was evaporated under vacuum. The resulting crude residue was purified by flash chromatography on Biotage Iaolera (230-400 mesh silica gel, eluting with 10-50% EtOAc in pet ether) to afford the title compound. Yield: 29% (0.1 g, yellow solid). $^1$H NMR (400 MHz, DMSO-d$_6$): δ 8.63 (d, J=8.0 Hz, 1H), 8.56 (s, 1H), 8.09 (s, 1H), 7.98 (d, J=1.2 Hz, 1H), 7.78 (s, 1H), 7.16 (s, 1H), 3.79-3.72 (m, 1H), 3.55-3.53 (m, 2H), 3.44-3.41 (m, 2H), 3.31-3.25 (m, 4H), 2.04-2.01 (m, 2H), 1.92-1.89 (m, 2H), 1.39-1.23 (m, 4H). LCMS: (Method C) 379.1 [M+H], Rt. 1.25 min.

Step 3: N-((1r,4r)-4-(2-methoxyethoxy)cyclohexyl)-2-(thiazol-5-yl)-6-(1H-imidazol-1-yl)isonicotinamide

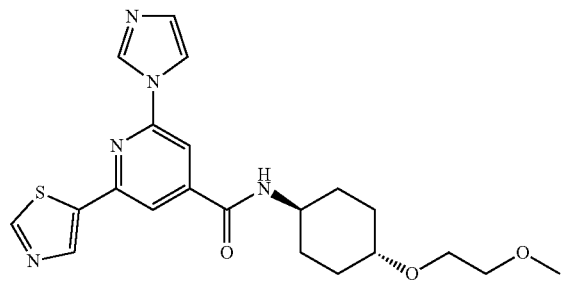 [SMILES: COCCO[C@H]1CC[C@H](NC(=O)c2cc(-c3cncs3)nc(-n3ccnc3)c2)CC1]

To a stirred solution of 2-chloro-6-(1H-imidazol-1-yl)-N-((1r,4r)-4-(2-methoxyethoxy)cyclohexyl)isonicotinamide (0.1 g, 0.26 mmol) in ethanol (5 mL) and water (0.5 mL), 5-(4,4,5,5-tetramethyl-1,3,2-dioxaborolan-2-yl)thiazole (73 mg, 0.34 mmol) and K$_2$CO$_3$ (0.11 g, 0.79 mmol) were added at RT and the mixture was purged with nitrogen gas for 5 min at RT. Then Pd(dppf)Cl$_2$·DCM (9 mg, 0.01 mmol) and CuI (5 mg, 0.02 mmol) were added and the reaction mixture was heated at 95° C. overnight. After completion (monitored by TLC), the reaction mixture was filtered through Celite and the filtrate was concentrated under vacuum. The resulting crude material was purified by flash chromatography on Biotage Isolera to get the title compound. Yield: 47% (53 mg, pale yellow solid). $^1$H NMR (400 MHz, DMSO-d$_6$): δ 9.26 (s, 1H), 8.78 (s, 1H), 8.64 (br s, 1H), 8.60 (d, J=7.6 Hz, 1H), 8.20 (s, 1H), 8.05 (s, 1H), 8.00 (s, 1H), 7.19 (s, 1H), 3.85-3.77 (m, 1H), 3.56-3.54 (m, 2H), 3.44-3.42 (m, 2H), 3.31-3.25 (m, 4H), 2.06-2.03 (m, 2H), 1.96-1.93 (m, 2H), 1.46-1.23 (m, 4H). LCMS: (Method A) 428.2 [M+H], Rt. 1.64 min. HPLC: (Method A) Rt. 2.34 min.

Ex. 2: N-((1r,4r)-4-(2-methoxyethoxy)cyclohexyl)-2,6-di(thiazol-5-yl)isonicotinamide

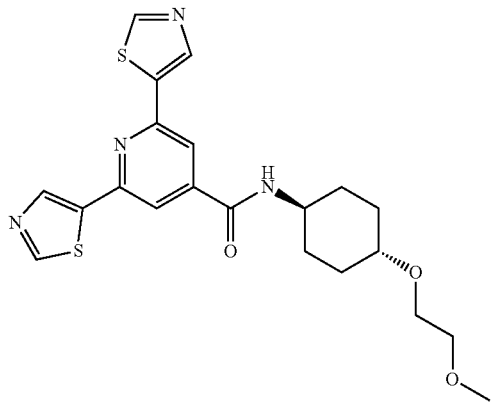

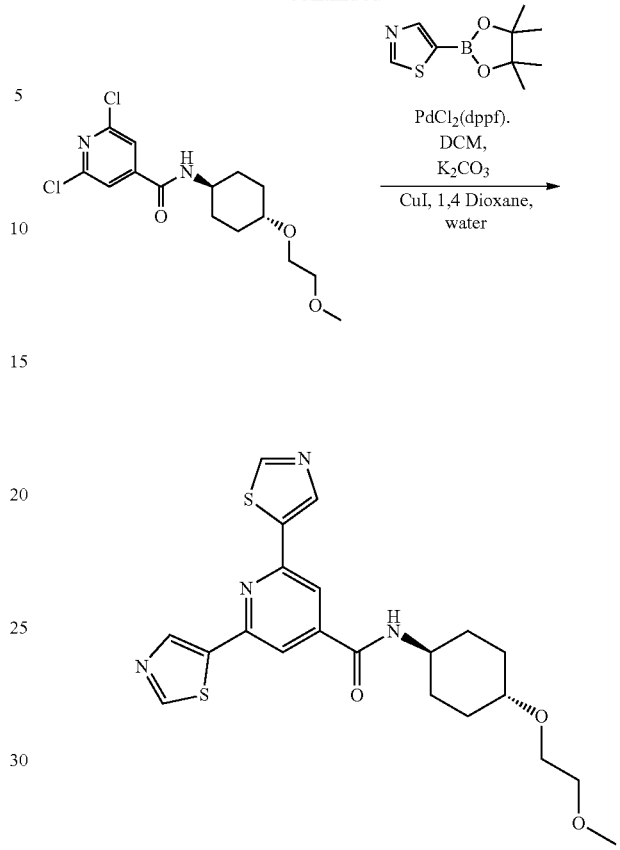

A solution of 2,6-dichloro-N-((1r,4r)-4-(2-methoxyethoxy)cyclohexyl)isonicotinamide (351 mg, 1.01 mmol) and 5-(4,4,5,5-tetramethyl-1,3,2-dioxaborolan-2-yl)thiazole (533 mg, 2.52 mmol) in a mixture of 1,4 Dioxane (5 mL) and water (0.5 mL) was deoxygenated by purging nitrogen gas over a period of 5 min. Subsequently, K$_2$CO$_3$ (558 mg, 4.04 mmol), CuI (19.23 mg, 0.10 mmol) followed by Pd(dppf)Cl$_2$·DCM (82.4 mg, 0.10 mmol) were added and the resultant mixture was heated at 115° C. for 16 h. After completion, the reaction mixture was filtered through a pad of Celite and washed with 10% MeOH in DCM (100 mL), dried over anhydrous Na$_2$SO$_4$, filtered and concentrated under vacuum to give crude product. The resultant crude residue was then purified by reverse phase chromatography (Method A) and the collected fractions were concentrated under reduced pressure, the obtained product was re-dissolved in 10% MeOH in DCM (10 mL) washed with 10% NaHCO$_3$ solution (50 mL) and water (2×50 mL). The organic layer was dried over anhydrous Na$_2$SO$_4$ concentrated under reduced pressure to give title compound. Yield: 59% (264.64 mg, off-white solid); $^1$HNMR (400 MHz, DMSO-d$_6$): δ 9.22 (d, J=0.4 Hz, 2H), 8.72 (d, J=0.8 Hz, 2H), 8.60 (d, J=7.6 Hz, 1H), 8.22 (s, 2H), 3.85-3.70 (m, 1H), 3.60-3.56 (m, 2H), 3.55-3.50 (m, 2H), 3.43-3.20 (m, 4H), 2.06-2.00 (m, 2H), 1.96-1.90 (m, 2H), 1.46-1.38 (m, 2H), 1.32-1.23 (m, 2H); LCMS: (Method C) 445.0 [M+H], Rt. 1.77 min; HPLC: (Method A) Rt. 3.48 min.

Ex. 3: N-((1r,4r)-4-(2-methoxyethoxy)cyclohexyl)-2-(1-methyl-1H-pyrazol-4-yl)-6-(thiazol-5-yl)isonicotinamide Step 1: 2-chloro-N-((1r,4r)-4-(2-methoxyethoxy)cyclohexyl)-6-(1-methyl-1H-pyrazol-4-yl)isonicotinamide

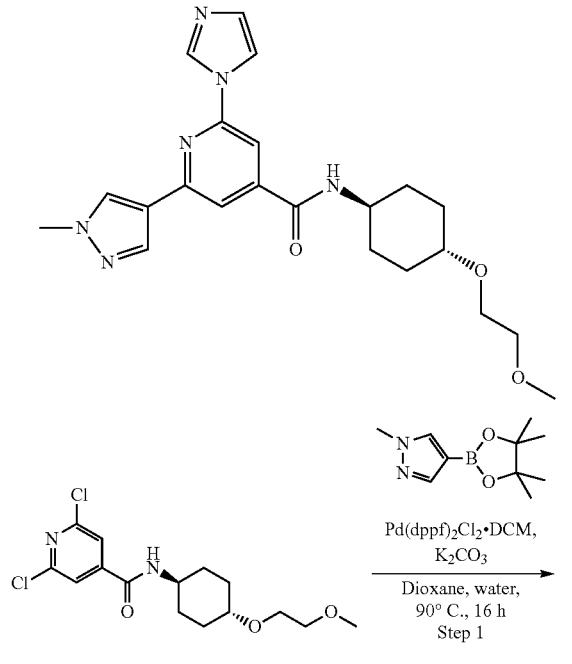

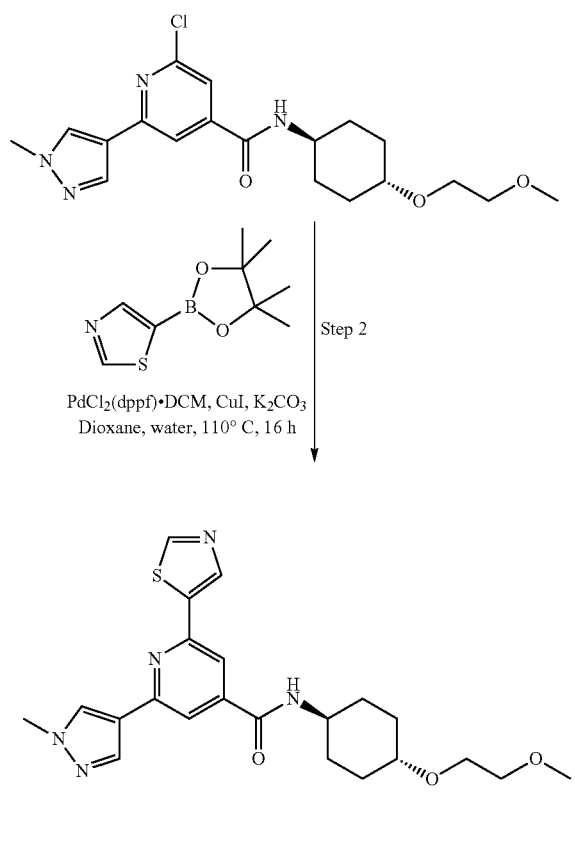

A solution of 2,6-dichloro-N-((1r,4r)-4-(2-methoxyethoxy)cyclohexyl)isonicotinamide (989 mg, 2.84 mmol) and 1-methyl-4-(4,4,5,5-tetramethyl-1,3,2-dioxaborolan-2-yl)-1H-pyrazole (414 mg, 1.99 mmol) in a mixture of 1,4 Dioxane (10 mL) and water (1 mL) was deoxygenated by purging nitrogen gas for 5 min. Subsequently $K_2CO_3$ (786 mg, 5.69 mmol) and Pd(dppf)Cl$_2$·DCM (232 mg, 0.28 mmol) were added and the resultant mixture was heated at 90° C. for 16 h. After completion, the reaction mixture was filtered through a pad of Celite and washed with 10% MeOH in DCM (100 mL). The filtrate was washed water (2×50 mL), dried over anhydrous $Na_2SO_4$ filtered and concentrated under vacuum. The obtained crude residue was then purified by Grace normal phase chromatography (100-200 mesh silica gel, eluent: 2%-5% MeOH in DCM) to give title compound. Yield: 54.5% (610 mg, brown gummy solid). $^1$HNMR (400 MHz, DMSO-d$_6$): δ 8.54 (d, J=7.6 Hz, 1H), 8.39 (s, 1H), 8.04 (d, J=0.4 Hz, 1H), 7.93 (d, J=1.2 Hz, 1H), 7.57 (d, J=0.8 Hz, 1H), 3.9 (s, 3H), 3.83-3.79 (m, 1H), 3.56-3.50 (m, 2H), 3.45-3.40 (m, 2H), 3.29-3.20 (m, 4H), 2.05-2.00 (m, 2H), 1.94-1.91 (m, 2H), 1.45-1.37 (m, 2H), 1.30-1.22 (m, 2H), LCMS: (Method C) 393.2 [M+H], Rt. 1.73 min.

Step 2: N-((1r,4r)-4-(2-methoxyethoxy)cyclohexyl)-2-(1-methyl-1H-pyrazol-4-yl)-6-(thiazol-5-yl)isonicotinamide

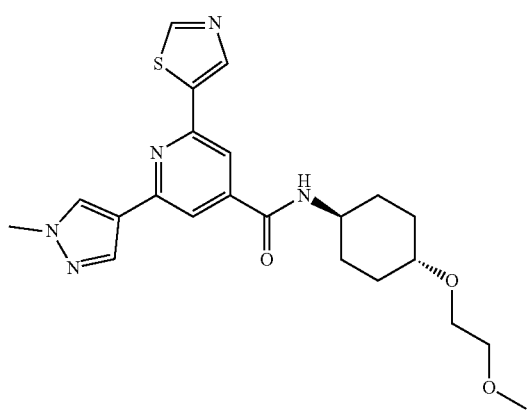

A solution of 2-chloro-N-((1r,4r)-4-(2-methoxyethoxy) cyclohexyl)-6-(1-methyl-1H-pyrazol-4-yl)isonicotinamide (513 mg, 1.30 mmol) and 5-(4,4,5,5-tetramethyl-1,3,2-dioxaborolan-2-yl)thiazole (413 mg, 1.95 mmol) in 1,4 Dioxane (5 mL) and water (0.5 mL) was deoxygenated by purging nitrogen gas for 5 min. Then $K_2CO_3$ (448 mg, 3.25 mmol), CuI (24.7 mg, 0.13 mmol) followed by Pd(dppf)Cl$_2$·DCM (106 mg, 0.13 mmol) were added and heated at 110° C. for 16 h. After completion, the reaction mixture was filtered through a pad of Celite, washed with 10% MeOH in DCM (100 mL). The filtrate was washed with water (2×50 mL), dried over anhydrous $Na_2SO_4$ and concentrated under vacuum to give crude product. The crude residue was then purified by Grace reverse phase chromatography (Method A). The collected fractions were concentrated under reduced pressure and the obtained product was re-dissolved in 10% MeOH in DCM (50 mL) washed with 10% $NaHCO_3$ solution (20 mL) and water (2×50 mL). The organic layer was dried over anhydrous $Na_2SO_4$, concentrated under reduced pressure and dried by lyophilization to give title compound. Yield: 83.9% (484 mg, off-white solid). $^1$HNMR (400 MHz, DMSO-d$_6$): δ 9.19 (s, 1H), 8.67 (d, J=0.8 Hz, 1H), 8.51 (d, J=7.6 Hz, 1H), 8.38 (s, 1H), 8.08 (d, J=0.4 Hz, 1H), 8.00 (d, J=1.6 Hz, 1H), 7.90 (d, J=1.2 Hz, 1H), 3.9 (s, 3H), 3.83-3.75 (m, 1H), 3.57-3.55 (m, 2H), 3.54-3.44 (m, 2H), 3.33-2.53 (m, 4H), 2.06-1.95 (m, 2H), 1.94-1.90 (m, 2H), 1.46-1.43 (m, 2H), 1.39-1.31 (m, 2H); LCMS: (Method C) 442.2 [M+H], Rt. 1.70 min; HPLC: (Method A) Rt. 3.27 min.

Ex. 4: N-((1r,4r)-4-(2-methoxyethoxy)cyclohexyl)-2-(thiazol-5-yl)-6-(trifluoromethyl)isonicotinamide

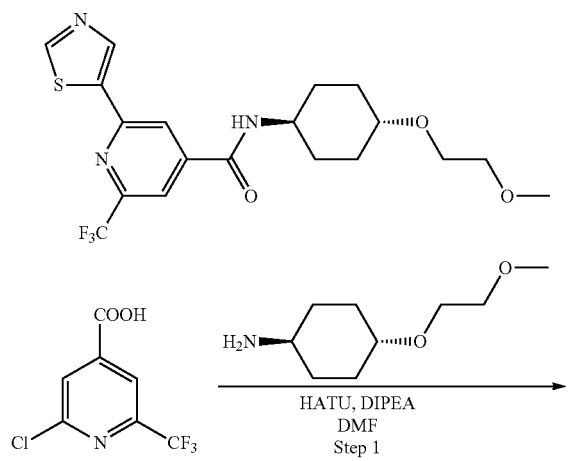

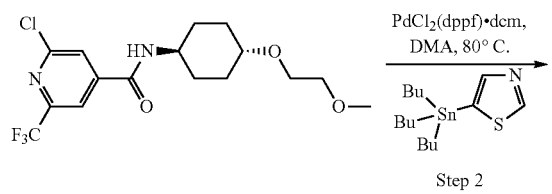

Step 1: 2-chloro-N-((1r,4r)-4-(2-methoxyethoxy) cyclohexyl)-6-(trifluoromethyl)isonicotinamide

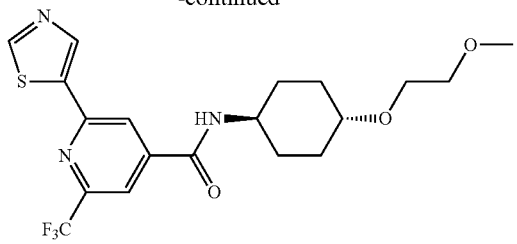

To a stirred solution of 2-chloro-6-(trifluoromethyl)isonicotinic acid (200 mg, 0.888 mmol) in DMF (5 mL) were added HATU (506.6 mg, 1.33 mmol) and DIPEA (0.46 mL, 2.66 mmol) at RT. After stirring for 5 min a solution of (1r,4r)-4-(2-methoxyethoxy)cyclohexan-1-amine (230.1 mg, 1.33 mmol) in DMF (0.5 mL) was added at same temperature. Further reaction was stirred at RT for overnight. The reaction mixture was monitored by TLC. Reaction mixture was quenched with water (25 mL). The resulting suspension was extracted with DCM (3×25 mL). The combined organic layer was washed with water (20 mL), brine (20 mL), dried over anhydrous $Na_2SO_4$ and solvent was evaporated under vacuum. The resulting crude product which was purified by column chromatography Biotage Isolera (100-200 mesh silica gel eluting with 10-50% EtOAc in pet ether) to afford the title compound. Yield: 32% (109 mg, White solid). $^1$HNMR (300 MHz, DMSO-d$_6$): δ 8.79 (d, J=7.2 Hz, 1H), 8.24 (s, 1H), 8.20 (s, 1H), 3.76-3.75 (m, 1H), 3.54-3.52 (m, 2H), 3.47-3.41 (m, 2H), 3.18 (s, 4H), 2.04-2.02 (m, 2H), 1.99-1.91 (m, 2H), 1.87-1.22 (m, 4H). LCMS: (Method C) 379.0 (M–H), Rt.2.278 min.

Step 2: N-((1r,4r)-4-(2-methoxyethoxy)cyclohexyl)-2-(thiazol-5-yl)-6-(trifluoromethyl)isonicotinamide

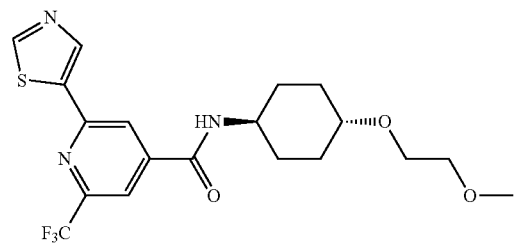 [SMILES: COCCO[C@H]1CC[C@H](NC(=O)c2cc(-c3cncs3)nc(C(F)(F)F)c2)CC1]

A mixture of 2-chloro-N-((1r,4r)-4-(2-methoxyethoxy) cyclohexyl)-6-(trifluoromethyl)isonicotinamide (100 mg, 0.263 mmol), 5-(tributylstannyl)thiazole (147.63 mg, 0.394 mmol) in DMA (3 mL), Pd(dppf)Cl$_2$·DCM (21.47 mg, 0.0263 mmol) were added at RT after purging nitrogen gas for 5 min. Then the reaction mixture was heated in a sealed tube at 80° C. for overnight. The reaction mixture was quenched with water (10 mL). The resulting suspension was extracted with DCM (3×15 mL). The combined organic layer was washed with water (10 mL), brine (10 mL) dried over anhydrous sodium sulfate and solvent was evaporated under vacuum to get crude compound which was purified by prep HPLC (Method A). The prep fractions were concentered to the aqueous phase added DCM and neutralized with 10% NaHCO$_3$ aqueous solution. The phases were separated. The organic phase was washed with water, brine, dried over anhydrous Na$_2$SO$_4$ and evaporated to afford the title compound Yield: 44% (50.1 mg, Off White solid). $^1$HNMR (400 MHz, DMSO-d$_6$): δ 9.28 (s, 1H), 8.81 (s, 1H), 8.76 (d, J=7.6 Hz, 1H), 8.60 (s, 1H), 8.12 (s, 1H), 3.83-3.79 (m, 1H), 3.56-3.54 (m, 2H), 3.44-3.42 (m, 2H), 3.26 (s, 4H), 2.05-2.03 (m, 2H), 1.95-1.92 (m, 2H), 1.45-1.36 (m, 2H), 1.31-1.22 (m, 2H). LCMS: (Method C) 430.2 [M+H], Rt.1.632 min, HPLC: (Method A) Rt.4.118 min.

Ex. 5: N-((1r,4r)-4-(2-methoxyethoxy)cyclohexyl)-2,6-di(thiazol-5-yl)pyrimidine-4-carboxamide

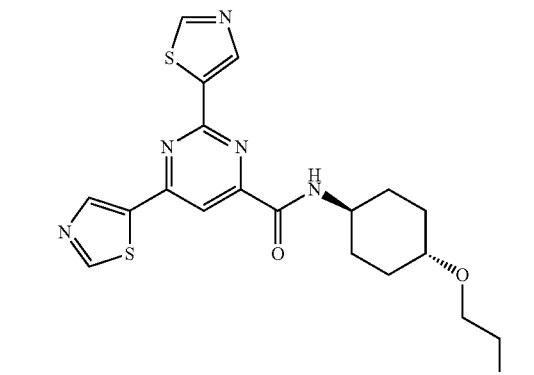

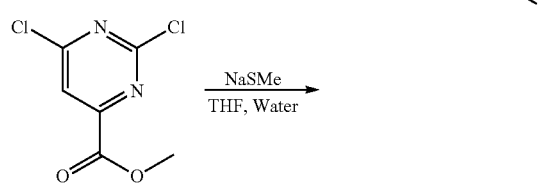

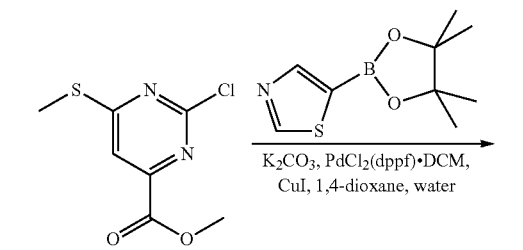

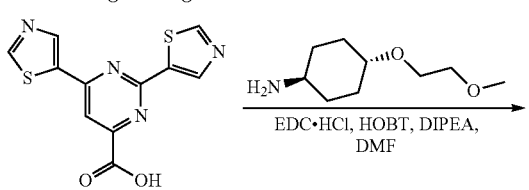

Step 1: methyl 2-chloro-6-(methylthio)pyrimidine-4-carboxylate

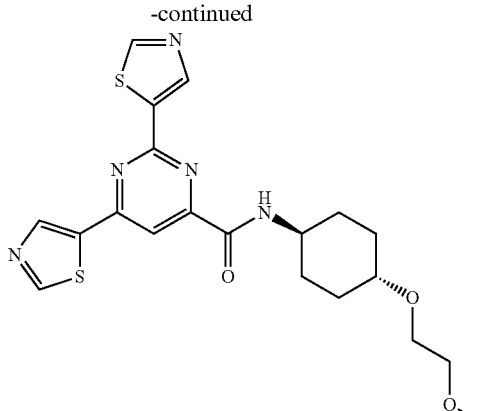

To a stirred solution of methyl 2,6-dichloropyrimidine-4-carboxylate (2.0 g, 96.62 mmol) in THF (25 mL), was added aq. NaSMe (676 mg, 96.62 mmol) at RT and the reaction mixture was stirred at RT for 3 h. After completion (monitored by TLC), the reaction mixture was diluted with water (100 mL) and the resulting suspension was extracted with diethyl ether (2×150 mL). The combined organic layer was washed with water (30 mL), brine (30 mL), dried over anhydrous Na$_2$SO$_4$ and the solvent was evaporated under vacuum to afford the title compound. Yield: 66% (1.4 g, yellow solid). $^1$H NMR (400 MHz, DMSO-d$_6$): δ 7.95 (s, 1H), 3.91 (s, 3H), 2.61 (s, 3H). LCMS: (Method C) 218.8 [M+H], Rt. 2.00 min.

Step 2: 2,6-di(thiazol-5-yl)pyrimidine-4-carboxylic acid and 6-(methylthio)-2-(thiazol-5-yl)pyrimidine-4-carboxylic acid

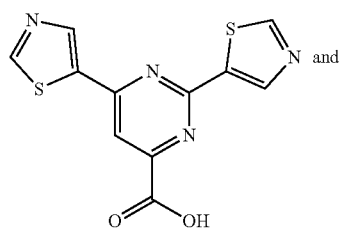 and

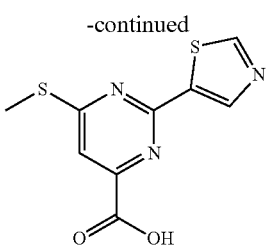

To a stirred solution of methyl 2-chloro-6-(methylthio)pyrimidine-4-carboxylate (0.50 g, 2.30 mmol) in 1,4-dioxane (12 mL) and water (2 mL), 5-(4,4,5,5-tetramethyl-1,3,2-dioxaborolan-2-yl)thiazole (729 mg, 3.45 mmol), and potassium carbonate (0.95 g, 6.90 mmol) were added at RT and nitrogen gas was purged through the reaction mixture for 5 min. Then Pd(dppf)Cl$_2$·DCM (188 mg, 0.23 mmol) and CuI (43 mg, 0.23 mmol) were added and the reaction mixture was heated at 110° C. overnight. After completion (monitored by TLC), the reaction mixture was diluted with 5% methanol in DCM and filtered through Celite. The filtrate was concentrated under vacuum to get the mixture of the title compounds which was used in the next step without further purification. Crude Yield: 0.56 g, black solid). LCMS: (Method C) 290.8 [M+H], Rt. 1.28 min, 253.9 [M+H], Rt. 1.44 min.

Step 3: N-((1r,4r)-4-(2-methoxyethoxy)cyclohexyl)-2,6-di(thiazol-5-yl)pyrimidine-4-carboxamide

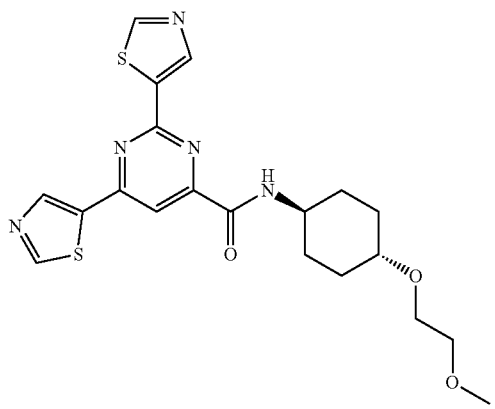 [SMILES: COCCO[C@H]1CC[C@H](NC(=O)c2cc(-c3cncs3)nc(-c3cncs3)n2)CC1]

To a stirred solution of the above crude mixture containing 2,6-di(thiazol-5-yl)pyrimidine-4-carboxylic acid and 6-(methylthio)-2-(thiazol-5-yl)pyrimidine-4-carboxylic acid (540 mg, 0.96 mmol) in DMF (12 mL) at RT, were added EDC·HCl (612 mg, 3.20 mmol), HOBt (432 mg, 3.20 mmol), DIPEA (0.87 mL, 6.40 mmol) and (1r,4r)-4-(2-methoxyethoxy)cyclohexan-1-amine (553 mg, 3.20 mmol) and the reaction mixture was stirred at RT overnight. The reaction mixture was monitored by TLC. After completion, the reaction mixture was diluted with water (50 mL) and the resulting suspension was extracted with EtOAc (3×100 mL). The combined organic layer was washed with water (50 mL), brine (50 mL), dried over anhydrous Na$_2$SO$_4$ and the solvent was evaporated under vacuum. The resulting crude residue was purified by Prep HPLC (Method A). The prep-fraction received from prep HPLC was made slightly basic using aq. NaHCO$_3$ and concentrated to remove acetonitrile under reduced pressure. The residual aqueous layer was extracted with 5% methanol in DCM (2×100 mL). The combined organic layer was washed with water (2×30 mL), dried over anhydrous Na$_2$SO$_4$, filtered and the filtrate was concentrated under vacuum. The residue was finally lyophilized from water-acetonitrile to afford the title compound. Yield: (21 mg, gray solid). $^1$H NMR (400 MHz, DMSO-d$_6$): δ 9.37-9.33 (m, 2H), 9.11-9.10 (m, 1H), 8.74 (d, J=8.4 Hz, 1H), 8.40 (s, 1H), 3.88-3.82 (m, 1H), 3.58-3.55 (m, 2H), 3.45-3.43 (m, 2H), 3.31-3.25 (m, 4H), 2.07-2.04 (m, 2H), 1.90-1.88 (m, 2H), 1.65-1.58 (m, 2H), 1.33-1.24 (m, 2H). LCMS: (Method A) 446.1 [M+H], Rt. 1.97 min. HPLC: (Method A) Rt. 3.76 min.

Ex. 6: N-((1r,4r)-4-(2-methoxyethoxy)cyclohexyl)-6-(1-methyl-1H-pyrazol-4-yl)-2-(thiazol-5-yl)pyrimidine-4-carboxamide

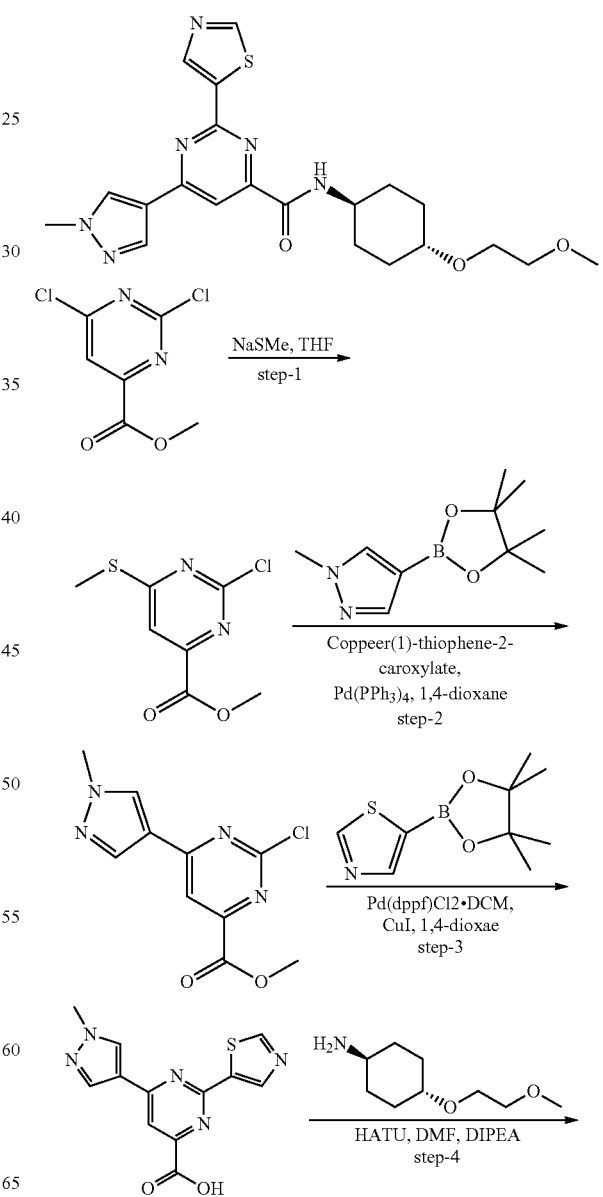

-continued

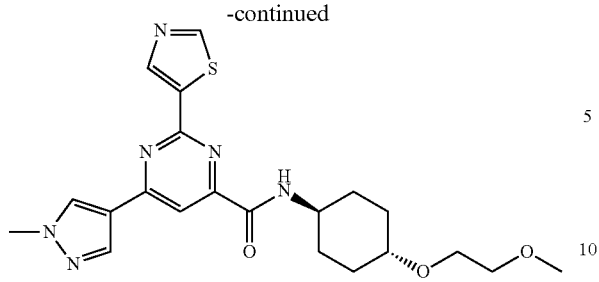

Step 1: methyl 2-chloro-6-(methylthio)pyrimidine-4-carboxylate

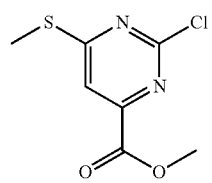

To a stirred solution of methyl 2,6-dichloropyrimidine-4-carboxylate (2 g, 9.66 mmol) in THF (25 mL), was added aq. NaSMe (676 mg, 9.66 mmol) at RT and stirred at same temperature for 3 h. The reaction mixture was monitored by TLC, quenched with water (100 mL). The resulting suspension was extracted with diethyl ether (2×150 mL). The combined organic layer was washed with water (30 mL), brine (30 mL), dried over anhydrous sodium sulphate and solvent was evaporated under vacuum to afford the title compound. Yield: 66% (1.4 g, yellow solid). $^1$H NMR (400 MHz, DMSO-$d_6$): δ 7.95 (s, 1H), 3.91 (s, 3H), 2.61 (s, 3H). LCMS: (Method C) 218.8 (M+H), Rt. 1.99 min.

Step 2: methyl 2-chloro-6-(1-methyl-1H-pyrazol-4-yl)pyrimidine-4-carboxylate

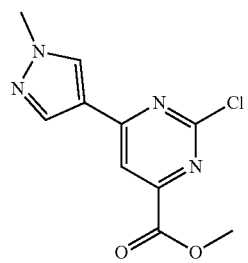 [SMILES: COC(=O)c1cc(-c2cnn(C)c2)nc(Cl)n1]

A stirred solution of methyl 6-chloro-2-(methylthio)pyrimidine-4-carboxylate (3 g, 13.76 mmol) in 1,4-dioxane (30 mL) was purged with $N_2$ gas for 10 min before addition of 4-(4,4,5,5-tetramethyl-1,3,2-dioxaborolan-2-yl)-1H-pyrazole (5.72 g, 27.52 mmol), copper(1)-thiophene-2-carboxylate (5.24 g, 27.52 mmol) and Pd(PPh$_3$)$_4$ (1.56 g, 1.37 mmol) at RT. Then the reaction was stirred at 85° C. for 6 h. Reaction mass was diluted with 5% methanol in DCM (150 mL) and filtered through celite bed. Filtrate was concentrated under vacuum and the resulting crude product was purified by flash chromatography (230-400 mesh silica gel eluting with 0-5% methanol in DCM) to afford the title compound. Yield: 35% (1.2 g, yellow solid). $^1$H NMR (400 MHz, DMSO-$d_6$): δ 8.73 (s, 1H), 8.32 (s, 1H), 8.25 (s, 1H), 3.94 (s, 3H), 3.92 (s, 3H). LCMS: (Method A) 253.2 (M+H), Rt. 1.53 min.

Step 3: 6-(1-methyl-1H-pyrazol-4-yl)-2-(thiazol-5-yl)pyrimidine-4-carboxylic acid

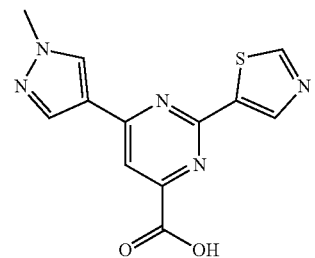 [SMILES: Cn1cc(-c2cc(C(=O)O)nc(-c3cncs3)n2)cn1]

To a stirred solution of methyl 2-chloro-6-(1-methyl-1H-pyrazol-4-yl)pyrimidine-4-carboxylate (1.0 g, 3.95 mmol) in 1,4-dioxane (10 mL) and water (2 mL), 5-(4,4,5,5-tetramethyl-1,3,2-dioxaborolan-2-yl)thiazole (1.08 g, 5.14 mmol), CuI (75 mg, 0.39 mmol) and potassium carbonate (1.63 g, 11.87 mmol) were added at RT and nitrogen gas was purged through the reaction mixture for 5 min. Then Pd(dppf)Cl$_2$·DCM (161 mg, 0.19 mmol) was added and the reaction mixture was heated at 110° C. for overnight. The reaction mixture was diluted with water, stirred at 50° C. for 10 min and filtered. The filtrate was acidified using aq. HCl (1.5 M) and the resulting solid was filtered and washed with water to get the title compound. Yield: 23% (0.28 g, brown solid). $^1$H NMR (400 MHz, DMSO-$d_6$): δ 14.0 (s, 1H), 9.36 (s, 1H), 8.81 (s, 1H), 8.78 (s, 1H), 8.35 (s, 1H), 8.07 (s, 1H), 3.91 (s, 3H). LCMS: (Method C) 288.0 (M+H), Rt. 1.29 min.

Step 4: N-((1r,4r)-4-(2-methoxyethoxy)cyclohexyl)-6-(1-methyl-1H-pyrazol-4-yl)-2-(thiazol-5-yl)pyrimidine-4-carboxamide

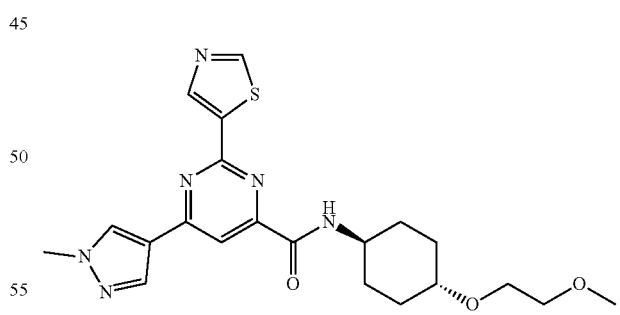

To a stirred solution of 6-(1-methyl-1H-pyrazol-4-yl)-2-(thiazol-5-yl)pyrimidine-4-carboxylic acid (150 mg, 0.52 mmol) in DMF (2.5 mL), were added EDC·HCl (150 mg, 0.78 mmol), HOBt (106 mg, 0.78 mmol) and DIPEA (202 mg, 1.56 mmol) and (1r,4r)-4-(2-methoxyethoxy)cyclohexan-1-amine (118 mg, 0.68 mmol) at RT and the reaction mixture was stirred overnight at RT. The reaction mixture was diluted with water (10 mL) and extracted with ethyl acetate (3×20 mL). The combined organic layer was washed with brine (10 mL) dried over anhydrous Na$_2$SO$_4$ and concentrated under vacuum. The resulting crude residue was purified by flash chromatography on Biotage Isolera (230-400 mesh silica gel, eluent: 0-5% methanol in DCM) to afford the title compound. Yield: 32% (73 mg, yellow solid). ¹H NMR (400 MHz, DMSO-d$_6$): δ 9.30 (d, J=0.4 Hz, 1H), 9.08 (d, J=0.8 Hz, 1H), 8.70 (s, 1H), 8.6 (d, J=8.8 Hz, 1H), 8.3 (d, J=0.4 Hz, 1H), 8.0 (s, 1H), 3.9 (s, 3H), 3.80-3.77 (m, 1H), 3.57-3.55 (m, 2H), 3.45-3.43 (m, 2H), 3.34-3.31 (m, 4H), 2.06-2.04 (m, 2H), 1.89-1.87 (m, 2H), 1.59-1.56 (m, 2H), 1.30-1.24 (m, 2H). LCMS: (Method C) 443.2 (M+H), Rt. 1.83 min. HPLC: (Method A) Rt. 3.45 min.

Ex. 7: N-((1r,4r)-4-(2-methoxyethoxy)cyclohexyl)-6-(methylthio)-2-(thiazol-5-yl)pyrimidine-4-carboxamide

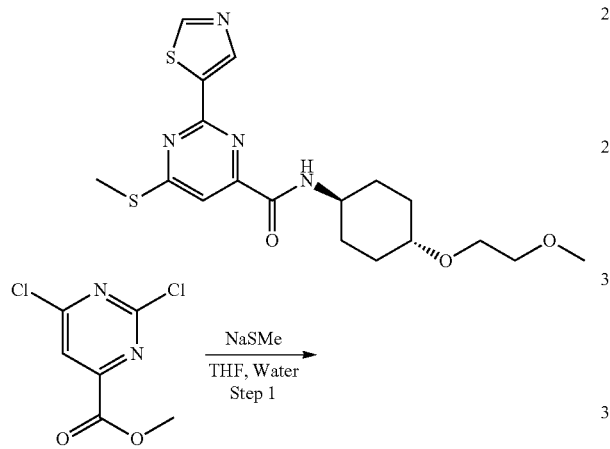

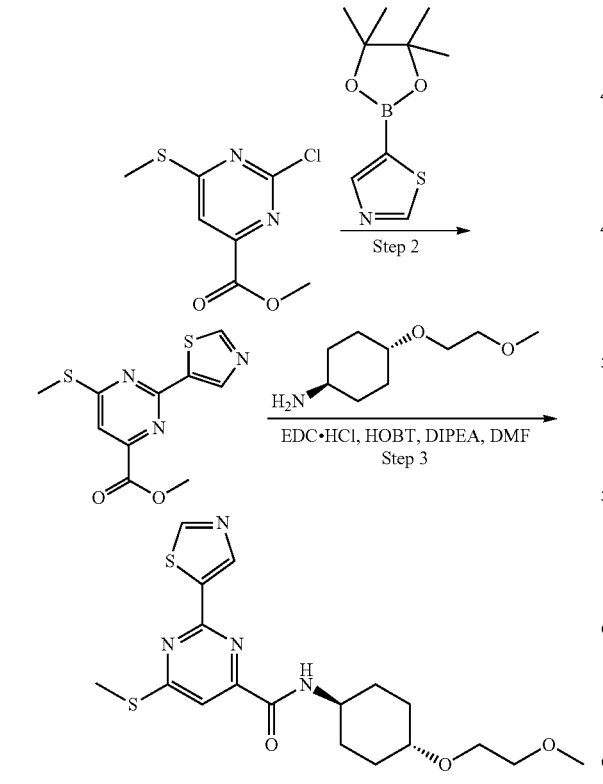

Step 1: methyl 2-chloro-6-(methylthio)pyrimidine-4-carboxylate

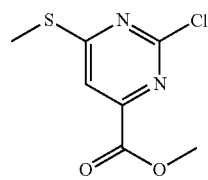

To a stirred solution of methyl 2,6-dichloropyrimidine-4-carboxylate (2 g, 96.62 mmol) in THF (25 mL), was added aq. NaSMe (676 mg, 96.62 mmol) at RT and stirred at same temperature for 3 h. The reaction mixture was quenched with water (100 mL) and extracted with diethyl ether (2×150 mL). The combined organic layer was washed with water (30 mL), brine (30 mL), dried over anhydrous Na$_2$SO$_4$ and solvent was evaporated under vacuum to afford the title compound. Yield: 66% (1.4 g, Yellow solid). ¹HNMR (400 MHz, DMSO-d$_6$): δ 8.0 (s, 1H), 3.9 (s, 3H), 2.6 (s, 3H). LCMS: (Method C) 218.8 [M+H], Rt.1.99 min.

Step 2: 6-(methylthio)-2-(thiazol-5-yl)pyrimidine-4-carboxylic acid

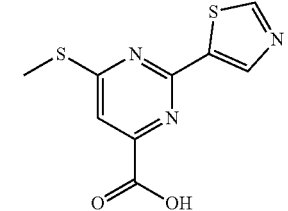 [SMILES: CSc1cc(C(=O)O)nc(-c2cncs2)n1]

To a stirred solution of methyl 2-chloro-6-(methylthio) pyrimidine-4-carboxylate (0.50 g, 2.30 mmol) in dioxane (12 mL) and water (2 mL), 5-(4,4,5,5-tetramethyl-1,3,2-dioxaborolan-2-yl)thiazole (729 mg, 3.45 mmol), CuI (43 mg, 0.23 mmol) and K$_2$CO$_3$ (0.95 g, 6.90 mmol) were added at RT and nitrogen gas was purged through the reaction mixture for 5 min. Then Pd(dppf)Cl$_2$·DCM (188 mg, 0.23 mmol) was added and the reaction mixture was heated at 110° C. for overnight. The reaction mixture was diluted with 5% methanol in DCM and filtered through Celite. The combined filtrate was concentrated under vacuum and the resulting crude material was used as it is for further step. Yield: 96% (0.56 g, Black solid, crude). LCMS: (Method C) 353.9 [M+H], Rt.1.44 min.

Step 3: N-((1r,4r)-4-(2-methoxyethoxy)cyclohexyl)-6-(methylthio)-2-(thiazol-5-yl)pyrimidine-4-carboxamide

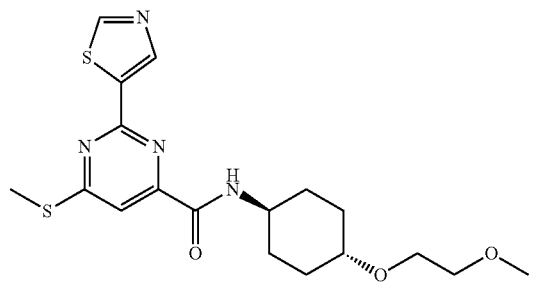

To a stirred solution of crude 6-(methylthio)-2-(thiazol-5-yl)pyrimidine-4-carboxylic acid (540 mg, 0.75 mmol) in DMF (12 mL), were added EDC·HCl (612 mg, 3.20 mmol), HOBt (432 mg, 3.20 mmol) and DIPEA (826 mg, 6.40 mmol) followed by (1r,4r)-4-(2-methoxyethoxy)cyclohexan-1-amine (553 mg, 3.20 mmol) and the reaction mixture was stirred at RT for overnight. The reaction mixture was quenched with water (50 mL) and extracted with EtOAc (3×100 mL). The combined organic layer was washed with water (50 mL), brine (50 mL), dried over anhydrous Na$_2$SO$_4$ and solvent was evaporated under vacuum. The resulting crude product was purified by Prep HPLC (Method A). Fraction received from prep HPLC was made slightly basic using aq. NaHCO$_3$ and ACN was removed on rota vapour under reduced pressure. Aqueous layer was extracted with 5% methanol in DCM 2×100 mL). The combined organic layer was washed with water (2×30 mL), dried over anhydrous Na$_2$SO$_4$, filtered and the filtrate was concentrated and lyophilized to afford the title compound. Yield: 5% (35 mg, Gray solid). $^1$HNMR (400 MHz, DMSO-d$_6$): δ 9.34 (s, 1H), 9.0 (s, 1H), 8.5 (d, J=8.4 Hz, 1H), 8.2 (s, 1H), 3.81-3.79 (m, 1H), 3.55-3.53 (m, 2H), 3.44-3.42 (m, 2H), 3.34-3.32 (m, 4H), 2.6 (s, 3H), 2.03-2.00 (m, 2H), 1.86-1.83 (m, 2H), 1.54-1.51 (m, 2H), 1.30-1.27 (m, 2H). LCMS: (Method A) 409.1 [M+H], Rt.2.20 min. HPLC: (Method A) Rt.4.02 min.

Ex. 8: N-((1r,4r)-4-(2-methoxyethoxy)cyclohexyl)-4-(1-methyl-1H-pyrazol-4-yl)-6-(thiazol-5-yl)picolinamide

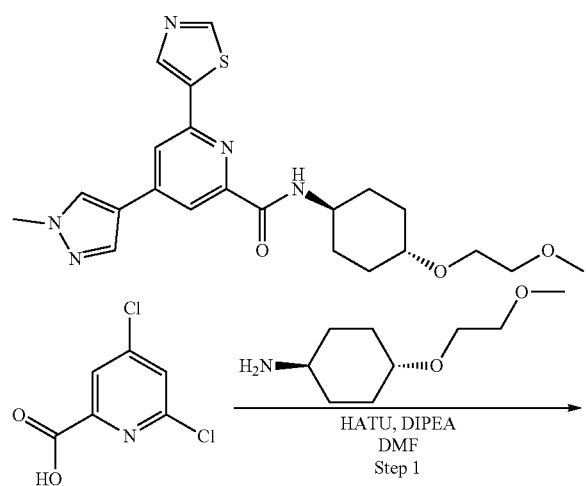

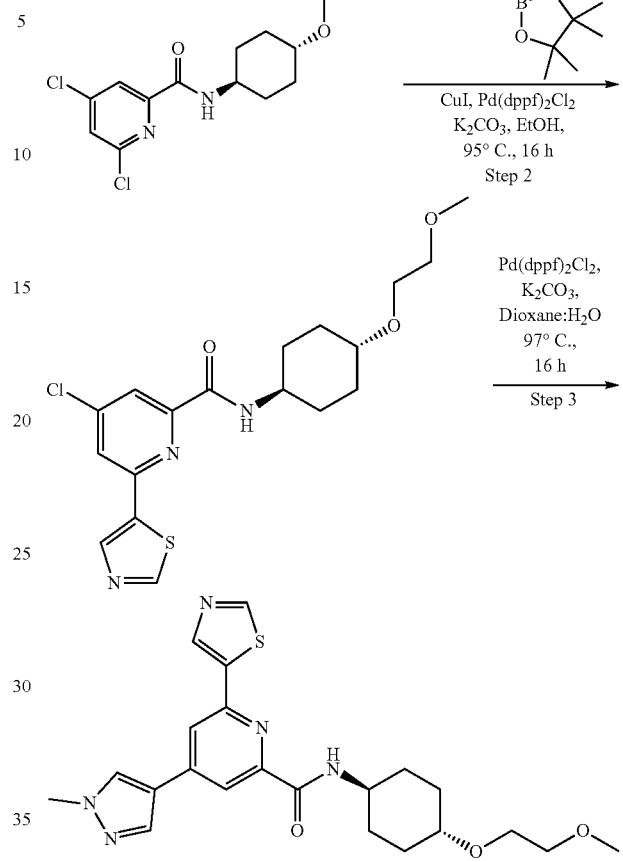

Step 1: 4,6-dichloro-N-((1r,4r)-4-(2-methoxyethoxy)cyclohexyl)picolinamide

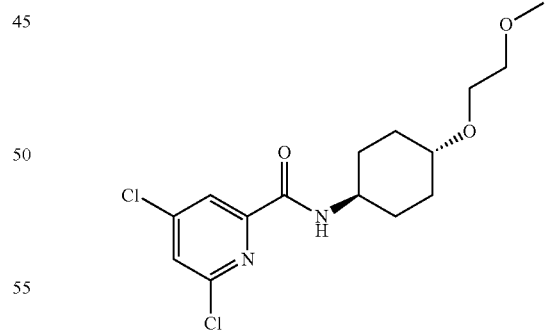

To a stirred solution of 4,6-dichloropicolinic acid (3.0 g, 15.62 mmol) in DMF (30 mL) were added DIPEA (8.39 mL, 46.87 mmol) and HATU (8.90 g, 23.43 mmol) at 0° C. After stirring for 5 min a solution of (1r,4r)-4-(2-methoxyethoxy)cyclohexan-1-amine (3.24 g, 18.75 mmol) in DMF (5.0 mL) was added at same temperature. The reaction mixture was stirred at RT for 16 h. The reaction mixture was monitored by TLC. After completion of reaction, it was quenched with water (25 mL). The resulting suspension was extracted with EtOAc (3×50 mL). The combined organic layer was washed with water (50 mL), brine (50 mL), dried over anhydrous Na₂SO₄ and solvent was evaporated under vacuum to get crude compound which was purified by column chromatography on Biotage Isolera (100-200 mesh silica gel eluting with 0-60% EtOAc in pet ether) to afford the title compound Yield: 77% (4.2 g, Yellow solid). ¹HNMR 300 MHz, DMSO-d₆): δ 8.46 (d, J=8.1 Hz, 1H), 8.01-7.98 (m, 2H), 3.76-3.73 (m, 1H), 3.52-3.50 (m, 2H), 3.42-3.40 (m, 2H), 3.23 (s, 4H), 2.00-197 (m, 2H), 1.80-1.76 (m, 2H), 1.55-1.44 (m, 2H), 1.26-1.19 (m, 2H). LCMS: (Method C) 347.0 [M+H], Rt.2.15 min Step 2: 4-chloro-N-((1r,4r)-4-(2-methoxyethoxy) cyclohexyl)-6-(thiazol-5-yl)picolinamide

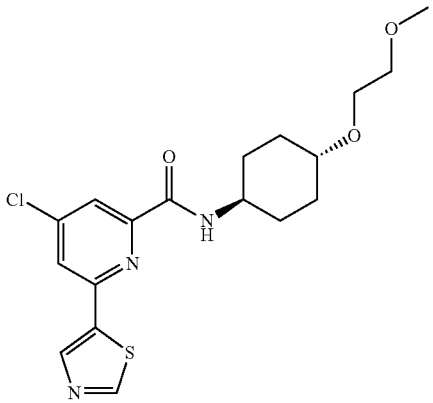 [SMILES: COCCO[C@H]1CC[C@H](NC(=O)c2cc(Cl)cc(-c3cncs3)n2)CC1]

To a stirred solution of 4,6-dichloro-N-((1r,4r)-4-(2-methoxyethoxy) cyclohexyl) picolinamide. (500 mg, 1.440 mmol) in 9.0 mL ethanol and water (1.0 mL) taken in a sealed tube, 5-(4,4,5,5-Tetramethyl-1,3,2-dioxaborolan-2-yl) thiazole (364.9 mg, 1.729 mmol), CuI (27.37 mg, 0.144 mmol), potassium carbonate (497.1 mg, 3.602 mmol), Pd(dppf)Cl₂·DCM (58.83 mg, 0.0724 mmol) were added at RT and the nitrogen gas was purged through the reaction mixture for 5 min. The reaction mixture was heated at 95° C. for 16 h. After completion of the reaction, it was filtered through Celite and washed with DCM (20 mL). The solvent was evaporated under vacuum to get crude compound. The resulting crude product was purified by column chromatography on Biotage isolera (230-400 mesh silica gel eluting with 0-10% MeOH in DCM) to afford the title compound. Yield: 55.5% (290 mg, Pale brown solid)¹HNMR (400 MHz, DMSO-d₆): δ 9.26 (s, 1H), 8.87 (s, 1H), 8.37 (d, J=1.6 Hz, 1H), 8.30 (d, J=8.4 Hz, 1H), 7.91 (d, J=1.6 Hz, 1H), 3.81-3.78 (m, 1H), 3.55-3.53 (m, 2H), 3.44-3.42 (m, 2H), 3.25 (s, 4H), 2.03-2.00 (m, 2H), 1.99-1.89 (m, 2H), 1.56-1.48 (m, 2H), 1.29-1.23 (m, 2H). LCMS: (Method A) 396.1 [M+H], Rt.1.912 min.

Step 3: N-((1r,4r)-4-(2-methoxyethoxy)cyclohexyl)-4-(1-methyl-1H-pyrazol-4-yl)-6-(thiazol-5-yl)picolinamide

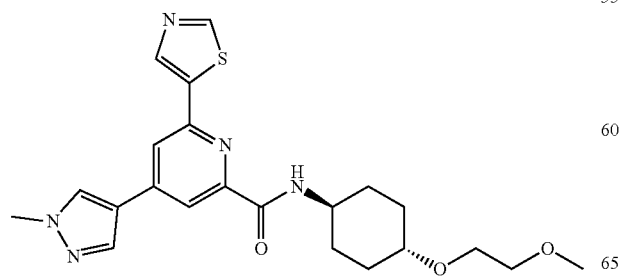

To a stirred mixture of 4-chloro-N-((1r,4r)-4-(2-methoxyethoxy) cyclohexyl)-6-(thiazol-5-yl) picolinamide (280 mg, 0.705 mmol), 1-methyl-4-(4,4,5,5-tetramethyl-1,3,2-dioxaborolan-2-yl)-1H-pyrazole (176.9 mg, 0.850 mmol), K₂CO₃ (244.5 mg, 1.772 mmol), Pd(dppf)Cl₂·DCM (72.36 mg, 0.0886 mmol) in 4.5 mL dioxane and water (0.5 mL) taken in a sealed tube was purged with N₂ for 5 min. The reaction mixture was heated at 97° C. for 16 h. The reaction was monitored by LCMS. After completion of the reaction, it was filtered through Celite and washed with DCM (20 mL). The filtrate was evaporated under vacuum to get crude product which was purified by prep HPLC (Method A). The prep fractions were concentrated, diluted with DCM and neutralized with 10% NaHCO₃ aqueous solution. The organic phase was washed with water, brine, dried over anhydrous Na₂SO₄ and evaporated to afford the title compound. Yield: 45% (141.7 mg, off White solid). ¹HNMR (400 MHz, DMSO-d₆): δ 9.22 (s, 1H), 8.84 (s, 1H), 8.60 (s, 1H), 8.33 (d, J=1.2 Hz, 1H), 8.26 (s, 1H), 8.20 (d, J=8.4 Hz, 1H), 8.06 (d, J=1.6 Hz, 1H), 3.91 (s, 3H), 3.85-3.80 (m, 1H), 3.56-3.54 (m, 2H), 3.45-3.42 (m, 2H), 3.26 (s, 4H), 2.03-2.00 (m, 2H), 1.92-1.89 (m, 2H), 1.55-1.47 (m, 2H), 1.33-1.25 (m, 2H). LCMS: (Method A) 441.9 [M+H], Rt.2.02 min, HPLC: (Method A) Rt.3.54 min.

Ex. 9: N-((1r,4r)-4-(2-methoxyethoxy)cyclohexyl)-6-(thiazol-5-yl)picolinamide

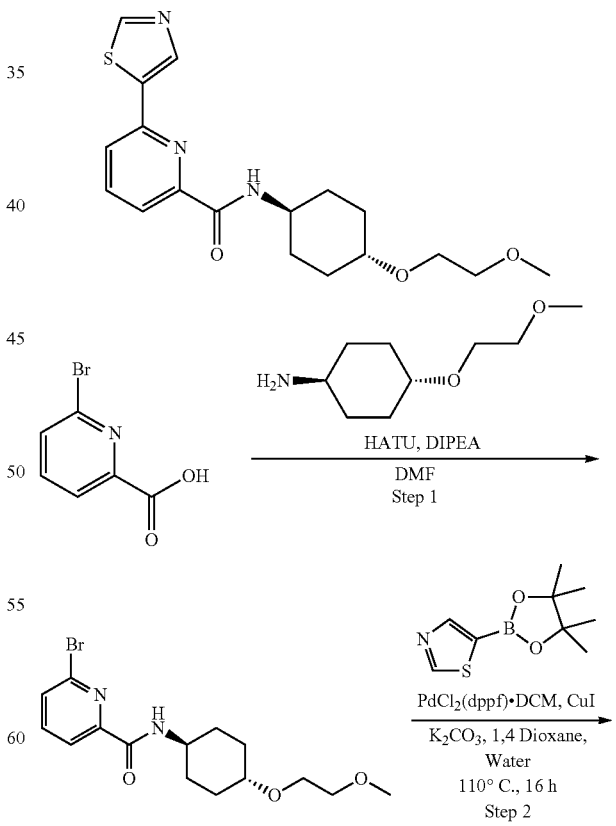

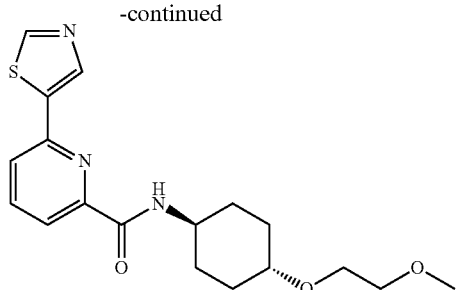

Step 1: 6-bromo-N-((1r,4r)-4-(2-methoxyethoxy)cyclohexyl)picolinamide

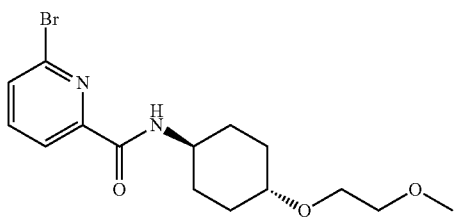 [SMILES: COCCO[C@H]1CC[C@H](NC(=O)c2cccc(Br)n2)CC1]

To a stirred solution of 6-bromopicolinic acid (415 mg, 2.05 mmol) in DMF (4 mL) was added HATU (1.17 g, 4.46 mmol) followed by DIPEA (0.94 mL, 5.12 mmol) under nitrogen atmosphere at 0° C., the resultant mixture was stirred for 15 min. After 15 min, (1r,4r)-4-(2-methoxyethoxy) cyclohexan-1-amine (533 mg, 3.08 mmol) was added and stirred at RT for 16 h. After completion, the reaction mixture was quenched with ice-cold water (20 mL) and extracted with EtOAc (50 mL). The ethyl acetate layer was washed with water (2×50 mL) dried over anhydrous Na$_2$SO$_4$, filtered and concentrated under vacuum to give title compound. Yield: 69.9% (510 mg, brown gummy solid). $^1$H NMR (400 MHz, DMSO-d$_6$): δ 8.32 (d, J=10.80 Hz, 1H), 8.1-8.00 (m, 1H), 7.95-7.90 (m, 1H), 7.89-7.82 (m, 1H), 3.75-3.70 (m, 1H), 3.53-3.50 (m, 2H), 3.42-3.40 (m, 2H), 3.25-3.16 (m, 4H), 2.20-1.86 (m, 4H), 1.39-1.22 (m, 4H), LCMS: (Method C) 360.0 [M+H], Rt. 1.94 min.

Step 2: N-((1r,4r)-4-(2-methoxyethoxy)cyclohexyl)-6-(thiazol-5-yl)picolinamide

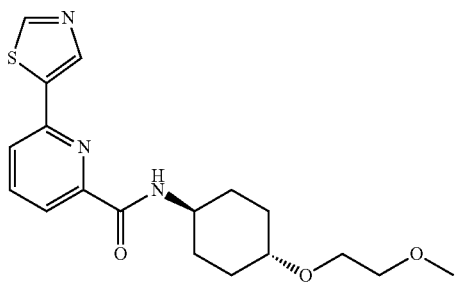 [SMILES: COCCO[C@H]1CC[C@H](NC(=O)c2cccc(-c3cncs3)n2)CC1]

A solution of 6-bromo-N-((1r,4r)-4-(2-methoxyethoxy)cyclohexyl)picolinamide (210 mg, 0.58 mmol) and 5-(4,4,5,5-tetramethyl-1,3,2-dioxaborolan-2-yl)thiazole (186 mg, 0.88 mmol) in 1,4 Dioxane (3 mL) and water (0.5 mL was deoxygenated by purging nitrogen gas for 10 min. Then K$_2$CO$_3$ (162 mg, 1.17 mmol) followed by CuI (11.1 mg, 0.058 mmol) and Pd(dppf)Cl$_2$·DCM (47.3 mg, 0.058 mmol) were added, the resultant mixture was heated at 110° C. for 16 h. After completion, the reaction mixture was filtered through a pad of Celite and washed with 10% MeOH in DCM (50 mL). The combined organic layer was dried over anhydrous Na$_2$SO$_4$, filtered and concentrated under vacuum to give crude residue. The obtained crude product was then purified by Grace reverse phase chromatography (Method A), the collected fractions were concentrated under reduced pressure, the obtained product was re-dissolved in 10% MeOH in DCM (50 mL) washed with 10% NaOH solution (20 mL) followed by water (20 mL). The organic layer was dried over anhydrous Na$_2$SO$_4$, filtered, concentrated under reduced pressure and further dried using lyophilization to give title compound. Yield: 66.12% (140.5 mg, white solid); $^1$HNMR (400 MHz, DMSO-d$_6$): δ 9.22 (s, 1H), 8.79 (s, 1H), 8.23 (d, J=8.4 Hz, 1H), 8.15-8.10 (m, 1H), 8.09-8.05 (m, 1H), 7.96-7.90 (m, 1H), 3.83-3.80 (m, 1H), 3.56-3.50 (m, 2H), 3.45-3.40 (m, 2H), 3.38-3.33 (m, 1H), 3.30 (s, 3H), 2.03-2.00 (m, 2H), 1.91-1.88 (m, 2H), 1.57-1.50 (m, 2H), 1.48-1.24 (m, 2H); LCMS: (Method D) 362.2 [M+H], Rt. 2.29 min; HPLC: (Method A) Rt. 3.26 min.

Ex 10: 4-(1H-imidazol-1-yl)-N-((1r,4r)-4-(2-methoxyethoxy)cyclohexyl)-6-(thiazol-5-yl)picolinamide

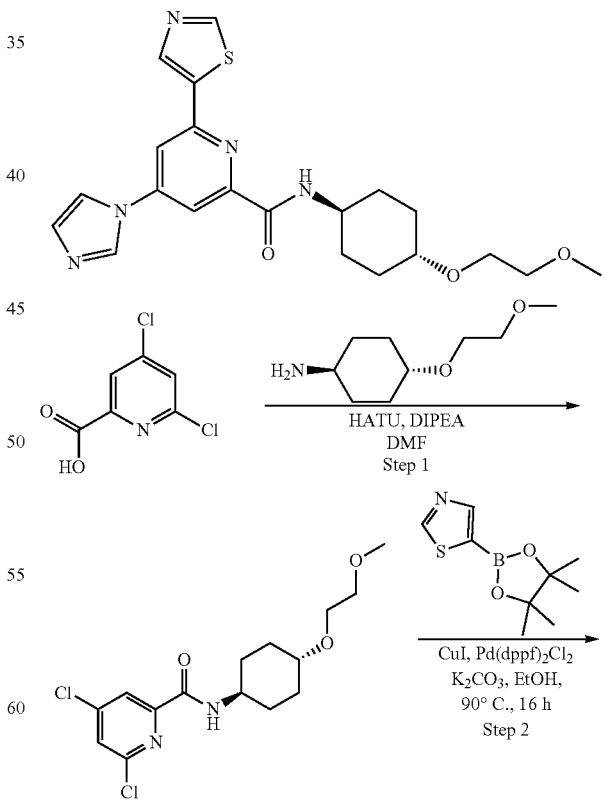

-continued

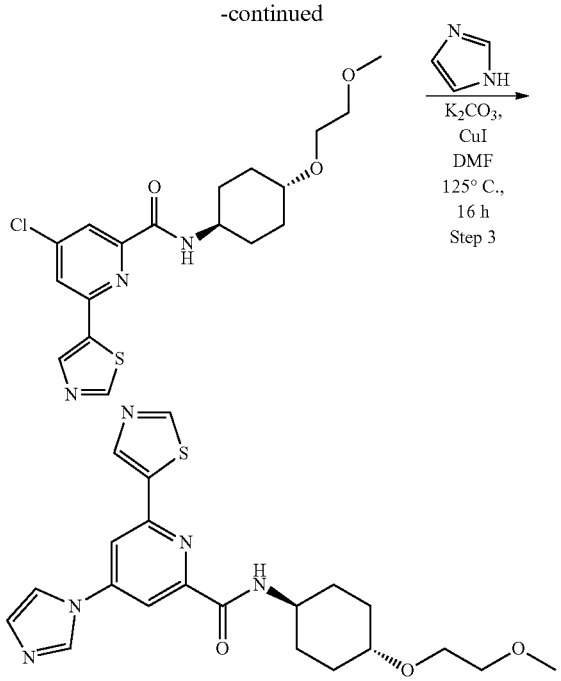

Step 1: 4,6-dichloro-N-((1r,4r)-4-(2-methoxyethoxy) cyclohexyl)picolinamide

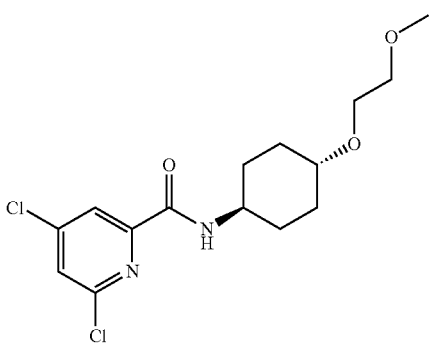 [SMILES: COCCO[C@H]1CC[C@H](NC(=O)c2cc(Cl)cc(Cl)n2)CC1]

To a stirred solution of 4,6-dichloropicolinic acid (1.5 g, 7.8 mmol) in DMF (15 mL) were added DIPEA (4.19 mL, 23.43 mmol) and HATU (5.93 g, 15.62 mmol) at 0° C. After stirring for 5 min a solution of (1r,4r)-4-(2-methoxyethoxy) cyclohexan-1-amine (1.48 g, 8.59 mmol) in DMF (2.5 mL) was added at same temperature. The reaction was stirred at RT for 16 h. The reaction mixture was monitored by TLC. After completion of the reaction, it was quenched with water (25 mL). The resulting suspension was extracted with EtOAc (3×25 mL). The combined organic layer was washed with water (20 mL), brine (20 mL), dried over anhydrous $Na_2SO_4$ and solvent was evaporated under vacuum to get crude compound which was purified by column chromatography on Biotage Isolera (100-200 mesh silica gel eluting with 0-60% EtOAc in pet ether) to afford the title compound Yield: 49% (1.35 g, Yellow solid). $^1$HNMR 400 MHz, DMSO-$d_6$): δ 8.49 (d, J=8.4 Hz, 1H), 8.03 (d, J=1.6 Hz, 1H), 8.00 (d, J=1.6 Hz, 1H), 3.87-3.81 (m, 1H), 3.54-3.52 (m, 2H), 3.44-3.40 (m, 2H), 3.20 (s, 4H), 2.01-198 (m, 2H), 1.81-1.78 (m, 2H), 1.53-1.49 (m, 2H), 1.25-1.21 (m, 2H). LCMS: (Method C) 347.1. [M+H], Rt.2.27 min.

Step 2: 4-chloro-N-((1r,4r)-4-(2-methoxyethoxy) cyclohexyl)-6-(thiazol-5-yl)picolinamide

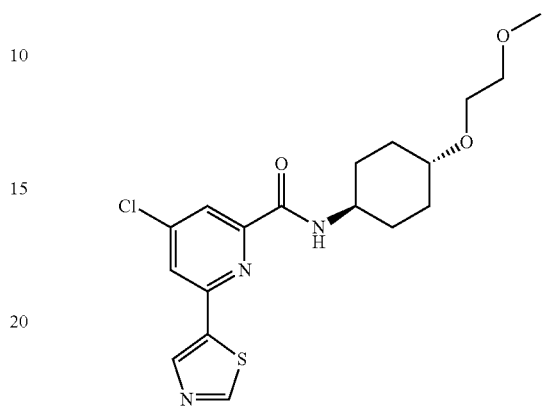

To a stirred solution of 4,6-dichloro-N-((1r,4r)-4-(2-methoxyethoxy) cyclohexyl) picolinamide (200 mg, 0.576 mmol) in 4.5 mL ethanol and water (0.5 mL) taken in a sealed tube, 5-(4,4,5,5-Tetramethyl-1,3,2-dioxaborolan-2-yl) thiazole (145.93 mg, 0.691 mmol), CuI (10.95 mg, 0.0576 mmol), potassium carbonate (159.0 mg, 1.15 mmol), Pd(dppf)Cl$_2$·DCM (23.53 mg, 0.028 mmol) were added at RT and the nitrogen gas was purged through the reaction mixture for 5 min. Then the reaction mixture was heated at 100° C. for 16 h. After completion of the reaction, reaction mixture was filtered through Celite and washed with DCM (20 mL). The solvent was evaporated under vacuum to get crude compound. The resulting crude product which was purified by column chromatography by on Biotage isolera (230-400 mesh silica gel eluting with 0-10% MeOH in DCM) to afford the title compound Yield: 35.2% (80 mg, Pale brown solid)$^1$HNMR (400 MHz, DMSO-d$_6$): δ 9.26 (s, 1H), 8.87 (s, 1H), 8.37 (d, J=2.0 Hz, 1H), 8.29 (d, J=8.4 Hz, 1H), 7.91 (d, J=1.6 Hz, 2H), 3.93-3.79 (m, 1H), 3.55-3.53 (m, 2H), 3.44-3.42 (m, 2H), 3.25 (s, 4H), 2.03-2.00 (m, 2H), 1.89-1.86 (m, 2H), 1.54-1.50 (m, 2H), 1.32-1.24 (m, 2H). LCMS: (Method A) 395.8[M+H], Rt.2.584 min.

Step 3: 4-(1H-imidazol-1-yl)-N-((1r,4r)-4-(2-methoxyethoxy)cyclohexyl)-6-(thiazol-5-yl)picolinamide

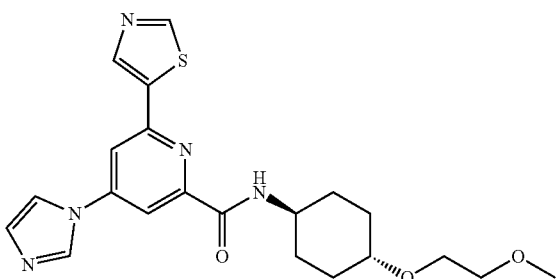

A mixture of 4-chloro-N-((1r,4r)-4-(2-methoxyethoxy) cyclohexyl)-6-(thiazol-5-yl) picolinamide (80 mg, 0.202 mmol), imidazole (41.31 mg, 0.607 mmol), copper iodide (3.8 mg, 0.0202 mmol) and K$_2$CO$_3$ (83.84 mg, 0.607 mmol) in DMF (2 mL) taken in a sealed tube was purged with N$_2$ for 5 min. The reaction mixture was heated at 125° C. for 16 h. The reaction was monitored by LCMS. After completion of the reaction, reaction mixture was filtered through Celite and washed with DCM (10 mL). The filtrate was evaporated under vacuum to get crude product which was purified by prep HPLC (Method A). The prep fraction was concentered, diluted with DCM and neutralized with 10% NaHCO$_3$ aqueous solution. The organic phase was washed with water, brine, dried over anhydrous Na$_2$SO$_4$ and evaporated to afford the title compound. Yield: 19.7% (17.02 mg, Off white solid). $^1$HNMR (400 MHz, DMSO-d$_6$): δ 9.25 (s, 1H), 8.92 (d, J=0.4 Hz, 1H), 8.75 (s, 1H), 8.47 (d, J=2.4 Hz, 1H), 8.30 (d, J=8.4 Hz, 1H), 8.19 (d, J=1.6 Hz, 2H), 7.22 (s, 1H), 3.85-3.81 (m, 1H), 3.56-3.54 (m, 2H), 3.45-3.42 (m, 2H), 3.26 (s, 4H), 2.03-2.01 (m, 2H), 1.93-1.89 (m, 2H), 1.58-1.49 (m, 2H), 1.34-1.23 (m, 2H). LCMS: (Method C) 427.9 [M+H], Rt.1.193 min. HPLC: (Method A) Rt.2.439 min.

Ex. 11: 6-(1H-imidazol-1-yl)-N-((1r,4r)-4-(2-methoxyethoxy)cyclohexyl)picolinamide

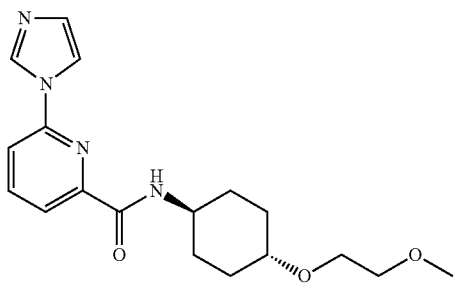 [SMILES: COCCO[C@H]1CC[C@H](NC(=O)c2cccc(-n3ccnc3)n2)CC1]

Step 1: 6-(1H-imidazol-1-yl)picolinic acid

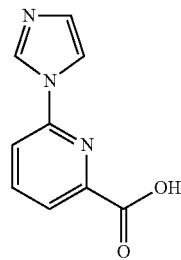 [SMILES: O=C(O)c1cccc(-n2ccnc2)n1]

A solution of methyl 6-bromopicolinate (502 mg, 2.32 mmol) and 1H-imidazole (474 mg, 6.97 mmol) in DMF (5 mL) was deoxygenated by purging nitrogen gas for 5 min. After 5 min, K$_2$CO$_3$ (801 mg, 5.80 mmol) followed by CuI (44.2 mg, 0.23 mmol) were added and heated at 140° C. for 16 h. Upon completion, the reaction mixture was filtered through pad of Celite, and washed with EtOAc (200 mL) and water (50 mL). Aqueous layer acidified using 1.5 N HCl, evaporated under vacuum. and washed with EtOAc (200 mL) and water (50 mL). Aqueous layer acidified using 1.5 N HCl, evaporated under vacuum. The crude product was taken for further steps without any purification. Yield: 44.5% (210 mg, white solid); LCMS: (Method B) 190.1 [M+H], Rt. 0.56 min.

Step 2: 6-(1H-imidazol-1-yl)-N-((1r,4r)-4-(2-methoxyethoxy)cyclohexyl)picolinamide

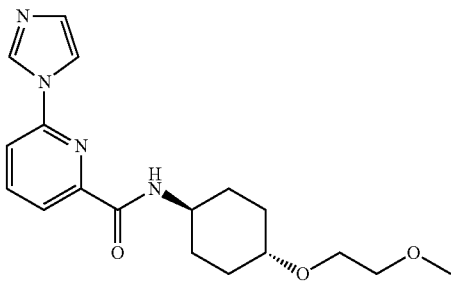 [SMILES: COCCO[C@H]1CC[C@H](NC(=O)c2cccc(-n3ccnc3)n2)CC1]

To a stirred solution of 6-(1H-imidazol-1-yl)picolinic acid (102 mg, 0.53 mmol) in DMF (7 mL) was added HATU (307 mg, 0.80 mmol) followed by DIPEA (0.37 mL, 2.02 mmol) at 0° C. under nitrogen atmosphere and stirred for 5 min. Subsequently, (1r,4r)-4-(2-methoxyethoxy)cyclohexan-1-amine (146 mg, 0.80 mmol) was added, the resultant mixture was stirred at RT for 16 h. After completion, water (50 mL) was added to the reaction mixture and extracted with EtOAc (100 mL).(too much solvent for 100 mg scale) The organic layer was washed with water (2×25 mL), dried over anhydrous Na$_2$SO$_4$, filtered and concentrated under vacuum. The obtained crude residue was purified by Grace reverse phase chromatography (Method B). The collected fractions were concentrated under reduced pressure, the obtained product was re-dissolved in 10% MeOH in DCM (50 mL) and washed with 10% aq. NaHCO$_3$ solution (20 mL) followed by water (2×25 mL). (Some of insoluble particles were observed that were not in soluble in organic layer. These were dissolving excess water) The organic layer was dried over anhydrous Na$_2$SO$_4$, filtered, concentrated under reduced pressure and further dried by lyophilization to give title compound. Yield: 56.7% (105.39 mg, off-white solid); $^1$HNMR (400 MHz, DMSO-d$_6$): δ 8.95 (s, 1H), 8.56 (d, J=8.8 Hz, 1H), 8.26 (s, 1H), 8.15 (d, J=7.6 Hz, 1H), 8.00 (d, J=8.0 Hz, 1H), 7.16 (s, 1H), 3.86-3.80 (m, 1H), 3.57-3.55 (m, 2H), 3.55-3.54 (m, 2H), 3.44-3.26 (m, 4H), 2.05-2.030 (m, 2H), 1.84-1.81 (m, 2H), 1.62-1.53 (m, 2H), 1.29-1.21 (m, 2H); LCMS: (Method C) 345.2 [M+H], Rt. 0.95 min; HPLC: (Method A) Rt. 2.01 min.

Ex. 12: 6-(1H-imidazol-1-yl)-N-((1r,4r)-4-(2-methoxyethoxy)cyclohexyl)-4-(1-methyl-1H-pyrazol-4-yl)picolinamide

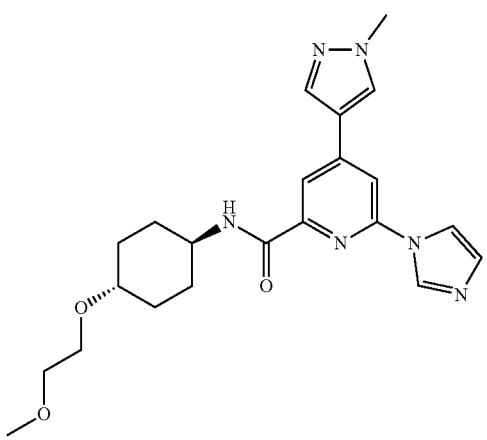

Step 1: 4,6-dichloro-N-((1r,4r)-4-(2-methoxyethoxy)cyclohexyl)picolinamide

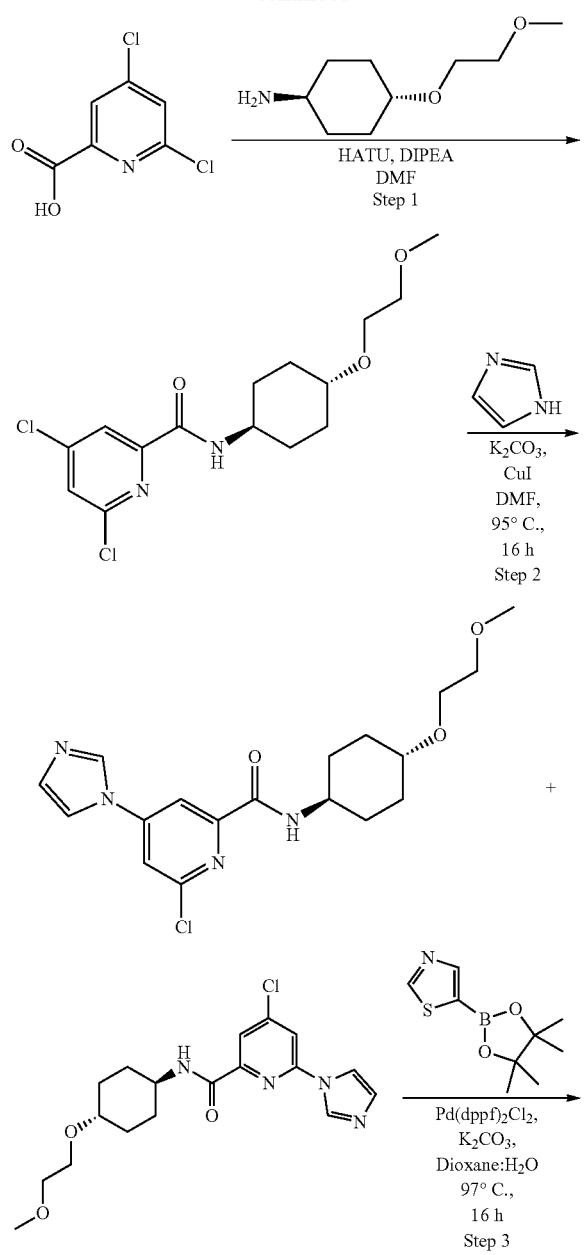

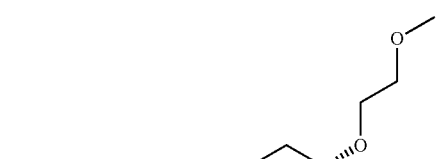

To a stirred solution of 4,6-dichloropicolinic acid (1.5 g, 7.8 mmol, CAS No. 88912-25-8) in DMF (15 mL) were added DIPEA (4.19 mL, 23.43 mmol) and HATU (5.93 g, 15.62 mmol) at 0° C. After stirring for 5 min a solution of (1r,4r)-4-(2-methoxyethoxy) cyclohexan-1-amine (1.48 g, 8.59 mmol) in DMF (2.5 mL) was added at same temperature. The reaction mixture was stirred at RT for 16 h. The reaction mixture was monitored by TLC. After completion of the reaction, it was quenched with water (25 mL). The resulting suspension was extracted with EtOAc (3×25 mL). The combined organic layer was washed with water (20 mL), brine (20 mL), dried over anhydrous $Na_2SO_4$ and solvent was evaporated under vacuum to get crude compound which was purified by column chromatography on Biotage Isolera (100-200 mesh silica gel eluting with 0-60% EtOAc in pet ether) to afford the title compound Yield: 49% (1.35 g, Yellow solid). $^1$HNMR 400 MHz, DMSO-$d_6$): δ 8.49 (d, J=8.4 Hz, 1H), 8.03 (d, J=1.6 Hz, 1H), 8.00 (d, J=1.6 Hz, 1H), 3.87-3.81 (m, 1H), 3.54-3.52 (m, 2H), 3.44-3.40 (m, 2H), 3.20 (s, 4H), 2.01-198 (m, 2H), 1.81-1.78 (m, 2H), 1.53-1.49 (m, 2H), 1.25-1.21 (m, 2H). LCMS: (Method C) 347.1. [M+H], Rt.2.27 min.

Step 2: 6-chloro-4-(1H-imidazol-1-yl)-N-((1r,4r)-4-(2-methoxyethoxy) cyclohexyl)picolinamide and 4-chloro-6-(1H-imidazol-1-yl)-N-((1r,4r)-4-(2-methoxyethoxy)cyclohexyl)picolinamide

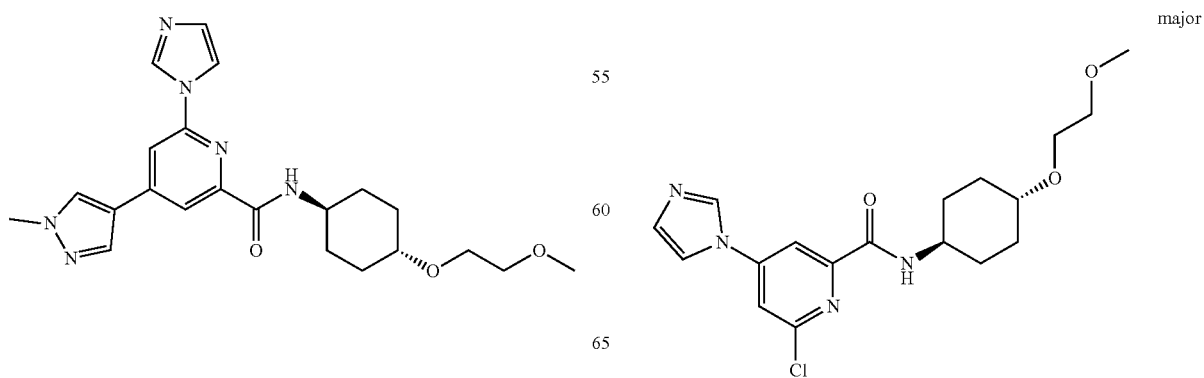

-continued

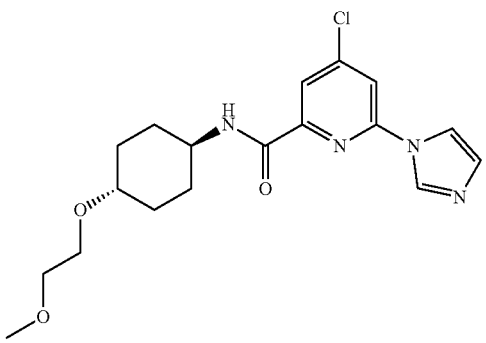

mirror

A mixture of 4,6-dichloro-N-((1r,4r)-4-(2-methoxyethoxy) cyclohexyl) picolinamide (700 mg, 2.017 mmol), imidazole (123.4 mg, 1.81 mmol), copper iodide (38.32 mg, 0.201 mmol) and $K_2CO_3$ (417.5 mg, 3.025 mmol) in DMF (15 mL) taken in a sealed tube was purged with $N_2$ for 5 min. The reaction mixture was heated at 90° C. for 16 h. The reaction was monitored by LCMS. After completion of the reaction, it was filtered through Celite bed and washed with DCM (10 mL). The filtrate was evaporated under vacuum to get crude product which was purified by column chromatography on Biotage Isolera (230-400 mesh silica gel eluting with 0-10% MeOH in DCM). Yield 80% (610.1 mg, Gummy Solid). $^1$HNMR (400 MHz, DMSO-$d_6$): δ 8.71 (s, 1H), 8.45 (d, J=8.4 Hz, 1H), 8.27 (d, J=2.8 Hz, 1H), 8.19 (d, J=2.0 Hz, 1H), 8.14 (s, 1H), 7.19 (s, 1H), 3.81-3.78 (m, 1H), 3.56-3.52 (m, 2H), 3.44-3.41 (m, 2H), 3.23 (s, 4H), 2.02-2.00 (m, 2H), 1.84-1.81 (m, 2H), 1.58-1.48 (m, 2H), 1.20-1.29 (m, 2H). LCMS: (Method C) 379.2 [M+H], Rt.1.13 min, 379.2 [M+H], Rt.1.02 min.

Step 3: 6-(1H-imidazol-1-yl)-N-((1r,4r)-4-(2-methoxyethoxy)cyclohexyl)-4-(1-methyl-1H-pyrazol-4-yl)picolinamide

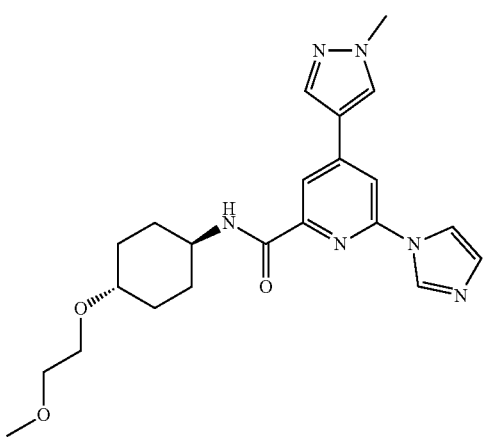 [SMILES: COCCO[C@H]1CC[C@H](NC(=O)c2cc(-c3cnn(C)c3)cc(-n3ccnc3)n2)CC1]

A mixture of 6-chloro-4-(1H-imidazol-1-yl)-N-((1r,4r)-4-(2-methoxyethoxy)cyclohexyl)picolinamide and 4-chloro-6-(1H-imidazol-1-yl)-N-((1r,4r)-4-(2-methoxyethoxy)cyclohexyl)picolinamide (280 mg, 0.740 mmol, 55% major and 26% minor), 1-methyl-4-(4,4,5,5-tetramethyl-1,3,2-dioxaborolan-2-yl)-1H-pyrazole (184.88 mg, 0.888 mmol), $K_2CO_3$ (255.5 mg, 1.851 mmol), Pd(dppf)Cl$_2$·DCM (30.24 mg, 0.0370 mmol) in 4.5 mL dioxane and water (0.5 mL) taken in a sealed tube was purged with $N_2$ for 5 min. The reaction mixture was heated at 97° C. for 16 h. The reaction was monitored by LCMS. After completion of the reaction, it was filtered through Celite and washed with DCM (20 mL). The filtrate was evaporated under vacuum to get crude product which was purified by column chromatography on Biotage Isolera (230-400 mesh silica gel eluting with 0-10% MeOH in DCM) to afford the title compound which was further purified by prep HPLC (Method A). The prep fraction of minor isomer was concenered, diluted with DCM and neutralized with 10% NaHCO$_3$ aqueous solution. The organic phase was washed with water, brine, dried over anhydrous Na$_2$SO$_4$ and evaporated to afford the title compound. Yield: 8% (28.1 mg, off White solid). $^1$HNMR (400 MHz, DMSO-$d_6$): δ 8.97 (s, 1H), 8.60 (s, 1H), 8.52 (d, J=8.4 Hz, 1H), 8.31-8.30 (m, 1H), 8.27 (s, 1H), 8.14 (J=1.2 Hz, 1H), 8.07 (d, J=1.2 Hz, 1H), 7.18 (s, 1H), 3.94 (s, 3H), 3.86-3.83 (m, 1H), 3.56-3.54 (m, 2H), 3.45-3.42 (m, 2H), 3.24 (s, 4H), 2.06-2.03 (m, 2H), 1.86-1.83 (m, 2H), 1.63-1.53 (m, 2H), 1.31-1.25 (m, 2H). LCMS: (Method A) 425.2 [M+H], Rt.1.54 min, HPLC: (Method A) Rt.2.48 min.

Ex. 13: 6-(1H-imidazol-1-yl)-4-(1-isopropyl-1H-pyrazol-4-yl)-N-((1r,4r)-4-(2-methoxyethoxy)cyclohexyl)picolinamide

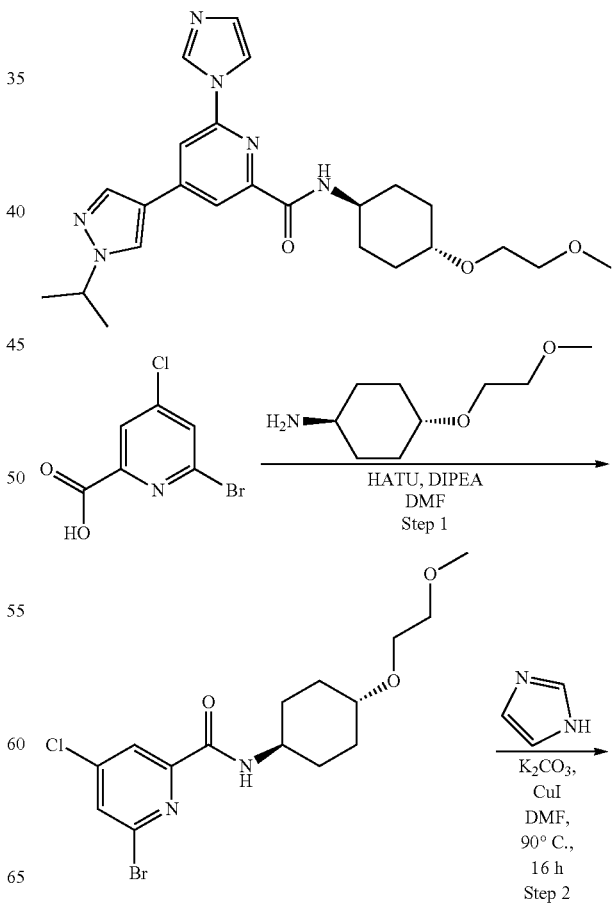

Step 2: 4-chloro-6-(1H-imidazol-1-yl)-N-((1r,4r)-4-(2-methoxyethoxy)cyclohexyl)picolinamide

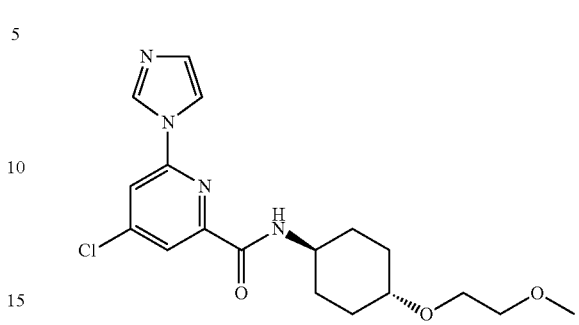

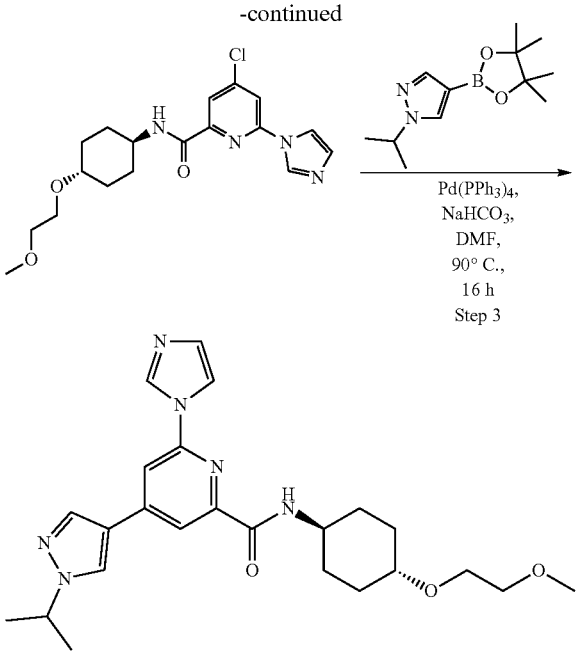

Step 1: 6-bromo-4-chloro-N-((1r,4r)-4-(2-methoxyethoxy)cyclohexyl)picolinamide

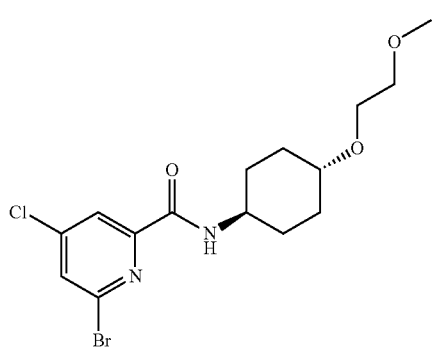 [SMILES: COCCO[C@H]1CC[C@H](NC(=O)c2cc(Cl)cc(Br)n2)CC1]

To a stirred solution of 6-bromo-4-chloropicolinic acid (3.0 g, 12.71 mmol) in DMF (30 mL) were added DIPEA (6.60 mL, 38.13 mmol) and HATU (7.23 g, 19.06 mmol) at 0'° C. After stirring for 5 min a solution of (1r,4r)-4-(2-methoxyethoxy)cyclohexan-1-amine (2.85 g, 16.52 mmol) in DMF (2.5 mL) was added at the same temperature. And the reaction mixture was stirred at RT overnight. After completion (monitored by TLC), the reaction mixture was diluted with water (45 mL). The resulting suspension was extracted with EtOAc (3×45 mL). The combined organic layer was washed with water (40 mL), brine (40 mL), dried over anhydrous $Na_2SO_4$ and the solvent was evaporated under vacuum. The get crude residue was purified by column chromatography on Biotage Isolera (100-200 mesh silica gel eluting with 0-60% EtOAc in pet ether) to afford the title compound. Yield: 43% (2.1 g, Yellow solid). $^1$H NMR (400 MHz, DMSO-$d_6$): δ 8.44 (d, J=8.4 Hz, 1H), 8.14 (d, J=1.6 Hz, 1H), 8.00 (d, J=2.0 Hz, 1H), 3.78-3.71 (m, 1H), 3.55-3.52 (m, 2H), 3.43-3.41 (m, 2H), 3.24-3.18 (m, 4H), 2.01-198 (m, 2H), 1.81-1.78 (m, 2H), 1.54-1.49 (m, 2H), 1.26-1.21 (m, 2H). LCMS: (Method C) 391.0 [M+H], Rt. 2.20 min.

A mixture of 6-bromo-4-chloro-N-((1r,4r)-4-(2-methoxyethoxy)cyclohexyl)picolinamide (200 mg, 0.510 mmol), imidazole (31.2 mg, 0.459 mmol), $K_2CO_3$ (105.69 mg, 0.765 mmol), copper iodide (9.7 mg, 0.0510 mmol) in DMF (15 mL) taken in a sealed tube was purged with $N_2$ for 5 min. The reaction mixture was heated at 90° C. for 16 h. The reaction was monitored by LCMS. After completion of the reaction, it was filtered through Celite and washed with DCM (10 mL). The filtrate was evaporated under vacuum to get crude product which was purified by column chromatography on Biotage Isolera (230-400 mesh silica gel eluting with 0-10% MeOH in DCM). Yield 65% (125.1 mg, Gummy Solid). $^1$HNMR (400 MHz, DMSO-$d_6$): δ 8.99 (s, 1H), 8.63 (d, J=8.4 Hz, 1H), 8.30 (d, J=1.6 Hz, 1H), 8.26 (d, J=1.6 Hz, 1H), 7.92 (d, J=2.0 Hz, 1H), 7.16 (s, 1H), 3.86-3.82 (m, 1H), 3.55-3.54 (m, 2H), 3.44-3.43 (m, 2H), 3.26 (s, 4H), 2.06-2.03 (m, 2H), 1.84-1.81 (m, 2H), 1.62-1.52 (m, 2H), 1.29-1.20 (m, 2H). LCMS: (Method C) 379.2 [M+H], Rt.1.37 min.

Step 3: 6-(1H-imidazol-1-yl)-4-(1-isopropyl-1H-pyrazol-4-yl)-N-((1r,4r)-4-(2-methoxyethoxy)cyclohexyl)picolinamide

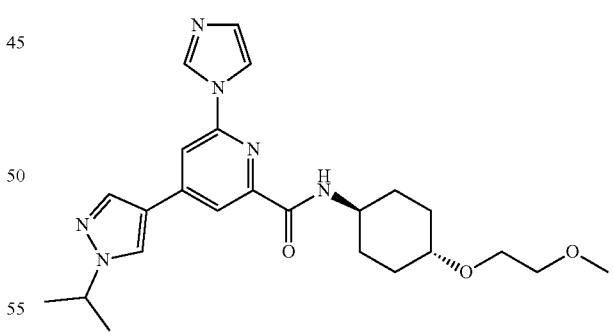

A mixture of 4-chloro-6-(1H-imidazol-1-yl)-N-((1r,4r)-4-(2-methoxyethoxy)cyclohexyl)picolinamide (120 mg, 0.3177 mmol), 1-isopropyl-4-(4,4,5,5-tetramethyl-1,3,2-dioxaborolan-2-yl)-1H-pyrazole (89.9 mg, 0.3809 mmol), $NaHCO_3$ (80.01 mg, 0.9523 mmol), Pd(PPh$_3$)$_4$ (36.66 mg, 0.03177 mmol) in 2.0 mL DMF and 0.1 mL of water taken in a sealed tube was purged with nitrogen gas for 5 min. The reaction mixture was at 100° C. for 16 h. After completion of the reaction, it was filtered through Celite and washed with DCM (10 mL). The solvent was evaporated under vacuum to get crude compound. The resulting crude product was purified by column chromatography on Biotage isolera (230-400 mesh silica gel eluting with 0-10% MeOH in DCM) to afford the title compound which was further purified by prep HPLC (Method TFA). The prep fraction was concentrated, diluted with DCM and neutralized with 10% NaHCO₃ aqueous solution. The organic phase was washed with water, brine, water dried over anhydrous sodium sulfate and lyophilized to afford the title compound Yield: 28% (40 mg, Off white solid). ¹HNMR (400 MHz, DMSO-$d_6$): δ 8.97 (s, 1H), 8.71 (s, 1H), 8.52 (d, J=8.4 Hz, 1H), 8.31-8.30 (m, 1H), 8.28 (s, 1H), 8.15 (d, J=1.2 Hz, 1H), 8.11 (d, J=1.2 Hz, 1H), 7.19 (s, 1H), 4.58-4.54 (m, 1H), 3.89-3.85 (m, 1H), 3.57-3.51 (m, 2H), 3.45-3.42 (m, 2H), 3.26 (s, 4H), 2.08-2.03 (m, 2H), 1.86-1.83 (m, 2H), 1.60-1.56 (m, 2H), 1.49 (d, J=6.4 Hz, 6H), 1.28-1.24 (m, 2H). LCMS: (Method C) 453.2 [M+H], Rt.1.47 min, HPLC: (Method A) Rt.2.80 min.

Ex. 14: 6-(1H-imidazol-1-yl)-N-((1r,4r)-4-(2-methoxyethoxy)cyclohexyl)-4-(1,3,5-trimethyl-1H-pyrazol-4-yl)picolinamide To a stirred suspension of 4-chloro-6-(1H-imidazol-1-yl)-N-((1r,4r)-4-(2-methoxyethoxy)cyclohexyl)picolinamide (90 mg, 0.24 mmol) in DMF (3.0 mL) and water (one drop) at RT, were added 1,3,5-trimethyl-4-(4,4,5,5-tetramethyl-1,3,2-dioxaborolan-2-yl)-1H-pyrazole (67 mg, 0.28 mmol), and NaHCO₃ (59 mg, 0.71 mmol) and the mixture was purged with N₂ (gas) for 5 min. Then Pd(PPh₃)₄ (27.4 mg, 0.02 mmol) was added at RT and the reaction mixture was heated in a sealed tube at 100° C. for 16 h. After completion (monitored by TLC), reaction mixture was filtered through Celite bed, and the bed was washed with DCM (10 mL). The filtrate was concentrated under vacuum and the resulting crude material was purified by prep HPLC (Method A). The prep fractions were concentrated under vacuum. To the residue was added DCM and neutralized with 10% aq. NaHCO₃ aqueous solution. The organic layer was washed with water, brine, dried over anhydrous Na₂SO₄ and lyophilized to afford the title compound. Yield: 46% (50.1 mg, Off white solid). ¹H NMR (400 MHz, DMSO-$d_6$): δ 8.98 (s, 1H), 8.58 (d, J=8.8 Hz, 1H), 8.31-8.30 (m, 1H), 7.81-7.79 (m, 2H), 7.17-7.16 (m, 1H), 3.89-3.83 (m, 1H), 3.76 (s, 3H), 3.57-3.55 (m, 2H), 3.45-3.43 (m, 2H), 3.31-3.24 (m, 4H), 2.34 (s, 3H), 2.24 (s, 3H), 2.07-2.04 (m, 2H), 1.87-1.83 (m, 2H), 1.61-1.57 (m, 2H), 1.28-1.24 (m, 2H). LCMS: (Method C) 453.2 [M+H], Rt. 1.39 min, HPLC: (Method A) Rt. 2.53 min.

Ex. 15: 4-amino-6-(1H-imidazol-1-yl)-N-((1r,4r)-4-(2-methoxyethoxy)cyclohexyl)picolinamide

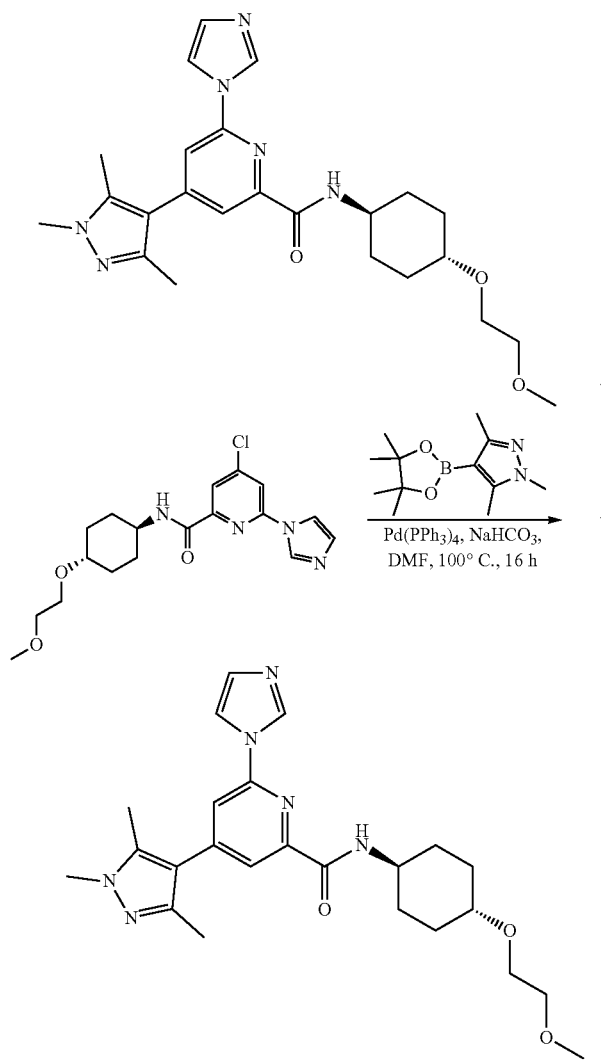

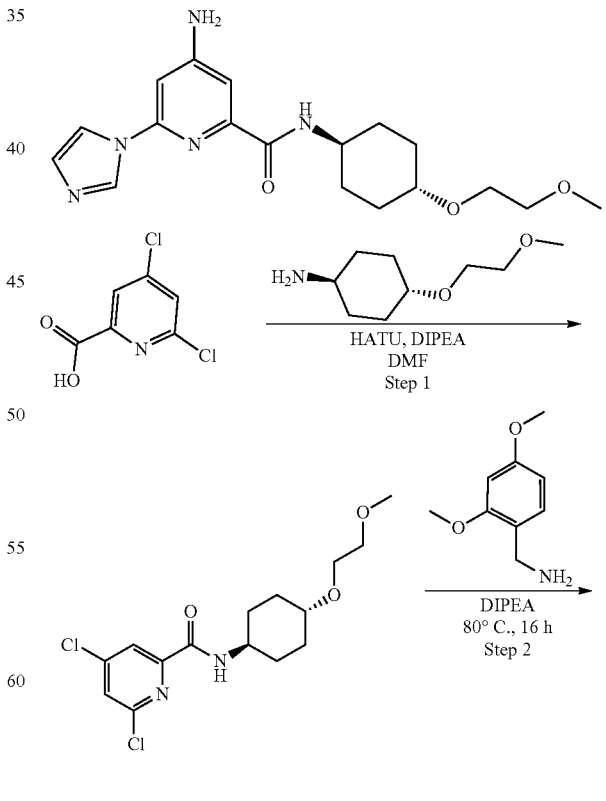

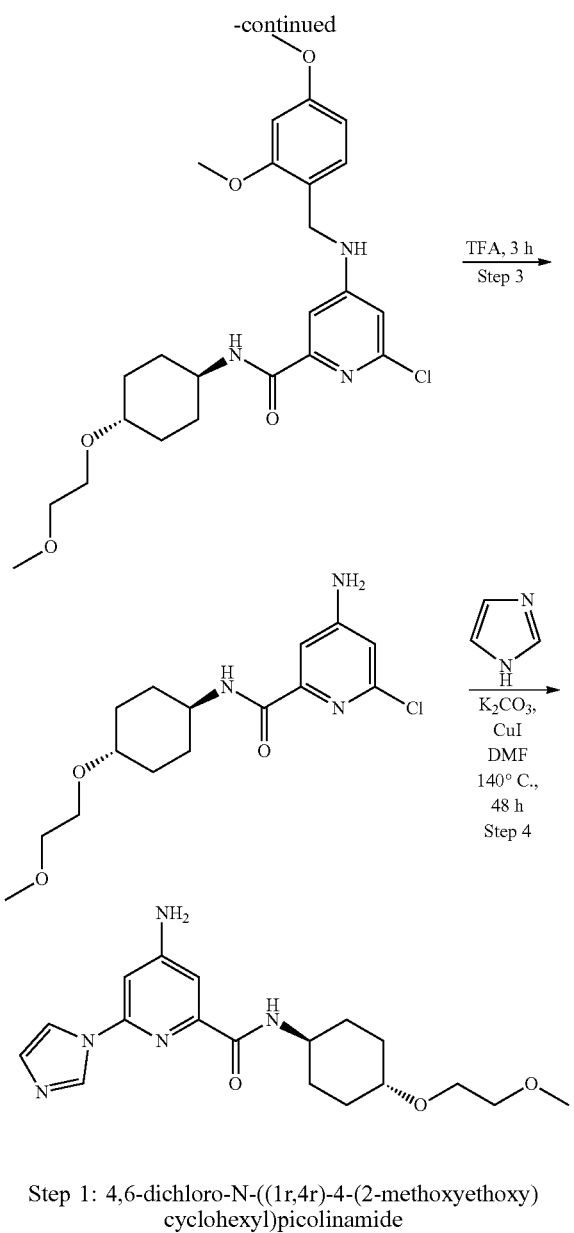

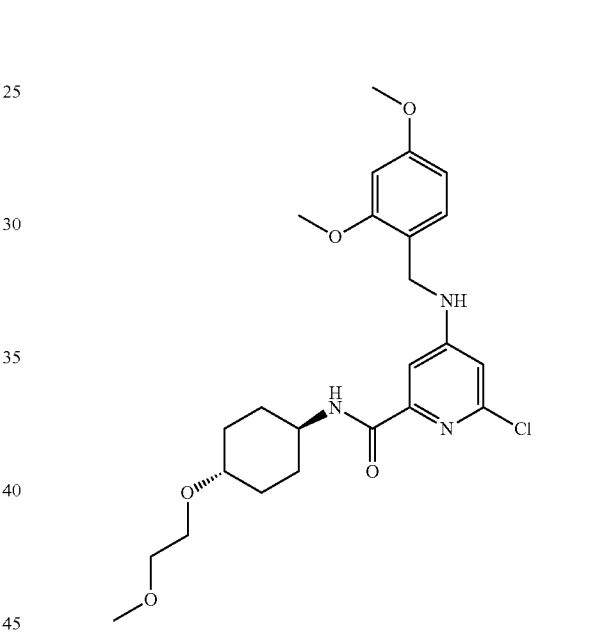

Step 1: 4,6-dichloro-N-((1r,4r)-4-(2-methoxyethoxy)cyclohexyl)picolinamide

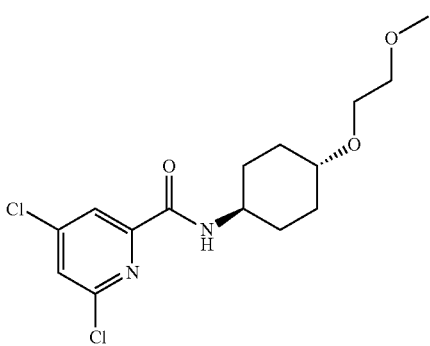 [SMILES: COCCO[C@H]1CC[C@H](NC(=O)c2cc(Cl)cc(Cl)n2)CC1]

To a stirred solution of 4,6-dichloropicolinic acid (1.5 g, 7.8 mmol) in DMF (15 mL) were added DIPEA (4.19 mL, 23.43 mmol) and HATU (5.93 g, 15.62 mmol) at 0° C. After stirring for 5 min a solution of (1r,4r)-4-(2-methoxyethoxy) cyclohexan-1-amine (1.48 g, 8.59 mmol) in DMF (2.5 mL) was added at same temperature. Further reaction was stirred at RT for overnight. The reaction mixture was monitored by TLC and quenched with water (25 mL).

The resulting suspension was extracted with EtOAc (3×25 mL). The combined organic layer was washed with water (20 mL), brine (20 mL), dried over anhydrous $Na_2SO_4$ and solvent was evaporated under vacuum to get crude compound which was purified by column chromatography Biotage Isolera (100-200 mesh silica gel eluting with 0-60% EtOAc in pet ether) to afford the title compound. Yield: 49% (1.35 g, Yellow solid). $^1$HNMR (400 MHz, DMSO-$d_6$): δ 8.49 (d, J=8.4 Hz, 1H), 8.03 (d, J=1.6 Hz, 1H), 8.00 (d, J=1.6 Hz, 1H), 3.87-3.81 (m, 1H), 3.54-3.52 (m, 2H), 3.44-3.40 (m, 2H), 3.21-3.20 (m, 4H), 2.01-198 (m, 2H), 1.81-1.78 (m, 2H), 1.53-1.49 (m, 2H), 1.25-1.21 (m, 2H). LCMS: (Method C) 347.1. [M+H] 349.1 and [M+H], Rt.2.27 min.

Step 2: 6-chloro-4-((2,4-dimethoxybenzyl)amino)-N-((1r,4r)-4-(2-methoxyethoxy)cyclohexyl)picolinamide A mixture of 4,6-dichloro-N-((1r,4r)-4-(2-methoxyethoxy) cyclohexyl)picolinamide (1.5 g, 4.32 mmol) in NMP (10 mL) was added (2,4-dimethoxyphenyl) methanamine (794.1 mg, 4.75 mmol), DIPEA (1.50 mL, 8.646 mmol) and purged with $N_2$ for 5 min. Then the reaction mixture was heated in a sealed tube at 80° C. for overnight. The reaction mixture was quenched with water (25 mL) and extracted with EtOAc (3×25 mL). The combined organic layer was washed with water (20 mL), brine (20 mL), dried over anhydrous $Na_2SO_4$ and solvent was evaporated under vacuum to get crude compound, which was purified by column chromatography Biotage Isolera (100-200 mesh silica gel eluting with 0-60% EtOAc in pet ether) to afford the title compound. Yield: 65% (1.30 g, Yellow solid). $^1$HNMR (300 MHz, DMSO-$d_6$): δ 8.00 (d, J=8.4 Hz, 1H), 7.57-7.56 (m, 1H), 7.21 (s, 1H), 7.10 (d, J=8.1 Hz, 1H), 6.58 (s, 2H), 6.48 (d, J=8.4 Hz, 1H), 4.21 (d, J=5.4 Hz, 2H), 3.82 (s, 3H), 3.78-3.68 (m, 4H), 3.54-3.51 (m, 2H), 3.43-3.40 (m, 2H), 3.24-3.22 (m, 4H), 1.99-1.90 (m, 2H), 1.80-1.76 (m, 2H), 1.46-1.42 (m, 2H), 1.26-1.19 (m, 2H). LCMS: (Method C) 478.2 [M+H], Rt.1.29 min.

Step 3: 4-amino-6-chloro-N-((1r,4r)-4-(2-methoxyethoxy)cyclohexyl)picolinamide

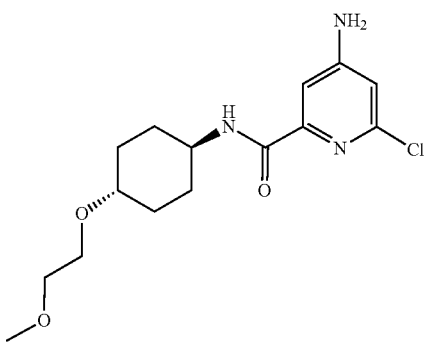 [SMILES: COCCO[C@H]1CC[C@H](NC(=O)c2cc(N)cc(Cl)n2)CC1]

To a stirred solution of 6-chloro-4-((2,4-dimethoxybenzyl)amino)-N-((1r,4r)-4-(2-methoxyethoxy)cyclohexyl)picolinamide (1.3 g, 2.726 mmol) was added TFA (9.39 mL 122.641 mmol) at 0° C. and for 3 h at RT. After completion of the reaction, the reaction mixture was cooled to 0° C. and added ice-cold water slowly followed by neutralization with sat. Na$_2$CO$_3$ solution. The solid formed during neutralization was filtered, washed with water, hexane and dried to afford the title compound. Yield: 96% (860 mg, Off white solid). $^1$HNMR (300 MHz, DMSO-d$_6$): δ 7.99 (d, J=8.4 Hz, 1H), 7.18 (d, J=2.1 Hz, 1H), 6.71 (s, 2H), 6.58 (d, J=2.1 Hz, 1H), 3.81-3.75 (m, 1H), 3.52-3.51 (m, 2H), 3.43-3.41 (m, 2H), 3.24-3.21 (m, 4H), 1.99-1.96 (m, 2H), 1.80-1.77 (m, 2H), 1.47-1.43 (m, 2H), 1.24-1.20 (m, 2H). LCMS: (Method C) 328.2 [M+H], Rt.1.74 min.

Step 4: 4-amino-6-(1H-imidazol-1-yl)-N-((1r,4r)-4-(2-methoxyethoxy)cyclohexyl)picolinamide

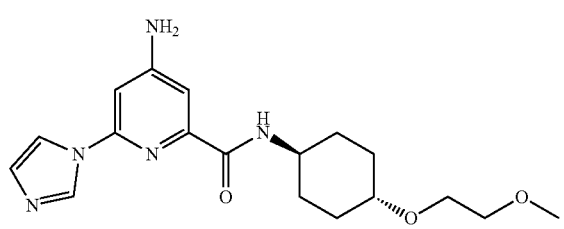 [SMILES: COCCO[C@H]1CC[C@H](NC(=O)c2cc(N)cc(-n3ccnc3)n2)CC1]

The mixture of 4-amino-6-chloro-N-((1r,4r)-4-(2-methoxyethoxy)cyclohexyl)picolinamide (200 mg, 0.611 mmol), imidazole (124.7 mg, 1.834 mmol), K$_2$CO$_3$ (253.2 mg, 1.834 mmol), copper iodide (11.6 mg, 0.0611 mmol) in DMF (4 mL) was purged with N$_2$ for 5 min and then reaction mixture was heated in a sealed tube at 140° C. for 48 h. The reaction mixture was filtered through Celite bed, washed with DCM (10 mL). The filtrate was evaporated under vacuum to get crude product, which was further purified by prep. HPLC (Method A). The prep. fraction was concentered to remove ACN and the resulting fraction neutralized with 10% NaHCO$_3$ aqueous solution and extracted with DCM. The organic phase was washed with water, brine, dried over anhydrous Na$_2$SO$_4$ and evaporated to afford the title compound. Yield 13% (30.1 mg, Off white solid). $^1$HNMR (400 MHz, DMSO-d$_6$): δ 8.71 (s, 1H), 8.31 (d, J=8.8 Hz, 1H), 7.94 (s, 1H), 7.19 (d, J=1.6 Hz, 1H), 7.09 (s, 1H), 6.79 (d, J=1.6 Hz, 1H), 6.64 (s, 2H), 3.81-3.75 (m, 1H), 3.54-3.53 (m, 2H), 3.44-3.42 (m, 2H), 3.25-3.21 (m, 4H), 2.04-2.01 (m, 2H), 1.82-1.79 (m, 2H), 1.57-1.47 (m, 2H), 1.28-1.19 (m, 2H). LCMS: (Method A) 360.3 [M+H], Rt.1.13 min. HPLC: (Method A) Rt.2.03 min.

Ex. 16: 4,6-di(1H-imidazol-1-yl)-N-((1r,4r)-4-(2-methoxyethoxy)cyclohexyl)picolinamide

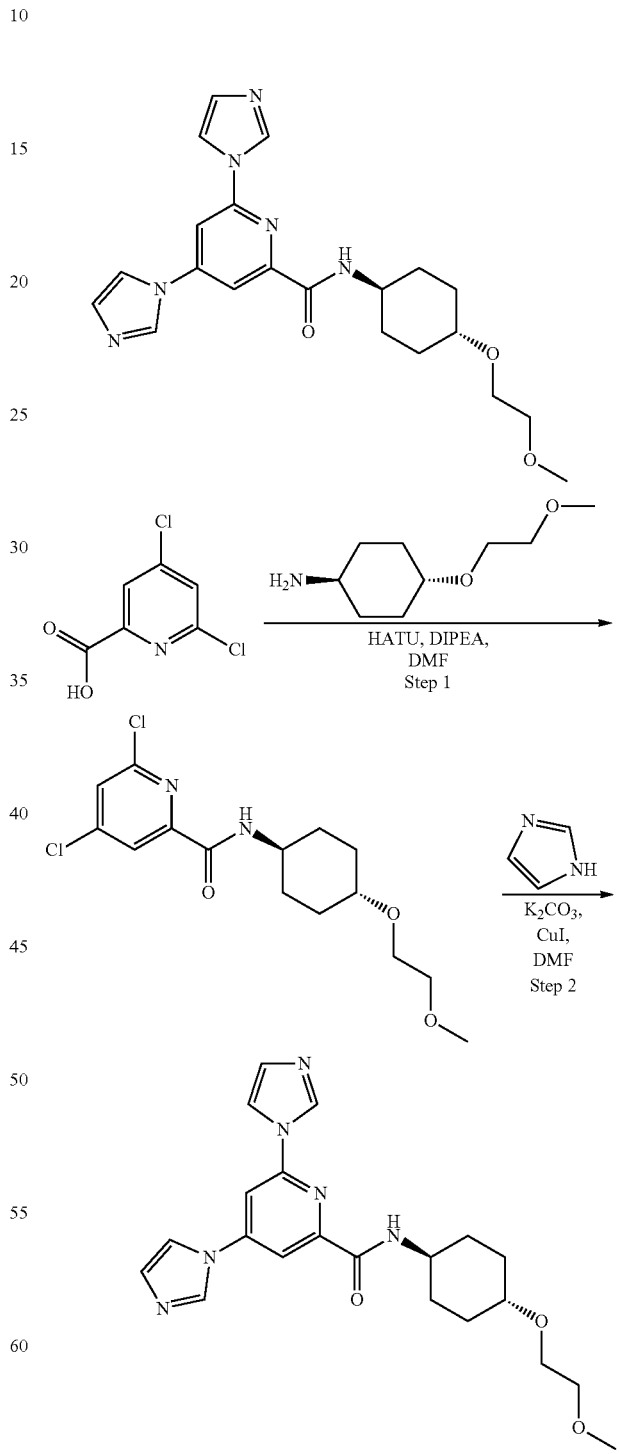

Step 1: 4,6-dichloro-N-((1r,4r)-4-(2-methoxyethoxy)cyclohexyl)picolinamide

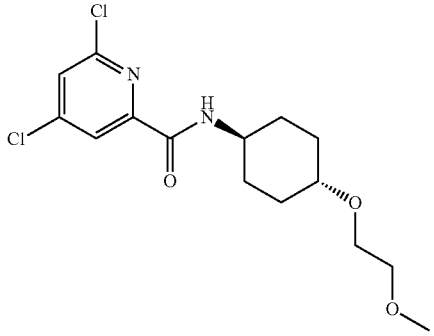 [SMILES: COCCO[C@H]1CC[C@H](NC(=O)c2cc(Cl)cc(Cl)n2)CC1]

To a stirred solution of 4,6-dichloropicolinic acid (1.5 g, 7.80 mmol) in DMF (15 mL) were added DIPEA (4.19 mL, 23.43 mmol) and HATU (5.93 g, 15.62 mmol) at 0° C. After stirring for 5 mi, a solution of (1r,4r)-4-(2-methoxyethoxy)cyclohexan-1-amine (1.48 g, 8.59 mmol) in DMF (2.5 mL) was added and the reaction mixture was stirred at RT for 16 h. The reaction mixture was monitored by TLC. After completion, the reaction mixture was diluted with water (25 mL) and extracted with EtOAc (3×25 mL). The combined organic layer was washed with water (20 mL), brine (20 mL), dried over anhydrous $Na_2SO_4$ and the solvent was evaporated under vacuum. The crude residue was purified by column chromatography on Biotage Isolera (100-200 mesh silica gel eluting with 0-60% EtOAc in pet ether) to afford the title compound. Yield: 49% (1.35 g, Yellow solid). $^1$H NMR (400 MHz, DMSO-$d_6$): δ 8.49 (d, J=8.4 Hz, 1H), 8.03 (d, J=1.6 Hz, 1H), 8.00 (d, J=1.6 Hz, 1H), 3.87-3.81 (m, 1H), 3.54-3.52 (m, 2H), 3.44-3.40 (m, 2H), 3.31-3.25 (m, 4H), 2.01-198 (m, 2H), 1.81-1.78 (m, 2H), 1.53-1.49 (m, 2H), 1.25-1.21 (m, 2H). LCMS: (Method C) 347.1 [M+H], 349.1 [M+H], Rt. 2.27 min.

Step 2: 4,6-di(1H-imidazol-1-yl)-N-((1r,4r)-4-(2-methoxyethoxy)cyclohexyl)picolinamide

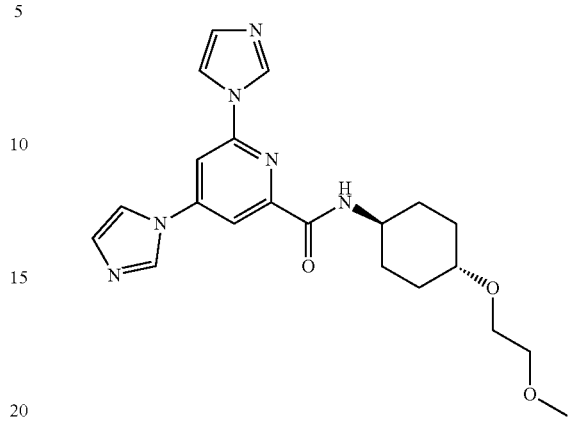

A mixture of 4,6-dichloro-N-((1r,4r)-4-(2-methoxyethoxy)cyclohexyl)picolinamide (0.1 g, 0.29 mmol), imidazole (17.63 mg, 0.259 mmol) and $K_2CO_3$ (59.65 mg, 0.43 mmol) in DMF (2 mL) in a sealed tube was purged with $N_2$ for 5 min. Then copper iodide (5.4 mg, 0.03 mmol) was added, the tube was sealed, and the reaction mixture was heated at 125° C. overnight. The reaction was monitored by LCMS. After completion, the reaction mixture was filtered through Celite and the Celite bed was washed with DCM (10 mL). The filtrate was concentrated under vacuum. The crude residue was purified by prep HPLC (Method A). The prep fraction was concentered, diluted with DCM and neutralized with 10% aq. $NaHCO_3$ solution. The organic layer was washed with water, brine, dried over anhydrous $Na_2SO_4$ and concentrated to afford the title compound. Yield: 16% (19.2 mg, Off white solid). $^1$H NMR (400 MHz, DMSO-$d_6$): δ 9.03 (s, 1H), 8.75 (s, 1H), 8.64 (d, J=8.8 Hz, 1H), 8.36-8.35 (m, 1H), 8.27-8.26 (m, 1H), 8.22-8.21 (m, 1H), 8.20-8.19 (m, 1H), 7.23-7.22 (m, 1H), 7.20 (s, 1H), 3.89-3.81 (m, 1H), 3.57-3.54 (m, 2H), 3.45-3.42 (m, 2H), 3.31-3.22 (s, 4H), 2.07-2.04 (m, 2H), 1.86-1.84 (m, 2H), 1.64-1.55 (m, 2H), 1.32-1.23 (m, 2H). LCMS: (Method A) 411.2 [M+H], Rt. 1.25 min. HPLC: (Method B) Rt. 4.07 min.

Ex. 17: 6-(1H-imidazol-1-yl)-N-((1r,4r)-4-(2-methoxyethoxy)cyclohexyl)-4-(thiazol-5-yl)picolinamide

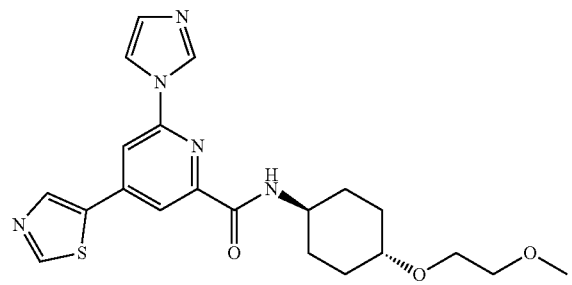

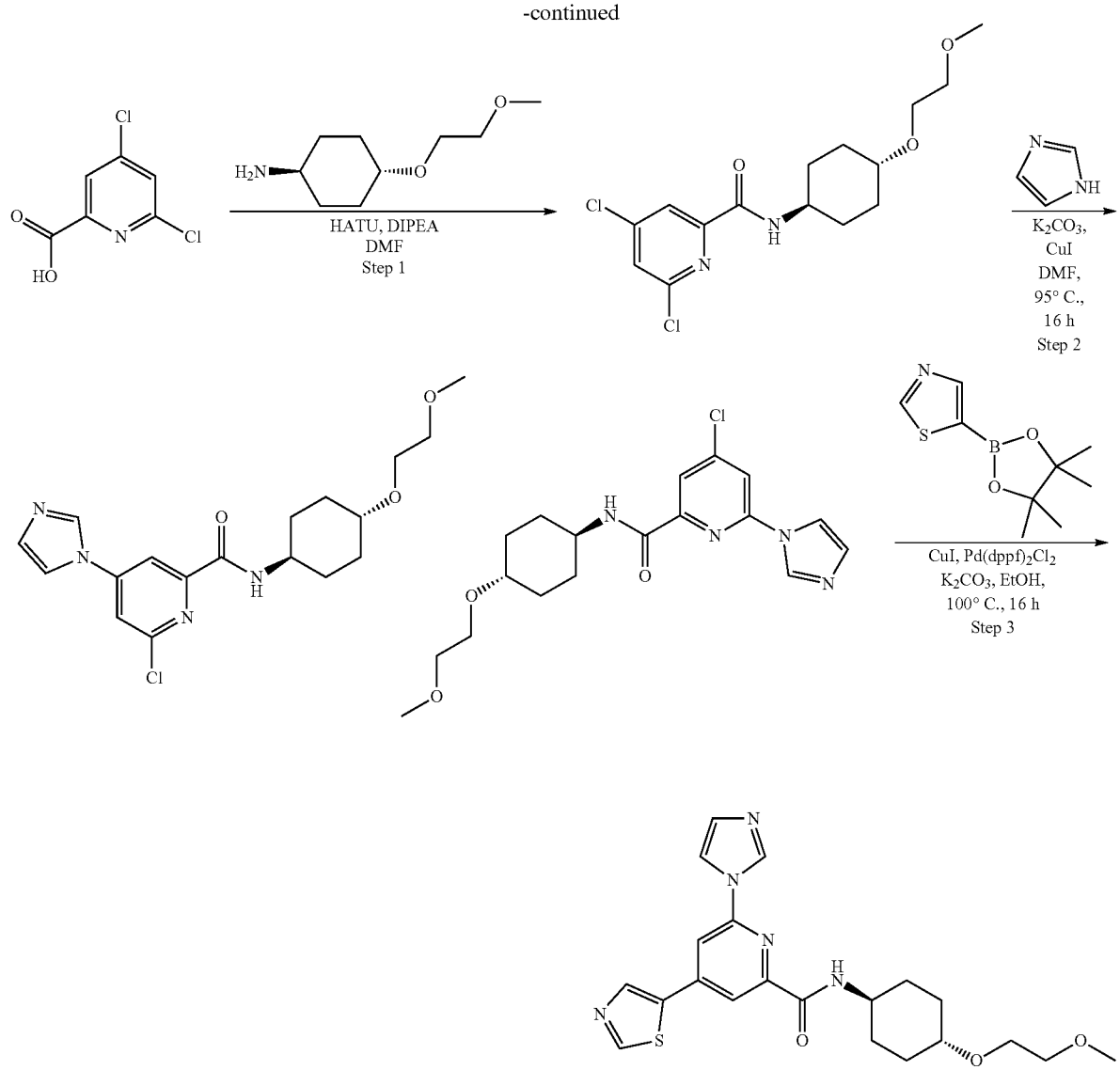

Step 1: 4,6-dichloro-N-((1r,4r)-4-(2-methoxyethoxy)cyclohexyl)picolinamide

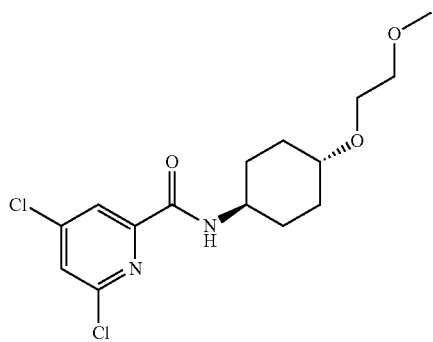 [SMILES: COCCO[C@H]1CC[C@H](NC(=O)c2cc(Cl)cc(Cl)n2)CC1]

To a stirred solution of 4,6-dichloropicolinic acid (1.5 g, 7.8 mmol) in DMF (15 mL) were added DIPEA (4.19 mL, 23.43 mmol) and HATU (5.93 g, 15.62 mmol) at 0° C. After stirring for 5 min a solution of (1r,4r)-4-(2-methoxyethoxy)cyclohexan-1-amine (1.48 g, 8.59 mmol) in DMF (2.5 mL) was added at same temperature. The reaction mixture was stirred at RT for 16 h. The reaction mixture was monitored by TLC. After completion of the reaction, it was quenched with water (25 mL). The resulting suspension was extracted with EtOAc (3×25 mL). The combined organic layer was washed with water (20 mL), brine (20 mL), dried over anhydrous $Na_2SO_4$ and solvent was evaporated under vacuum to get crude compound which was purified by column chromatography on Biotage Isolera (100-200 mesh silica gel eluting with 0-60% EtOAc in pet ether) to afford the title compound Yield: 49% (1.35 g, Yellow solid). $^1$HNMR 400 MHz, DMSO-$d_6$): δ 8.49 (d, J=8.4 Hz, 1H), 8.03 (d, J=1.6 Hz, 1H), 8.00 (d, J=1.6 Hz, 1H), 3.87-3.81 (m, 1H), 3.54-3.52 (m, 2H), 3.44-3.40 (m, 2H), 3.20 (s, 4H), 2.01-198 (m, 2H), 1.81-1.78 (m, 2H), 1.53-1.49 (m, 2H), 1.25-1.21 (m, 2H). LCMS: (Method C) 347.1. [M+H], Rt.2.27 min.

Step 2: 6-chloro-4-(1H-imidazol-1-yl)-N-((1r,4r)-4-(2-methoxyethoxy) cyclohexyl)picolinamide and 4-chloro-6-(1H-imidazol-1-yl)-N-((1r,4r)-4-(2-methoxyethoxy)cyclohexyl)picolinamide

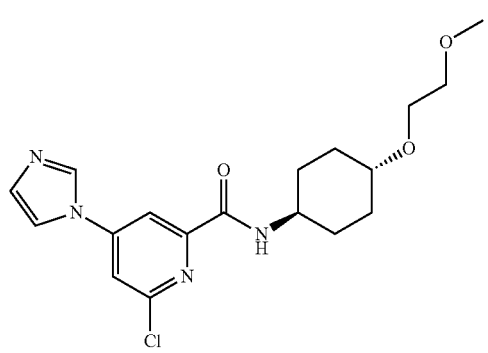

major

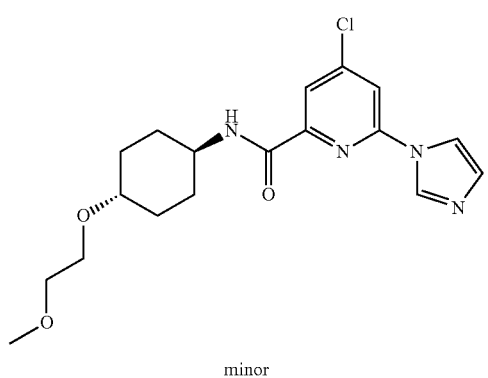

minor

A mixture of 4,6-dichloro-N-((1r,4r)-4-(2-methoxyethoxy) cyclohexyl) picolinamide (700 mg, 2.017 mmol), imidazole (123.4 mg, 1.81 mmol), copper iodide (38.32 mg, 0.201 mmol) and $K_2CO_3$ (417.5 mg, 3.025 mmol) in DMF (15 mL) taken in a sealed tube was purged with $N_2$ for 5 min. The reaction mixture was heated at 90° C. for 16 h. The reaction was monitored by LCMS. After completion of the reaction, it was filtered through Celite bed and washed with DCM (10 mL). The filtrate was evaporated under vacuum to get crude product which was purified by column chromatography on Biotage Isolera (230-400 mesh silica gel eluting with 0-10% MeOH in DCM). Yield 80% (610.1 mg, Gummy Solid). $^1$HNMR (400 MHz, DMSO-$d_6$): δ 8.71 (s, 1H), 8.45 (d, J=8.4 Hz, 1H), 8.27 (d, J=2.8 Hz, 1H), 8.19 (d, J=2.0 Hz, 1H), 8.14 (s, 1H), 7.19 (s, 1H), 3.81-3.78 (m, 1H), 3.56-3.52 (m, 2H), 3.44-3.41 (m, 2H), 3.23 (s, 4H), 2.02-2.00 (m, 2H), 1.84-1.81 (m, 2H), 1.58-1.48 (m, 2H), 1.20-1.29 (m, 2H). LCMS: (Method C) 379.2 [M+H], Rt.1.13 min, 379.2 [M+H], Rt.1.02 min.

Step 3: 6-(1H-imidazol-1-yl)-N-((1r,4r)-4-(2-methoxyethoxy)cyclohexyl)-4-(thiazol-5-yl)picolinamide

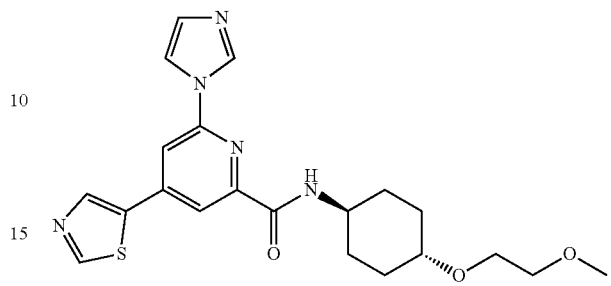

A mixture of 6-chloro-4-(1H-imidazol-1-yl)-N-((1r,4r)-4-(2-methoxyethoxy)cyclohexyl)picolinamide and 4-chloro-6-(1H-imidazol-1-yl)-N-((1r,4r)-4-(2-methoxyethoxy)cyclohexyl)picolinamide (600 mg, 1.587 mmol, 72.56% and 25.7% isomer ratio), 5-(4,4,5,5-Tetramethyl-1,3,2-dioxaborolan-2-yl) thiazole (401.9 mg, 1.904 mmol), CuI (30.15 mg, 0.1587 mmol), potassium carbonate (547.61 mg, 3.968 mmol), Pd(dppf)$Cl_2$·DCM (64.81 mg, 0.0793 mmol) in 9.0 mL ethanol and water (1.0 mL) taken in a sealed tube at RT and the nitrogen gas was purged through the reaction mixture for 5 min. Then the reaction mixture was heated at 100° C. for 16 h. After completion of the reaction, it was filtered through Celite and washed with DCM (20 mL). The solvent was evaporated under vacuum to get crude compound. The resulting crude product was purified by column chromatography on Biotage isolera (230-400 mesh silica gel eluting with 0-10% MeOH in DCM) to afford the title compound which was further purified by prep HPLC (Method HCOOH). The prep fraction of minor isomer was concentered, diluted with DCM and neutralized with 10% $NaHCO_3$ aqueous solution. The organic phase was washed with water, brine, dried over anhydrous $Na_2SO_4$ and evaporated to afford the title compound Yield: 3.2% (21 mg, Off white solid) $^1$HNMR (400 MHz, DMSO-$d_6$): δ 9.33 (d, J=0.4 Hz, 1H), 9.03 (s, 1H), 8.84 (d, J=0.4 Hz, 1H), 8.61 (d, J=8.8 Hz, 1H), 8.38-8.37 (m, 1H), 8.31 (d, J=1.6 Hz, 1H), 8.09 (d, J=1.2 Hz, 1H), 7.19 (s, 1H), 3.87-3.84 (m, 1H), 3.57-3.54 (m, 2H), 3.45-3.42 (m, 2H), 3.24 (s, 4H), 2.06-2.03 (m, 2H), 1.86-1.83 (m, 2H), 1.61-1.54 (m, 2H), 1.31-1.23 (m, 2H). LCMS: (Method C) 428.4 [M+H], Rt.1.18 min, HPLC: (Method A) Rt.2.306 min.

Ex. 18: 4-chloro-6-(1H-imidazol-1-yl)-N-((1r,4r)-4-(2-methoxyethoxy)cyclohexyl)-picolinamide

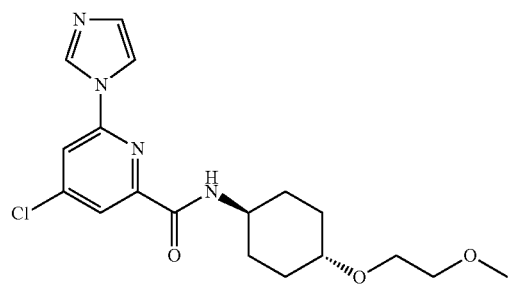

69

-continued

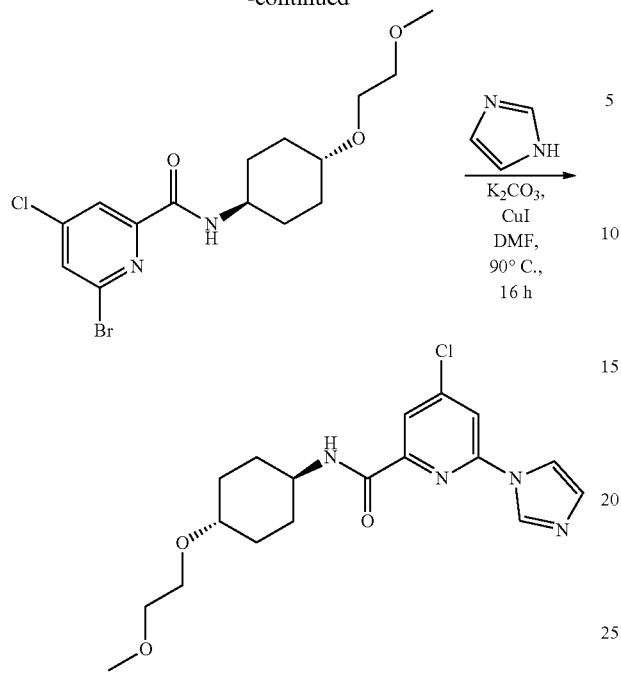

A mixture of 6-bromo-4-chloro-N-((1r,4r)-4-(2-methoxyethoxy)cyclohexyl)picolinamide (200 mg, 0.510 mmol), imidazole (31.2 mg, 0.459 mmol), K₂CO₃ (105.69 mg, 0.765 mmol), copper iodide (9.7 mg, 0.0510 mmol) in DMF (15 mL) taken in a sealed tube was purged with N₂ for 5 min. The reaction mixture was heated at 90° C. for 16 h. The reaction was monitored by LCMS. After completion of the reaction, it was filtered through Celite and washed with DCM (10 mL). The filtrate was evaporated under vacuum to get crude product which was purified by column chromatography on Biotage Isolera (230-400 mesh silica gel eluting with 0-10% MeOH in DCM). Yield 65% (125.1 mg, Gummy Solid). ¹HNMR (400 MHz, DMSO-d₆): δ 8.99 (s, 1H), 8.63 (d, J=8.4 Hz, 1H), 8.30 (d, J=1.6 Hz, 1H), 8.26 (d, J=1.6 Hz, 1H), 7.92 (d, J=2.0 Hz, 1H), 7.16 (s, 1H), 3.86-3.82 (m, 1H), 3.55-3.54 (m, 2H), 3.44-3.43 (m, 2H), 3.26 (s, 4H), 2.06-2.03 (m, 2H), 1.84-1.81 (m, 2H), 1.62-1.52 (m, 2H), 1.29-1.20 (m, 2H). LCMS: (Method C) 379.2 [M+H], Rt.1.37 min.

Ex. 19: 6-(1H-imidazol-1-yl)-N-((1r,4r)-4-(2-methoxyethoxy)cyclohexyl)-4-(trifluoromethyl)picolinamide

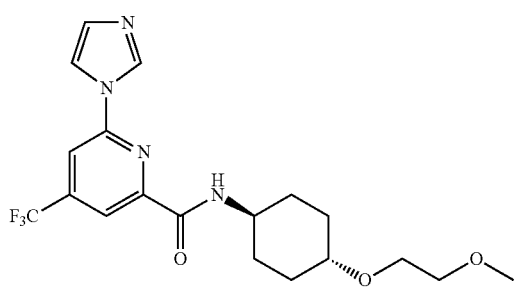

70

-continued

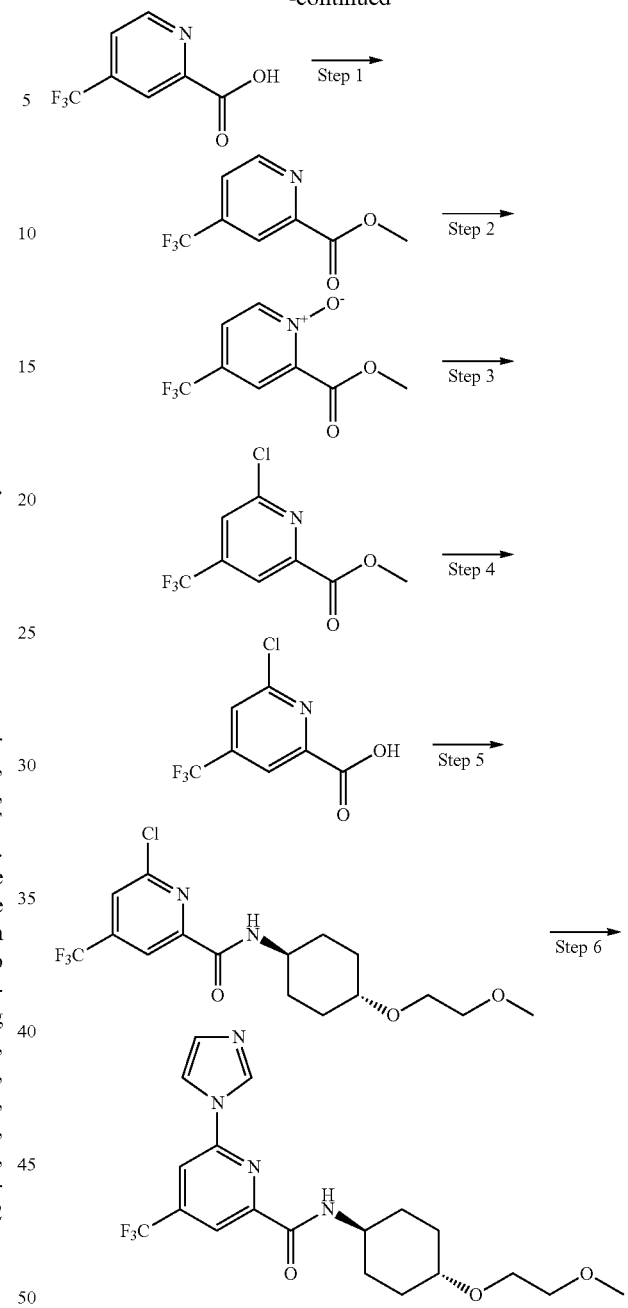

Step 1: methyl 4-(trifluoromethyl)picolinate

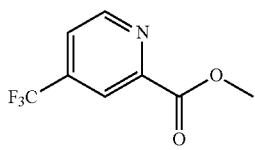

To a stirred solution of 4-(trifluoromethyl)picolinic acid (1 g, 5.23 mmol) in MeOH (10 mL) at 0° C., thionyl chloride (1.15 mL, 15.69 mmol) was added slowly over 5 min and heated to reflux for overnight. The reaction mixture was concentrated under reduced pressure to get crude compound. Crude compound was neutralized with sat. NaHCO₃ solution (25 mL), extracted with EtOAc (2×25 mL). The combined organic layer was washed with brine (25 mL), dried over anhydrous Na₂SO₄ and solvent was evaporated under vacuum to afford the title compound. Yield: 75% (0.8 g, Pale yellow liquid). ¹HNMR (400 MHz, DMSO-d6): δ 8.98 (d, J=5.2 Hz, 1H), 8.39-8.39 (m, 1H), 7.75-7.73 (m, 1H), 4.08 (s, 3H). LCMS: (Method C) 206.0 [M+H], Rt.1.809 min.

Step 2: 2-(methoxycarbonyl)-4-(trifluoromethyl)pyridine 1-oxide

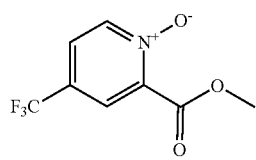

To a stirred solution of methyl 4-(trifluoromethyl)picolinate (0.6 g, 2.92 mmol) in DCM (20 mL), Urea hydrogen peroxide (0.55 g, 5.84 mmol) and TFAA (1.22 g, 5.84 mmol) were added and stirred at RT for 16 h. After completion of the reaction, reaction mixture was quenched with sat. NaHCO₃ solution and extracted with DCM (2×20 mL). The combined organic layer was washed with brine solution (20 mL) water (20 mL), dried over anhydrous Na₂SO₄, filtered and dried under vacuum to afford the title compound Yield: 94% (0.61 g, Pale yellow liquid). 1HNMR 400 MHz, DMSO-d₆: δ 8.33 (d, J=6.8 Hz, 1H), 7.92 (d, J=2.8 Hz, 1H), 7.59-7.56 (m, 1H), 4.05 (s, 3H). LCMS: (Method C) 222.0 [M+H], Rt.1.286 min.

Step 3: methyl 6-chloro-4-(trifluoromethyl)picolinate

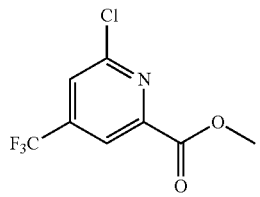

The solution of methyl 2-(methoxycarbonyl)-4-(trifluoromethyl)pyridine 1-oxide (0.6 g) and POCl₃ (10 mL) was heated to 70° C. for overnight. Reaction mixture was concentrated under reduced pressure. The resulting crude was dissolved in EtOAc (25 mL) and neutralized with sat·NaHCO₃ solution. The organic layer was dried over anhydrous Na₂SO₄, filtered and concentrated under vacuum to afford the title compound Yield: 92% (0.6 g, off white solid). ¹HNMR (400 MHz, CDCl₃): δ 8.30 (d, J=0.4 Hz, 1H), 7.78 (d, J=0.8 Hz, 1H), 4.07 (s, 3H). LCMS: (Method C) 220.0 [M−H], Rt. 2.197 min.

Step 4: 6-chloro-4-(trifluoromethyl)picolinic acid

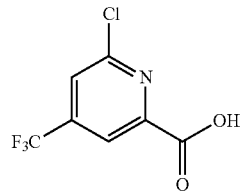 [SMILES: O=C(O)c1cc(C(F)(F)F)cc(Cl)n1]

To a solution of methyl 6-chloro-4-(trifluoromethyl)picolinate (0.6 g, 2.51 mmol) in THF (12 mL) and water (4 mL) was added NaOH (0.301 g, 7.53 mmol) at RT and stirred at same temperature for overnight. The reaction mixture was evaporated under vacuum and acidified with 1.5 N HCl solution to adjust pH-2.0 and extracted with EtOAc (2×10 mL). The combined organic layer was washed with water (10 mL), brine (10 mL), dried over anhydrous Na₂SO₄ and the solvent was evaporated under vacuum to afford the title compound. Yield: 88% (0.5 g, Pale brown liquid). ¹HNMR 400 MHz, DMSO-d₆): δ 14.11 (s, 1H), 8.31-8.31 (m, 1H), 8.24 (d, J=0.4 Hz, 1H). LCMS: (Method C) 226.2 [M+H], Rt. 1.547 min.

Step 5: 6-chloro-N-((1r,4r)-4-(2-methoxyethoxy)cyclohexyl)-4-(trifluoromethyl)picolinamide

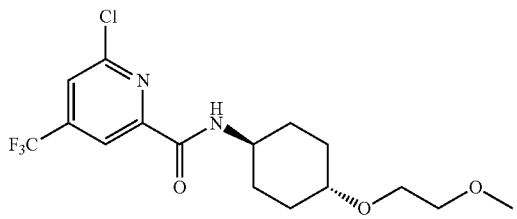 [SMILES: COCCO[C@H]1CC[C@H](NC(=O)c2cc(C(F)(F)F)cc(Cl)n2)CC1]

To a stirred solution of 6-chloro-4-(trifluoromethyl)picolinic acid (0.5 g, 2.22 mmol) in DMF (10 mL) were added DIPEA (1.19 mL, 6.66 mmol) and HATU (1.26 g, 3.33 mmol) at RT. After stirring for 5 min a solution of (1r,4r)-4-(2-methoxyethoxy)cyclohexan-1-amine (0.461 g, 2.66 mmol) was added at same temperature. Further reaction was stirred at RT for overnight. The reaction mixture was monitored by TLC and quenched with water (20 mL). The resulting suspension was extracted with EtOAc (2×10 mL). The combined organic layer was washed with water (10 mL), brine (10 mL), dried over anhydrous Na₂SO₄ and solvent was evaporated under vacuum. The resulting crude product which was purified by purified by column chromatography on Biotage Isolera (230-400 mesh silica gel eluting with 16-20%% EtOAc in pet ether) to afford the title compound. Yield: 62% (0.52 g, Yellow gummy solid). LCMS: (Method C) 381.2 [M+H], Rt.2.298 min.

Step 6: 6-(1H-imidazol-1-yl)-N-((1r,4r)-4-(2-methoxyethoxy)cyclohexyl)-4-(trifluoromethyl)picolinamide

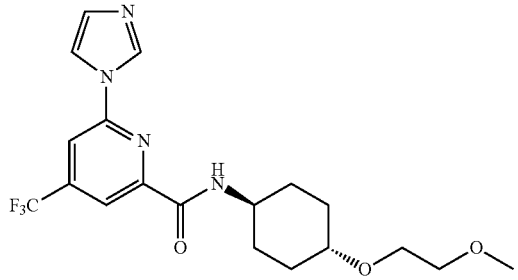 [SMILES: COCCO[C@H]1CC[C@H](NC(=O)c2cc(C(F)(F)F)cc(-n3ccnc3)n2)CC1]

A mixture of 6-chloro-N-((1r,4r)-4-(2-methoxyethoxy) cyclohexyl)-4-(trifluoromethyl)picolinamide (0.2 g, 0.52 mmol), imidazole (107 mg, 1.57 mmol), copper iodide (9.9 mg, 0.05 mmol) and $K_2CO_3$ (217 mg, 1.57 mmol) in DMF (4 mL) was purged with $N_2$ for 2 min and then reaction mixture was heated in a sealed tube at 120° C. for overnight. Reaction mixture was diluted with EtOAc (10 mL) and filtered through Celite bed. The filtrate was evaporated under vacuum and the resulting crude product was purified by prep HPLC (Method C). Prep fraction was collected, concentrated under reduced pressure to get product. Then product was dissolved in 10% MeOH/DCM (10 mL) and neutralized with 10% $NaHCO_3$ solution (4 mL) before giving washing with brine solution and water. The organic layer was dried over anhydrous $Na_2SO_4$, filtered, dried under reduced pressure and lyophilized to get product. Yield: 44% (95.53 mg, White gummy solid). $^1$HNMR (400 MHz, DMSO-$d_6$): δ 9.09-9.09 (m, 1H), 8.73 (d, J=8.4 Hz, 1H), 8.45 (s, 1H), 8.43-8.42 (m, 1H), 8.12 (d, J=0.4 Hz, 1H), 7.20-7.20 (m, 1H), 3.89-3.83 (m, 1H), 3.57-3.55 (m, 2H), 3.45-3.42 (m, 2H), 3.33-3.26 (m, 4H), 2.07-2.04 (m, 2H), 1.86-1.83 (m, 2H), 1.65-1.54 (m, 2H), 1.32-1.22 (m, 2H). LCMS: (Method A) 413.0 [M+H], Rt.1.902 min, HPLC: (Method A) Rt.2.611 min.

Ex. 20: 4-fluoro-6-(1H-imidazol-1-yl)-N-((1r,4r)-4-(2-methoxyethoxy)cyclohexyl)picolinamide

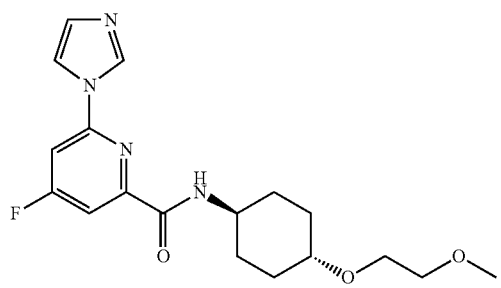 [SMILES: COCCO[C@H]1CC[C@H](NC(=O)c2cc(F)cc(-n3ccnc3)n2)CC1]

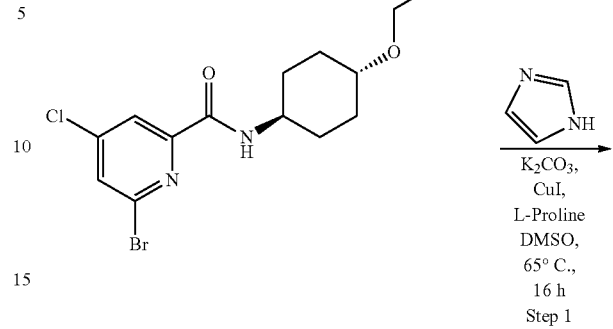

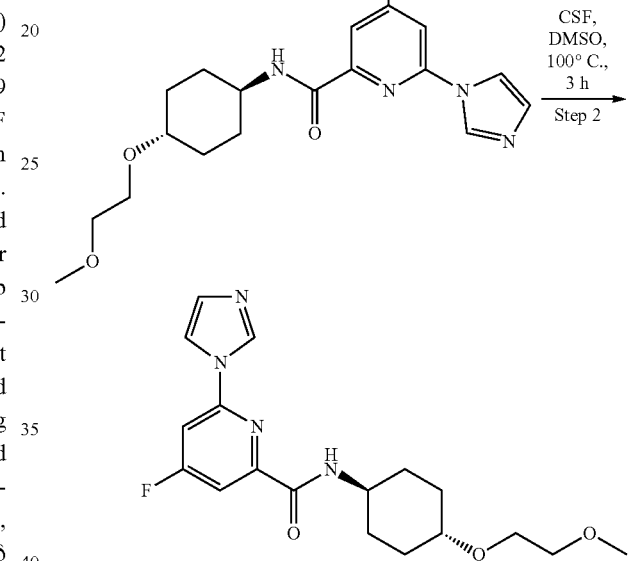

Step 1: 4-chloro-6-(1H-imidazol-1-yl)-N-((1r,4r)-4-(2-methoxyethoxy)cyclohexyl)picolinamide

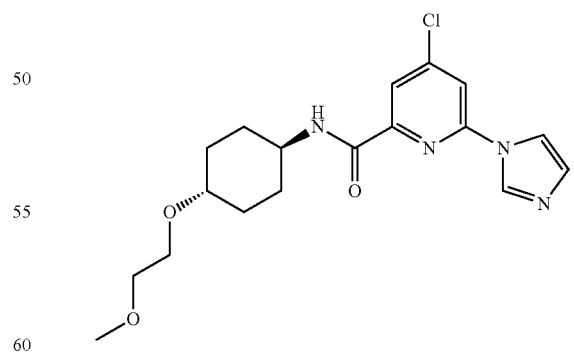

A mixture of 6-bromo-4-chloro-N-((1r,4r)-4-(2-methoxyethoxy)cyclohexyl)picolinamide (620 mg, 1.585 mmol), imidazole (97.04 mg, 1.427 mmol), copper iodide (27.10 mg, 0.142 mmol), L-Proline (32.8 mg, 0.285 mmol) and $K_2CO_3$ (395.9 mg, 2.86 mmol) in DMSO (5 mL) was purged with $N_2$ for 5 min and then reaction mixture was heated in a sealed tube at 65° C. for 48 h. The reaction was monitored by LCMS, after completion of the reaction, reaction mixture was filtered through Celite bed, washed with DCM (10 mL). The filtrate was evaporated under vacuum to get crude product which was purified by column chromatography Biotage Isolera (230-400 mesh silica gel eluting with 0-10% MeOH in DCM). Yield 35% (210 mg, Gummy Solid). $^1$HNMR (300 MHz, DMSO-d$_6$): δ 8.99 (s, 1H), 8.63 (d, J=8.7 Hz, 1H), 8.29 (d, J=4.5 Hz, 1H), 8.26 (d, J=1.5 Hz, 1H), 7.92 (d, J=1.5 Hz, 1H), 7.17 (s, 1H), 3.89-3.88 (m, 1H), 3.57-3.53 (m, 2H), 3.45-3.43 (m, 2H), 3.18 (s, 4H), 2.06-2.03 (m, 2H), 1.84-1.81 (m, 2H), 1.60-1.51 (m, 2H), 1.31-1.23 (m, 2H). LCMS: (Method C) 379.2 [M+H], Rt.1.44 min.

Step 2: 4-fluoro-6-(1H-imidazol-1-yl)-N-((1r,4r)-4-(2-methoxyethoxy)cyclohexyl)picolinamide

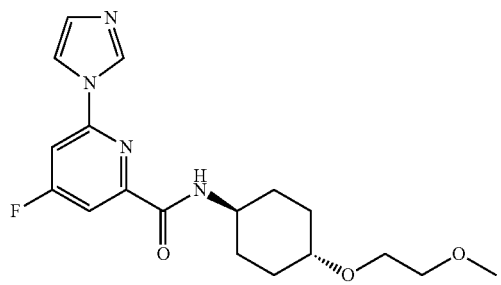

A mixture of 4-chloro-6-(1H-imidazol-1-yl)-N-((1r,4r)-4-(2-methoxyethoxy)cyclohexyl)picolinamide (200 mg, 0.529 mmol) in DMSO (4.0 mL) Cesium Fluoride (200.91 mg, 1.322 mmol) was added at RT and the nitrogen gas was purged through the reaction mixture for 5 min. Then the reaction mixture was heated in seal tube at 100° C. for 3 h. The reaction mixture was monitored by TLC and quenched with water (15 mL). The resulting suspension was extracted with DCM (3×25 mL). The combined organic layer was washed with water (20 mL), brine (20 mL), dried over anhydrous Na$_2$SO$_4$ and solvent was evaporated under vacuum to get crude compound which was purified by prep HPLC (Method C). The prep fraction was concentered to remove ACN and the resulting aqueous layer was neutralized with 10% NaHCO$_3$. Then extracted with DCM (25 mL) and DCM layer was washed with water, brine, dried over anhydrous Na$_2$SO$_4$ and evaporated to afford the title compound. Yield: 21% (41.1 mg, Off white solid). $^1$HNMR (400 MHz, DMSO-d$_6$): δ 8.99 (s, 1H), 8.63 (d, J=8.8 Hz, 1H), 8.28-8.27 (m, 1H), 8.08-8.05 (m, 1H), 7.76-7.73 (m, 1H), 7.17 (s, 1H), 3.86-3.82 (m, 1H), 3.57-3.54 (m, 2H), 3.45-3.42 (m, 2H), 3.23 (s, 4H), 2.06-2.03 (m, 2H), 1.84-1.81 (m, 2H), 1.62-1.54 (m, 2H), 1.30-1.21 (m, 2H). LCMS: (Method C) 363.0 [M+H], Rt.1.18 min, HPLC: (Method A) Rt.2.217 min.

Ex. 21: 2-(1H-imidazol-1-yl)-N-((1r,4r)-4-(2-methoxyethoxy)cyclohexyl)isonicotinamide

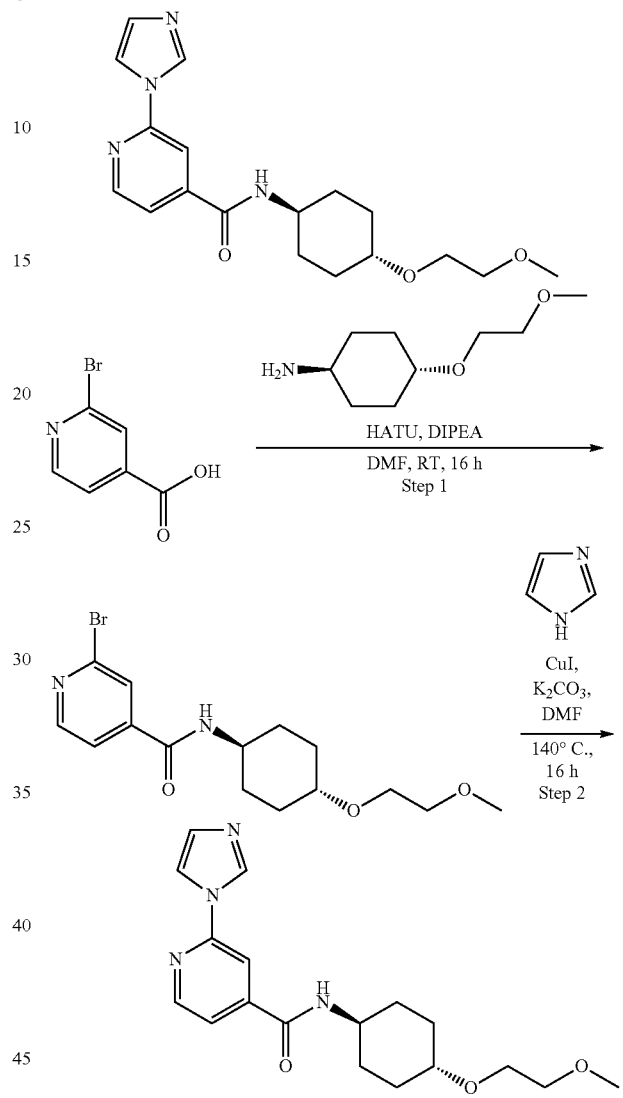

Step 1: 2-bromo-N-((1r,4r)-4-(2-methoxyethoxy)cyclohexyl)isonicotinamide

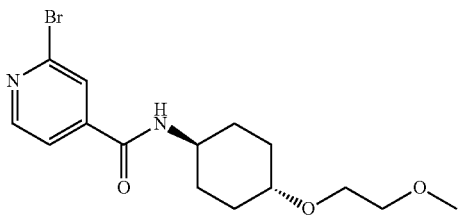 [SMILES: COCCO[C@H]1CC[C@H](NC(=O)c2ccnc(Br)c2)CC1]

To a stirred solution of 2-bromoisonicotinic acid (510 mg, 2.52 mmol) in DMF (5 mL) at 0° C. was added HATU (1.43 g, 3.78 mmol) followed by DIPEA (1.16 mL, 6.30 mmol) under nitrogen atmosphere and stirred for 5 min. After 5 min, (1r,4r)-4-(2-methoxyethoxy)cyclohexan-1-amine (656 mg, 3.78 mmol) was added and stirred at RT for 16 h. Upon completion, the reaction mixture was quenched with ice-cold water (20 mL) and extracted with EtOAc (50 mL). The ethyl acetate layer was washed with water (2×25 mL), dried over anhydrous Na$_2$SO$_4$, filtered and concentrated under vacuum to give title compound. Yield: 48.2% (435 mg, yellow solid). $^1$H NMR (400 MHz, DMSO-d$_6$): δ 8.59 (d, J=7.60 Hz, 1H), 8.53 (d, J=5.20 Hz, 1H), 7.99 (s, 1H), 7.78 (dd, J=6.40, 1.2 Hz, 1H), 3.84-3.79 (m, 1H), 3.57-3.50 (m, 2H), 3.45-3.40 (m, 2H), 3.30-3.20 (m, 4H), 2.06-2.00 (m, 2H), 1.84-1.80 (m, 2H), 1.61-1.50 (m, 2H), 1.30-1.20 (m, 2H), LCMS: (Method A) 357.0 [M+H], Rt. 1.86 min.

Step 2: 2-(1H-imidazol-1-yl)-N-((1r,4r)-4-(2-methoxyethoxy)cyclohexyl)isonicotinamide A solution of 2-bromo-N-((1r,4r)-4-(2-methoxyethoxy)cyclohexyl)isonicotinamide (191 mg, 0.55 mmol) and 1H-imidazole (113 mg, 1.66 mmol) in DMF (3 mL) was deoxygenated for 5 min by purging nitrogen gas. After 5 min, K$_2$CO$_3$ (151 mg, 1.10 mmol) followed by CuI (10.4 mg, 0.05 mmol) were added at RT and the resultant mixture was heated at 140° C. for 16 h. After completion, the reaction mixture was filtered through pad of Celite, and washed with 10% MeOH in DCM (50 mL). The combined filtrate was evaporated under vacuum to give crude product, the crude residue was purified by Grace normal phase chromatography (Eluent: 2%-3% MeOH in DCM). The collected fractions were concentrated under reduced pressure, then re-dissolved in 10% MeOH in DCM (50 mL) washed with 10% aq. NaHCO$_3$ solution (20 mL) followed by water (2×20 mL). The organic layer was dried over anhydrous Na$_2$SO$_4$, filtered, concentrated under reduced pressure, further drying by lyophilization yielded title compound. Yield: 11.3% (20.89 mg, white solid); $^1$HNMR (400 MHz, DMSO-d$_6$): 8.61 (d, J=5.2 Hz, 1H), 8.58-8.55 (m, 2H), 8.08 (s, 1H), 8.00 (s, 1H), 7.70-7.68 (m, 1H), 7.16 (s, 1H), 3.80-3.78 (m, 1H), 3.77-3.56 (m, 2H), 3.55-3.50 (m, 2H), 3.43-3.29 (m, 4H), 2.05-2.00 (m, 2H), 1.93-1.90 (m, 2H), 1.41-1.38 (m, 2H), 1.35-1.24 (m, 2H); LCMS: (Method C) 345.2 [M+H], Rt. 1.03 min; HPLC: (Method A) Rt. 1.87 min.

Ex. 22: 2,6-di(1H-imidazol-1-yl)-N-((1r,4r)-4-(2-methoxyethoxy)cyclohexyl)isonicotinamide

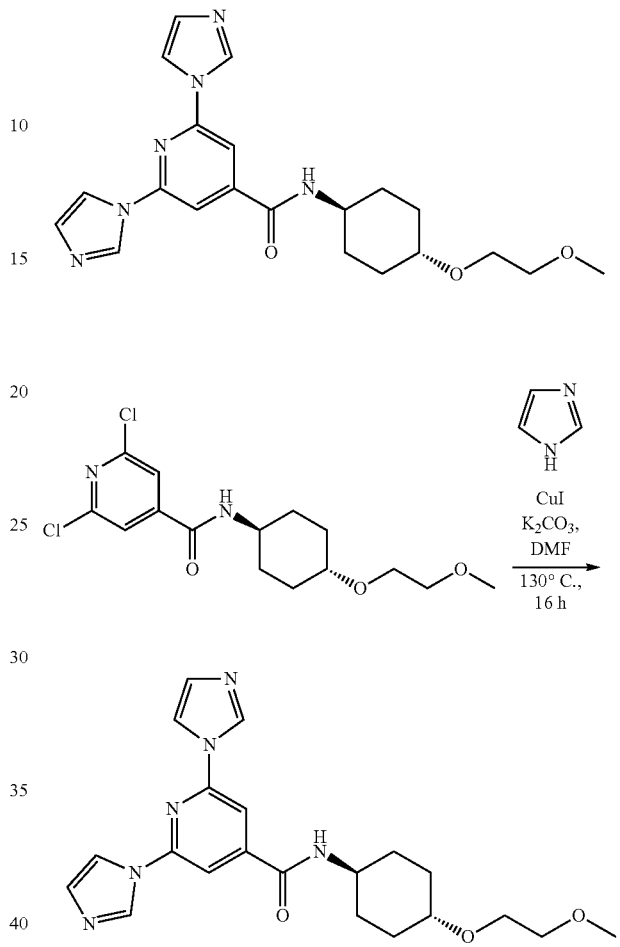

A solution of 2,6-dichloro-N-((1r,4r)-4-(2-methoxyethoxy)cyclohexyl)isonicotinamide (72 mg, 0.20 mmol) and 1H-imidazole (84.7 mg, 1.24 mmol) in DMF (2 mL) was deoxygenated by purging nitrogen gas for 5 min. Subsequently, K$_2$CO$_3$ (143 mg, 1.03 mmol) and CuI (3.9 mg, 0.02 mmol) were added and the reaction mixture was heated at 130° C. for 16 h. After completion, the reaction mixture was filtered through pad of Celite, and washed with 10% MeOH in DCM (50 mL). The combined organic layer was dried over anhydrous Na$_2$SO$_4$, filtered and concentrated under vacuum. The obtained crude residue was purified by Grace reverse phase chromatography (Method A). The collected fractions were concentrated under reduced pressure, diluted with 10% MeOH in DCM (50 mL) washed with 10% aq. NaHCO$_3$ solution (20 mL), water (20 mL) and dried over anhydrous Na$_2$SO$_4$. The solvent was evaporated under reduced pressure and dried over lyophilization to give title compound. Yield: 62.8% (53.57 mg, off-white solid); $^1$HNMR (400 MHz, DMSO-d$_6$): δ 8.79 (t, J=1.2 Hz, 2H), 8.56 (d, J=7.6 Hz, 1H), 8.17 (t, J=1.6 Hz, 2H), 7.99 (s, 2H), 7.18 (t, J=1.2 Hz, 2H), 3.82-3.78 (m, 1H), 3.56-3.54 (m, 2H), 3.45-3.26 (m, 4H), 2.07-2.00 (m, 2H), 1.97-1.90 (m, 2H), 1.46-1.40 (m, 2H), 1.37-1.27 (m, 2H). LCMS: (Method C) 411.0 [M+H], Rt. 0.73 min; HPLC: (Method B) Rt. 4.12 min.

Ex. 23: 2-(1H-imidazol-1-yl)-N-((1r,4r)-4-(2-methoxyethoxy)cyclohexyl)-6-(1-methyl-1H-pyrazol-4-yl)isonicotinamide

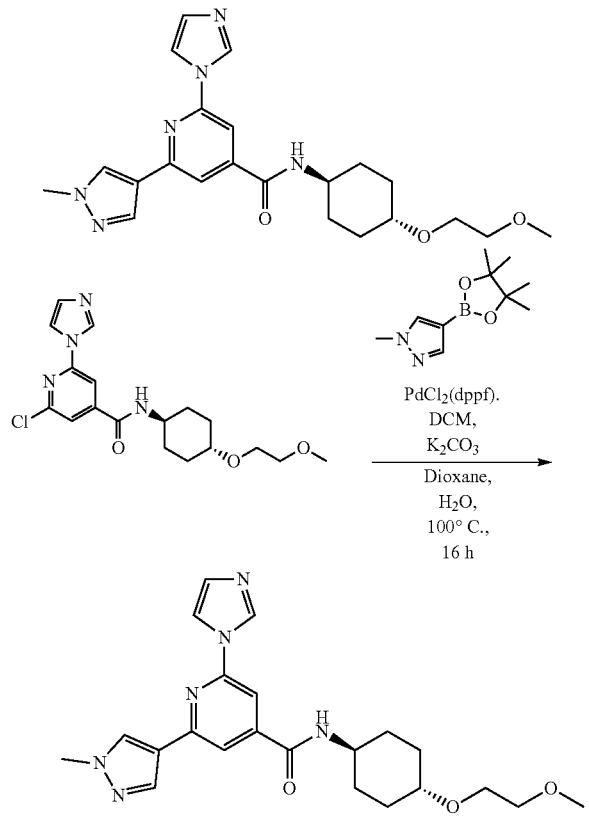

A solution of 2-chloro-6-(1H-imidazol-1-yl)-N-((1r,4r)-4-(2-methoxyethoxy)cyclohexyl) isonicotinamide (215 mg, 0.56 mmol) and 1-methyl-4-(4,4,5,5-tetramethyl-1,3,2-dioxaborolan-2-yl)-1H-pyrazole (177 mg, 0.85 mmol), in a mixture of 1,4 Dioxane (5 mL) and water (0.5 mL) was deoxygenated by purging nitrogen gas for 5 min. Subsequently $K_2CO_3$ (195 mg, 1.41 mmol) and Pd(dppf)$Cl_2 \cdot$DCM (46.3 mg, 0.05 mmol) were added and the resultant reaction mixture was heated at 100° C. for 16 h. After completion, the reaction mixture was filtered through a pad of Celite and washed with 10% MeOH in DCM (50 mL). The combined organic layer was dried over anhydrous $Na_2SO_4$, filtered and concentrated under vacuum. The obtained crude residue was purified by Grace reverse phase chromatography (Method A) and further purified by preparative HPLC using Method A. The collected fractions were concentrated under reduced pressure and the obtained product was re-dissolved in 10% MeOH in DCM (50 mL) and washed with 10% aq. $NaHCO_3$ solution (20 mL) followed by water (20 mL). The organic layer was dried over anhydrous $Na_2SO_4$, filtered, concentrated under reduced pressure and further dried by lyophilization to give title compound. Yield: 12.3% (29.80 mg, off-white solid); $^1$HNMR (400 MHz, DMSO-$d_6$): δ 8.69 (s, 1H), 8.50 (d, J=8.0 Hz, 2H), 8.17 (d, J=0.8 Hz, 1H), 8.09 (t, J=1.6 Hz, 1H), 7.87 (d, J=1.2 Hz, 1H), 7.80 (d, J=0.8 Hz, 1H), 7.16 (t, J=1.2 Hz, 1H), 3.92 (s, 3H), 3.82-3.80 (m, 1H), 3.57-3.55 (m, 2H), 3.54-3.51 (m, 2H), 3.44-3.33 (m, 4H), 2.06-2.03 (m, 2H), 1.95-1.93 (m, 2H), 1.42-1.39 (m, 2H), 1.31-1.24 (m, 2H); LCMS: (Method C) 425.3 [M+H], Rt. 1.20 min; HPLC: (Method A) Rt. 2.37 min.

Ex. 24: 2-(1-ethyl-1H-pyrazol-4-yl)-6-(1H-imidazol-1-yl)-N-((1r,4r)-4-(2-methoxyethoxy)cyclohexyl)isonicotinamide

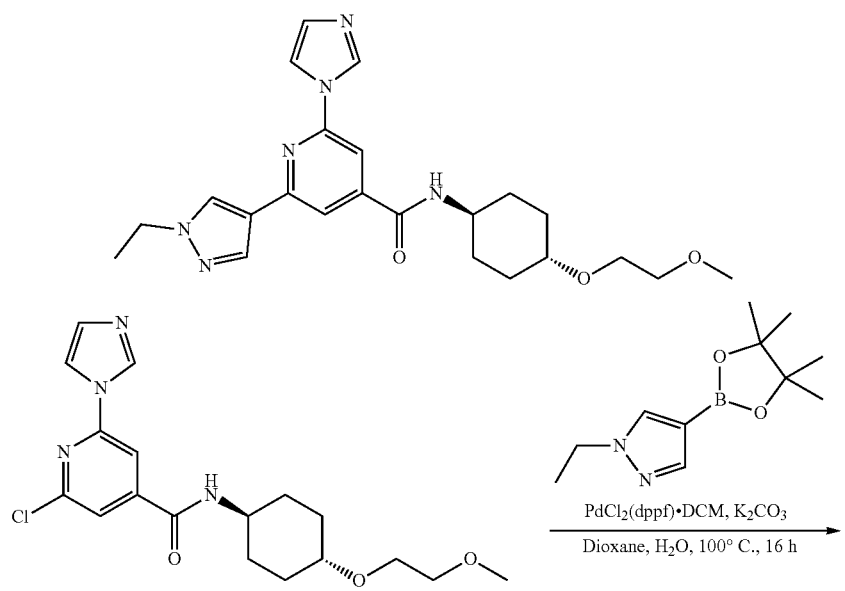

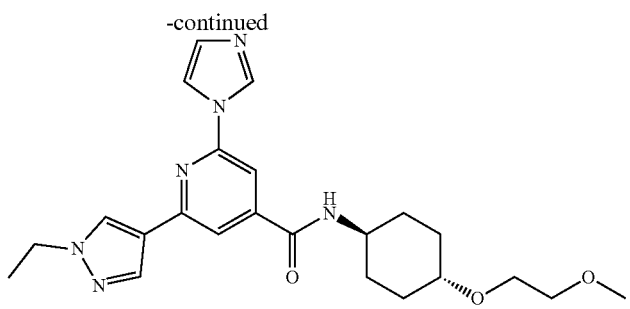

A solution of 2-chloro-6-(1H-imidazol-1-yl)-N-((1r,4r)-4-(2-methoxyethoxy)cyclohexyl) isonicotinamide (113 mg, 0.29 mmol) and 1-ethyl-4-(4,4,5,5-tetramethyl-1,3,2-dioxaborolan-2-yl)-1H-pyrazole (99.38 mg, 0.44 mmol) in 1,4 Dioxane (2 mL) and water (0.13 mL), was purged with nitrogen gas for 5 min. After 5 min, $K_2CO_3$ (102.8 mg, 0.74 mmol) and $PdCl_2$(dppf).DCM (24.3 mg, 0.02 mmol) were added and the resultant mixture was heated at 100° C. for 16 h. After completion, the reaction mixture was filtered through pad of Celite, and washed with 10% MeOH in DCM (50 mL). The combined organic layer was dried over anhydrous $Na_2SO_4$, filtered, concentrated under vacuum. The obtained crude compound was then purified by Grace reverse phase chromatography (Method A). The collected fractions were concentrated, the product was re-dissolved in 10% MeOH in DCM (50 mL) washed with 10% aq. $NaHCO_3$ solution (20 mL) followed by water (20 mL). The organic layer was dried over anhydrous $Na_2SO_4$, filtered, concentrated under reduced pressure and further dried by lyophilization to give title compound. Yield: 24% (31.5 mg, off-white solid); $^1$HNMR (400 MHz, DMSO-$d_6$): δ 8.90 (s, 1H), 8.57-8.51 (m, 2H), 8.19-8.17 (m, 2H), 7.91 (s, 1H), 7.85 (s, 1H), 7.27 (s, 1H), 4.21 (q, J=7.2 Hz, 2H), 3.81-3.75 (m, 1H), 3.56-3.54 (m, 2H), 3.44-3.42 (m, 2H), 3.27-3.25 (m, 4H), 2.05-2.03 (m, 2H), 1.95-1.92 (m, 2H), 1.46-1.37 (m, 5H), 1.31-1.26 (m, 2H); LCMS: (Method C) 439.2 [M+H], Rt. 1.34 min; HPLC: (Method A) Rt. 2.66 min.

Ex. 25: 2-(1H-imidazol-1-yl)-6-(1-isopropyl-1H-pyrazol-4-yl)-N-((1r,4r)-4-(2-methoxyethoxy)cyclohexyl)isonicotinamide

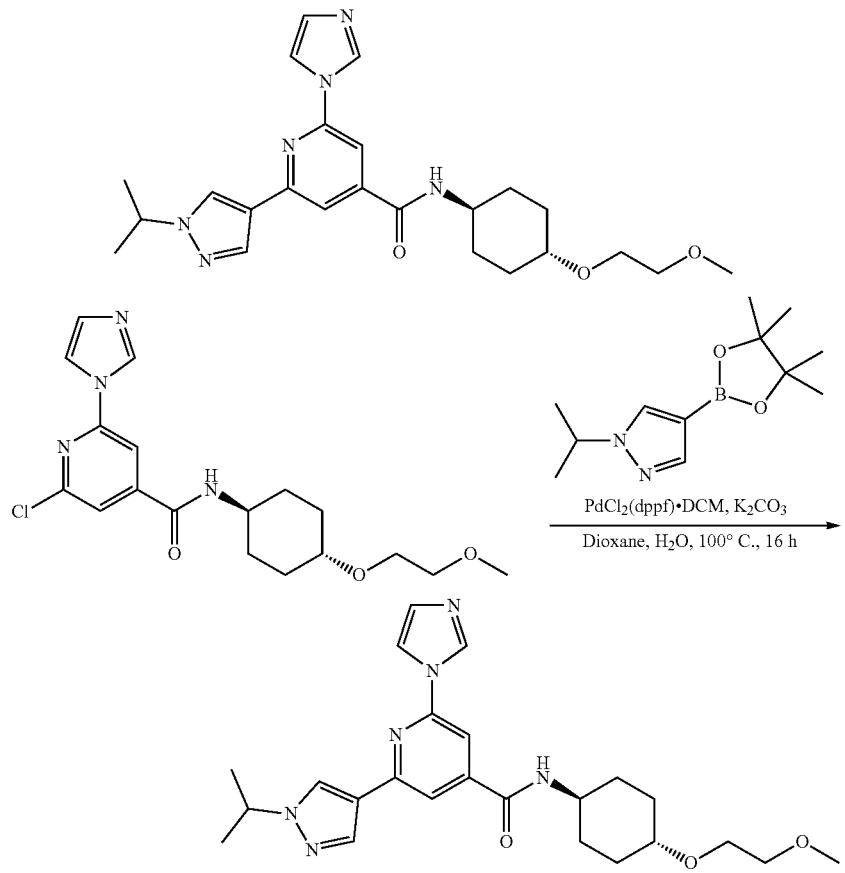

A solution of 2-chloro-6-(1H-imidazol-1-yl)-N-((1r,4r)-4-(2-methoxyethoxy)cyclohexyl) isonicotinamide (102 mg, 0.26 mmol) and 1-isopropyl-4-(4,4,5,5-tetramethyl-1,3,2-dioxaborolan-2-yl)-1H-pyrazole (95.3 mg, 0.40 mmol) in a mixture of 1,4 Dioxane (2 mL) and water (0.2 mL) was deoxygenated by purging nitrogen gas for 5 min. Subsequently $K_2CO_3$ (92.87 mg, 0.67 mmol) and Pd(dppf)$Cl_2 \cdot$DCM (21.96 mg, 0.02 mmol) and the reaction mixture was heated at 100° C. for 16 h. After completion, the reaction mixture was filtered through pad of Celite and washed with 10% MeOH in DCM (50 mL). The combined organic layer was dried over anhydrous $Na_2SO_4$, filtered and concentrated under vacuum to give crude residue, which was then purified by Grace reverse phase chromatography (Method A). The collected fractions were concentrated under reduced pressure and the obtained product was re-dissolved in 10% MeOH in DCM (50 mL). The layer was washed with 10% $NaHCO_3$ solution (20 mL), water (20 mL) and dried over anhydrous $Na_2SO_4$, concentrated under reduced pressure, further dried over lyophilization to give title compound. Yield: 42.5% (51.88 mg, pale yellow solid); $^1$HNMR (400 MHz, DMSO-$d_6$): δ 8.73-8.72 (m, 1H), 8.59 (s, 1H), 8.50 (d, J=7.6 Hz, 1H), 8.18 (d, J=0.4 Hz, 1H), 8.11-8.10 (m, 1H), 7.90 (d, J=0.8 Hz, 1H), 7.80 (d, J=1.2 Hz, 1H), 7.17-7.10 (m, 1H), 4.59-4.50 (m, 1H), 3.59-3.55 (m, 1H), 3.55-3.45 (m, 2H), 3.45-3.26 (m, 2H), 3.36-3.32 (m, 4H), 2.06-2.00 (m, 2H), 1.95-1.90 (m, 2H), 1.50 (d, J=6.8 Hz, 6H), 1.40 (m, 2H), 1.32-1.25 (m, 2H); LCMS: (Method C) 453.0 [M+H], Rt. 1.26 min; HPLC: (Method A) Rt. 2.85 min.

Ex. 26: 2-(1H-imidazol-1-yl)-N-((1r,4r)-4-(2-methoxyethoxy)cyclohexyl)-6-(1-methyl-1H-pyrazol-3-yl)isonicotinamide

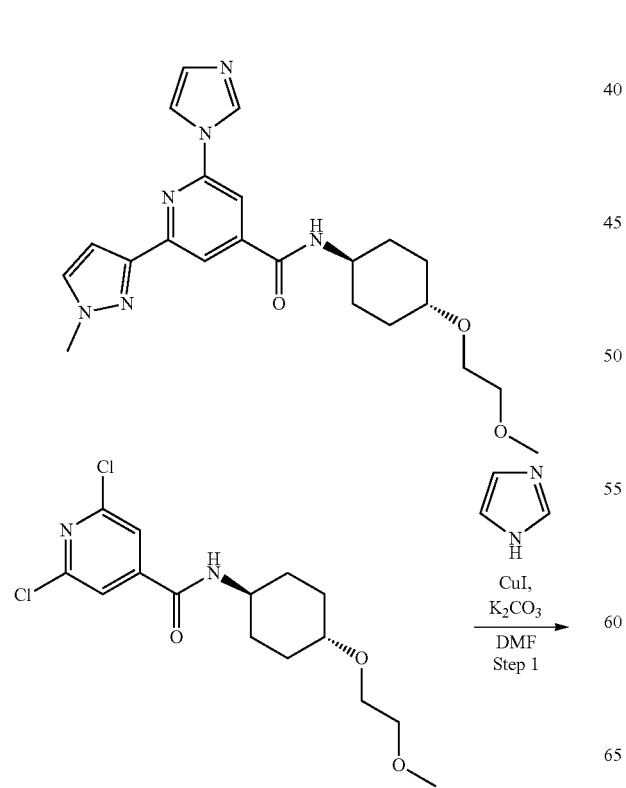

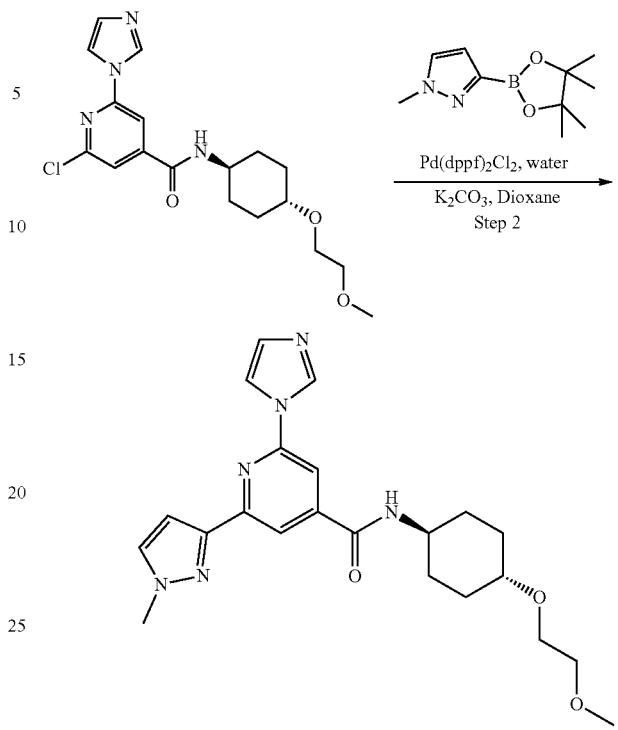

Step 1: 2-chloro-6-(1H-imidazol-1-yl)-N-((1r,4r)-4-(2-methoxyethoxy)cyclohexyl)isonicotinamide To a stirred solution of 2,6-dichloro-N-((1r,4r)-4-(2-methoxyethoxy)cyclohexyl)isonicotinamide (950 mg, 2.73 mmol) in DMF (100 mL) and 1H-imidazole (558 mg, 8.20 mmol) degassed gas for 10 min before the addition of potassium carbonate (1.13 g, 8.20 mmol) followed by CuI (51.9 mg, 0.27 mmol) were added at RT. The reaction mixture was heated at 100° C. for 16 h. After completion, the reaction mixture was filtered through Celite, and washed with 5% MeOH in DCM (200 mL). The combined organic layer was washed with 10% $NaHCO_3$ solution (50 mL) followed by water (2×50 mL). The combined organic layer was evaporated under vacuum and the resulting crude was purified by grace chromatography using silica gel (100-200 mesh, 2%-3% MeOH in DCM) to get title compound. Yield: 40% (410 mg, brown solid). LCMS: (Method C) 378.9 [M+H], Rt 1.26 min.

Step 2: 2-(1H-imidazol-1-yl)-N-((1r,4r)-4-(2-methoxyethoxy)cyclohexyl)-6-(1-methyl-1H-pyrazol-3-yl)isonicotinamide

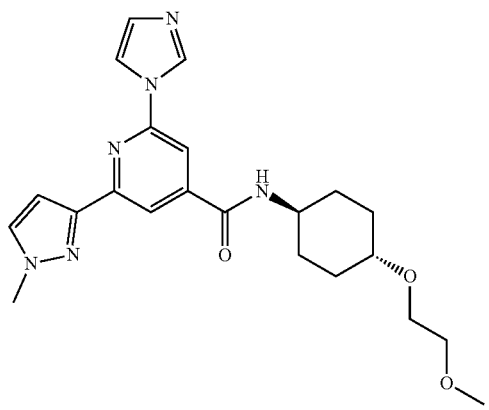 [SMILES: COCCO[C@H]1CC[C@H](NC(=O)c2cc(-c3ccn(C)n3)nc(-n3ccnc3)c2)CC1]

To a stirred solution of 2-chloro-6-(1H-imidazol-1-yl)-N-((1r,4r)-4-(2-methoxyethoxy)cyclohexyl)isonicotinamide (100 mg, 0.26 mmol) and 1-methyl-3-(4,4,5,5-tetramethyl-1,3,2-dioxaborolan-2-yl)-1H-pyrazole (80 mg, 0.39 mmol), in a mixture of 1,4 Dioxane (2.5 mL) and water (0.25 mL), nitrogen gas was purged through the reaction mixture for 5 min before the addition of K₂CO₃ (110 mg, 0.78 mmol) followed by Pd(dppf)Cl₂·DCM (20 mg, 0.02 mmol) were added at RT. The reaction mixture was heated at 100° C. for 16 h. After completion, the reaction mixture was filtered through Celite, and washed with 10% MeOH in DCM (100 mL). The combined organic layer was dried over anhydrous sodium sulfate, filtered and the filtrate was concentrated under vacuum. The resulting crude residue was purified by Prep HPLC (Method A). The prep-fraction was collected, concentrated under reduced pressure, diluted with 10% MeOH/DCM (50 mL) and washed with 10% NaHCO₃ solution (20 mL) followed by water (2×20 mL). The organic layer was dried over anhydrous sodium sulfate, filtered, concentrated under reduced pressure and lyophilized to get the title compound. Yield: 52% (58.41 mg, off white solid). ¹HNMR (400 MHz, DMSO-d₆): δ 9.20 (s, 1H), 8.73 (d, J=7.6 Hz, 1H), 8.30 (s, 1H), 8.25 (d, J=1.2 Hz, 1H), 8.06 (d, J=1.2 Hz, 1H), 7.90 (d, J=2.0 Hz, 1H), 7.50 (s, 1H), 7.10 (d, J=2.4 Hz, 1H), 4.00 (s, 3H), 3.85-3.80 (m, 1H), 3.57-3.54 (m, 2H), 3.45-3.42 (m, 2H), 3.30-3.24 (m, 4H), 2.06-2.03 (m, 2H), 1.93-1.91 (m, 2H), 1.45-1.38 (m, 2H), 1.32-1.25 (m, 2H), LCMS: (Method C) 425.2 [M+H], Rt. 1.20 min. HPLC: (Method A) Rt. 2.33 min.

Ex. 27: 2-(1H-imidazol-1-yl)-N-((1r,4r)-4-(2-methoxyethoxy)cyclohexyl)-6-(1-methyl-1H-pyrazol-4-yl)pyrimidine-4-carboxamide

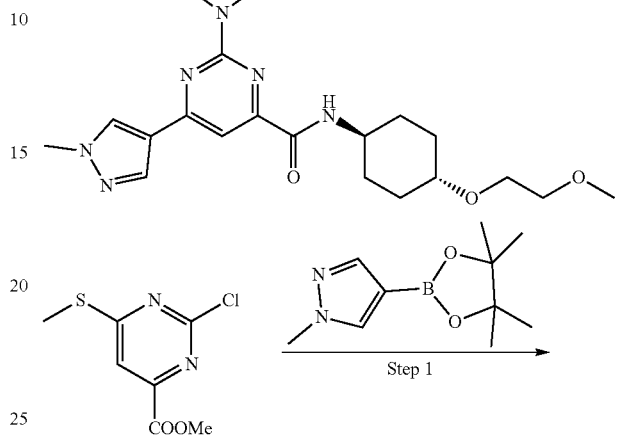

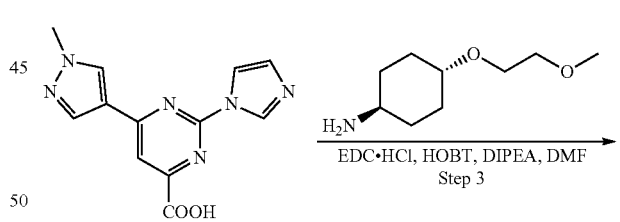

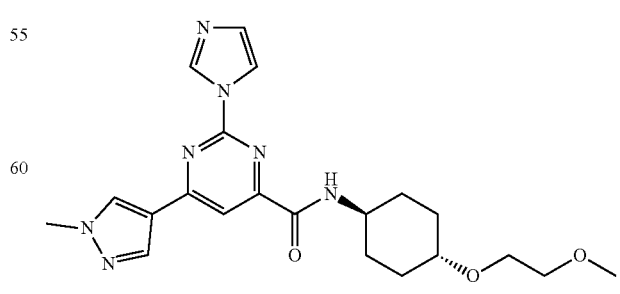

Step 1: methyl 2-chloro-6-(1-methyl-1H-pyrazol-4-yl)pyrimidine-4-carboxylate

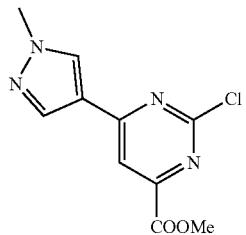 [SMILES: COC(=O)c1cc(-c2cnn(C)c2)nc(Cl)n1]

A solution of methyl 2-chloro-6-(methylthio)pyrimidine-4-carboxylate (1.0 g, 4.58 mmol) in dioxane (15 mL) was purged with nitrogen gas for 15 min and then charged Copper (1) thiophene-2-carboxylate (1.75 g, 9.17 mmol), 1-methyl-4-(4,4,5,5-tetramethyl-1,3,2-dioxaborolan-2-yl)-1H-pyrazole (1.9 g, 9.17 mmol) and tetrakis(triphenylphosphine)palladium(0) (0.53 g, 0.46 mmol) at RT and heated at 85° C. for 6 h. The reaction mixture diluted with 5% methanol in DCM and filtered through Celite. The combined filtrate was concentrated under vacuum and the resulting crude material was purified by flash chromatography on Biotage Isolera to get the title compound. Yield: 28% (0.32 g, Yellow solid). $^1$HNMR (400 MHz, DMSO-d6): δ 8.7 (s, 1H), 8.3 (s, 1H), 8.2 (s, 1H), 3.9 (s, 3H), 3.9 (s, 3H). LCMS: (Method A) 253.0 [M+H], 1.50 min.

Step 2: 2-(1H-imidazol-1-yl)-6-(1-methyl-1H-pyrazol-4-yl)pyrimidine-4-carboxylic acid

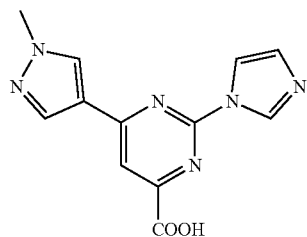 [SMILES: Cn1cc(-c2cc(C(=O)O)nc(-n3ccnc3)n2)cn1]

A reaction mixture of methyl 2-chloro-6-(1-methyl-1H-pyrazol-4-yl)pyrimidine-4-carboxylate (0.31 g, 1.23 mmol), imidazole (0.33 mg, 4.92 mmole), CuI (233 mg, 1.23 mmole) and $K_2CO_3$ (0.68 g, 4.92 mmole) in DMF (3 mL) was heated to 120° C. for overnight.

The reaction mixture was diluted with water (20 mL) and filtered through Celite bed. Filtrate was concentrated to afford the crude title compound, which was used as such for next step. $^1$HNMR (400 MHz, DMSO-d6): δ 12.1 (s, 1H), 8.6 (s, 1H), 8.3 (s, 1H), 8.0 (s, 1H), 7.7 (s, 1H), 7.6 (s, 1H), 3.9 (s, 3H). LCMS (reaction mixture): (Method A) 271.0 [M+H], 0.22 min.

Step 3: 2-(1H-imidazol-1-yl)-N-((1r,4r)-4-(2-methoxyethoxy)cyclohexyl)-6-(1-methyl-1H-pyrazol-4-yl)pyrimidine-4-carboxamide

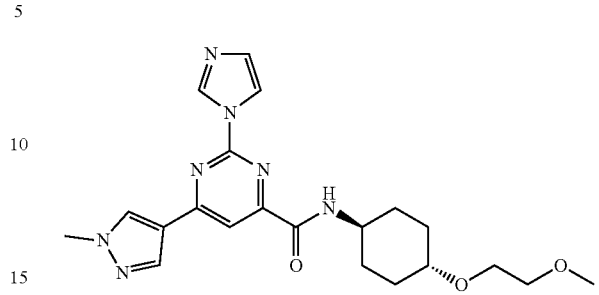

To a stirred solution of 2-(1H-imidazol-1-yl)-6-(1-methyl-1H-pyrazol-4-yl)pyrimidine-4-carboxylic acid (28 mg, 0.10 mmol) in DMF (1 mL), were added EDC·HCl (30 mg, 0.15 mmol), HOBt (21 mg, 0.15 mmol) and DIPEA (40 mg, 0.31 mmol) followed by (1r,4r)-4-(2-methoxyethoxy)cyclohexan-1-amine (23 mg, 0.13 mmol) and the reaction mixture was stirred at RT for overnight. The reaction mixture was diluted with water (10 mL) and extracted with 5% methanol in DCM (3×20 mL). The combined organic layer was washed with brine (10 mL), dried over anhydrous $Na_2SO_4$ and concentrated under vacuum. The resulting crude residue was purified by prep HPLC (method A). Fraction received from prep HPLC was made slightly basic using aq. $NaHCO_3$ and ACN was removed on rota vapour under reduced pressure. Aqueous layer was extracted with 5% methanol in DCM (2×20 mL). The combined organic layer was washed with water (2×10 mL), dried over anhydrous $Na_2SO_4$, filtered and the filtrate was concentrated under vacuum to afford the title compound. Yield: 23% (10 mg, off white solid). $^1$HNMR (400 MHz, DMSO-d6): δ 9.04 (s, 1H), 8.83 (s, 1H), 8.76 (d, J=8.80 Hz, 1H), 8.43 (s, 1H), 8.3 (s, 1H), 8.1 (s, 1H), 7.2 (s, 1H), 3.9 (s, 3H), 3.80-0.00 (m, 1H), 3.57-3.56 (m, 2H), 3.45-3.43 (m, 2H), 3.2 (s, 4H), 2.07-2.04 (m, 2H), 1.87-1.84 (m, 2H), 1.60-1.56 (m, 2H), 1.25-1.24 (m, 2H). LCMS: (Method A) 426.2 [M+H], Rt.1.34 min, 98.56%. HPLC: (Method A) Rt. 2.34 min.

Ex. 28: 2-(1H-imidazol-1-yl)-N-((1r,4r)-4-(2-methoxyethoxy)cyclohexyl)pyrimidine-4-carboxamide

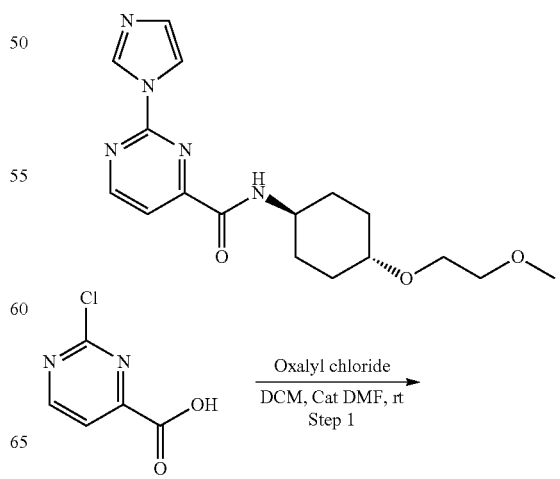

-continued

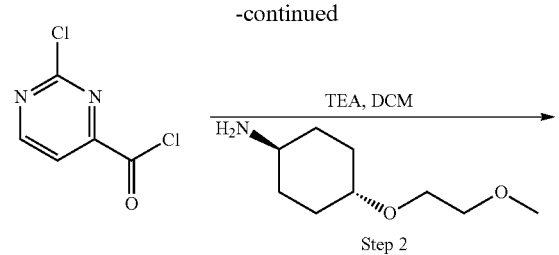

Step 2

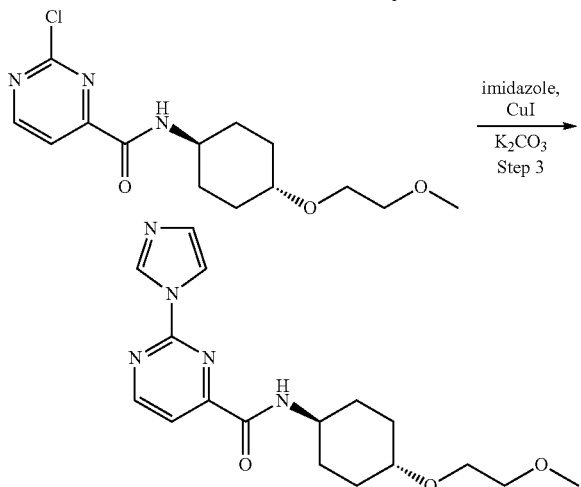

Step 1: 2-chloropyrimidine-4-carbonyl chloride

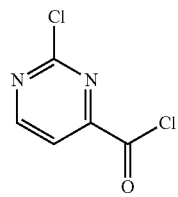

To a stirred solution of 2-chloropyrimidine-4-carboxylic acid (1 g, 6.3 mmol) and 2 drops of DMF in DCM (20 ml) oxalyl chloride (1.20 g, 9.46 mmol) was added at 0° C. and stirred at RT for 2 h. The reaction mixture was dried under vacuum to get desired product. Yield: 98% (1 g, Pale brown gum).

Step 2: 2-chloro-N-((1r,4r)-4-(2-methoxyethoxy) cyclohexyl)pyrimidine-4-carboxamide

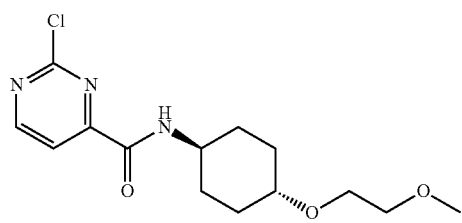 [SMILES: COCCO[C@H]1CC[C@H](NC(=O)c2ccnc(Cl)n2)CC1]

To a stirred solution of 2-chloropyrimidine-4-carbonyl chloride (1 g, 5.65 mmol) and TEA (2.37 mL, 16.95 mmol) in THF (20 mL) at 0° C. (1r,4r)-4-(2-methoxyethoxy)cyclohexan-1-amine (0.977 g, 5.65 mmol) was added at same temperature and stirred at RT for overnight. The reaction mixture was quenched with sat·NaHCO$_3$ solution (20 mL). The resulting suspension was extracted with EtOAc (2×25 mL). The combined organic layer was washed with water (20 mL), brine (20 mL), dried over anhydrous Na$_2$SO$_4$ and solvent was evaporated under vacuum to afford the title compound. Yield: 84% (1.5 g, Pale brown gummy solid). LCMS: (Method C) 314.2 [M+H], Rt.1.615 min.

Step 3: 2-(1H-imidazol-1-yl)-N-((1r,4r)-4-(2-methoxyethoxy)cyclohexyl)pyrimidine-4-carboxamide

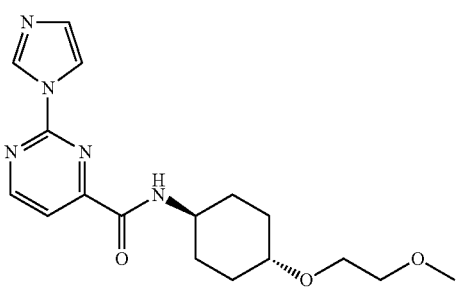 [SMILES: COCCO[C@H]1CC[C@H](NC(=O)c2ccnc(-n3ccnc3)n2)CC1]

A mixture of 2-chloro-N-((1r,4r)-4-(2-methoxyethoxy)cyclohexyl)pyrimidine-4-carboxamide (1.5 g, 4.78 mmol), imidazole (975 mg, 14.34 mmol), copper iodide (90.5 mg, 0.478 mmol) and K$_2$CO$_3$ (1.97 g, 14.34 mmol) in DMF (20 mL) was purged with N$_2$ for 5 min and then reaction mixture was heated in a sealed tube at 120° C. for overnight. Reaction mixture was diluted with DCM and filtered through Celite bed. The filtrate was evaporated under vacuum and the resulting crude product was purified by prep HPLC (Method A). Prep fraction was concentrated under reduced pressure to get product. Then product was dissolved in 10% MeOH/DCM (20 mL) and neutralized with 10% NaHCO$_3$ solution (10 mL) before washing with brine solution and water. The organic layer was dried over anhydrous Na$_2$SO$_4$, filtered, dried under reduced pressure and lyophilized to get product. Yield: 38% (635.57 mg, Pale yellow gummy solid). $^1$HNMR (400 MHz, DMSO-d$_6$: δ 9.06 (d, J=4.8 Hz, 1H), 8.97 (s, 1H), 8.85 (d, J=8.8 Hz, 1H), 8.23 (s, 1H), 7.91 (d, J=5.2 Hz, 1H), 7.19 (s, 1H), 7.33 (d, J=8.4 Hz, 1H), 3.89-3.81 (m, 1H), 3.57-3.54 (m, 2H), 3.45-3.42 (m, 2H), 3.34-3.26 (m, 4H), 2.07-2.04 (m, 2H), 1.86-1.83 (m, 2H), 1.62-1.52 (m, 2H), 1.31-1.21 (m, 2H). LCMS: (Method C) 346.0 [M+H], Rt.1.336 min. HPLC: (Method A) Rt. 2.006 min.

Ex. 29: 6-(1H-imidazol-1-yl)-N-((1r,4r)-4-(2-methoxyethoxy)cyclohexyl)-4-methylpicolinamide

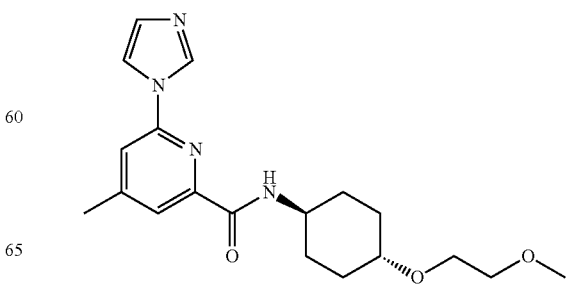

Step 2: 6-(1H-imidazol-1-yl)-N-((1r,4r)-4-(2-methoxyethoxy)cyclohexyl)-4-methylpicolinamide

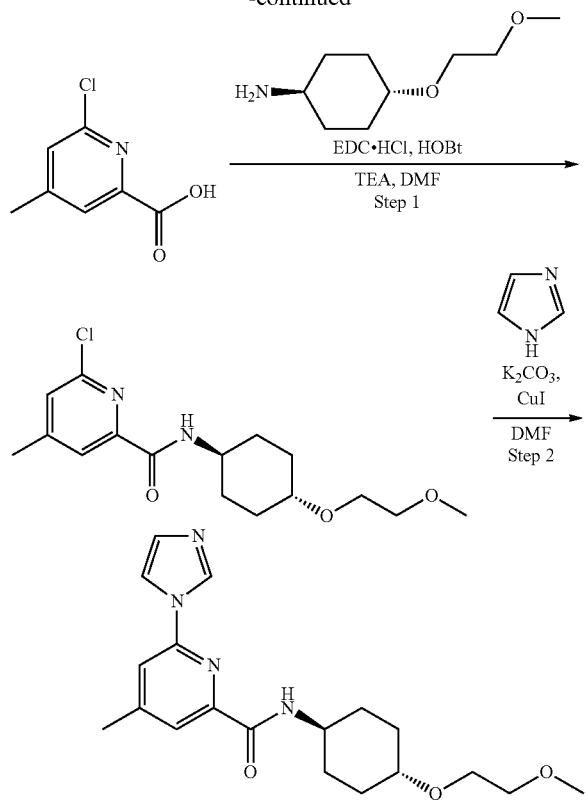

Step 1: 6-chloro-N-((1r,4r)-4-(2-methoxyethoxy)cyclohexyl)-4-methylpicolinamide

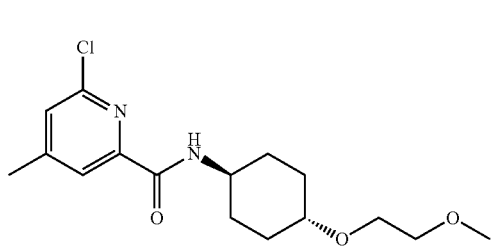

To a stirred solution of 6-chloro-4-methylpicolinic acid (511 mg, 2.97 mmol) in DMF (5 mL) at 0° C. was added EDC·HCl (856 mg, 4.46 mmol), HOBt (603 mg, 4.46 mmol) followed by DIPEA (1.37 mL, 7.44 mmol) under nitrogen atmosphere and the resultant mixture was stirred for 5 min. After 5 min, (1r,4r)-4-(2-methoxyethoxy)cyclohexan-1-amine (774 mg, 4.46 mmol) was added and stirred at RT for 16 h. After completion, the reaction mixture was quenched with ice-cold water (25 mL) and extracted with EtOAc (50 mL), washed with water (2×20 mL) and dried over anhydrous $Na_2SO_4$. The solvent was evaporated under reduced pressure to give title compound. Yield: 77.05% (750 mg, brown solid); $^1$H NMR (400 MHz, DMSO-$d_6$): δ 11.99 (s, 1H), 8.18 (d, J=7.6 Hz, 1H), 7.61 (d, J=8.0 Hz, 1H), 7.54 (d, J=16.4 Hz, 1H), 6.91 (s, 1H), 3.75-3.70 (m, 1H), 3.53-3.50 (m, 2H), 3.42-3.40 (m, 2H), 3.25-3.16 (m, 4H), 2.20-1.86 (m, 4H), 1.39-1.22 (m, 4H), LCMS: (Method C) 327.2 [M+H], Rt. 2.10 min.

A solution of 6-chloro-N-((1r,4r)-4-(2-methoxyethoxy)cyclohexyl)-4-methylpicolinamide (210 mg, 0.64 mmol) and 1H-imidazole (131 mg, 1.92 mmol) in DMF (3 mL) was added $K_2CO_3$ (266 mg, 1.92 mmol) followed by CuI (12.2 mg, 0.06 mmol) and the resultant reaction mixture was heated at 130° C. for 16 h. After completion, the reaction mixture was filtered through a pad of Celite and washed with DCM (50 mL), the filtrate was evaporated under vacuum to give crude product. The crude product was then purified by Grace reverse phase chromatography (method A) and the collected fractions were concentrated under reduced pressure. The product obtained was re-dissolved in 10% MeOH in DCM (50 mL), washed with 10% aq. $NaHCO_3$ solution (20 mL), water (2×20 mL), dried over anhydrous $Na_2SO_4$, filtered and concentrated under reduced pressure to give title compound. Yield: 33.5% (77.29 mg, off-white solid); $^1$HNMR (400 MHz, DMSO-$d_6$): δ 8.91 (s, 1H), 8.52 (d, J=8.8 Hz, 1H), 8.22 (t, J=1.2 Hz, 1H), 7.88 (s, 1H), 7.82 (s, 1H), 7.15 (s, 1H), 3.84-3.79 (m, 1H), 3.57-3.50 (m, 2H), 3.45-3.40 (m, 2H), 3.30 (s, 3H), 3.26-3.20 (m, 1H), 2.5 (s, 3H), 2.06-2.00 (m, 2H), 1.84-1.80 (m, 2H), 1.61-1.50 (m, 2H), 1.30-1.20 (m, 2H); LCMS: (Method A) 359.2 [M+H], Rt. 1.19 min; HPLC: (Method A) Rt. 2.29 min.

Ex. 30:4-(1H-imidazol-1-yl)-N-((1r,4r)-4-(2-methoxyethoxy)cyclohexyl)-6-(1-methyl-1H-pyrazol-4-yl)picolinamide

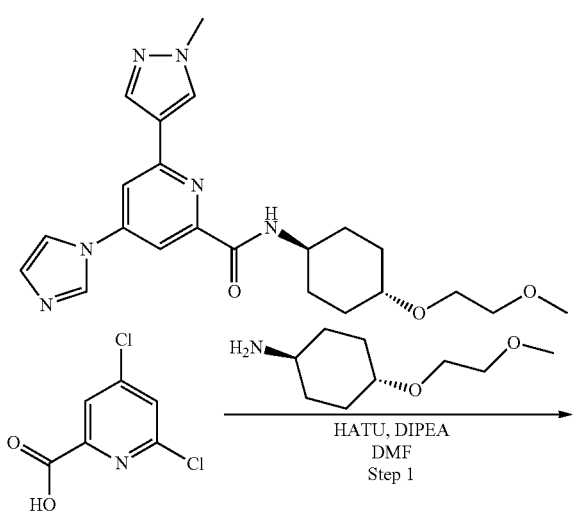

93
-continued

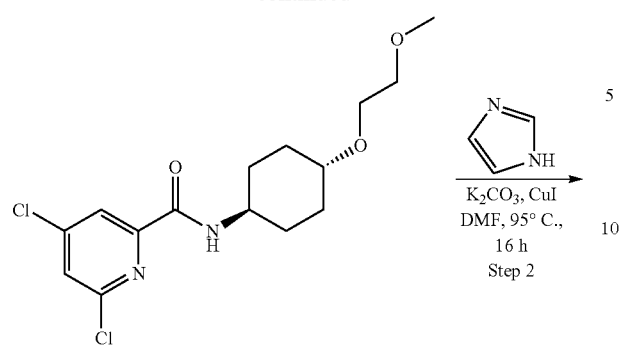

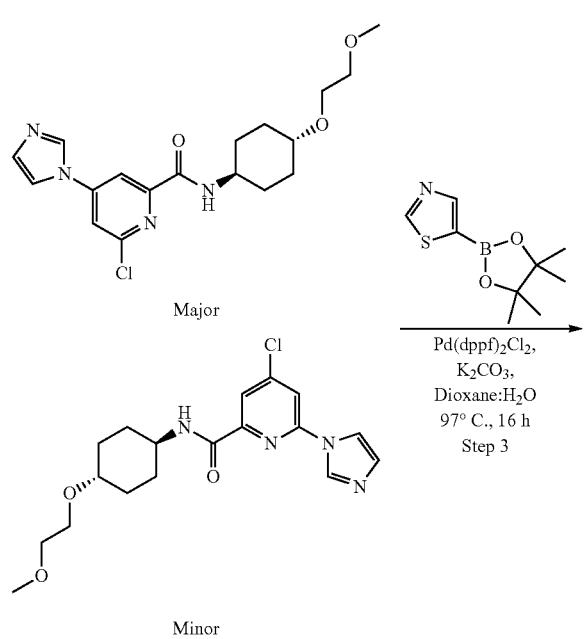

Step 1: 4,6-dichloro-N-((1r,4r)-4-(2-methoxyethoxy) cyclohexyl)picolinamide

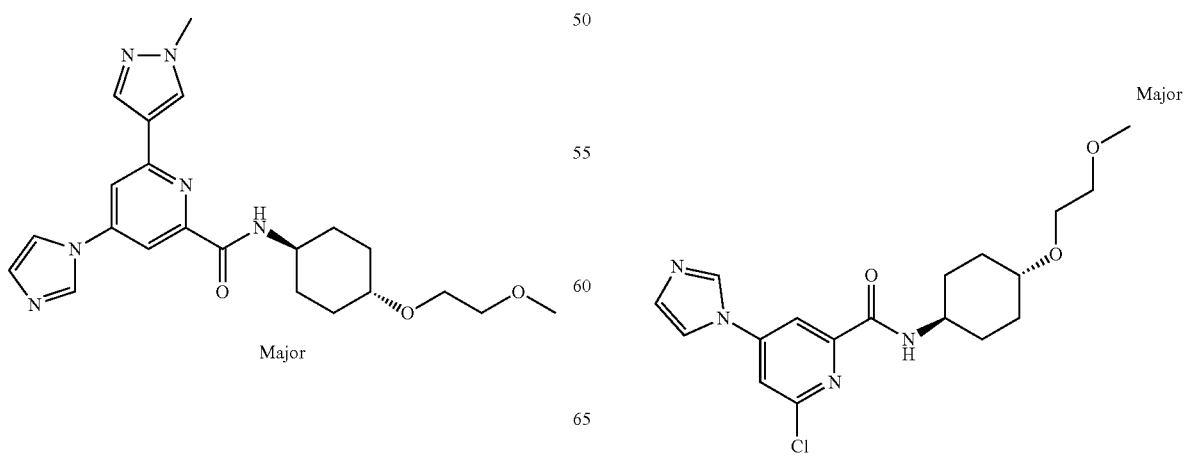

To a stirred solution of 4,6-dichloropicolinic acid (1.5 g, 7.8 mmol, CAS No. 88912-25-8) in DMF (15 mL) were added DIPEA (4.19 mL, 23.43 mmol) and HATU (5.93 g, 15.62 mmol) at 0° C. After stirring for 5 min a solution of (1r,4r)-4-(2-methoxyethoxy) cyclohexan-1-amine (1.48 g, 8.59 mmol) in DMF (2.5 mL) was added at same temperature. The reaction was stirred at RT for 16 h. The reaction mixture was monitored by TLC. After completion of reaction, it was quenched with water (25 mL). The resulting suspension was extracted with EtOAc (3×25 mL). The combined organic layer was washed with water (20 mL), brine (20 mL), dried over anhydrous Na$_2$SO$_4$ and solvent was evaporated under vacuum to get crude compound which was purified by column chromatography on Biotage Isolera (100-200 mesh silica gel eluting with 0-60% EtOAc in pet ether) to afford the title compound Yield: 49% (1.35 g, Yellow solid). $^1$HNMR 400 MHz, DMSO-d$_6$): δ 8.49 (d, J=8.4 Hz, 1H), 8.03 (d, J=1.6 Hz, 1H), 8.00 (d, J=1.6 Hz, 1H), 3.87-3.81 (m, 1H), 3.54-3.52 (m, 2H), 3.44-3.40 (m, 2H), 3.20 (s, 4H), 2.01-198 (m, 2H), 1.81-1.78 (m, 2H), 1.53-1.49 (m, 2H), 1.25-1.21 (m, 2H). LCMS: (Method C) 347.1. [M+H], Rt.2.27 min.

Step 2: 6-chloro-4-(1H-imidazol-1-yl)-N-((1r,4r)-4-(2-methoxyethoxy)cyclohexyl)picolinamide and 4-chloro-6-(1H-imidazol-1-yl)-N-((1r,4r)-4-(2-methoxyethoxy)cyclohexyl)picolinamide -continued Minor

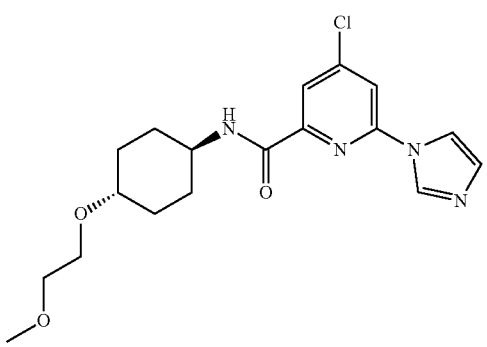

A mixture of 4,6-dichloro-N-((1r,4r)-4-(2-methoxyethoxy) cyclohexyl) picolinamide (400 mg, 1.15 mmol), imidazole (70.53 mg, 1.037 mmol), copper iodide (21.90 mg, 0.01152 mmol) and $K_2CO_3$ (397.69 mg, 2.88 mmol) in DMF (2 mL) taken in a sealed tube was purged with $N_2$ for 5 min. The reaction mixture was heated at 95° C. for 16 h. The reaction was monitored by LCMS. After completion of the reaction, it was filtered through Celite and washed with DCM (10 mL). The filtrate was evaporated under vacuum to get crude product which was purified by column chromatography on Biotage Isolera (230-400 mesh silica gel eluting with 0-10% MeOH in DCM) to afford the title compounds. The with 55 Yield: 71% (310.1 mg, off White solid). $^1$HNMR (400 MHz, DMSO-$d_6$): δ 8.61 (d, J=8.0 Hz, 1H), 8.44 (d, J=8.0 Hz, 1H), 8.29 (s, 1H), 8.21 (s, 1H), 7.96 (s, 1H), 7.93 (s, 1H), 3.81-3.77 (m, 1H), 3.56-3.52 (m, 2H), 3.44-3.41 (m, 2H), 3.20 (s, 4H), 2.09-2.02 (m, 2H), 1.84-1.81 (m, 2H), 1.58-1.48 (m, 2H), 1.20-1.29 (m, 2H). LCMS: (Method C) 379.2 [M+H], Rt.1.25 min, 379.2 [M+H], Rt.1.20 min.

Step 3: 4-(1H-imidazol-1-yl)-N-((1r,4r)-4-(2-methoxyethoxy)cyclohexyl)-6-(1-methyl-1H-pyrazol-4-yl)picolinamide

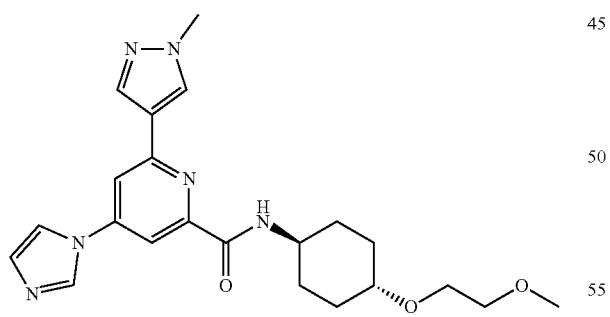

A mixture of 6-chloro-4-(1H-imidazol-1-yl)-N-((1r,4r)-4-(2-methoxyethoxy)cyclohexyl)picolinamide and 4-chloro-6-(1H-imidazol-1-yl)-N-((1r,4r)-4-(2-methoxyethoxy)cyclohexyl)picolinamide (280 mg, 0.740 mmol, 55% major and 26% minor), 1-methyl-4-(4,4,5,5-tetramethyl-1,3,2-dioxaborolan-2-yl)-1H-pyrazole (184.88 mg, 0.888 mmol, Cas No. 761446-44-0), $K_2CO_3$ (255.5 mg, 1.851 mmol), Pd(dppf)$Cl_2$·DCM (30.24 mg, 0.0370 mmol) in 4.5 mL dioxane and water (0.5 mL) taken in a sealed tube, was purged with $N_2$ for 5 min. The reaction mixture was heated at 97° C. for 16 h. The reaction was monitored by LCMS. After completion of the reaction, it was filtered through Celite and washed with DCM (20 mL). The filtrate was evaporated under vacuum to get crude product which was purified by column chromatography on Biotage Isolera (230-400 mesh silica gel eluting with 0-10% MeOH in DCM) to afford the title compound which was further purified by prep HPLC (Method A). The prep fractions were concentrated, dissolved with DCM and neutralized with 10% $NaHCO_3$ aqueous solution. The organic phase was washed with water, brine, dried over anhydrous $Na_2SO_4$ and evaporated to afford the title compound. Yield: 15% (48.1 mg, off White solid). $^1$HNMR (400 MHz, DMSO-$d_6$): δ 8.72 (s, 1H), 8.60 (s, 1H), 8.48 (d, J=8.4 Hz, 1H), 8.36 (d, J=0.4 Hz, 1H), 8.16 (d, J=2.0 Hz, 1H), 8.13 (s, 1H), 8.04 (d, J=2.0 Hz, 1H), 7.23 (s, 1H), 3.94 (s, 3H), 3.86-3.82 (m, 1H), 3.57-3.55 (m, 2H), 3.45-3.42 (m, 2H), 3.26 (s, 4H), 2.08-2.03 (m, 2H), 1.90-1.87 (m, 2H), 1.62-1.53 (m, 2H), 1.34-1.24 (m, 2H). LCMS: (Method A) 425.2 [M+H], Rt.1.56 min, HPLC: (Method A) Rt.2.53 min.

Ex. 31: N-((1r,4r)-4-hydroxycyclohexyl)-6-(1H-imidazol-1-yl)picolinamide

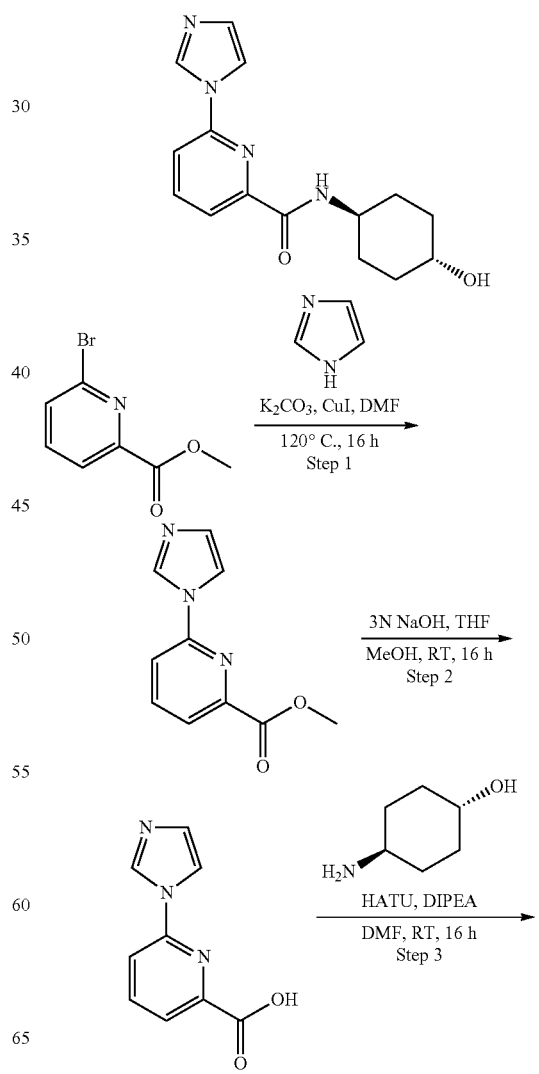

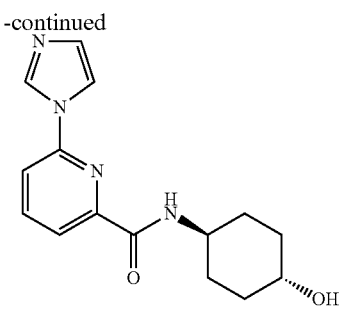

Step 1: methyl 6-(1H-imidazol-1-yl)picolinate

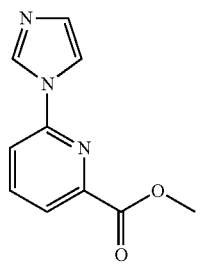

A solution of methyl 6-bromopicolinate (1.23 g, 5.69 mmol, CAS No. 26218-75-7) and 1H-imidazole (1.16 g, 17.08 mmol) in DMF (20 mL) was deoxygenated by purging nitrogen gas for 10 min. After 10 min, $K_2CO_3$ (1.96 g, 14.23 mmol) and CuI (108 mg, 0.56 mmol) were added, the resultant mixture was heated at 120° C. for 16 h. After completion, the reaction mixture was filtered through pad of Celite and washed with 10% MeOH in DCM (200 mL). The combined filtrates were concentrated under vacuum to give crude product, which was then purified by Grace chromatography using silica gel (100-200 mesh, 70-100% EtOAc in petroleum ether) to give title compound. Yield: 81.2% (940 mg, pale yellow solid). LCMS: (Method B) 204.1 [M+H], Rt.1.44 min, $^1$HNMR (400 MHz, DMSO-$d_6$): δ 8.57 (t, J=1.20 Hz, 1H), 8.24-8.20 (m, 1H), 8.11-8.09 (m, 1H), 8.03-7.99 (m, 2H), 7.17-7.16 (m, 1H), 3.9 (s, 3H).

Step 2: 6-(1H-imidazol-1-yl)picolinic acid

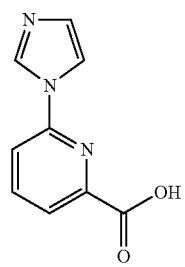 [SMILES: O=C(O)c1cccc(-n2ccnc2)n1]

Methyl 6-(1H-imidazol-1-yl) picolinate (937 mg, 4.61 mmol) was dissolved in THF (5 mL) and MeOH (5 mL) then 3N aq. NaOH (5 mL) was added at RT, the resultant mixture was stirred for 16 h. After completion the solvent was evaporated under vacuum, residue was acidified with 4 M HCl in 1,4 Dioxane and then concentrated under vacuum to get title compound. Yield: crude (950 mg, yellow solid). LCMS: (Method C) 190.2 [M+H], Rt. 0.19 min, $^1$HNMR (400 MHz, DMSO-$d_6$): δ 9.39 (s, 1H), 8.33-8.28 (m, 2H), 8.22 (d, J=8.0 Hz, 1H), 8.11 (d, J=7.6 Hz, 1H), 7.55 (s, 1H).

Step 3: N-((1r,4r)-4-hydroxycyclohexyl)-6-(1H-imidazol-1-yl)picolinamide

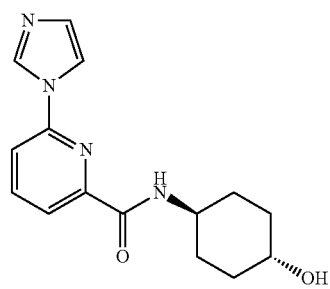 [SMILES: O=C(N[C@H]1CC[C@H](O)CC1)c1cccc(-n2ccnc2)n1]

To a stirred solution of 6-(1H-imidazol-1-yl)picolinic acid (110 mg, 0.58 mmol) in DMF (3 mL) was added HATU (331 mg, 0.87 mmol) followed by DIPEA (0.26 mL, 1.45 mmol) at 0° C. under nitrogen atmosphere and the resultant mixture was stirred for 10 min. After 10 min, (1r,4r)-4-aminocyclohexan-1-ol (100 mg, 0.87 mmol) was added and stirred at RT for 16 h. Upon completion, the reaction mixture was concentrated to give crude product, which was then purified by Grace reverse phase chromatography (Method B). The collected fractions were concentrated under reduced pressure and the obtained product was re-dissolved in 10% MeOH in DCM (20 mL), washed with 10% aq. $NaHCO_3$ solution (10 mL) followed by water (10 mL). The organic layer was dried over anhydrous $Na_2SO_4$, filtered, concentrated under reduced pressure and further dried by lyophilization to give title compound. Yield: 85.2% (141.9 mg, brown solid); $^1$HNMR (400 MHz, DMSO-$d_6$): δ 8.94 (t, J=0.8 Hz, 1H), 8.53 (d, J=8.8 Hz, 1H), 8.26 (t, J=1.6 Hz, 1H), 8.16 (t, J=8.0 Hz, 1H), 8.01-7.94 (m, 2H), 7.20 (t, J=1.2 Hz, 1H), 4.60 (s, 1H), 3.83-3.79 (m, 1H), 3.46-3.40 (m, 1H), 1.90-1.87 (m, 2H), 1.80-1.70 (m, 2H), 1.63-1.60 (m, 2H), 1.53-1.29 (m, 2H); LCMS: (Method D) 287.2 [M+H], Rt. 1.46 min; HPLC: (Method B) Rt. 3.13 min.

Ex. 32:
N-cyclohexyl-6-(1H-imidazol-1-yl)picolinamide

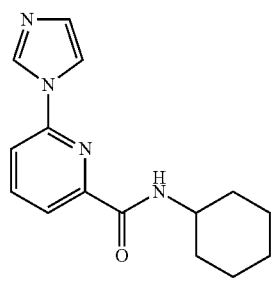

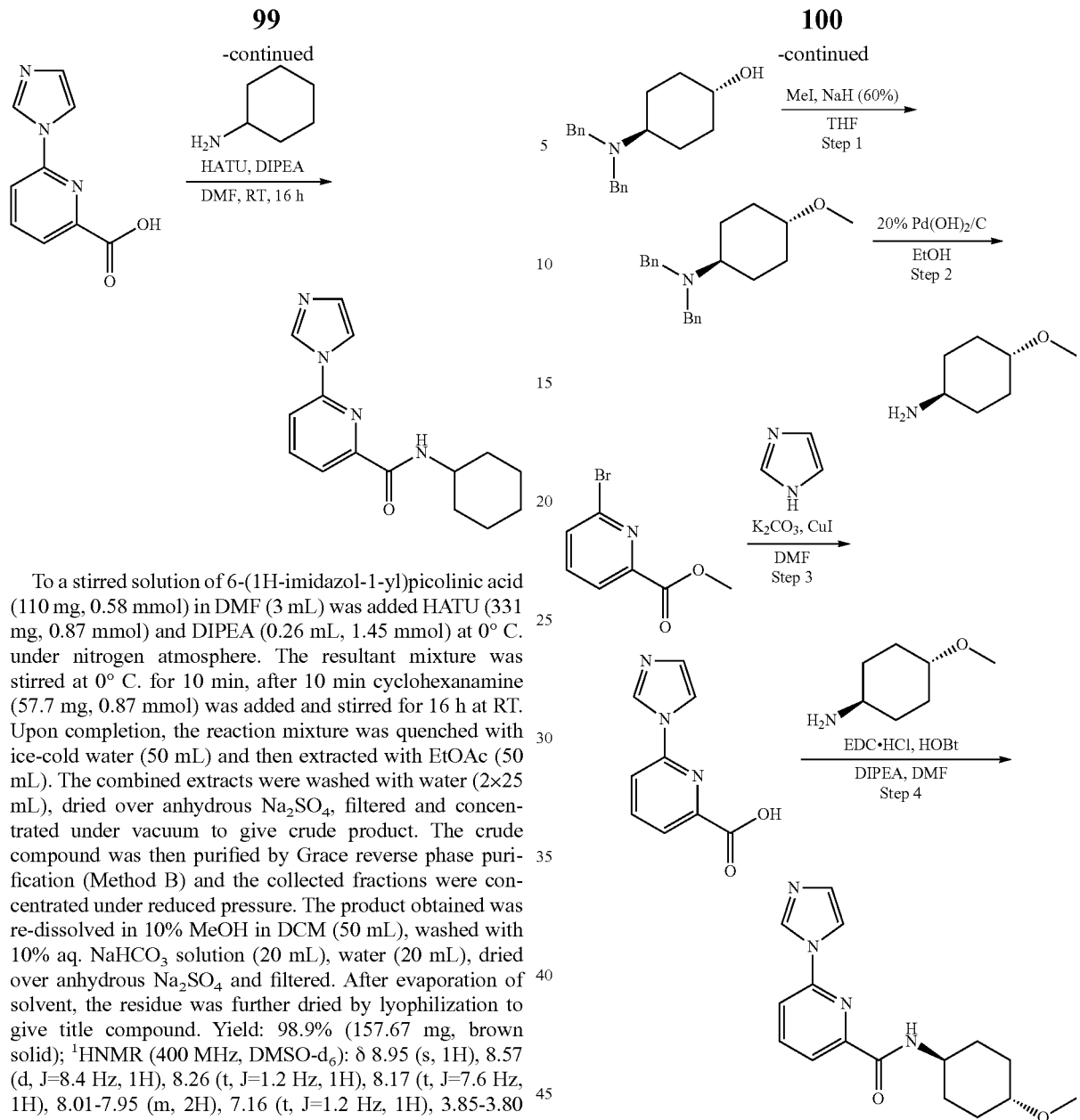

To a stirred solution of 6-(1H-imidazol-1-yl)picolinic acid (110 mg, 0.58 mmol) in DMF (3 mL) was added HATU (331 mg, 0.87 mmol) and DIPEA (0.26 mL, 1.45 mmol) at 0° C. under nitrogen atmosphere. The resultant mixture was stirred at 0° C. for 10 min, after 10 min cyclohexanamine (57.7 mg, 0.87 mmol) was added and stirred for 16 h at RT. Upon completion, the reaction mixture was quenched with ice-cold water (50 mL) and then extracted with EtOAc (50 mL). The combined extracts were washed with water (2×25 mL), dried over anhydrous Na$_2$SO$_4$, filtered and concentrated under vacuum to give crude product. The crude compound was then purified by Grace reverse phase purification (Method B) and the collected fractions were concentrated under reduced pressure. The product obtained was re-dissolved in 10% MeOH in DCM (50 mL), washed with 10% aq. NaHCO$_3$ solution (20 mL), water (20 mL), dried over anhydrous Na$_2$SO$_4$ and filtered. After evaporation of solvent, the residue was further dried by lyophilization to give title compound. Yield: 98.9% (157.67 mg, brown solid); $^1$HNMR (400 MHz, DMSO-d$_6$): δ 8.95 (s, 1H), 8.57 (d, J=8.4 Hz, 1H), 8.26 (t, J=1.2 Hz, 1H), 8.17 (t, J=7.6 Hz, 1H), 8.01-7.95 (m, 2H), 7.16 (t, J=1.2 Hz, 1H), 3.85-3.80 (m, 1H), 1.82-1.63 (m, 4H), 1.56-1.50 (m, 1H), 1.49-1.40 (m, 2H), 1.38-1.33 (m, 2H), 1.32-1.21 (m, 1H); LCMS: (Method D) 271.2 [M+H], Rt. 2.49 min; HPLC: (Method A) Rt. 2.54 min.

Ex. 33: 6-(1H-imidazol-1-yl)-N-((1r,4r)-4-methoxy-cyclohexyl)picolinamide

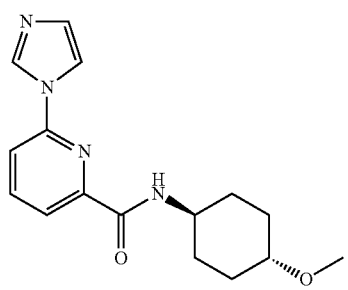 [SMILES: CO[C@H]1CC[C@H](NC(=O)c2cccc(-n3ccnc3)n2)CC1]

Step 1:
(1r,4r)-N,N-dibenzyl-4-methoxycyclohexan-1-amine

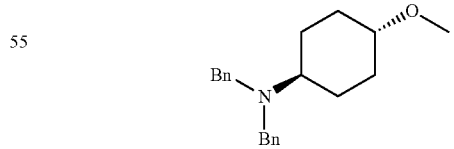

To a stirred solution of (1r,4r)-4-(dibenzylamino)cyclo-hexan-1-ol (710 mg, 2.40 mmol) in THF (10 mL) was added sodium hydride (240 mg, 6.00 mmol) at 0° C. under nitrogen atmosphere. After 10 min methyl iodide (0.37 mL, 6.00 mmol) was added, the resultant reaction mixture was stirred at RT for 5 h. After completion, the reaction mixture was poured into ice cold water (10 mL) and extracted with EtOAc (50 mL). The combined organic layer was washed with water (2×25 mL), dried over anhydrous Na$_2$SO$_4$, filtered and concentrated under vacuum to give crude compound. The resulting crude residue was purified by Grace normal phase chromatography (100-200 mesh silica gel, eluent: 5%-10% EtOAc in petroleum ether) to give title compound. Yield: 70% (520 mg, colorless liquid; LCMS: (Method C) 310.2 [M+H], Rt. 1.38 min.

Step 2: (1r,4r)-4-methoxycyclohexan-1-amine

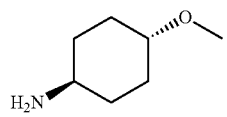

To a stirred solution of (1r,4r)-N,N-dibenzyl-4-methoxy-cyclohexan-1-amine (510 mg, 1.64 mmol) in absolute ethanol (10 mL) at RT, 20% Pd(OH)$_2$/C (50 mg) was added and the mixture was stirred for overnight under hydrogen at RT. After completion of the reaction, the reaction mixture was filtered through a pad of Celite and washed with methanol (50 mL). The filtrate was evaporated under vacuum to afford the title compound. This product was taken for next step without further purification. Yield: 100% yield is 215 mg (310 mg, Yellow liquid). Crude product (310 mg, Yellow liquid). LCMS: (Method A) 130.3 [M+H], Rt 0.52 min.

Step 3: 6-(1H-imidazol-1-yl)picolinic acid

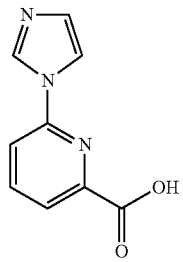 [SMILES: O=C(O)c1cccc(-n2ccnc2)n1]

To a stirred solution of methyl 6-bromopicolinate (450 mg, 2.08 mmol) in DMF (5 mL) and 1H-imidazole (425 mg, 6.24 mmol) was added K$_2$CO$_3$ (863 mg, 6.24 mmol) followed by CuI (39.6 mg, 0.20 mmol) and the resultant reaction mixture was heated at 140° C. for 16 h. After completion, the reaction mixture was filtered through a pad of Celite and washed with DCM (50 mL) and water (25 mL). From filtrate aqueous layer was separated and acidified using 1.5N HCl, then concentrated under reduced pressure to get the title compound as a hydrochloride salt. Yield: 100% yield is (395 mg, light blue color solid); LCMS: (Method C) 190.0 [M+H], Rt. 0.18 min.

Step 4: 6-(1H-imidazol-1-yl)-N-((1r,4r)-4-methoxy-cyclohexyl)picolinamide

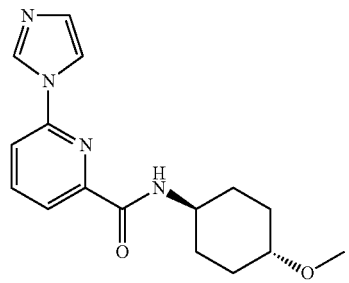 [SMILES: CO[C@H]1CC[C@H](NC(=O)c2cccc(-n3ccnc3)n2)CC1]

To a stirred solution of 6-(1H-imidazol-1-yl)picolinic acid (120 mg, 0.63 mmol) in DMF (3 mL) was added HOBt (128 mg, 0.95 mmol), EDC·HCl (182 mg, 0.95 mmol) followed by DIPEA (0.29 mL, 1.58 mmol) and the resultant mixture was stirred at 0° C. for 5 min. After 5 min, (1r,4r)-4-methoxycyclohexan-1-amine (123 mg, 0.95 mmol) was added and stirred for 16 h at RT. After completion, water (20 mL) was added to the reaction mixture and the aqueous layer was extracted with EtOAc (50 mL). The combined extracts were washed with water (2×15 mL) dried over anhydrous Na$_2$SO$_4$, filtered and concentrated under vacuum. The crude residue was then purified by Grace reverse phase chromatography (Method C) and the collected fractions were concentrated under reduced pressure. This product was re-dissolved in 10% MeOH in DCM (20 mL), washed with 10% NaHCO$_3$ solution (10 mL), water (10 mL) and dried over anhydrous Na$_2$SO$_4$, filtered, concentrated under reduced pressure to give title compound. Yield: 76% (145 mg, off-white solid); $^1$HNMR (400 MHz, DMSO-d$_6$): δ 8.95 (s, 1H), 8.57 (d, J=8.4 Hz, 1H), 8.26-8.25 (m, 1H), 8.18-8.14 (m, 1H), 8.01-7.90 (m, 2H), 7.16 (t, J=1.2 Hz, 1H), 3.88-3.70 (m, 1H), 3.30 (s, 3H), 3.16-3.05 (m, 1H), 2.08-2.00 (m, 2H), 1.86-1.80 (m, 2H), 1.63-1.53 (m, 2H), 1.28-1.18 (m, 2H); LCMS: (Method C) 301.2 [M+H], Rt. 0.80 min; HPLC: (Method A) Rt. 1.96 min.

Ex. 34: N-((1r,4r)-4-hydroxycyclohexyl)-2-(1H-imidazol-1-yl)pyrimidine-4-carboxamide

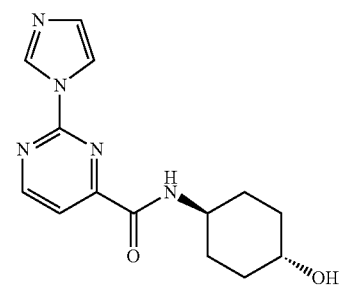 [SMILES: O=C(N[C@H]1CC[C@H](O)CC1)c1ccnc(-n2ccnc2)n1]

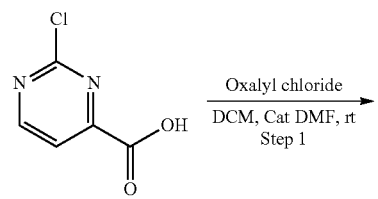

-continued

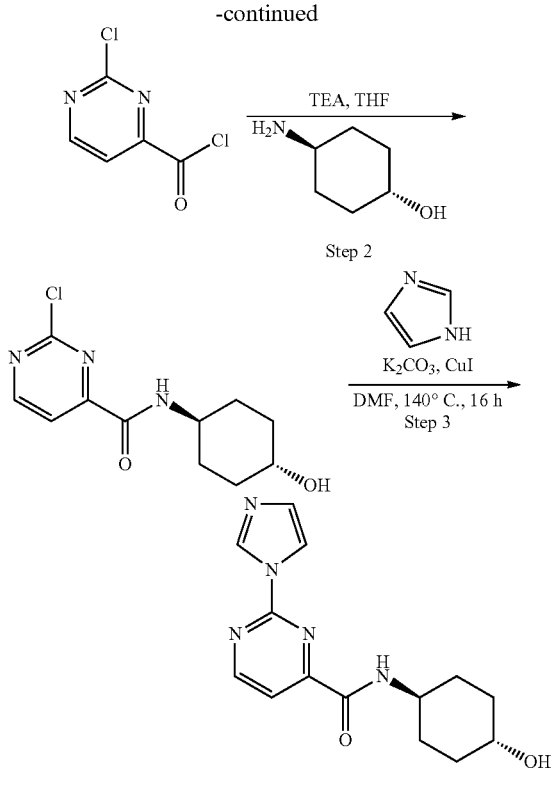

Step 1: 2-chloropyrimidine-4-carbonyl chloride

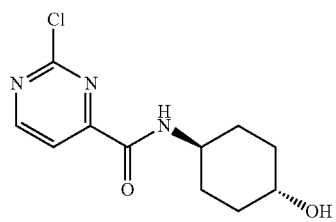 [SMILES: O=C(N[C@H]1CC[C@H](O)CC1)c1ccnc(Cl)n1]

To a stirred solution of 2-chloropyrimidine-4-carboxylic acid (300 mg, 1.89 mmol) and 1 drop of DMF in DCM (10 mL) at 0° C., oxalyl chloride (359 mg, 2.84 mmol) was added and the reaction mixture was stirred at RT for 3 h. The reaction mixture was monitored by TLC. After completion, the reaction mixture was concentrated under vacuum to get the title compound as crude material which was used without any purification in the next step. Yield: 95% (320 mg, Pale brown gum).

Step 2: 2-chloro-N-((1r,4r)-4-hydroxycyclohexyl) pyrimidine-4-carboxamide

To a stirred solution of 2-chloropyrimidine-4-carbonyl chloride (320 mg, 1.80 mmol) and TEA (0.75 mL, 5.42 mmol) in THF (10 mL) at 0° C. was added (1r,4r)-4-aminocyclohexan-1-ol (249 mg, 2.17 mmol) and the reaction mixture was stirred at RT for 16 h. The reaction mixture was monitored by TLC. After completion, the reaction mixture was quenched with sat. aq. NaHCO$_3$ solution (10 mL) and extracted with EtOAc (2×10 mL). The combined organic layer was washed with water (10 mL), brine (10 mL), dried over anhydrous Na$_2$SO$_4$ and filtered. The filtrate was concentrated under vacuum to afford the title compound which was used in the next step without further purification. Yield: 62% (260 mg, Brown gum). LCMS: (Method C) 256.2 [M+H], Rt. 0.97 min.

Step 3: N-((1r,4r)-4-hydroxycyclohexyl)-2-(1H-imidazol-1-yl)pyrimidine-4-carboxamide A suspension of 2-chloro-N-((1r,4r)-4-hydroxycyclohexyl)pyrimidine-4-carboxamide (250 mg, 0.98 mmol), imidazole (200 mg, 2.94 mmol), copper iodide (18 mg, 0.10 mmol) and K$_2$CO$_3$ (405 mg, 2.94 mmol) in DMF (3 mL) was purged with N$_2$ for 2 min and the reaction mixture was heated in a sealed tube at 140° C. overnight. After completion, (the reaction was monitored by TLC) the reaction mixture was diluted with DCM. The resulting mixture was filtered through Celite bed, the filtrate was concentrated under vacuum, and the resulting crude material was purified by prep HPLC (Method B). The prep-fraction was concentrated under reduced pressure. The residue was diluted with 10% MeOH in DCM (10 mL) and neutralized with 10% aq. NaHCO$_3$ solution (4 mL). The organic layer was separated and washed with brine and water. Then the organic layer was dried over anhydrous Na$_2$SO$_4$, filtered, concentrated under reduced pressure and finally lyophilized to get the title compound. Yield: 12% (33.1 mg, Off white solid). $^1$H NMR (400 MHz, DMSO-d$_6$): δ 9.06 (d, J=4.8 Hz, 1H), 8.97-8.96 (m, 1H), 8.84 (d, J=8.4 Hz, 1H), 8.24-8.23 (m, 1H), 7.91 (d, J=4.8 Hz, 1H), 7.19-7.18 (m, 1H), 4.63 (d, J=4.4 Hz, 1H), 3.83-3.80 (m, 1H), 3.49-3.42 (m, 1H), 1.91-1.88 (m, 2H), 1.81-1.79 (m, 2H), 1.59-1.50 (m, 2H), 1.29-1.26 (m, 2H). LCMS: (Method B) 288.4 [M+H], Rt. 1.44 min. HPLC: (Method B) Rt. 3.20 min.

Ex. 35: 2-(1H-imidazol-1-yl)-N-((1r,4r)-4-(2-methoxyethoxy)cyclohexyl)-6-methylpyrimidine-4-carboxamide

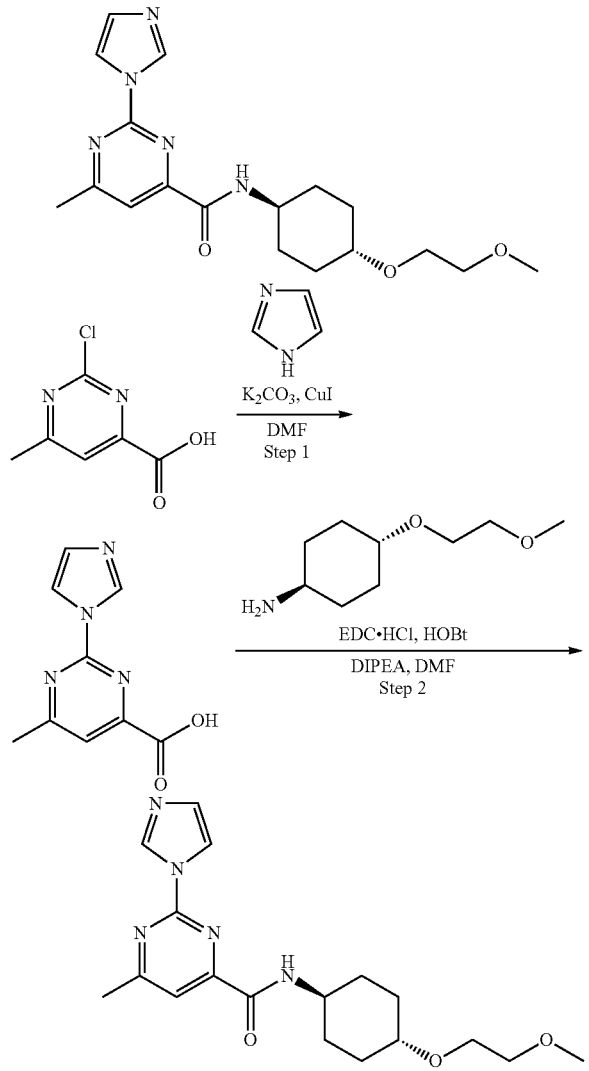

Step 1: 2-(1H-imidazol-1-yl)-6-methylpyrimidine-4-carboxylic acid

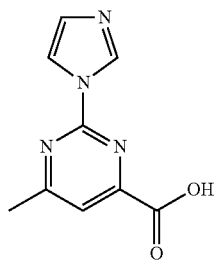

To a stirred solution of 2-chloro-6-methylpyrimidine-4-carboxylic acid (52 mg, 0.30 mmol, CAS No. 89581-58-8) (2 mL) and 1H-imidazole (62 mg, 0.90 mmol) in DMF was added $K_2CO_3$ (124 mg, 0.90 mmol) followed by CuI (5.78 mg, 0.03 mmol) and the resultant mixture was heated at 120° C. for 16 h. After completion, the reaction mixture was filtered through a pad of Celite and washed with Methanol (20 mL) and water (10 mL). All layers were concentrated under reduced vacuum to get crude product. The crude compound was re-dissolved in 1,4 Dioxane and acidified with 4M HCl in 1,4 Dioxane (3 mL). Then the solvent was evaporated under reduced pressure to give title compound as a hydrochloride salt. Yield: Crude product (75 mg, yellow solid). LCMS: (Method D) 205.1 [M+H], Rt. 0.52 min.

Step 2: 2-(1H-imidazol-1-yl)-N-((1r,4r)-4-(2-methoxyethoxy)cyclohexyl)-6-methylpyrimidine-4-carboxamide

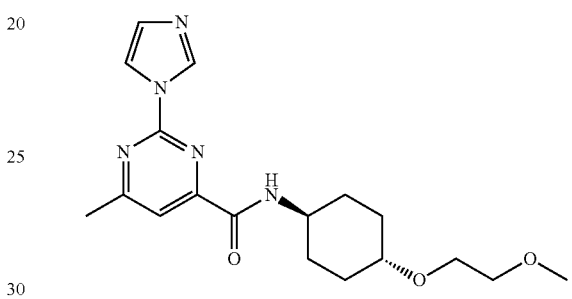

To a stirred solution of 2-(1H-imidazol-1-yl)-6-methylpyrimidine-4-carboxylic acid (71 mg, 0.34 mmol) in DMF (3 mL) was added HOBt (70 mg, 0.52 mmol), EDC·HCl (99.9 mg, 0.52 mmol) and DIPEA (0.16 mL, 0.86 mmol) at 0° C. under nitrogen atmosphere. Subsequently, (1r,4r)-4-(2-methoxyethoxy)cyclohexan-1-amine (90 mg, 0.52 mmol) was added and stirred at RT for 16 h. After completion, water (30 mL) was added to the reaction mixture and extracted with 10% MeOH in DCM (50 mL) washed with water (3×30 mL), dried over anhydrous $Na_2SO_4$, filtered and concentrated under vacuum to give crude product. The crude product was then purified by preparative HPLC (Method A) and the collected fractions were concentrated under reduced pressure. The product obtained was re-dissolved in 10% MeOH in DCM (35 mL), washed with 10% $NaHCO_3$ solution (15 mL), water (2×20 mL), dried over anhydrous $Na_2SO_4$ and concentrated under reduced pressure to give title compound. Yield: 25% (31.36 mg, pale brown solid); $^1$HNMR (400 MHz, DMSO-$d_6$): δ 8.94 (t, J=1.2 Hz, 1H), 8.79 (d, J=8.8 Hz, 1H), 8.20 (t, J=1.2 Hz, 1H), 7.83 (s, 1H), 7.17-7.16 (m, 1H), 3.86-3.80 (m, 1H), 3.57-3.50 (m, 2H), 3.45-3.39 (m, 2H), 3.34-3.24 (m, 4H), 2.08-2.00 (m, 2H), 1.85-1.80 (m, 2H), 1.61-1.52 (m, 2H), 1.30-1.22 (m, 2H); LCMS: (Method C) 360.0 [M+H], Rt. 1.9 min; HPLC: (Method A) Rt. 2.22 min.

The final product was characterized by X-ray powder diffraction, thermogravimetric analysis, and differential scanning calorimetry (DSC). The characterization results indicated that the product was crystalline, referred to herein as Polymorph Type A, which was further identified to be an anhydrate. The x-ray diffraction pattern is shown in FIG. 1 The x-ray diffraction peaks are listed in Table 1 below.

TABLE 1

Raw XRD diffraction data for Polymorph Type A

| Pos. [°2Th.] | Height [cts] | FWHM Left [°2Th.] | d-spacing [Å] | Rel. Int. [%] |
|---|---|---|---|---|
| 4.4033 | 20.26 | 0.9446 | 20.06794 | 1.08 |
| 7.3690 | 108.44 | 0.1574 | 11.99676 | 5.78 |
| 8.9317 | 104.00 | 0.1574 | 9.90100 | 5.54 |
| 9.3459 | 123.17 | 0.1181 | 9.46307 | 6.56 |
| 10.3571 | 99.21 | 0.1574 | 8.54133 | 5.29 |
| 11.9503 | 481.41 | 0.1771 | 7.40591 | 25.65 |
| 12.7024 | 348.62 | 0.1574 | 6.96906 | 18.58 |
| 13.9597 | 77.03 | 0.1574 | 6.34412 | 4.10 |
| 14.5452 | 390.13 | 0.1378 | 6.09000 | 20.79 |
| 14.8156 | 1876.74 | 0.0984 | 5.97946 | 100.00 |
| 14.9355 | 1794.30 | 0.0590 | 5.93173 | 95.61 |
| 15.6213 | 583.50 | 0.1378 | 5.67285 | 31.09 |
| 16.2470 | 143.63 | 0.1181 | 5.45576 | 7.65 |
| 16.5554 | 109.56 | 0.1181 | 5.35482 | 5.84 |
| 17.3861 | 104.21 | 0.1574 | 5.10077 | 5.55 |
| 17.8801 | 88.87 | 0.1968 | 4.96096 | 4.74 |
| 19.3340 | 781.59 | 0.2558 | 4.59106 | 41.65 |
| 19.7004 | 136.15 | 0.1181 | 4.50649 | 7.25 |
| 20.7274 | 176.58 | 0.2755 | 4.28546 | 9.41 |
| 21.1979 | 78.71 | 0.1574 | 4.19140 | 4.19 |
| 21.9787 | 502.52 | 0.1968 | 4.04422 | 26.78 |
| 22.2005 | 288.79 | 0.0984 | 4.00431 | 15.39 |
| 22.4712 | 362.72 | 0.1378 | 3.95669 | 19.33 |
| 22.8918 | 130.16 | 0.1968 | 3.88493 | 6.94 |
| 23.4167 | 82.59 | 0.2362 | 3.79903 | 4.40 |
| 24.3701 | 197.28 | 0.1574 | 3.65252 | 10.51 |
| 24.8568 | 57.44 | 0.1968 | 3.58209 | 3.06 |
| 25.6139 | 63.92 | 0.1574 | 3.47790 | 3.41 |
| 26.5776 | 50.13 | 0.2362 | 3.35395 | 2.67 |
| 27.1542 | 317.69 | 0.1771 | 3.28403 | 16.93 |
| 28.2164 | 71.84 | 0.1181 | 3.16277 | 3.83 |
| 29.3757 | 47.05 | 0.5510 | 3.04054 | 2.51 |
| 36.2590 | 19.73 | 0.2362 | 2.47757 | 1.05 |
| 37.4344 | 22.84 | 0.2362 | 2.40244 | 1.22 |
| 38.5170 | 20.00 | 0.3936 | 2.33737 | 1.07 |

Figure 2:
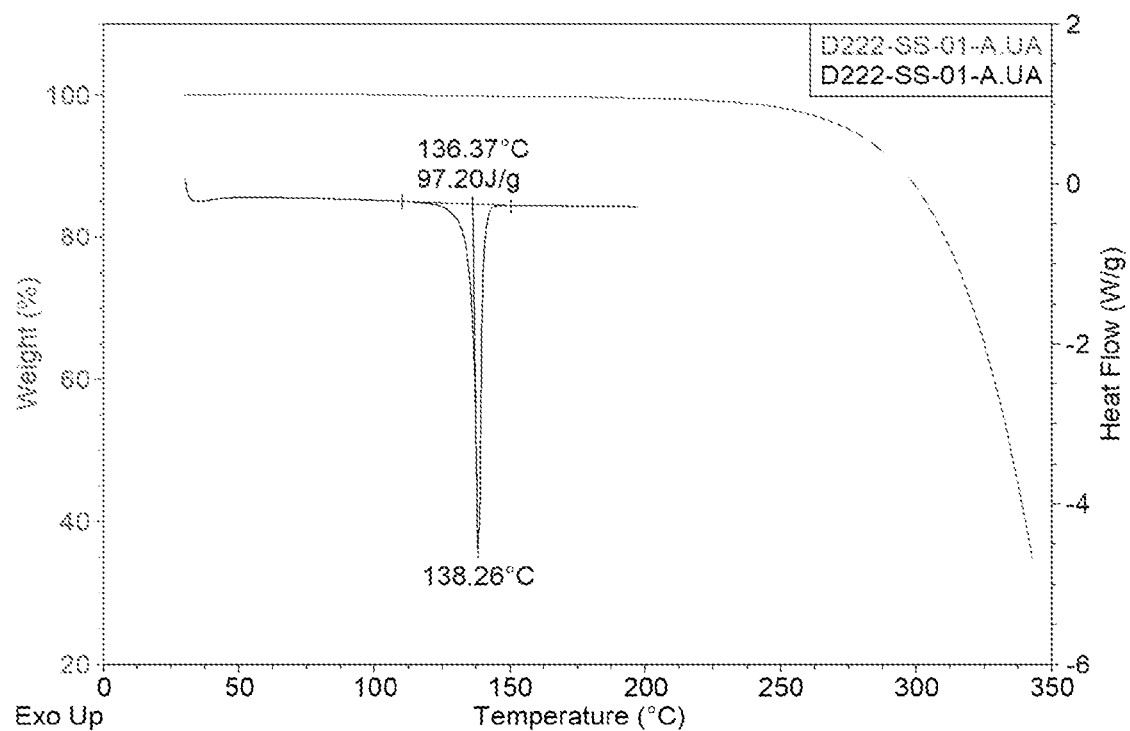
FIG. 2 is a combined graph of thermogravimetric analysis (TGA) and differential scanning calorimetry (DSC) of 2-(1H-imidazol-1-yl)-N-((1r,4r)-4-(2-methoxyethoxy)cyclohexyl)-6-methylpyrimidine-4-carboxamide Polymorph Type A.

Results of thermogravimetric analysis (TGA) and differential scanning calorimetry (DSC) are shown in FIG. 2. TGA (top curve, left axis) shows minimal weight loss before decomposition, and DSC (bottom curve, right axis) shows one sharp melting peak at 136.4° C. (onset) before decomposition, indicating that the material is an anhydrate.

Polymorphic Form A could also be obtained by dissolving about 15 mg of the compound in 0.4-3.0 mL of methanol, ethanol, acetone, THF, 1,4 dioxane, ACN, DMF, or DMSO to obtain clear solutions. The solution was magnetically stirred followed by stepwise addition of 0.2-0.5 mL water as the anti-solvent till precipitate appeared or the total amount of anti-solvent reached 15.0 mL. Alternately, clear solutions were obtained in isopropyl alcohol, acetone, MIBK, EtOAc, THF, DCM, MTBE, or toluene; and n-heptane was used as the anti-solvent. Alternately, clear solutions were obtained in ethanol MEK, isopropanol, CPME, 2-MeTHF, trichloromethane and anisole 3:1, and n-hexane was used as the antisolvent. XRPD showed that in all cases, Polymorph Type A was obtained.

Polymorphic Form A could also be obtained by dissolving about 15 mg of starting material in 0.6-2.0 mL of solvents in a 4-mL glass vial. Solvents used were methanol, ethanol, acetone, ethyl acetate, THF, MTBE, ACN, and DCM/n-heptane (3:1). If no dissolution was achieved, suspensions were filtered using a Nylon membrane (pore size of 0.22 m) and the filtrates were used for the following steps. Then the visually clear solutions were covered by Parafilm® with 4-8 pinholes and subjected to evaporation at RT. XRPD showed that in all cases, Polymorph Type A was obtained.

Figure 3:
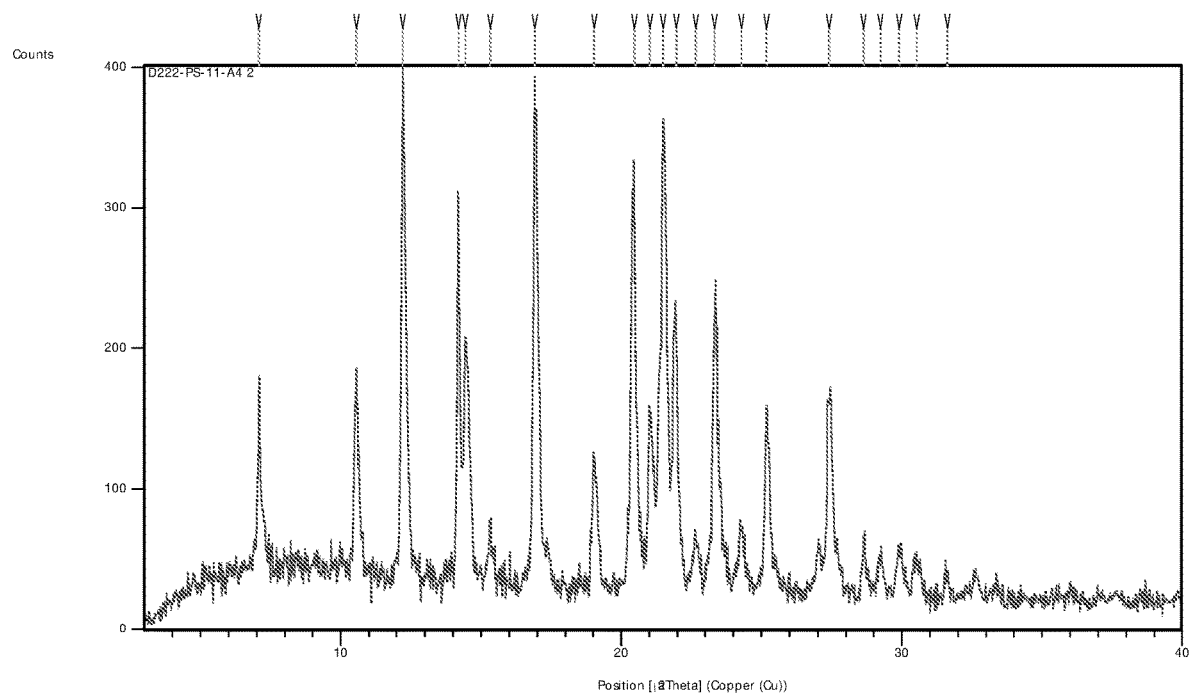
FIG. 3 is an X-ray powder diffraction (XRPD) pattern of 2-(1H-imidazol-1-yl)-N-((1r,4r)-4-(2-methoxyethoxy)cyclohexyl)-6-methylpyrimidine-4-carboxamide Polymorph Type B.

A second polymorphic form, referred to herein as Polymorph Type B, was produced via reverse anti-solvent addition of the compound in toluene/n-heptane system at room temperature. The x-ray diffraction pattern is shown in FIG. 3. The x-ray diffraction peaks are shown in Table 2 below.

TABLE 2

Raw XRD diffraction data for Polymorph Type B

| Pos. [°2Th.] | Height [cts] | FWHM Left [°2Th.] | d-spacing [Å] | Rel. Int. [%] |
|---|---|---|---|---|
| 7.0786 | 138.65 | 0.0787 | 12.48819 | 38.77 |
| 10.5585 | 146.05 | 0.1181 | 8.37881 | 40.83 |
| 12.2088 | 357.66 | 0.1378 | 7.24971 | 100.00 |
| 14.1833 | 278.85 | 0.0787 | 6.24458 | 77.97 |
| 14.4398 | 173.68 | 0.1574 | 6.13425 | 48.56 |
| 15.3296 | 33.24 | 0.2362 | 5.78010 | 9.29 |
| 16.9127 | 353.79 | 0.1378 | 5.24249 | 98.92 |
| 19.0575 | 93.07 | 0.2362 | 4.65703 | 26.02 |
| 20.4734 | 271.57 | 0.1574 | 4.33805 | 75.93 |
| 21.0322 | 124.67 | 0.1574 | 4.22403 | 34.86 |
| 21.4978 | 332.26 | 0.1181 | 4.13360 | 92.90 |
| 21.9560 | 183.50 | 0.1181 | 4.04836 | 51.31 |
| 22.6625 | 35.70 | 0.2362 | 3.92372 | 9.98 |
| 23.3303 | 199.31 | 0.0984 | 3.81290 | 55.73 |
| 24.2765 | 48.39 | 0.1574 | 3.66639 | 13.53 |
| 25.1645 | 133.23 | 0.0984 | 3.53900 | 37.25 |
| 27.4009 | 139.22 | 0.1968 | 3.25502 | 38.92 |
| 28.6231 | 36.38 | 0.1574 | 3.11874 | 10.17 |
| 29.2521 | 26.95 | 0.2362 | 3.05310 | 7.54 |
| 29.9200 | 29.34 | 0.2362 | 2.98645 | 8.20 |
| 30.5466 | 24.30 | 0.2362 | 2.92661 | 6.79 |
| 31.6335 | 15.24 | 0.2362 | 2.82849 | 4.26 |

Figure 4:
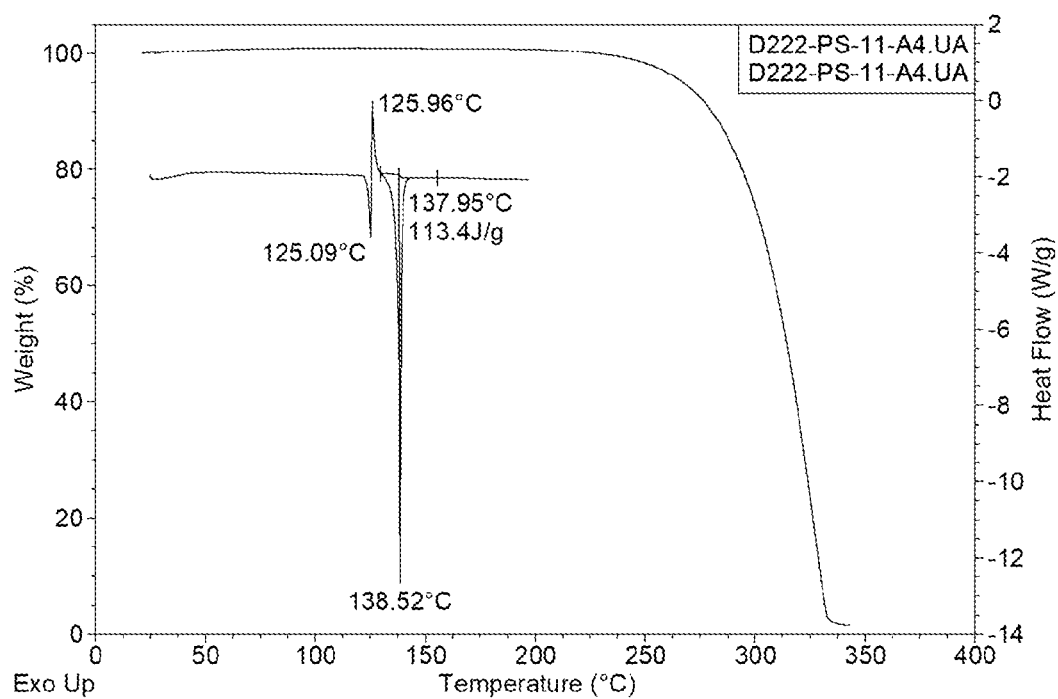
FIG. 4 is a combined graph of thermogravimetric analysis (TGA) and differential scanning calorimetry (DSC) of 2-(1H-imidazol-1-yl)-N-((1r,4r)-4-(2-methoxyethoxy)cyclohexyl)-6-methylpyrimidine-4-carboxamide Polymorph Type B.

In FIG. 4, Polymorph Type B exhibited a negligible weight loss before decomposition by TGA (top curve, left axis), and DSC (bottom curve, right axis) showed two endothermic peaks at 123.8° C. and 137.9° C. (onset) and an exothermic peak at 125.6° C. (onset). All the data indicated Polymorph Type B is an anhydrate.

Ex. 36: 2-(1H-imidazol-1-yl)-N-((1r,4r)-4-(2-methoxyethoxy)cyclohexyl)-6-(trifluoromethyl)pyrimidine-4-carboxamide

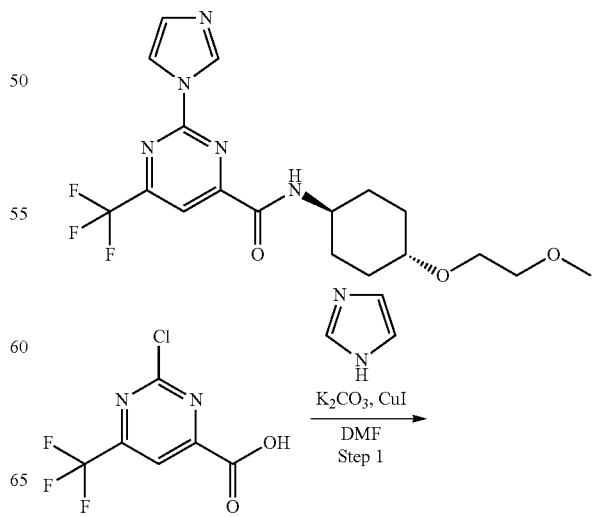

-continued

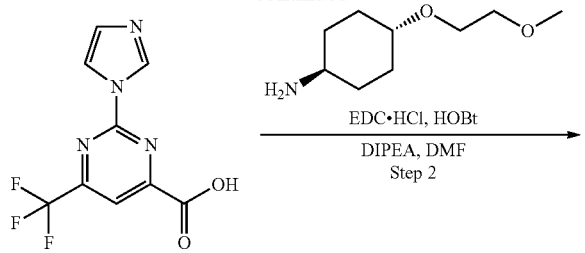

Step 1: 2-(1H-imidazol-1-yl)-6-(trifluoromethyl)pyrimidine-4-carboxylic acid

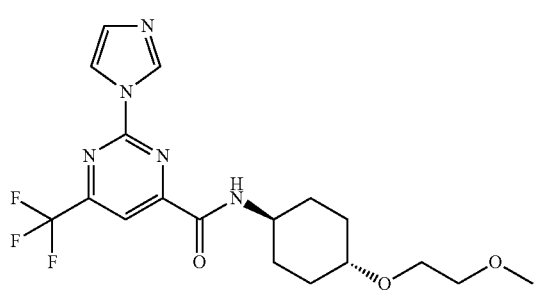 [SMILES: COCCO[C@H]1CC[C@H](NC(=O)c2cc(C(F)(F)F)nc(-n3ccnc3)n2)CC1]

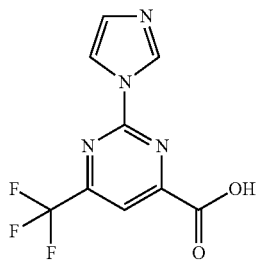 [SMILES: O=C(O)c1cc(C(F)(F)F)nc(-n2ccnc2)n1]

To a stirred solution of 2-chloro-6-(trifluoromethyl)pyrimidine-4-carboxylic acid (71 mg, 0.31 mmol) and 1H-imidazole (64 mg, 0.94 mmol) in DMF (2 mL) was added $K_2CO_3$ (129 mg, 0.94 mmol) followed by CuI (5.96 mg, 0.03 mmol) and the resultant mixture was heated at 120° C. for 16 h. After completion, the reaction mixture was filtered through a pad of Celite and washed with Methanol (50 mL) and water (10 mL). All layers were concentrated under reduced vacuum to get crude product. The crude product was re-dissolved in 1,4 dioxane (2 mL) was added 4M HCl in 1,4-dioxane (5 mL) and the solvent was evaporated to give title compound as a hydrochloride salt. Yield: Crude product (75 mg, yellow solid). LCMS: (Method D) 259.0 [M+H], Rt. 1.30 min.

Step 2: 2-(1H-imidazol-1-yl)-N-((1r,4r)-4-(2-methoxyethoxy)cyclohexyl)-6-(trifluoromethyl)pyrimidine-4-carboxamide

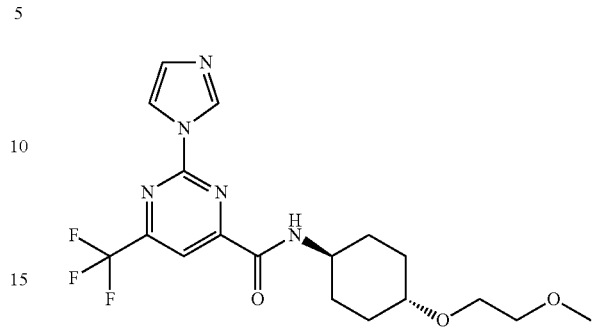

To a stirred solution of 2-(1H-imidazol-1-yl)-6-(trifluoromethyl)pyrimidine-4-carboxylic acid (71 mg, 0.27 mmol) in DMF (2 mL) at 0° C. was added EDC·HCl (79 mg, 0.41 mmol), HOBt (55 mg, 0.41 mmol) followed by DIPEA (0.12 mL, 0.68 mmol) under nitrogen atmosphere. Subsequently, (1r,4r)-4-(2-methoxyethoxy)cyclohexan-1-amine (57 mg, 0.33 mmol) was added and stirred for 16 h. After completion, water (30 mL) was added to the reaction mixture, extracted with 10% MeOH in DCM (50 mL), washed with water (3×30 mL) dried over anhydrous $Na_2SO_4$ and concentrated under vacuum to give crude product. The crude product was then purified by preparative HPLC (Method A) and the collected fractions were concentrated under reduced pressure. The obtained product was re-dissolved in 10% MeOH in DCM (35 mL), washed with 10% $NaHCO_3$ solution (15 mL), water (2×20 mL) and dried over anhydrous $Na_2SO_4$ concentrated under reduced pressure to give title compound. Yield: 20% (23.26 mg, pale brown solid); $^1$HNMR (400 MHz, DMSO-$d_6$): δ 9.07 (s, 1H), 9.01 (d, J=8.4 Hz, 1H), 8.24 (s, 1H), 8.19 (s, 1H), 7.25 (s, 1H), 3.90-3.86 (m, 1H), 3.57-3.55 (m, 2H), 3.51-3.42 (m, 2H), 3.36-3.26 (m, 4H), 2.08-2.05 (m, 2H), 1.87-1.80 (m, 2H), 1.63-1.54 (m, 2H), 1.32-1.24 (m, 2H); LCMS: (Method C) 414.0 [M+H], Rt. 1.84 min. HPLC: (Method A) Rt. 2.74 min.

Ex. 37: 6-(1H-imidazol-1-yl)-N-((1r,4r)-4-(2-methoxyethoxy) cyclohexyl)-4-(methylthio)picolinamide

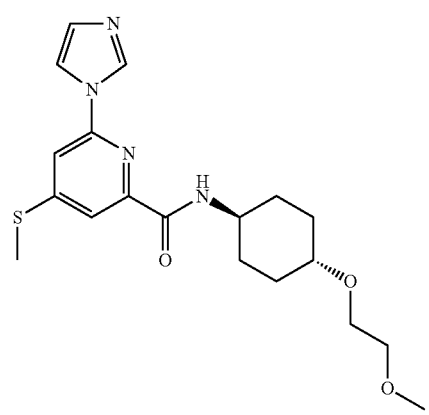

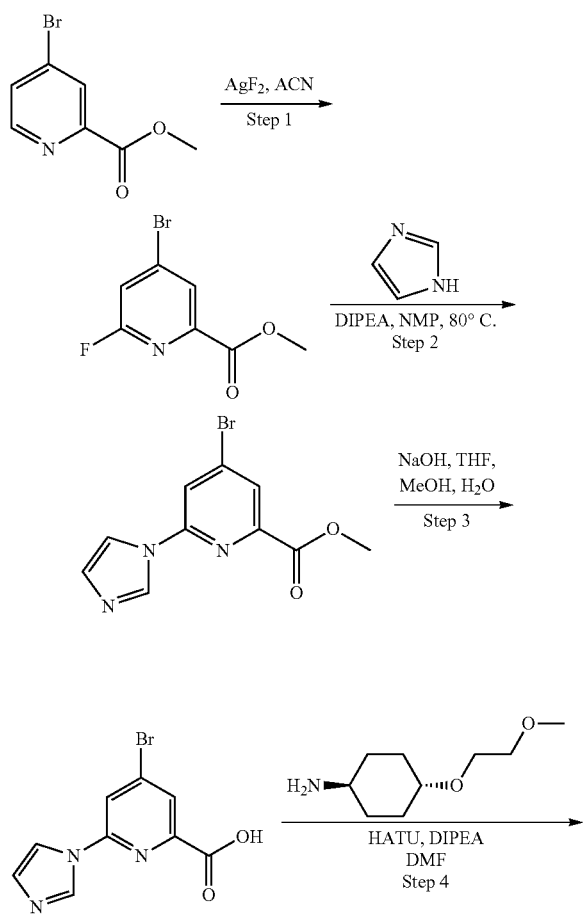

Step 1: Methyl 4-bromo-6-fluoropicolinate

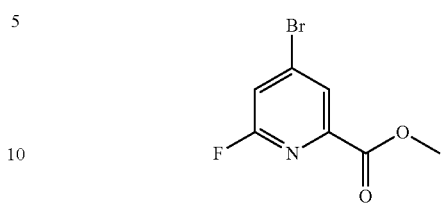

To a stirred solution of methyl 4-bromopicolinate (2.7 g, 12.5 mmol) in acetonitrile (30 mL), AgF$_2$ (5.46 g, 37.5 mmol) was added in one portion and stirred at same RT for 16 h. The progress of the reaction was monitored by TLC and quenched with 10% aq. NaHCO$_3$ (20 mL). The resulting suspension was extracted with EtOAc (3×25 mL). The combined organic layer was washed with water (20 mL), brine (20 mL), dried over anhydrous Na$_2$SO$_4$ and the solvent was evaporated under vacuum. The crude residue was purified by column chromatography on Biotage Isolera (100-200 mesh silica gel eluting with 0-10% EtOAc in pet ether) to afford the title compound. Yield: 27% (860 mg, White solid). $^1$H NMR (400 MHz, DMSO-d$_6$): δ 8.18-8.17 (m, 1H), 7.98-7.97 (m, 1H), 3.93 (s, 3H). LCMS: (Method C) 233.9 (M+H) and 235.9 (M+H), Rt. 2.02 min.

Step 2: Methyl 4-bromo-6-(1H-imidazol-1-yl)picolinate

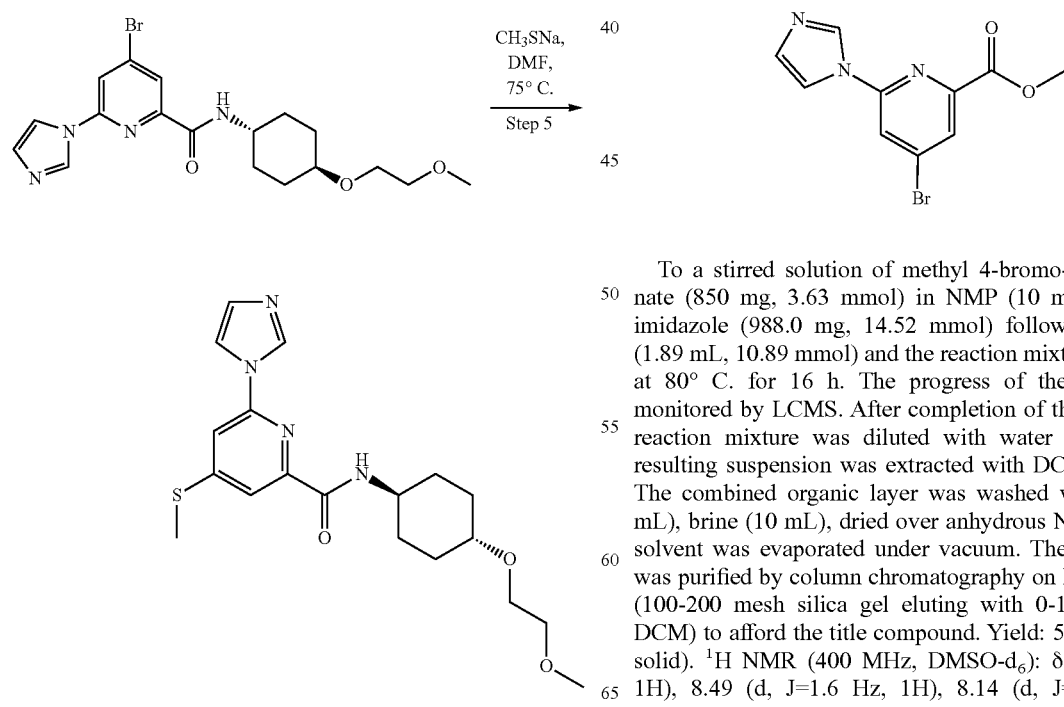

To a stirred solution of methyl 4-bromo-6-fluoropicolinate (850 mg, 3.63 mmol) in NMP (10 mL) was added imidazole (988.0 mg, 14.52 mmol) followed by DIPEA (1.89 mL, 10.89 mmol) and the reaction mixture was heated at 80° C. for 16 h. The progress of the reaction was monitored by LCMS. After completion of the reaction, the reaction mixture was diluted with water (10 mL). The resulting suspension was extracted with DCM (3×25 mL). The combined organic layer was washed with water (10 mL), brine (10 mL), dried over anhydrous Na$_2$SO$_4$ and the solvent was evaporated under vacuum. The crude residue was purified by column chromatography on Biotage Isolera (100-200 mesh silica gel eluting with 0-10% MeOH in DCM) to afford the title compound. Yield: 54% (550.1 mg, solid). $^1$H NMR (400 MHz, DMSO-d$_6$): δ 8.60-8.59 (m, 1H), 8.49 (d, J=1.6 Hz, 1H), 8.14 (d, J=1.6 Hz, 1H), 8.02-8.01 (m, 1H), 7.17-7.16 (m, 1H), 3.93 (s, 3H). LCMS: (Method C) 283.9 (M+H), Rt. 0.70 min.

Step 3: 4-Bromo-6-(1H-imidazol-1-yl)picolinic acid

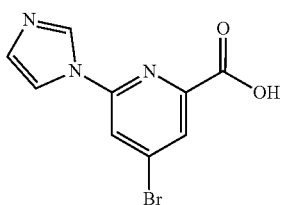 [SMILES: O=C(O)c1cc(Br)cc(-n2ccnc2)n1]

To a stirred solution of methyl 4-bromo-6-(1H-imidazol-1-yl)picolinate (540 mg, 1.91 mmol) in MeOH (3 mL), THF (3 mL) and water (2 mL) was added NaOH (229.7 mg, 5.74 mmol) at RT and the reaction mixture was stirred at the same temperature for 4 h. The progress of the reaction was monitored by TLC and observed complete consumption of starting material. The reaction mixture was concentrated under vacuum and the residue was acidified with 3 N HCl solution (20 mL). The resulting solid was collected by filtration and dried to afford the title compound. Yield: 66% (340.1 mg, solid). $^1$H NMR (400 MHz, DMSO-$d_6$): δ 13.70 (bs, 1H), 8.67 (s, 1H), 8.46 (d, J=1.6 Hz, 1H), 8.11 (d, J=1.2 Hz, 1H), 8.08 (d, J=1.2 Hz, 1H), 7.16 (s, 1H). LCMS: (Method C) 269.9 (M+H), Rt. 0.24 min.

Step 4: 4-Bromo-6-(1H-imidazol-1-yl)-N-((1r,4r)-4-(2-methoxyethoxy) cyclohexyl) picolinamide

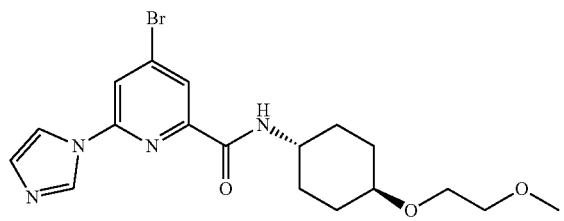 [SMILES: COCCO[C@H]1CC[C@H](NC(=O)c2cc(Br)cc(-n3ccnc3)n2)CC1]

To a stirred solution of 4-bromo-6-(1H-imidazol-1-yl) picolinic acid (330 mg, 1.231 mmol) in DMF (3 mL) were added DIPEA (0.64 mL, 3.69 mmol) and HATU (701.8 mg, 1.847 mmol) at RT. After stirring for 5 min, a solution of (1r,4r)-4-(2-methoxyethoxy) cyclohexan-1-amine (255.6 mg, 1.477 mmol) in DMF (0.5 mL) was added at the same temperature. Further, reaction was stirred at RT for 16 h. The progress of the reaction was monitored by TLC and the reaction mixture was diluted with water (25 mL). The resulting suspension was extracted with EtOAc (3×25 mL). The combined organic layer was washed with water (20 mL), brine (20 mL), dried over anhydrous Na$_2$SO$_4$ and the solvent was evaporated under vacuum. The crude residue was purified by column chromatography on Biotage Isolera (100-200 mesh silica gel, eluting with 0-60% EtOAc in pet ether) to afford the title compound Yield: 53% (280 mg, Yellow solid). $^1$H NMR (400 MHz, DMSO-$d_6$): δ 8.99 (s, 1H), 8.62 (d, J=8.7 Hz, 1H), 8.39 (d, J=1.5 Hz, 1H), 8.31 (d, J=1.2 Hz, 1H), 8.04 (d, J=1.2 Hz, 1H), 7.17 (s, 1H), 3.89-3.83 (m, 1H), 3.57-3.50 (m, 2H), 3.44-3.41 (m, 2H), 3.33-3.23 (m, 4H), 2.06-2.02 (m, 2H), 1.84-1.81 (m, 2H), 1.59-1.55 (m, 2H), 1.30-1.24 (m, 2H). LCMS: (Method C) 423.0 (M+H) and 425.0 (M+H), Rt. 1.27 min.

Step 5: 6-(1H-imidazol-1-yl)-N-((1r,4r)-4-(2-methoxyethoxy) cyclohexyl)-4-(methylthio)picolinamide

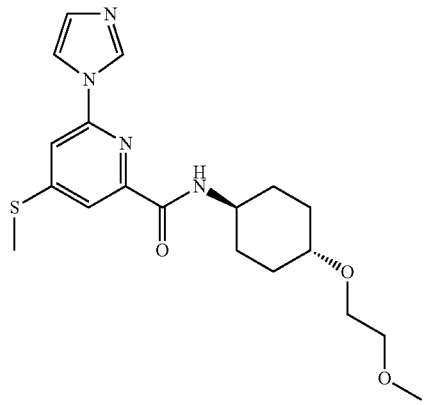 [SMILES: COCCO[C@H]1CC[C@H](NC(=O)c2cc(SC)cc(-n3ccnc3)n2)CC1]

To a stirred solution of 4-bromo-6-(1H-imidazol-1-yl)-N-((1r,4r)-4-(2-methoxyethoxy)cyclohexyl)picolinamide (100 mg, 0.236 mmol) in DMF (12 mL) was added sodium thiomethoxide (33.13 mg, 0.47 mmol) and the reaction mixture was heated at 75° C. for 6 h, the reaction was monitored by LCMS. After the reaction was completed, the reaction mixture was diluted with water (10 mL). The resulting suspension was extracted with DCM (3×25 mL). The combined organic layer was washed with water (10 mL), brine (10 mL), dried over anhydrous Na$_2$SO$_4$ and solvent was evaporated under vacuum. The crude residue was purified by prep HPLC (Method A). The prep fraction was concentered to the aqueous phase, added DCM and neutralized with 10% NaHCO$_3$ aqueous solution. The phases were separated. The organic phase was washed with water, brine, dried over anhydrous Na$_2$SO$_4$ and evaporated to afford the title compound. Yield: 34% (32 mg, Gummy Solid), $^1$H NMR (400 MHz, DMSO-$d_6$): δ 8.95 (s, 1H), 8.54 (d, J=8.0 Hz, 1H), 8.29-8.28 (m, 1H), 7.77 (d, J=1.6 Hz, 1H), 7.73 (d, J=1.2 Hz, 1H), 7.14 (s, 1H), 3.83-3.81 (m, 1H), 3.56-3.54 (m, 2H), 3.44-3.42 (m, 2H), 3.30-3.23 (m, 4H), 2.67 (s, 3H), 2.05-2.02 (m, 2H), 1.84-1.81 (m, 2H), 1.61-1.52 (m, 2H), 1.29-1.23 (m, 2H). LCMS: (Method C) 391.0 (M+H), Rt. 1.23 min. HPLC: (Method A) Rt. 2.53 min.

Ex. 38: 4-(1-Hydroxyethyl)-6-(1H-imidazol-1-yl)-N-((1r,4r)-4-(2-methoxyethoxy)cyclohexyl)picolinamide

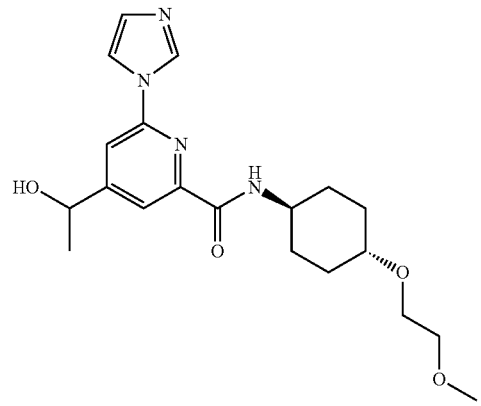 [SMILES: COCCO[C@H]1CC[C@H](NC(=O)c2cc(C(C)O)cc(-n3ccnc3)n2)CC1]

115

-continued

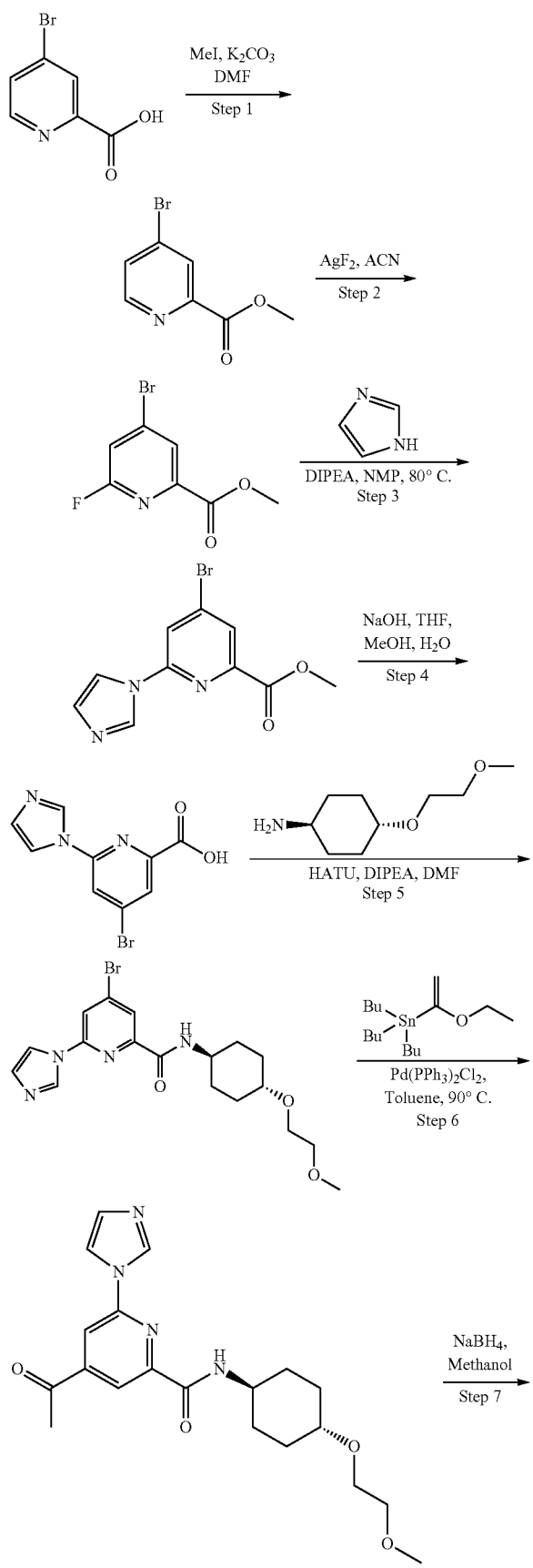

116

-continued

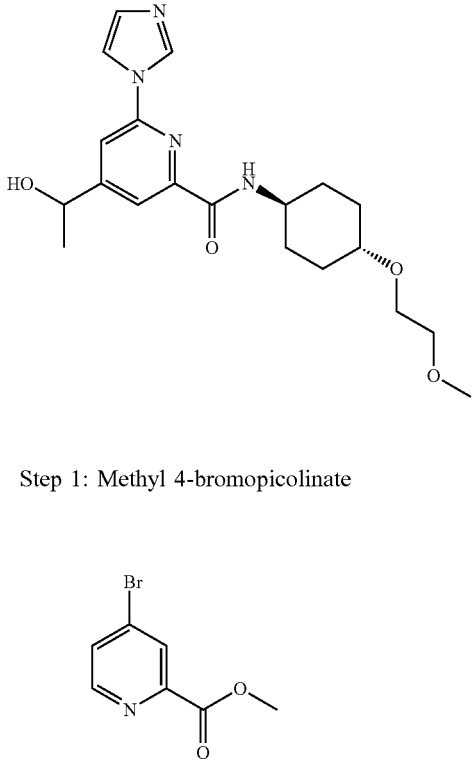

Step 1: Methyl 4-bromopicolinate

To a stirred solution of 4-bromopicolinic acid (10 g, 49.50 mmol) in DMF (80 mL) was added K$_2$CO$_3$ (20.49 g, 148.51 mmol) in one portion and the reaction mixture was stirred at RT for 10 min, then added MeI (42.17 g, 297.0 mmol) slowly and the reaction mixture was stirred at RT for 30 h in a sealed tube. The progress of the reaction was monitored by TLC. After completion, the reaction mixture was quenched with water (150 mL). The resulting suspension was extracted with EtOAc (3×100 mL). The combined organic layer was washed with water (100 mL), brine (100 mL), dried over anhydrous Na$_2$SO$_4$ and the solvent was evaporated under vacuum. The crude residue was purified by column chromatography on Biotage Isolera (100-200 mesh silica gel, eluting with 0-20% EtOAc in pet ether) to afford the title compound. Yield: 77% (8.23 g, White Solid). $^1$H NMR (300 MHz, DMSO-d$_6$): δ 8.61 (d, J=5.1 Hz, 1H), 8.21-8.20 (m, 1H), 7.98-7.96 (m, 1H), 3.90 (s, 3H). LCMS: (Method C) 218.0 (M+H), Rt. 1.33 min.

Step 2: Methyl 4-bromo-6-fluoropicolinate

To a stirred solution of methyl 4-bromopicolinate (3.3 g, 15.27 mmol) in acetonitrile (40 mL), AgF$_2$ (6.68 g, 45.83 mmol) was added in one portion and the reaction mixture was stirred at RT for 6 h. The reaction was monitored by TLC. After completion, the reaction mixture was quenched with 10% aq. NaHCO$_3$ (20 mL). The resulting suspension was extracted with EtOAc (3×100 mL). The combined organic layer was washed with water (100 mL), brine (100 mL), dried over anhydrous Na$_2$SO$_4$ and the solvent was evaporated under vacuum. The crude residue was purified by column chromatography on Biotage Isolera (100-200 mesh silica gel, eluting with 0-10% EtOAc in pet ether) to afford the title compound. Yield 34% (1.23 g, White Solid). $^1$H NMR (400 MHz, DMSO-d$_6$): δ 8.18-8.17 (m, 1H), 7.98-7.97 (m, 1H), 3.90 (s, 3H). LCMS: (Method C) 233.9 (M+H), Rt. 1.81 min.

Step 3: Methyl 4-bromo-6-(1H-imidazol-1-yl)picolinate

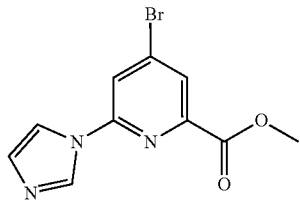 [SMILES: COC(=O)c1cc(Br)cc(-n2ccnc2)n1]

To a stirred solution of methyl 4-bromo-6-fluoropicolinate (1.8 g, 7.69 mmol) in NMP (10 mL) was added imidazole (2.09 g, 30.76 mmol) followed by DIPEA (4.0 mL, 23.07 mmol) and the reaction mixture was heated at 80° C. for 16 h. The reaction was monitored by LCMS. After completion, the reaction mixture was diluted with water (10 mL). The resulting suspension was extracted with DCM (3×50 mL). The combined organic layer was washed with water (50 mL), brine (50 mL), dried over anhydrous Na$_2$SO$_4$ and the solvent was evaporated under vacuum. The crude residue was purified by column chromatography on Biotage Isolera (100-200 mesh silica gel eluting with 0-10% MeOH in DCM) to afford the title compound. Yield 74% (1.6 g, solid). $^1$H NMR (400 MHz, DMSO-d$_6$): δ 8.60-8.59 (m, 1H), 8.49 (d, J=1.2 Hz, 1H), 8.14 (d, J=1.6 Hz, 1H), 8.02-8.01 (m, 1H), 7.17-7.16 (m, 1H), 3.93 (s, 3H). LCMS: (Method A) 283.9 (M+H), Rt. 0.54 min.

Step 4: 4-Bromo-6-(1H-imidazol-1-yl) picolinic acid

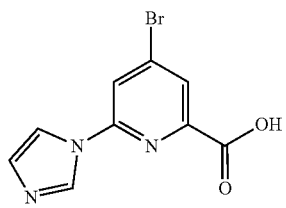 [SMILES: O=C(O)c1cc(Br)cc(-n2ccnc2)n1]

To a stirred solution of methyl 4-bromo-6-(1H-imidazol-1-yl)picolinate (1.56 g, 5.53 mmol) in MeOH (9 mL), THF (9 mL) and water (6 mL) was added NaOH (664 mg, 16.59 mmol) at RT and the reaction mixture was stirred at the same temperature for 4 h. The reaction mixture was monitored by TLC, starting material was consumed. The reaction mixture was concentrated under vacuum and acidified with 3 N aq. HCl solution (20 mL). The resulting solid was collected by filtration and dried to afford the title compound. Yield: 94% (1.39 g, Solid). $^1$H NMR (300 MHz, DMSO-d$_6$): δ 9.94 (s, 1H), 8.72 (d, J=1.5 Hz, 1H), 8.50-8.49 (m, 1H), 8.32 (d, J=1.5 Hz, 1H), 7.84 (s, 1H). LCMS: (Method B) 270.6 (M+H), Rt. 1.02 min.

Step 5: 4-Bromo-6-(1H-imidazol-1-yl)-N-((1r,4r)-4-(2-methoxyethoxy)cyclohexyl)picolinamide

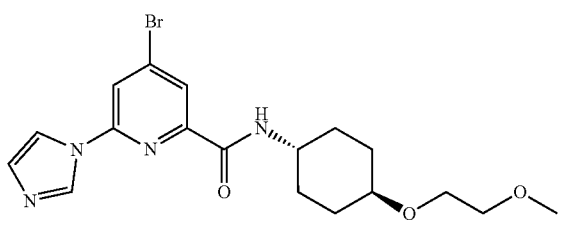 [SMILES: COCCO[C@H]1CC[C@H](NC(=O)c2cc(Br)cc(-n3ccnc3)n2)CC1]

To a stirred solution of 4-bromo-6-(1H-imidazol-1-yl) picolinic acid (1.35 g, 5.04 mmol) in DMF (20 mL) were added DIPEA (2.64 mL, 15.10 mmol) and HATU (2.87 g, 7.553 mmol) at RT. After stirring for 5 min, a solution of (1r,4r)-4-(2-methoxyethoxy)cyclohexan-1-amine (1.3 g, 7.55 mmol) in DMF (0.5 mL) was added and the reaction mixture was stirred at RT for 16 h. The reaction mixture was monitored by TLC and was diluted with water (25 mL) after completion. The resulting suspension was extracted with EtOAc (3×50 mL). The combined organic layer was washed with water (50 mL), brine (50 mL), dried over anhydrous Na$_2$SO$_4$ and the solvent was evaporated under vacuum. The crude residue was purified by column chromatography on Biotage Isolera (100-200 mesh silica gel eluting with 0-60% EtOAc in pet ether) to afford the title compound. Yield: 52% (1.2 g, Yellow solid). $^1$H NMR (300 MHz, DMSO-d$_6$): δ 8.98 (s, 1H), 8.62 (d, J=8.7 Hz, 1H), 8.39 (d, J=1.5 Hz, 1H), 8.31-8.30 (m, 1H), 8.04 (d, J=1.5 Hz, 1H), 7.17 (s, 1H), 3.84-3.80 (m, 1H), 3.56-3.50 (m, 2H), 3.44-3.41 (m, 2H), 3.23 (s, 4H), 2.05-2.03 (m, 2H), 1.83-1.80 (m, 2H), 1.62-1.51 (m, 2H), 1.29-1.23 (m, 2H). LCMS: (Method C) 425.0 (M+H), Rt. 1.21 min.

Step 6: 4-Acetyl-6-(1H-imidazol-1-yl)-N-((1r,4r)-4-(2-ethoxyethoxy)cyclohexyl)picolinamide

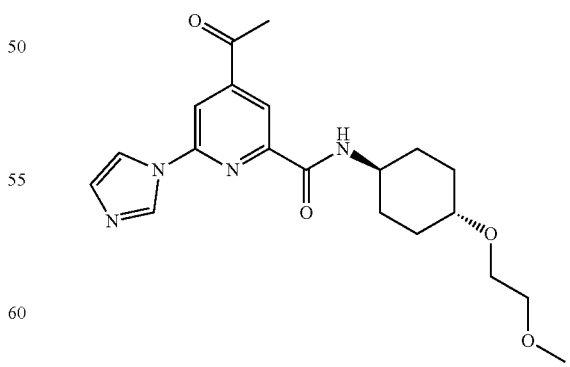

A mixture of 4-bromo-6-(1H-imidazol-1-yl)-N-((1r,4r)-4-(2-ethoxyethoxy)cyclohexyl)picolinamide (400 mg, 0.95 mmol) and tributyl(1-ethoxyvinyl)tin (409 mg, 1.13 mmol) in toluene (8 mL) at RT was purged with nitrogen gas for 5 min. Then Pd(PPh$_3$)$_2$Cl$_2$ (28.9 mg, 0.04 mmol) was added and the reaction mixture was heated at 90° C. for 16 h. The reaction was monitored by TLC and complete conversion of starting material was observed. The reaction mixture was filtered through Celite bed and washed with DCM (20 mL). The solvent was evaporated under vacuum and the crude residue was purified by column chromatography on Biotage Isolera (100-200 mesh silica gel eluting with 0-10% MeOH in DCM) to afford the title compound. Yield: 87% (320 mg, Yellow solid). $^1$H NMR (400 MHz, DMSO-d$_6$): δ 9.05 (d, J=0.8 Hz, 1H), 8.63 (d, J=8.8 Hz, 1H), 8.40-8.39 (m, 1H), 8.34 (d, J=1.2 Hz, 1H), 8.27-8.25 (m, 1H), 7.19 (s, 1H), 3.88-3.85 (m, 1H), 3.57-3.55 (m, 2H), 3.45-3.43 (m, 2H), 3.31-3.24 (m, 4H), 2.74 (s, 3H), 2.07-2.04 (m, 2H), 1.91-1.84 (m, 2H), 1.61-1.57 (m, 2H), 1.31-1.25 (m, 2H). LCMS: (Method C) 387.2 (M+H), Rt.1.04 min.

Step 7: 4-(1-Hydroxyethyl)-6-(1H-imidazol-1-yl)-N-((1r,4r)-4-(2-methoxyethoxy)cyclohexyl)picolinamide

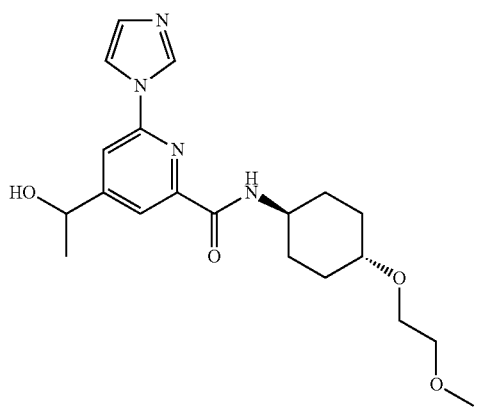 [SMILES: COCCO[C@H]1CC[C@H](NC(=O)c2cc(C(C)O)cc(-n3ccnc3)n2)CC1]

To a stirred solution of 4-acetyl-6-(1H-imidazol-1-yl)-N-((1r,4r)-4-(2-methoxyethoxy)cyclohexyl)picolinamide (110 mg, 0.28 mmol) in MeOH (5 mL) was added NaBH$_4$ (16.20 mg, 0.43 mmol) at 0° C. slowly. After complete addition, the reaction mixture was stirred at RT for 1.5 h. The reaction was monitored by TLC and observed complete conversion of starting material. Then the reaction mixture was cooled to 0° C. and quenched with water (2 mL). The reaction mixture was concentrated under reduced pressure. The residue was diluted with water (10 mL), stirred for 5 min, then added DCM (10 mL), and the mixture was stirred for 10 min at RT. The mixture was extracted with DCM (2×10 mL). The combined organic phase was washed with water followed by brine, dried over anhydrous Na$_2$SO$_4$, concentrated in vacuo and the crude residue was purified by column chromatography on Biotage Isolera (230-400 mesh silica gel eluting with 0-10% MeOH in DCM as gradient) to afford the title compound. Yield: 38% (42.0 mg, Gummy Solid). $^1$H NMR (400 MHz, DMSO-d$_6$): δ 8.93 (s, 1H), 8.53 (d, J=7.6 Hz, 1H), 8.25-8.24 (m, 1H), 7.99 (s, 1H), 7.90 (s, 1H), 7.15 (s, 1H), 5.64 (d, J=4.4 Hz, 1H), 4.89-4.87 (m, 1H), 3.85-3.83 (m, 1H), 3.57-3.54 (m, 2H), 3.45-3.42 (m, 2H), 3.24 (s, 4H), 2.05-2.03 (m, 2H), 1.85-1.82 (m, 2H), 1.59-1.52 (m, 2H), 1.40 (d, J=6.4 Hz, 3H), 1.31-1.21 (m, 2H). LCMS: (Method A) 389.3 (M+H), Rt. 1.26 min. HPLC: (Method C) Rt. 4.01 min.

Ex. 39: 6-(1H-imidazol-1-yl)-N-((1r,4r)-4-(2-methoxyethoxy)cyclohexyl)-4-(methylsulfonyl)picolinamide

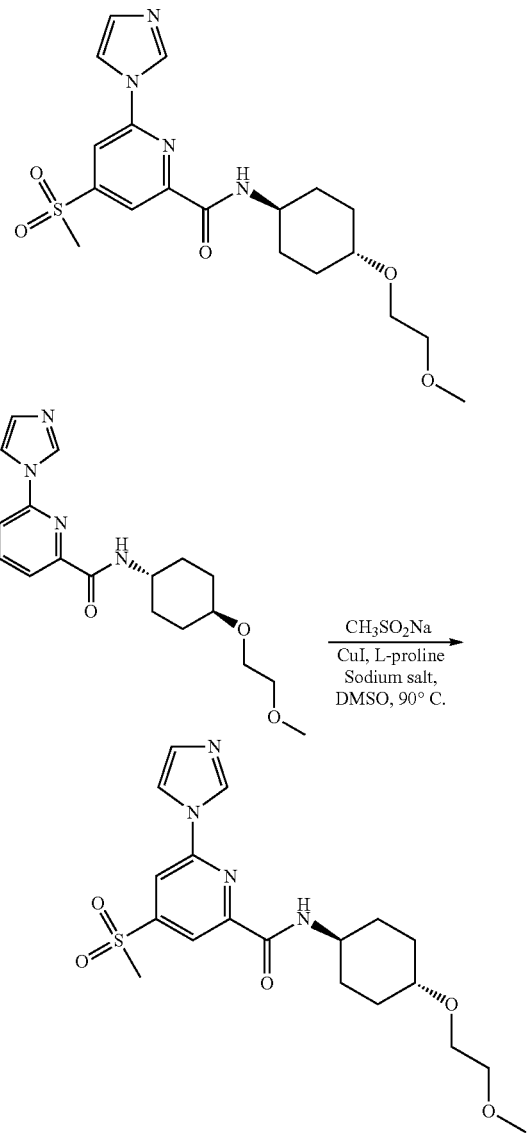

To a stirred solution of 4-bromo-6-(1H-imidazol-1-yl)-N-((1r,4r)-4-(2-methoxyethoxy)cyclohexyl)picolinamide (150 mg, 0.35 mmol) in DMSO (3 mL) was added sodium methanesulfinate (54.25 mg, 0.53 mmol), CuI (6.73 mg, 0.03 mmol) and sodium L-prolinate (9.73 mg, 0.07 mmol) and the reaction mixture was heated at 90° C. for 16 h. The reaction was monitored by LCMS. After completion of the reaction, the reaction mixture was diluted with water (10 mL). The resulting suspension was extracted with DCM (3×25 mL). The combined organic layer was washed with water (10 mL), brine (10 mL), dried over anhydrous Na$_2$SO$_4$ and concentrated under vacuum to get crude compound which was purified by prep HPLC (Method A). The prep fractions were concentered to the aqueous phase, added DCM and neutralized with 10% NaHCO$_3$ aqueous solution. The phases were separated. The organic phase was washed with water, brine, dried over anhydrous Na$_2$SO$_4$ and concentrated to afford the title compound. Yield: 27% (41.5 mg, White solid). ¹H NMR (400 MHz, DMSO-$d_6$): δ 9.08-9.07 (m, 1H), 8.73 (d, J=8.8 Hz, 1H), 8.46 (d, J=1.2 Hz, 1H), 8.41-8.40 (m, 1H), 8.29 (d, J=1.2 Hz, 1H), 7.21-7.20 (m, 1H), 3.92-3.84 (m, 1H), 3.57-3.55 (m, 2H), 3.45-3.42 (m, 5H), 3.30-3.25 (m, 4H), 2.07-2.04 (m, 2H), 1.86-1.83 (m, 2H), 1.64-1.55 (m, 2H), 1.32-1.23 (m, 2H). LCMS: (Method C) 423.0 (M+H), Rt. 1.24 min. HPLC: (Method B) Rt. 4.20 min.

Ex. 40: 4-(2-Hydroxypropan-2-yl)-6-(1H-imidazol-1-yl)-N-((1r,4r)-4-(2-methoxyethoxy)cyclohexyl)picolinamide

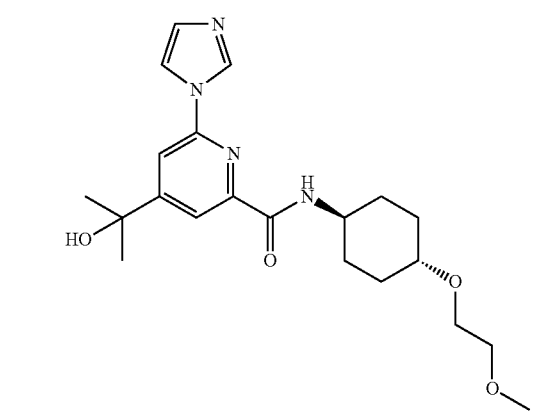

To a stirred solution of 4-acetyl-6-(1H-imidazol-1-yl)-N-((1r,4r)-4-(2-methoxyethoxy)cyclohexyl)picolinamide (200 mg, 0.52 mmol) in dry THF (5 mL) was added MeMgBr (0.51 mL, 1.55 mmol, 3 M solution in THF) dropwise at −40° C. over a period of 5 min. After complete addition, the reaction mixture warmed to RT and stirred for 3 h at RT. The reaction was monitored by TLC. After completion, the reaction mixture was cooled to 0° C. and sat. aq. NH$_4$Cl (5 mL) was added slowly, and the reaction mixture was stirred for 10 min. Then DCM (20 mL) was added and the mixture was stirred for 10 min. The layers were separated, the aqueous layer was extracted with DCM (2×10 mL). The organic phase was washed with water followed by brine, dried over anhydrous Na$_2$SO$_4$, the solvent was evaporated in vacuo to afford the crude product which was purified by column chromatography on Biotage Isolera (230-400 mesh silica gel eluting with 0-10% MeOH in DCM as gradient) to afford the title compound. Yield: 27% (56 mg, Off white Solid). ¹H NMR (400 MHz, DMSO-$d_6$): δ 8.95 (s, 1H), 8.53 (d, J=8.8 Hz, 1H), 8.28-8.27 (m, 1H), 8.10 (d, J=1.2 Hz, 1H), 7.92 (d, J=1.2 Hz, 1H), 7.16-7.15 (m, 1H), 5.52 (s, 1H), 3.86-3.77 (m, 1H), 3.57-3.54 (m, 2H), 3.45-3.42 (m, 2H), 3.30-3.24 (m, 4H), 2.05-2.03 (m, 2H), 1.85-1.82 (m, 2H), 1.61-1.52 (m, 2H), 1.50 (s, 6H), 1.31-1.21 (m, 2H). LCMS: (Method C) 403.2 (M+H), Rt. 1.18 min. HPLC: (Method B) Rt. 4.23 min.

Ex. 41: N-((1r,4r)-4-(difluoromethoxy)cyclohexyl)-2-(1H-imidazol-1-yl)pyrimidine-4-carboxamide

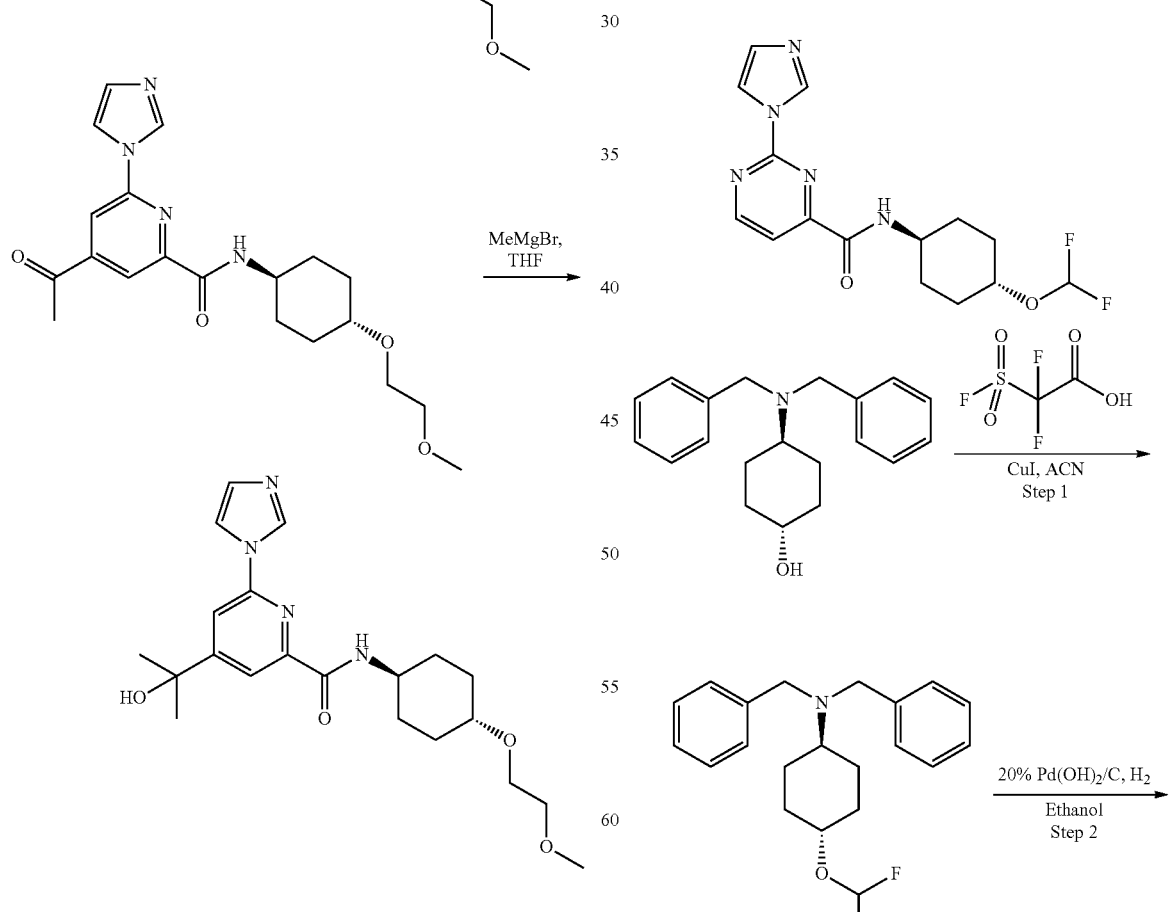

-continued

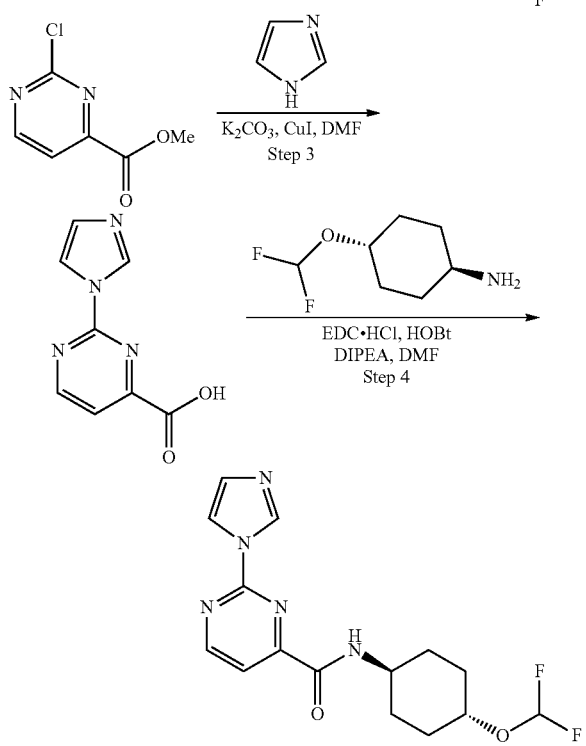

Step 1: (1r,4r)-N,N-dibenzyl-4-(difluoromethoxy)cyclohexan-1-amine

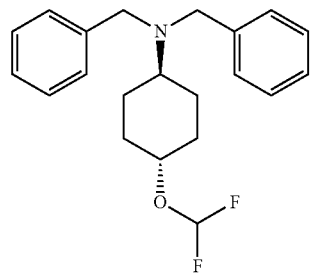 [SMILES: FC(F)O[C@H]1CC[C@H](N(Cc2ccccc2)Cc2ccccc2)CC1]

To a stirred solution of (1r,4r)-4-(dibenzylamino)cyclohexan-1-ol (2.03 g, 6.87 mmol) in ACN (100 mL), CuI (261 mg, 1.37 mmol) was added at RT. Then reaction mass was heated to 45° C. At this temperature, 2,2-difluoro-2-(fluorosulfonyl)acetic acid (2.57 mL, 24.93 mmol) was added and the reaction mixture was stirred for 1 h at 45° C. After 1 h, TLC shows unreacted (1r,4r)-4-(dibenzylamino)cyclohexan-1-ol. An additional portion of 2,2-difluoro-2-(fluorosulfonyl)acetic acid (1.15 mL, 11.19 mmol) was added at 45° C. and the reaction mixture was stirred at 45° C. for another 1 h. After completion, the reaction mixture was cooled to RT, and concentrated under vacuum. The crude residue was slowly diluted with water (30 mL), 10% aq. NaHCO$_3$ solution (30 mL) and EtOAc (100 mL) with continuous stirring. The suspension was filtered through a Celite-bed. The layers of the filtrate were separated. The combined organic layer was washed with brine solution (30 mL) followed by water (30 mL), dried over anhydrous Na$_2$SO$_4$, filtered and the filtrate was concentrated under vacuum. The resulting crude residue was purified by Grace normal phase purification using silica gel (100-200 mesh, 2-5% EtOAc/pet ether) to get the title compound. Yield: 51% (1.21 g, white solid). $^1$H NMR (400 MHz, DMSO-d$_6$): δ 7.35-7.18 (m, 10H), 6.67 (t, J=76.8 Hz, 1H), 4.01-3.94 (m, 1H), 3.57 (s, 4H), 2.51-2.40 (m, 1H), 2.00-1.97 (m, 2H), 1.85-1.82 (m, 2H), 1.54-1.40 (m, 2H), 1.27-1.21 (m, 2H), LCMS: (Method D) 346.5 (M+H), Rt. 2.74 min.

Step 2:
(1r,4r)-4-(difluoromethoxy)cyclohexan-1-amine

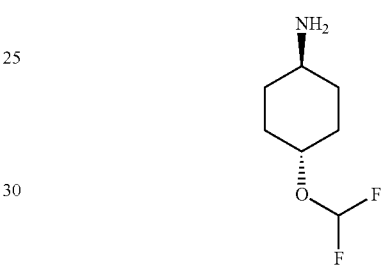

To a stirred solution of (1r,4r)-N,N-dibenzyl-4-(difluoromethoxy)cyclohexan-1-amine (610 mg, 1.76 mmol) in absolute ethanol (6 mL), Pd(OH)$_2$/C (60 mg, 20%) was added at RT and the mixture was stirred for 16 h under hydrogen (bladder reaction) at RT. After completion, the reaction mixture was filtered through a Celite-bed and the bed was washed with MeOH (50 mL). The filtrate was evaporated under vacuum and the residue was co-distilled with toluene (2×20 mL) to get the title compound. Yield: 72% (210 mg, colorless liquid). LCMS: (Method A) 166.2 (M+H), 1.15 min.

Step 3:
2-(1H-imidazol-1-yl)pyrimidine-4-carboxylic acid

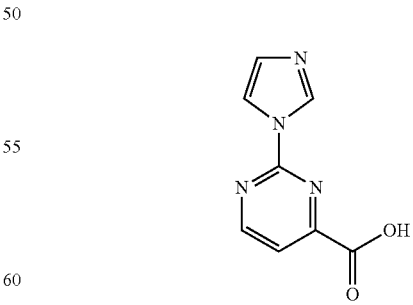

A stirred solution of methyl 2-chloropyrimidine-4-carboxylate (510 mg, 2.95 mmol) and 1H-imidazole (612 mg, 8.86 mmol) in DMF (5 mL) was degassed gas for 5 min at RT before the addition of potassium carbonate (1.22 g, 8.86 mmol) followed by CuI (56.2 mg, 0.29 mmol). The reaction mixture was heated at 120° C. for 16 h. After completion, the reaction mixture was filtered through Celite, and the Celite bed was washed with 10% MeOH in DCM (20 mL) followed by MeOH (20 mL). The combined filtrate was concentrated under reduced pressure. The crude residue was dissolved in 1,4-dioxane (10 mL), acidified with HCl in 1,4-dioxane (4 M, 5 mL), and then concentrated under vacuum to get the title compound as a hydrochloride salt. Yield: 98% (550 mg, yellow solid). LCMS: (Method C) 191.1 (M+H), Rt. 0.43 min.

Step 4: N-((1r,4r)-4-(difluoromethoxy)cyclohexyl)-2-(1H-imidazol-1-yl)pyrimidine-4-carboxamide

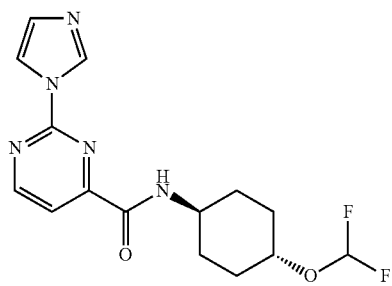 [SMILES: O=C(N[C@H]1CC[C@H](OC(F)F)CC1)c1ccnc(-n2ccnc2)n1]

To a stirred solution of 2-(1H-imidazol-1-yl)pyrimidine-4-carboxylic acid (195 mg, 1.02 mmol) in DMF (10 mL) at 0° C., EDC·HCl (294 mg, 1.53 mmol), HOBt (207 mg, 1.53 mmol) and DIPEA (0.47 mL, 2.56 mmol) were added under nitrogen atmosphere. Then (1r,4r)-4-(difluoromethoxy)cyclohexan-1-amine (203 mg, 1.23 mmol) was added and the reaction mixture was stirred at RT for 16 h. After completion (starting material was consumed according to TLC), the reaction mixture was diluted with water (20 mL) and then extracted with 10% MeOH in DCM (50 mL). The resulting organic solution was washed with water (2×20 mL). The organic layer was dried over anhydrous Na$_2$SO$_4$, filtered and the filtrate was concentrated under vacuum. The resulting crude residue was purified by Grace reverse phase purification (Method A). The prep-fraction was concentrated under reduced pressure, and the residue was diluted with 10% MeOH/DCM (30 mL) and washed with 10% aq. NaHCO$_3$ solution (10 mL) followed by water (10 mL). The organic layer was dried over anhydrous Na$_2$SO$_4$, filtered, and concentrated under reduced pressure and finally lyophilized to get the title compound. Yield: 42% (145.33 mg, Off-white solid). $^1$H NMR (400 MHz, DMSO-d$_6$): 9.07-9.06 (m, 1H), 8.97 (s, 1H), 8.87 (d, J=8.8 Hz, 1H), 8.23-8.22 (m, 1H), 7.92 (d, J=5.2 Hz, 1H), 7.19-7.18 (m, 1H), 6.76 (t, J=76.8 Hz, 1H), 4.09-4.02 (m, 1H), 3.92-3.84 (m, 1H), 2.05-2.02 (m, 2H), 1.90-1.86 (m, 2H), 1.67-1.48 (m, 4H), LCMS: (Method A) 337.9 (M+H), Rt. 1.92 min. HPLC: (Method A) Rt. 2.63 min.

Ex. 42: N-((1r,4r)-4-(difluoromethoxy)cyclohexyl)-2-(1H-imidazol-1-yl)-6-methylpyrimidine-4-carboxamide

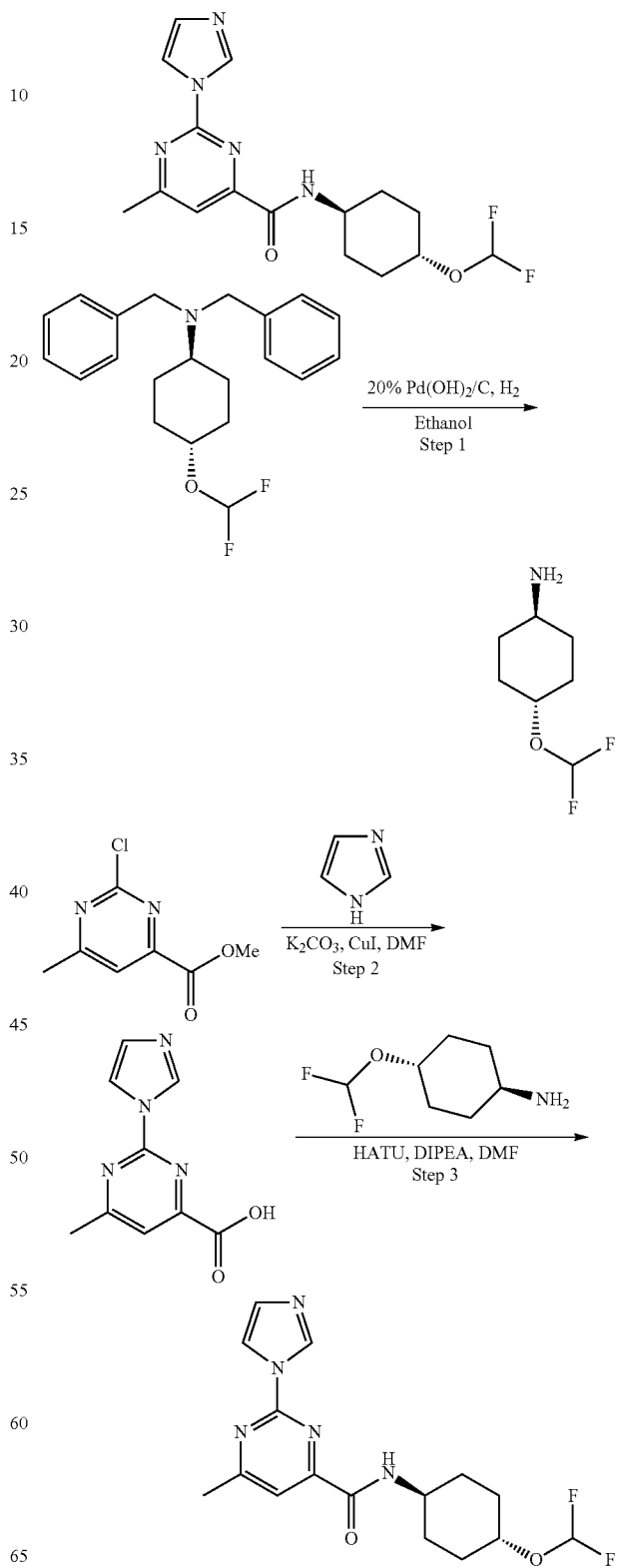

Step 1: (1r,4r)-4-(difluoromethoxy)cyclohexan-1-amine

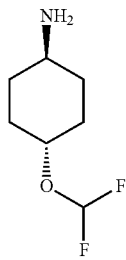 [SMILES: N[C@H]1CC[C@H](OC(F)F)CC1]

To a stirred solution of (1r,4r)-N,N-dibenzyl-4-(difluoromethoxy)cyclohexan-1-amine (610 mg, 1.76 mmol) in absolute ethanol (6 mL), Pd(OH)$_2$/C (61 mg, 20%) was added at RT and the mixture was stirred for 16 h under hydrogen (bladder reaction) at RT. After completion, the reaction mixture was filtered through a Celite bed and the bed was washed with MeOH (100 mL). The combined filtrate was concentrated under vacuum and the residue was co-distilled with toluene (2×50 mL) to get the title compound. Yield: crude (310 mg, colorless liquid). LCMS: (Method A) 166.2 (M+H), Rt. 1.16 min.

Step 2: 2-(1H-imidazol-1-yl)-6-methylpyrimidine-4-carboxylic acid

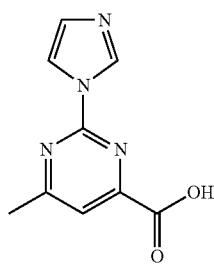

A stirred solution of 2-chloro-6-methylpyrimidine-4-carboxylic acid (210 mg, 1.12 mmol) and 1H-imidazole (233 mg, 3.37 mmol) in DMF (3 mL) at RT was degassed gas for 5 min before the addition of potassium carbonate (466 mg, 3.37 mmol) followed by CuI (21.4 mg, 0.11 mmol) at RT. The reaction mixture was heated at 120° C. for 16 h. After completion, the reaction mixture was filtered through Celite, and the bed was washed with methanol (20 mL) and water (10 mL). The combined filtrate was concentrated under vacuum. The crude residue was dissolved in 1,4-dioxane (5 mL) and then acidified with HCl in 1,4-dioxane (5 mL, 4 M). The mixture was concentrated under vacuum to get the title compound as a hydrochloride salt. Yield: Crude (220 mg, yellow solid). LCMS: (Method C) 205.1 (M+H), Rt. 0.40 min.

Step 3: N-((1r,4r)-4-(difluoromethoxy)cyclohexyl)-2-(1H-imidazol-1-yl)-6-methylpyrimidine-4-carboxamide

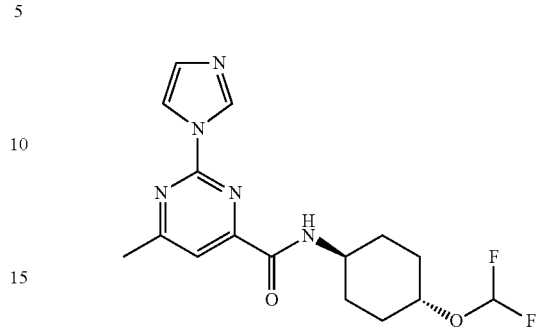

To a stirred solution of 2-(1H-imidazol-1-yl)-6-methylpyrimidine-4-carboxylic acid (210 mg, 1.02 mmol) in DMF (3 mL) at 0° C., HATU (585 mg, 1.54 mmol) and DIPEA (0.47 mL, 2.57 mmol) were added under nitrogen atmosphere. Then (1r,4r)-4-(difluoromethoxy)cyclohexan-1-amine (203 mg, 1.23 mmol) was added and the reaction mixture was stirred at RT for 16 h. After completion (starting material was consumed according to TLC), the reaction mixture was diluted with water (30 mL) and then extracted with 10% MeOH in DCM (50 mL). The resulting organic solution was washed with water (3×30 mL). The organic layer was dried over anhydrous Na$_2$SO$_4$, filtered and the filtrate was concentrated under vacuum. The resulting crude product was purified by reverse phase purification. The prep-fraction was concentrated under reduced pressure, the residue was diluted with 10% MeOH/DCM (50 mL) and washed with 10% aq. NaHCO$_3$ solution (15 mL) followed by water (20 mL). The organic layer was dried over anhydrous Na$_2$SO$_4$, filtered, concentrated under reduced pressure and finally lyophilized to get the title compound. Yield: 39% (140.69 mg, pale yellow solid). $^1$H NMR (400 MHz, DMSO-d$_6$): 8.94 (s, 1H), 8.81 (d, J=8.4 Hz, 1H), 8.19 (s, 1H), 7.84 (s, 1H), 7.17 (s, 1H), 6.95-6.76 (m, 1H), 4.08-4.02 (m, 1H), 3.89-3.80 (m, 1H), 2.63 (s, 3H), 2.05-2.00 (m, 2H), 1.89-1.86 (m, 2H), 1.67-1.48 (m, 4H). LCMS: (Method D) 352.2 (M+H), Rt. 2.03 min. HPLC: (Method A) Rt. 2.89 min.

Ex. 43: 4-Cyano-6-(1H-imidazol-1-yl)-N-((1r,4r)-4-(2-methoxyethoxy)cyclohexyl)picolinamide

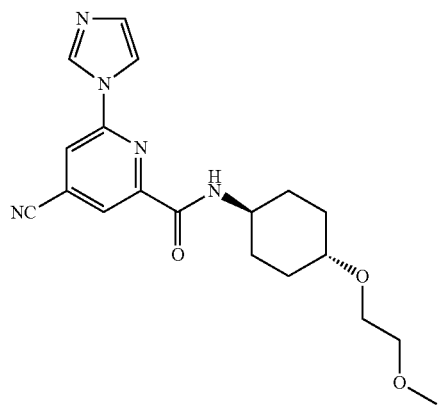 [SMILES: COCCO[C@H]1CC[C@H](NC(=O)c2cc(C#N)cc(-n3ccnc3)n2)CC1]

-continued

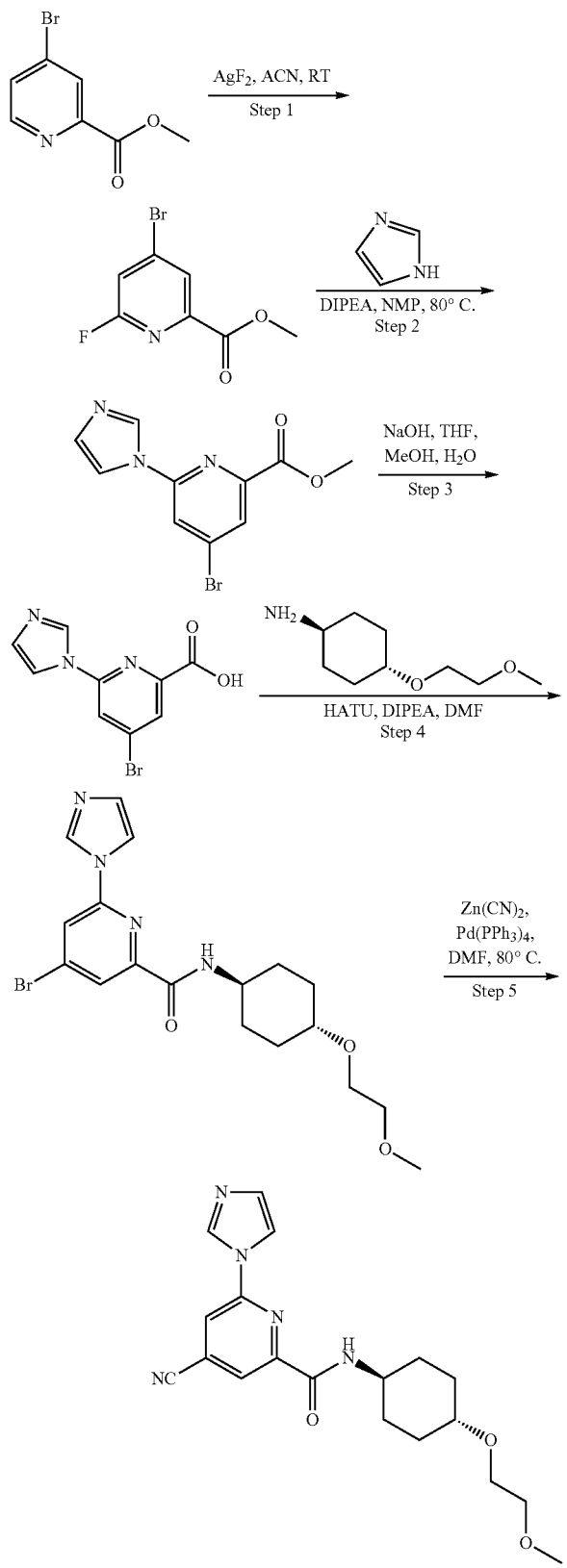

Step 1: Methyl 4-bromo-6-fluoropicolinate

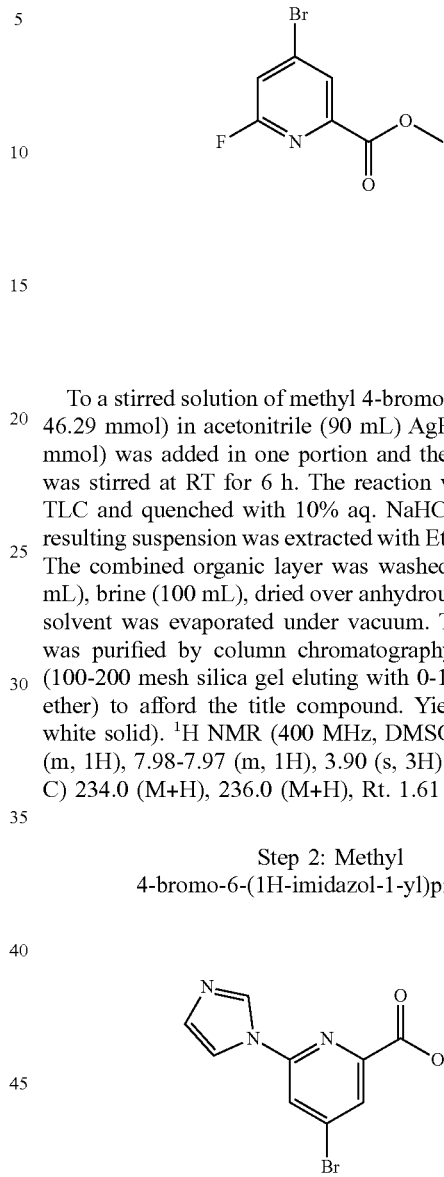

To a stirred solution of methyl 4-bromopicolinate (10.0 g, 46.29 mmol) in acetonitrile (90 mL) AgF$_2$ (20.0 g, 138.88 mmol) was added in one portion and the reaction mixture was stirred at RT for 6 h. The reaction was monitored by TLC and quenched with 10% aq. NaHCO$_3$ (20 mL). The resulting suspension was extracted with EtOAc (3×100 mL). The combined organic layer was washed with water (100 mL), brine (100 mL), dried over anhydrous Na$_2$SO$_4$ and the solvent was evaporated under vacuum. The crude residue was purified by column chromatography Biotage Isolera (100-200 mesh silica gel eluting with 0-10% EtOAc in pet ether) to afford the title compound. Yield: 38% (4.13 g, white solid). $^1$H NMR (400 MHz, DMSO-d$_6$): δ 8.18-8.17 (m, 1H), 7.98-7.97 (m, 1H), 3.90 (s, 3H). LCMS: (Method C) 234.0 (M+H), 236.0 (M+H), Rt. 1.61 min.

Step 2: Methyl 4-bromo-6-(1H-imidazol-1-yl)picolinate

To a stirred solution of methyl 4-bromo-6-fluoropicolinate (4.1 g, 17.51 mmol) in NMP (30 mL) was added imidazole (4.76 g, 70.08 mmol) followed by DIPEA (9.1 mL, 52.56 mmol) and the reaction mixture was heated at 80° C. for 16 h. The reaction was monitored by LCMS. After completion, the reaction mixture was quenched with water (10 mL). The resulting suspension was extracted with DCM (3×50 mL). The combined organic layer was washed with water (50 mL), brine (50 mL), dried over anhydrous Na$_2$SO$_4$ and the solvent was evaporated under vacuum. The crude residue was purified by column chromatography on Biotage Isolera (100-200 mesh silica gel eluting with 0-10% MeOH in DCM) to afford the title compound. Yield: 55% (2.76 g, yellow solid). $^1$H NMR (400 MHz, DMSO-d$_6$): δ 8.60-8.59 (m, 1H), 8.49 (d, J=1.6 Hz, 1H), 8.14 (d, J=1.6 Hz, 1H), 8.02-8.01 (m, 1H), 7.17-7.16 (m, 1H), 3.93 (s, 3H). LCMS: (Method A) 284.0 (M+H), Rt. 1.88 min.

Step 3: 4-Bromo-6-(1H-imidazol-1-yl)picolinic acid

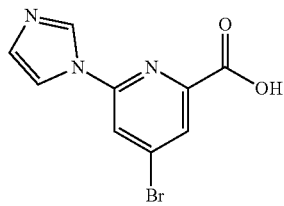 [SMILES: O=C(O)c1cc(Br)cc(-n2ccnc2)n1]

To a stirred solution of methyl 4-bromo-6-(1H-imidazol-1-yl)picolinate (2.71 g, 9.60 mmol) in MeOH (18 mL), THF (18 mL) and water (12 mL) was added NaOH (1.15 g, 28.88 mmol) at RT and the reaction mixture was stirred at RT for 4 h. The reaction mixture was monitored by TLC, starting material was consumed. The reaction mixture was concentrated under vacuum and acidified with HCl solution (20 mL, 3 N). The resulting solid was collected by filtration and dried to afford the title compound. Yield: 88% (2.27 g, off white solid). $^1$H NMR (400 MHz, DMSO-$d_6$): δ 13.61 (bs, 1H), 8.67 (d, J=0.8 Hz, 1H), 8.46 (d, J=1.6 Hz, 1H), 8.11 (d, J=1.2 Hz, 1H), 8.09-8.08 (m, 1H), 7.17-7.16 (m, 1H). LCMS: (Method D) 268.0 and 270.0 (M+H), Rt. 0.98 min.

Step 4: 4-Bromo-6-(1H-imidazol-1-yl)-N-((1r,4r)-4-(2-methoxyethoxy)cyclohexyl)picolinamide

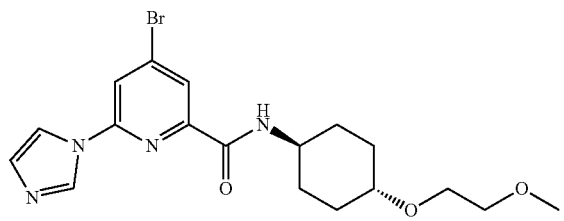

To a stirred solution of 4-bromo-6-(1H-imidazol-1-yl) picolinic acid (2.30 g, 8.58 mmol) in DMF (30 mL) were added DIPEA (4.50 mL, 25.74 mmol) and HATU (4.89 g, 12.87 mmol) at RT. After stirring for 5 min, a solution of (1r,4r)-4-(2-methoxyethoxy)cyclohexan-1-amine (2.2 g, 12.87 mmol) in DMF (0.5 mL) was added and the reaction mixture was stirred at RT for 16 h. The reaction mixture was monitored by TLC and diluted with water (25 mL). The resulting suspension was extracted with EtOAc (3×50 mL). The combined organic layer was washed with water (50 mL), brine (50 mL), dried over anhydrous Na$_2$SO$_4$ and the solvent was evaporated under vacuum. The crude residue was purified by column chromatography on Biotage Isolera (100-200 mesh silica gel eluting with 0-60% EtOAc in pet ether) to afford the title compound. Yield: 66% (2.4 g, Yellow solid). $^1$H NMR (300 MHz, DMSO-$d_6$): δ 8.99 (s, 1H), 8.62 (d, J=8.7 Hz, 1H), 8.39 (d, J=1.5 Hz, 1H), 8.31-8.30 (m, 1H), 8.04 (d, J=1.5 Hz, 1H), 7.17 (s, 1H), 3.88-3.80 (m, 1H), 3.56-3.50 (m, 2H), 3.44-3.41 (m, 2H), 3.29-3.23 (m, 4H), 2.05-2.03 (m, 2H), 1.83-1.80 (m, 2H), 1.62-1.51 (m, 2H), 1.29-1.23 (m, 2H). LCMS: (Method C) 425.0 (M+H), Rt. 1.01 min.

Step 5: 4-Cyano-6-(1H-imidazol-1-yl)-N-((1r,4r)-4-(2-methoxyethoxy)cyclohexyl)picolinamide

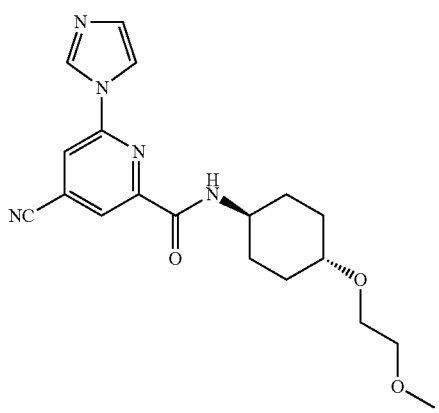 [SMILES: COCCO[C@H]1CC[C@H](NC(=O)c2cc(C#N)cc(-n3ccnc3)n2)CC1]

To a mixture of 4-bromo-6-(1H-imidazol-1-yl)-N-((1r,4r)-4-(2-methoxyethoxy)cyclohexyl) picolinamide (150 mg, 0.35 mmol), Zn(CN)$_2$ (63.0 mg, 0.53 mmol) in DMF (3 mL), Pd(PPh$_3$)$_4$ (41.0 mg, 0.035 mmol) were added at RT and the reaction mixture was purged with nitrogen gas for 5 min. The reaction mixture was heated at 80° C. for 24 h. After completion (the reaction was monitored by LCMS), the reaction mixture was filtered through a Celite bed, and the bed was washed with DCM (20 mL). The combined filtrate was concentrated under vacuum to get crude compound which was purified by prep HPLC (Method A). The prep fractions were concentered. To the residual aqueous phase was added DCM and neutralized with 10% NaHCO$_3$ aqueous solution. The organic layer was washed with water, brine, dried over anhydrous Na$_2$SO$_4$ and concentrated under vacuum to afford the title compound. Yield: 44% (60 mg, Off white solid). $^1$H NMR (400 MHz, DMSO-$d_6$): δ 9.01 (s, 1H), 8.69 (d, J=8.4 Hz, 1H), 8.59 (d, J=1.2 Hz, 1H), 8.33-8.31 (m, 1H), 8.24 (d, J=1.2 Hz, 1H), 7.20 (s, 1H), 3.89-3.81 (m, 1H), 3.57-3.54 (m, 2H), 3.45-3.42 (m, 2H), 3.29-3.25 (m, 4H), 2.06-2.03 (m, 2H), 1.84-1.82 (m, 2H), 1.62-1.53 (m, 2H), 1.30-1.21 (m, 2H). LCMS: (Method D) 370.1 (M+H), Rt. 1.75 min. HPLC: (Method A) Rt. 2.16 min.

Ex. 44: N-((1r,4r)-4-(2-hydroxyethoxy)cyclohexyl)-2-(1H-imidazol-1-yl)-6-methylpyrimidine-4-carboxamide

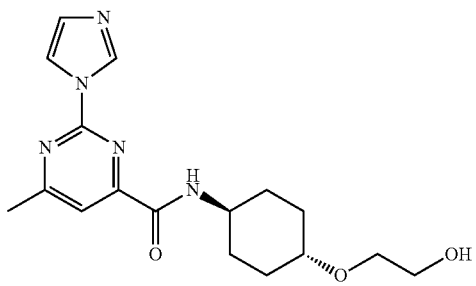

133
-continued

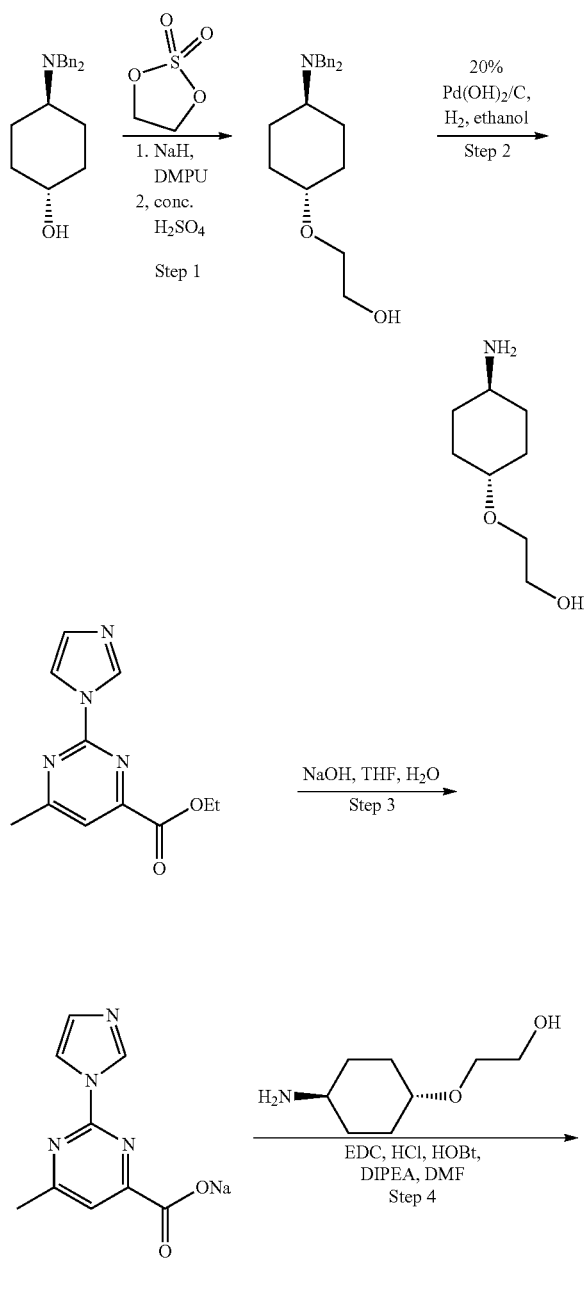

134

Step 1: 2-(((1r,4r)-4-(dibenzylamino)cyclohexyl)oxy)ethan-1-ol

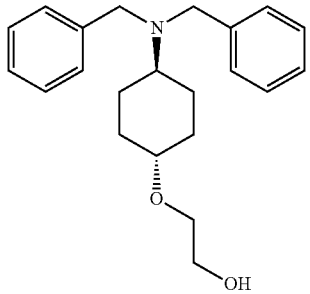 [SMILES: OCCO[C@H]1CC[C@H](N(Cc2ccccc2)Cc2ccccc2)CC1]

To a stirred solution of (1r,4r)-4-(dibenzylamino)cyclohexan-1-ol (2.10 g, 7.10 mmol) in DMPU (20 mL) at 0° C., NaH (60% suspension, 355 mg, 8.88 mmol) followed by 1,3,2-dioxathiolane 2,2-dioxide (1.14 g, 8.88 mmol) were added and the reaction mixture was stirred at RT for 16 h. After 16 h TLC shows unreacted (1r,4r)-4-(dibenzylamino)cyclohexan-1-ol. Additional portions of NaH (60% suspension, 355 mg, 8.88 mmol) followed by 1,3,2-dioxathiolane 2,2-dioxide (1.14 g, 8.88 mmol) were added and the reaction mixture was stirred at RT for 16 h. The reaction mixture was monitored by TLC and LCMS. After complete consumption of the starting material, the reaction mixture was quenched with addition of water (2.5 mL) and conc. $H_2SO_4$ (2.5 mL) and the reaction mixture was stirred for 16 h at 70° C. The reaction mixture was monitored by TLC and LCMS. After completion, the reaction mixture was diluted with 10% aq. $NaHCO_3$ solution (50 mL) and then extracted with EtOAc (3×100 mL). The combined organic layer was washed with brine solution (50 mL) followed by water (2×50 mL). The organic layer was dried over anhydrous $Na_2SO_4$, filtered and the filtrate was concentrated under vacuum. The resulting crude residue was purified by Grace normal phase using silica gel (100-200 mesh, 20-30% EtOAc/pet ether) to get the title compound. Yield: 50% (1.22 g, white solid). $^1H$ NMR (400 MHz, DMSO-$d_6$): δ 7.34-7.27 (m, 8H), 7.22-7.18 (m, 2H), 4.52-4.49 (m, 1H), 3.57 (s, 4H), 3.45-3.34 (m, 4H), 3.19-3.12 (m, 1H), 2.44-2.34 (m, 1H), 2.02-1.99 (m, 2H), 1.83-1.80 (m, 2H), 1.50-1.35 (m, 2H), 1.03-0.91 (m, 2H). LCMS: (Method A) 340.9 (M+H), Rt 1.70 min.

Step 2: 2-(((1r,4r)-4-aminocyclohexyl)oxy)ethan-1-ol

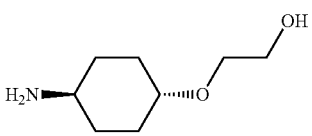 [SMILES: N[C@H]1CC[C@H](OCCO)CC1]

To a stirred solution of 2-(((1r,4r)-4-(dibenzylamino)cyclohexyl)oxy)ethan-1-ol (1.21 g, 3.56 mmol) in absolute ethanol (50 mL) at RT, Pd(OH)$_2$/C (150 mg, 20 wt %) was added and the mixture was stirred at RT for 16 h under hydrogen atmosphere. After completion, the reaction mixture was filtered through a Celite bed, and the Celite bed was washed with methanol (100 mL). The combined filtrate was concentrated under vacuum to afford the title compound which was used in the next step without further purification. Yield: crude (612 mg, colorless liquid). LCMS: (Method A), 160.2 (M+H), Rt. 0.58 min, 59.16% (ELSD), and Rt. 0.51 min.

Step 3: 2-(1H-imidazol-1-yl)-6-methylpyrimidine-4-carboxylic acid

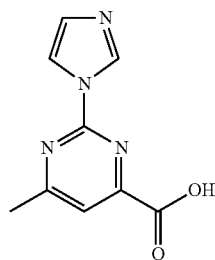

To a stirred solution of ethyl 2-(1H-imidazol-1-yl)-6-methylpyrimidine-4-carboxylate (975 mg, 4.19 mmol) in a mixture of 1,4-dioxane (7.25 mL) and water (2.5 mL) at RT, NaOH (184 mg, 4.61 mmol) was added and the reaction mixture was stirred at RT for 16 h. After completion (starting material was consumed according to TLC), 1,4-dioxane was concentrated under vacuum. To this residue, water (15 mL) was added and aqueous layer was washed with DCM (2×10 mL). The aqueous layer was separated and concentrated under reduced pressure. The resulting solid was co-distilled with toluene (2×10 mL) to get the title compound. Yield: 92% (870 mg, off-white solid). $^1$H NMR (400 MHz, DMSO-$d_6$): δ 8.60 (s, 1H), 7.96 (s, 1H), 7.53 (s, 1H), 7.11 (s, 1H). LCMS: (Method B) 205.3 (M+H), Rt. 0.88 min.

Step 4: N-((1r,4r)-4-(2-hydroxyethoxy)cyclohexyl)-2-(1H-imidazol-1-yl)-6-methylpyrimidine-4-carboxamide

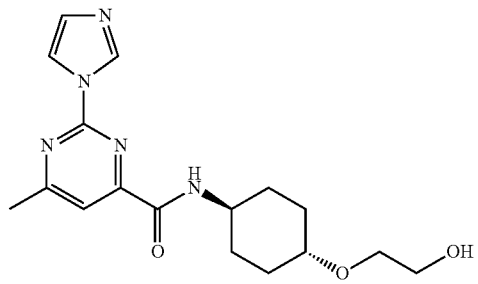 [SMILES: Cc1cc(C(=O)N[C@H]2CC[C@H](OCCO)CC2)nc(-n2ccnc2)n1]

To a stirred solution of sodium 2-(1H-imidazol-1-yl)-6-methylpyrimidine-4-carboxylate (205 mg, 0.90 mmol) in DMF (3 mL) at RT, DIPEA (0.15 mL, 0.90 mmol), HOBt (183 mg, 1.35 mmol), EDC·HCl (347 mg, 1.81 mmol), followed by 2-(((1r,4r)-4-aminocyclohexyl)oxy)ethan-1-ol (144 mg, 0.90 mmol) were added under nitrogen atmosphere and the reaction mixture was stirred for 16 h at RT. After completion (starting material was consumed according to TLC), the reaction mixture was diluted with water (10 mL) and the extracted with EtOAc (3×20 mL). The resulting organic solution was washed with 10% aq. NaHCO$_3$ (10 mL) and water (2×10 mL). The organic layer was dried over anhydrous Na$_2$SO$_4$, filtered and the filtrate was concentrated under vacuum. The resulting crude residue was purified by Prep HPLC. The prep-fraction was concentrated under reduced pressure, diluted with DCM (20 mL) and washed with brine solution (10 mL) followed by water (2×10 mL). The organic layer was dried over anhydrous Na$_2$SO$_4$, filtered, concentrated under reduced pressure to get the title compound. Yield: 41% (121.1 mg, off-white solid). $^1$H NMR (400 MHz, DMSO-$d_6$): δ 8.94-8.93 (m, 1H), 8.78 (d, J=8.4 Hz, 1H), 8.20-8.19 (m, 1H), 7.83 (s, 1H), 7.17-7.16 (m, 1H), 4.57-4.54 (m, 1H), 3.89-3.80 (m, 1H), 3.51-3.44 (m, 4H), 3.29-3.23 (m, 1H), 2.63 (s, 3H), 2.07-2.04 (m, 2H), 1.86-1.83 (m, 2H), 1.61-1.52 (m, 2H), 1.32-1.20 (m, 2H). LCMS: (Method A) 346.0 (M+H), Rt. 1.54 min. HPLC: (Method A) Rt. 1.83 min.

Ex. 45: 2-(1H-imidazol-1-yl)-N-((1r,4r)-4-(2-methoxyethoxy)cyclohexyl)-6-methylpyrimidine-4-carboxamide

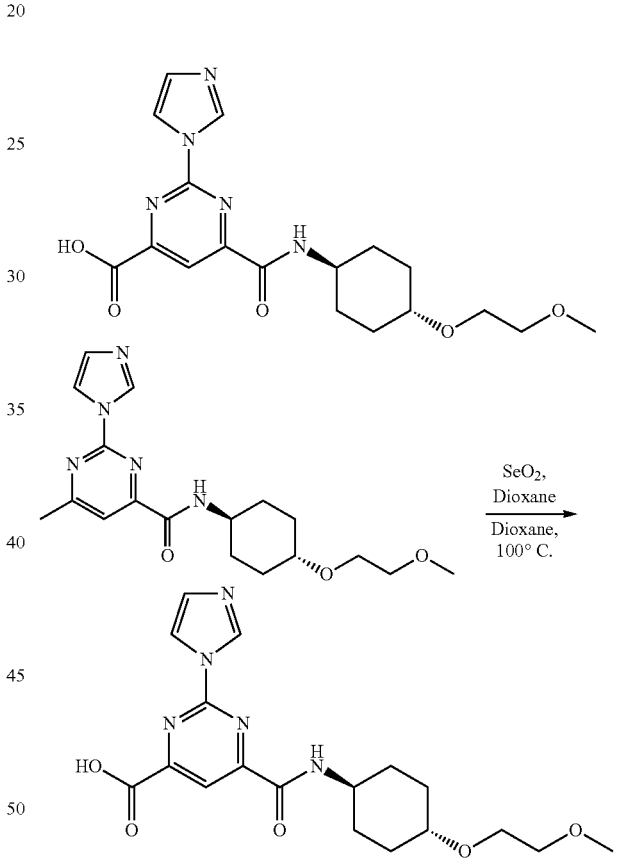

To a mixture of 2-(1H-imidazol-1-yl)-N-((1r,4r)-4-(2-methoxyethoxy)cyclohexyl)-6-methylpyrimidine-4-carboxamide (1.0 g, 2.78 mmol) in pyridine (10 mL) was added SeO$_2$ (1.08 g, 9.73 mmol) and the reaction mixture was heated at 100° C. for 16 h. The reaction mixture was monitored by TLC, TLC showed 10% conversion. The reaction mixture was concentrated under vacuum and the get crude residue was diluted with EtOAc (50.0 mL). The resulting mixture was filtered through Celite bed, washed with EtOAc (15.0 mL) and the solvent was evaporated under vacuum. The crude residue was purified by prep. HPLC. The prep fractions were concentrated to the aqueous phase, DCM was added and then neutralized with 10% NaHCO$_3$ aqueous solution. The organic phase was washed with brine, water, dried over anhydrous Na$_2$SO$_4$, and concentrated under vacuum to afford the title compound. Yield: 7% (70.0 mg, Off-white solid). $^1$H NMR (400 MHz, MeOD): δ 9.47 (s, 1H), 8.93 (d, J=8.4 Hz, 1H), 8.57 (s, 1H), 8.53 (s, 1H), 7.40 (s, 1H), 4.03-3.92 (m, 1H), 3.69-3.66 (m, 2H), 3.57-3.54 (m, 2H), 3.45-3.36 (m, 4H), 2.20-2.17 (m, 2H), 2.07-2.04 (m, 2H), 1.64-1.58 (m, 2H), 1.47-1.40 (m, 2H). LCMS: (Method A) 390.3 (M+H), Rt. 1.11 min. HPLC: (Method A) Rt. 1.77 min.

Ex. 46: 2-(1H-imidazol-1-yl)-N-((1r,4r)-4-(2-methoxyethoxy)cyclohexyl)-6-methylisonicotinamide

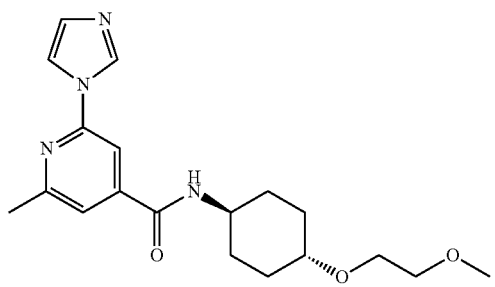

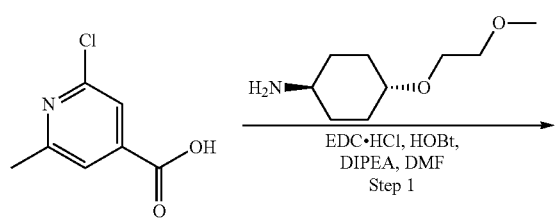

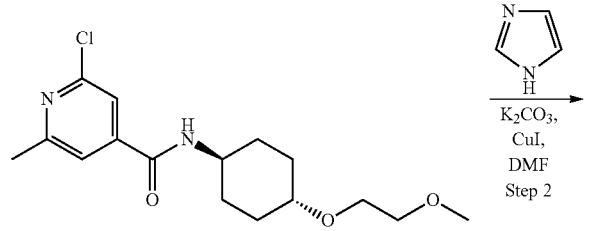

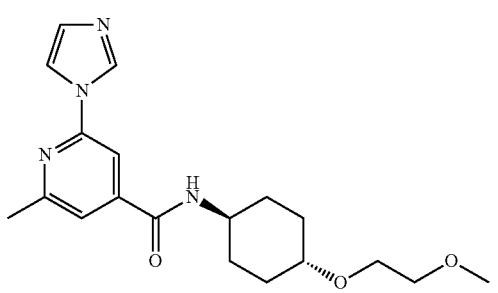

Step 1: 2-chloro-N-((1r,4r)-4-(2-methoxyethoxy)cyclohexyl)-6-methylisonicotinamide

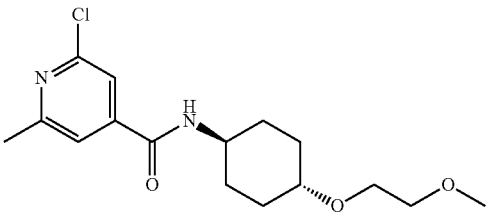

To a stirred solution of 2-chloro-6-methylisonicotinic acid (210 mg, 1.22 mmol) in DMF (3 mL) at 0° C., EDC·HCl (351.9 mg, 1.83 mmol), HOBt (248 mg, 1.83 mmol) followed by DIPEA (0.53 mL, 3.05 mmol) were added under nitrogen atmosphere and the reaction mixture was stirred at 0° C. for 5 min. Then (1r,4r)-4-(2-methoxyethoxy)cyclohexan-1-amine (212 mg, 1.22 mmol) was added and the reaction mixture was stirred at RT for 16 h. After completion (starting material was consumed according to TLC), the reaction mixture was diluted with water (30 mL) and then extracted with EtOAc (50 mL). The resulting organic solution was washed with 10% aq. NaHCO$_3$ (15 mL) followed by water (20 mL). The organic layer was dried over anhydrous Na$_2$SO$_4$, filtered and the filtrate was concentrated under vacuum. The resulting crude residue was purified by chromatography using silica gel (100-200 mesh, 50%-70% EtOAc/pet ether) to get the title compound. Yield: 37% (151 mg, yellow solid). LCMS: (Method A) 327.0 (M+H), Rt 2.09 min.

Step 2: 2-(1H-imidazol-1-yl)-N-((1r,4r)-4-(2-methoxyethoxy)cyclohexyl)-6-methylisonicotinamide

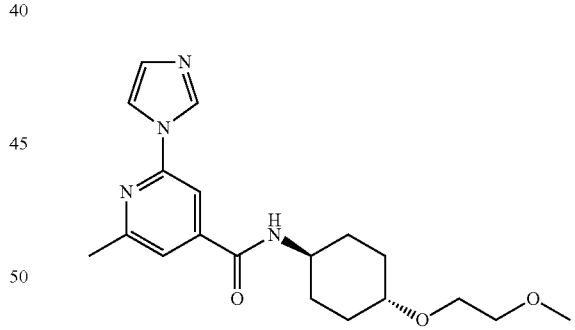

A stirred solution of 5-chloro-N-((1r,4r)-4-(2-methoxyethoxy)cyclohexyl)-1H-pyrrolo[2,3-c]pyridine-7-carboxamide (145 mg, 0.44 mmol) and 1H-imidazole (90.6 mg, 1.33 mmol) in DMF (3 mL) was purged with nitrogen gas for 5 min. The K$_2$CO$_3$ (183 mg, 1.33 mmol) followed by CuI (8.4 mg, 0.04 mmol) were added at RT and the reaction mixture was heated at 120° C. for 16 h. After completion, the reaction mixture was filtered through Celite, and washed with 5% MeOH in DCM (50 mL). The combined organic layer was washed with 10% aq. NaHCO$_3$ solution (20 mL) and water (2×15 mL), and then concentrated under vacuum. The resulting crude residue was purified by prep. HPLC. The prep-fraction was concentrated under reduced pressure, the residue was diluted with DCM (20 mL) and washed with 10% aq. NaHCO₃ solution (10 mL) and water (10 mL). The organic layer was dried over anhydrous Na₂SO₄, filtered, concentrated under reduced pressure and finally lyophilized to get the title compound. Yield: 28% (45.48 mg, off-white solid). ¹H NMR (400 MHz, DMSO-d₆): δ 8.54 (s, 1H), 8.49 (d, J=7.6 Hz, 1H), 7.97 (s, 1H), 7.86 (s, 1H), 7.57 (s, 1H), 7.10 (s, 1H), 3.81-3.75 (m, 1H), 3.56-3.53 (m, 2H), 3.44-3.40 (m, 2H), 3.30-3.24 (m, 4H), 2.57 (s, 3H), 2.04-2.01 (m, 2H), 1.92-1.89 (m, 2H), 1.40-1.24 (m, 4H). LCMS: (Method A) 359.0 (M+H), Rt. 1.69 min. HPLC: (Method A) Rt. 2.23 min.

Ex. 47: 6-cyano-2-(1H-imidazol-1-yl)-N-((1r,4r)-4-(2-methoxyethoxy)cyclohexyl)pyrimidine-4-carboxamide

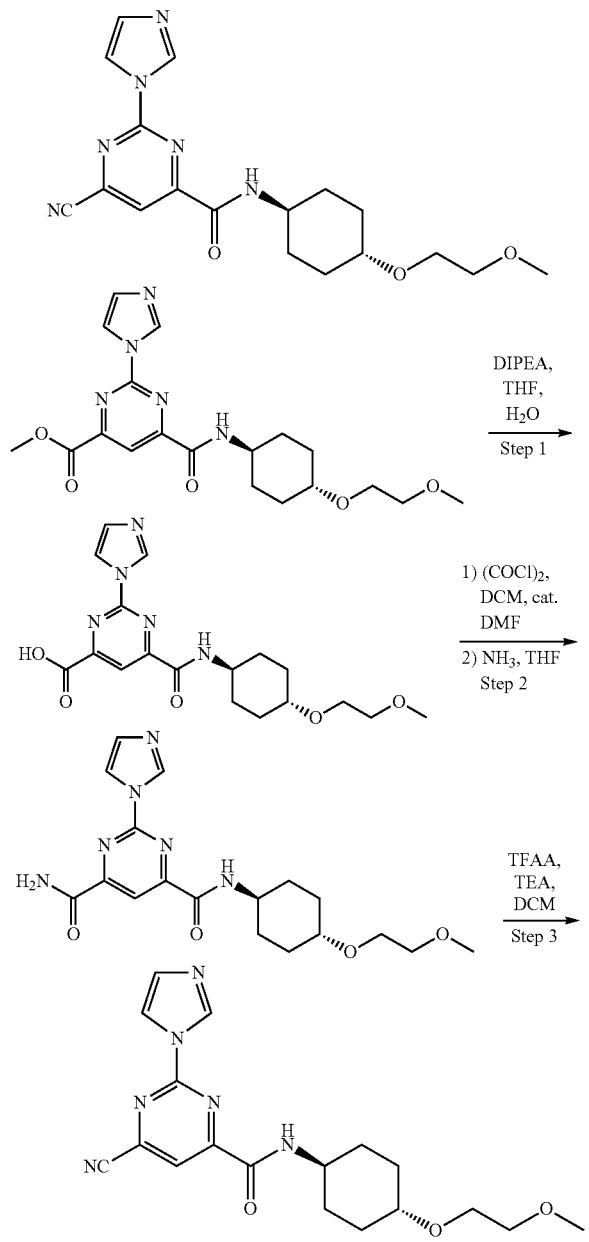

Step 1: 2-(1H-imidazol-1-yl)-6-(((1r,4r)-4-(2-methoxyethoxy)cyclohexyl)carbamoyl)pyrimidine-4-carboxylic acid

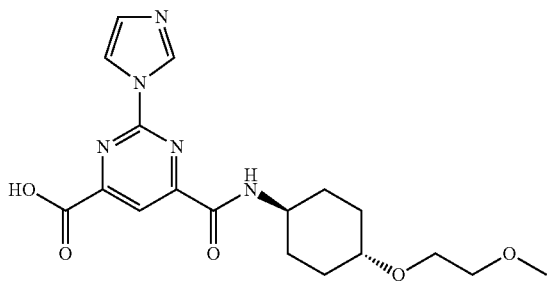 [SMILES: COCCO[C@H]1CC[C@H](NC(=O)c2cc(C(=O)O)nc(-n3ccnc3)n2)CC1]

To a stirred solution of methyl 2-(1H-imidazol-1-yl)-6-(((1r,4r)-4-(2-methoxyethoxy)cyclohexyl)carbamoyl)pyrimidine-4-carboxylate (800 mg, 1.98 mmol) in a mixture of THF:Water (1:1, 8 mL) was added DIPEA (768.82 mg, 5.94 mmol) and the reaction mixture was stirred at RT for 30 min. The reaction was monitored by TLC. After completion, the reaction mixture was diluted with water (25 mL) and the resulting suspension was extracted with EtOAC (30 mL). The aqueous layer was evaporated in vacuum to afford the resulting crude product which was used as such for next step. Yield 52% (0.4 g, Pale brown solid). LCMS: (Method C) 390.1 (M+H), Rt. 0.93 min.

Step 2: 2-(1H-imidazol-1-yl)-N-((1r,4r)-4-(2-methoxyethoxy)cyclohexyl)pyrimidine-4,6-dicarboxamide

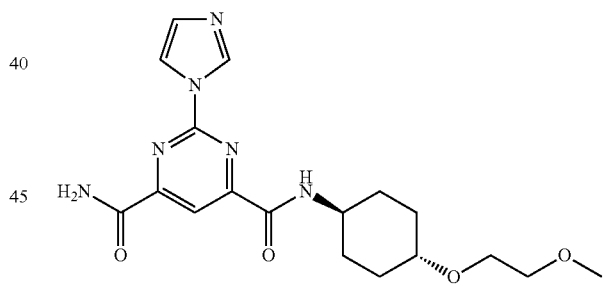

To a stirred solution of 2-(1H-imidazol-1-yl)-6-(((1r,4r)-4-(2-methoxyethoxy)cyclohexyl)carbamoyl)pyrimidine-4-carboxylic acid (0.4 g, 1.02 mmol) in DCM (4 mL) containing catalytic amount of DMF (0.05 mL) was added (COCl)₂ (0.12 mL, 1.33 mmol) slowly at 0° C. and the reaction mixture was slowly warmed to RT and stirred at RT for 2 h. The reaction was monitored by TLC. After completion of the starting material, the reaction mixture was treated with a solution of NH₃ in THF (40 mL, 10 Vol.) at 0° C. and the reaction mixture was stirred at RT for 30 min. The reaction mixture was filtered through Celite bed, and the bed was washed with DCM (20 mL). The combined organic layer was washed with water (20 mL), dried over anhydrous Na₂SO₄, filtered and the solvent was evaporated under vacuum to get the crude compound which was used as such for next step. Yield: 100% (0.4 g, Brown solid). LCMS: (Method C) 389.1 (M+1), Rt. 1.08 min.

Step 3: 6-cyano-2-(1H-imidazol-1-yl)-N-((1r,4r)-4-(2-methoxyethoxy)cyclohexyl)pyrimidine-4-carboxamide

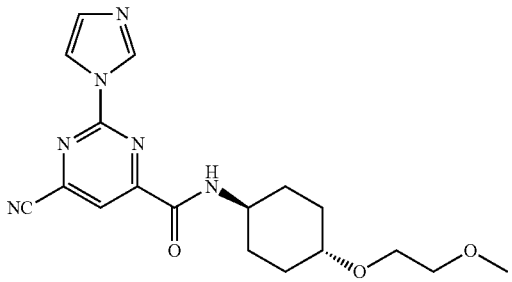 [SMILES: COCCO[C@H]1CC[C@H](NC(=O)c2cc(C#N)nc(-n3ccnc3)n2)CC1]

To a mixture of 2-(1H-imidazol-1-yl)-N-((1r,4r)-4-(2-methoxyethoxy)cyclohexyl)pyrimidine-4,6-dicarboxamide (400 mg, 1.03 mmol) in DCM (4.0 mL) at −20° C. was added TEA (0.28. mL, 2.06 mmol) followed by TFAA (0.18. mL, 1.32 mmol) slowly. After complete addition, the reaction mixture was stirred for 2 h at RT. The reaction was monitored by TLC. After the starting material was consumed, the reaction mixture was quenched with ice cold water (15 mL) slowly and diluted with DCM (20.0 mL). The mixture was stirred for 10 min at RT, the layers were separated, and the aqueous layer was extracted with DCM (2×15 mL). The combined organic layer was washed with 10% aq. NaHCO$_3$ (10.0 mL), brine (10.0 mL), water (10.0 mL), dried over anhydrous Na$_2$SO$_4$ and the solvent was evaporated in vacuum. The resulting crude residue was purified by prep. HPLC (neutral Method, ACN-water) to get the title compound. Yield: 29% (110 mg, Off-white solid). $^1$H NMR (400 MHz, DMSO-d$_6$): δ 9.03 (s, 1H), 8.97 (d, J=8.8 Hz, 1H), 8.43 (s, 1H), 8.24 (s, 1H), 7.22 (s, 1H), 3.89-3.82 (m, 1H), 3.57-3.54 (m, 2H), 3.44-3.42 (m, 2H), 3.30-3.24 (m, 4H), 2.07-2.04 (m, 2H), 1.86-1.83 (m, 2H), 1.62-1.53 (m, 2H), 1.31-1.22 (m, 2H). LCMS: (Method C) 371.0 (M+H), Rt. 1.60 min. HPLC: (Method A) Rt. 2.22 min.

Ex. 48: 2-(1H-imidazol-1-yl)-N-((1r,4r)-4-(2-methoxyethoxy)cyclohexyl)pyrimidine-4,6-dicarboxamide

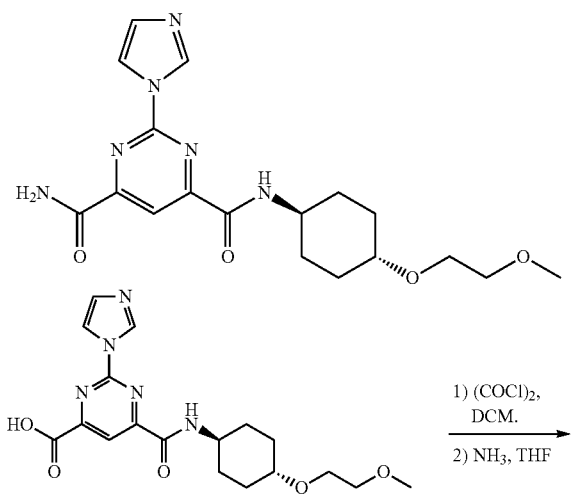

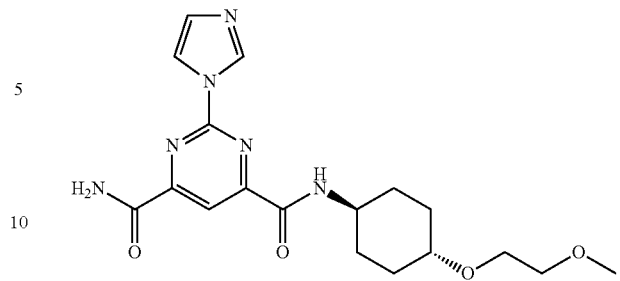

To a mixture of 2-(1H-imidazol-1-yl)-6-(((1r,4r)-4-(2-methoxyethoxy)cyclohexyl)carbamoyl)pyrimidine-4-carboxylic acid (50 mg, 0.13 mmol) in DCM (1.0 mL) at 0° C., was added (COCl)$_2$ (0.02 mL, 0.19 mmol) slowly and the reaction mixture was stirred at RT for 1 h. The reaction was monitored by TLC. After completion of starting material, the reaction mixture was treated with NH$_3$ solution in THF (1.0 mL, 0.5 M) at RT and the reaction mixture was stirred for 30 min at RT. The reaction mixture was concentrated under vacuum. The crude residue was purified by prep. HPLC to get the title compound. Yield: 40% (20.0 mg, Off-white solid). $^1$H NMR (400 MHz, DMSO-d$_6$): δ 9.23-9.22 (m, 1H), 8.90 (d, J=8.8 Hz, 1H), 8.80 (s, 1H), 8.56-8.55 (m, 1H), 8.29 (s, 1H), 8.16 (s, 1H), 7.20-7.19 (m, 1H), 3.89-3.81 (m, 1H), 3.57-3.54 (m, 2H), 3.45-3.42 (m, 2H), 3.30-3.25 (m, 4H), 2.07-2.05 (m, 2H), 1.87-1.84 (m, 2H), 1.62-1.52 (m, 2H), 1.31-1.21 (m, 2H). LCMS: (Method A) 389.3 (M+H), Rt. 1.17 min. HPLC: (Method A) Rt. 1.89 min.

Ex. 49: 6-(hydroxymethyl)-2-(1H-imidazol-1-yl)-N-((1r,4r)-4-(2-methoxyethoxy)cyclohexyl)pyrimidine-4-carboxamide

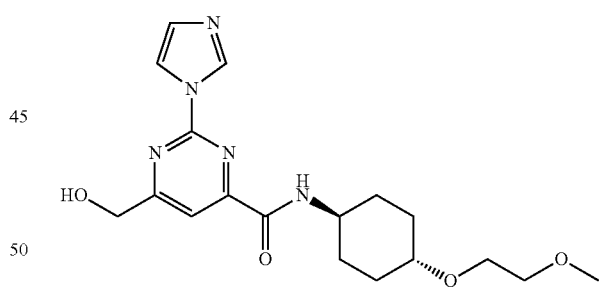

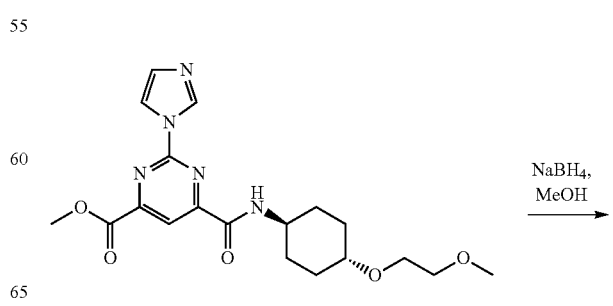

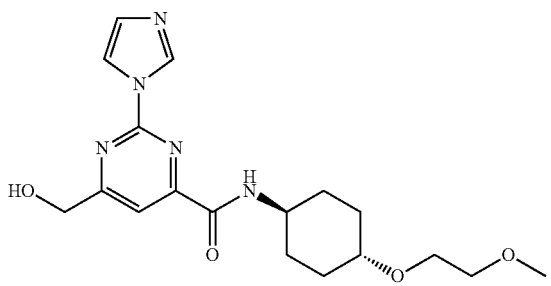

To a suspension of methyl 2-(1H-imidazol-1-yl)-6-(((1r,4r)-4-(2-methoxyethoxy)cyclohexyl)carbamoyl)pyrimidine-4-carboxylate (0.8 g, 1.98 mmol) in MeOH (16 mL) at 0° C., was added NaBH$_4$ (98 mg, 2.57 mmol) slowly and the reaction mixture was stirred at 0° C. for 1 h. After the starting material was consumed (monitored by TLC), the reaction mixture was quenched with ice cold water (25 mL) and stirred for 10 min at RT. Then EtOAc (40.0 mL) was added and the mixture stirred for 10 min. The layers were separated, and the aqueous layer was extracted with EtOAc (2×25 mL). The organic phase was washed with water (10 mL) followed by brine (10 mL), dried over anhydrous Na$_2$SO$_4$, and the solvent was evaporated under vacuum. The resulting crude residue was purified by prep. HPLC to get the title compound. Yield: 54% (400 mg, Off white solid). $^1$H NMR (400 MHz, DMSO-d$_6$): δ 8.95 (s, 1H), 8.83 (d, J=8.4 Hz, 1H), 8.20 (s, 1H), 8.00 (s, 1H), 7.17 (s, 1H), 5.90-5.87 (m, 1H), 4.68 (d, J=5.6 Hz, 2H), 3.90-3.81 (m, 1H), 3.57-3.54 (m, 2H), 3.45-3.42 (m, 2H), 3.30-3.25 (m, 4H), 2.07-2.04 (m, 2H), 1.87-1.84 (m, 2H), 1.62-1.52 (m, 2H), 1.31-1.22 (m, 2H). LCMS: (Method D) 376.1 (M+H), Rt. 1.55 min. HPLC: (Method A) Rt. 1.85 min.

Ex. 50: 2-(1H-imidazol-1-yl-d3)-N-((1r,4r)-4-(2-methoxyethoxy)cyclohexyl)-6-methylpyrimidine-4-carboxamide

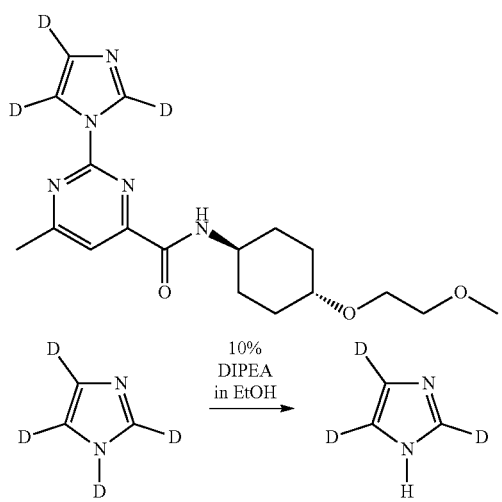

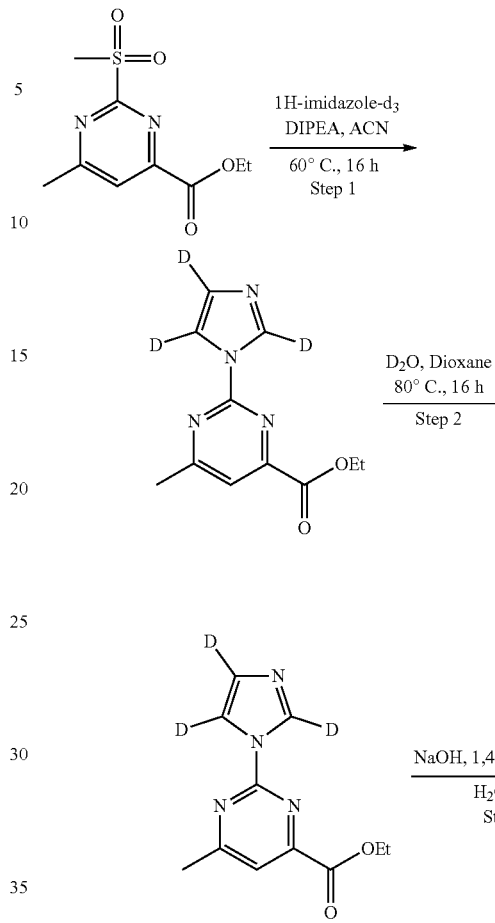

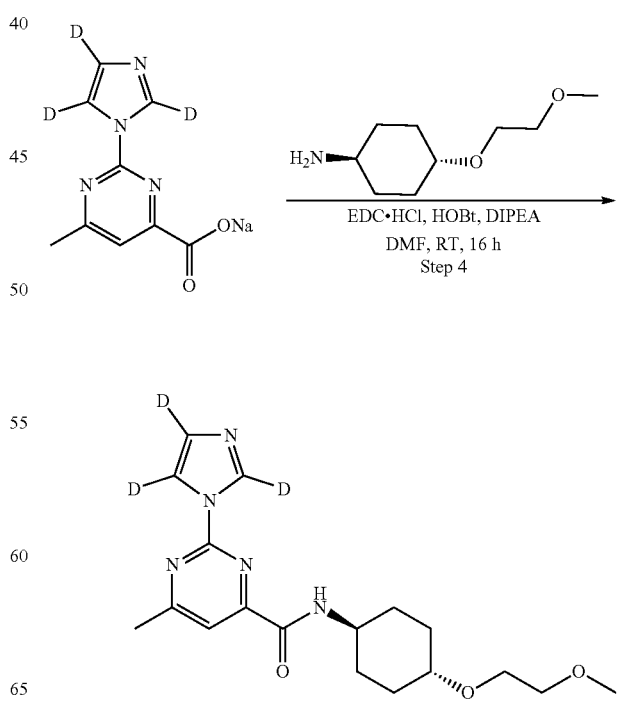

Step 1: Ethyl 2-(1H-imidazol-1-yl-d3)-6-methylpyrimidine-4-carboxylate

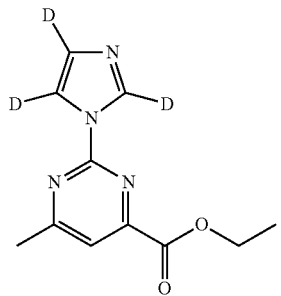 [SMILES: [2H]c1nc([2H])n(-c2nc(C)cc(C(=O)OCC)n2)c1[2H]]

Commercial 1H-imidazole-d4 (500 mg, 6.944 mmol) was treated with 10% DIPEA in EtOH (4×8 mL) and the mixture was concentrated under vacuum. The residue was co distilled with ACN (4×8 mL) to afford 1H-imidazole-d3 (500 mg) which was used as such in the following reaction.

To a stirred solution of 1H-imidazole-d3 (500 mg, 6.94 mmol) and ethyl 6-methyl-2-(methylsulfonyl)pyrimidine-4-carboxylate (1.86 g, 7.64 mmol) in ACN (10 mL) at RT, was added DIPEA (3.0 mL, 17.36 mmol) and the reaction mixture was heated at 60° C. for 14 h. After completion (monitored by TLC), the reaction mixture was concentrated under reduced pressure. The residue was dissolved in EtOAc (50 mL) and washed with water (20 mL) and brine solution (20 mL). The organic layer was dried over anhydrous $Na_2SO_4$, filtered and the filtrate was concentrated under vacuum. The resulting crude residue was triturated with petroleum ether to get the title compound. Yield: 78% (1.28 g, brown solid). $^1$H NMR (400 MHz, $CD_3OD$): δ 7.88 (s, 1H), 4.51 (q, J=7.2 Hz, 2H), 2.70 (s, 3H), 1.46 (t, J=7.2 Hz, 3H). (1H NMR showed presence of the D2-analogue in trace quantities). LCMS: (Method C) 236.1 (M+H), Rt. 0.93 min.

Step 2: Ethyl 2-(1H-imidazol-1-yl-d3)-6-methylpyrimidine-4-carboxylate

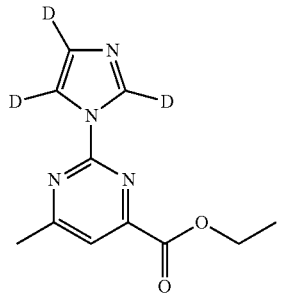 [SMILES: [2H]c1nc([2H])n(-c2nc(C)cc(C(=O)OCC)n2)c1[2H]]

Ethyl 2-(1H-imidazol-1-yl-d3)-6-methylpyrimidine-4-carboxylate (1.2 g, 5.10 mmol) obtained in step 1 was dissolved in a mixture of $D_2O$ (12 mL) and 1,4-dioxane (4.0 mL) and the mixture was heated at 80° C. for 16 h. The reaction mixture was concentrated under vacuum and the resulting solid was dissolved in EtOAc (10 mL). The organic layer was dried over anhydrous $Na_2SO_4$, filtered and the filtrate was concentrated under vacuum to get the compound. Yield: 88% (1.06 g, brown solid). $^1$H NMR (400 MHz, $CD_3OD$): δ 7.89 (s, 1H), 4.51 (q, J=7.2 Hz, 2H), 2.71 (s, 3H), 1.46 (t, J=7.2 Hz, 3H). LCMS: (Method C) 236.1 (M+H), Rt. 1.45 min.

Step 3: Sodium 2-(1H-imidazol-1-yl-d3)-6-methylpyrimidine-4-carboxylate

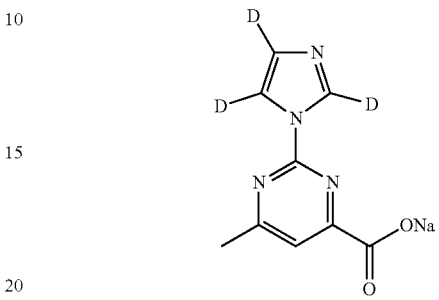

To a stirred solution of ethyl 2-(1H-imidazol-1-yl-d3)-6-methylpyrimidine-4-carboxylate (1.05 g, 4.46 mmol) in a mixture of 1,4-dioxane (7.0 mL) and water (3.0 mL) at RT, NaOH (196.59 mg, 4.91 mmol) was added, and the reaction mixture was stirred at RT for 3 h. After completion (starting material was consumed according to TLC), 1,4-dioxane was evaporated under vacuum. To the resulting residue, water (5 mL) was added, and the aqueous layer was washed with DCM (25 mL). The aqueous layer was separated and concentrated under reduced pressure. The resulting solid was co-distilled with toluene (3×10 mL) to get the title compound (1HNMR showed the presence of traces of the D2 analogue). Yield: 100% (1.025 g, white solid). $^1$H NMR (400 MHz, $CD_3OD$): δ 7.73 (s, 1H), 2.64 (s, 3H). LCMS: (Method A) 208.1 (M+H), Rt. 0.79 min.

Step 4: 2-(1H-imidazol-1-yl-d3)-N-((1r,4r)-4-(2-methoxyethoxy)cyclohexyl)-6-methylpyrimidine-4-carboxamide

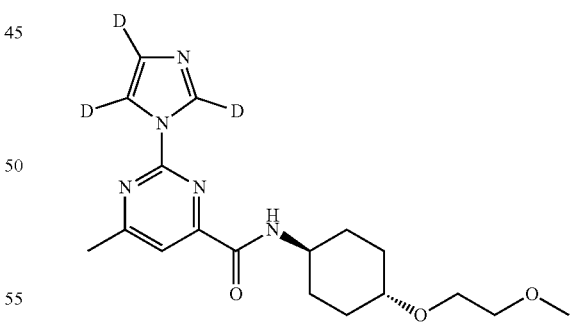

To a stirred solution of sodium 2-(1H-imidazol-1-yl)-6-methylpyrimidine-4-carboxylate (1.0 g, 4.36 mmol) in DMF (10 mL) at RT, DIPEA (0.76 mL, 4.363 mmol), HOBt (885.1 mg, 6.544 mmol), EDC·HCl (1.68 g, 8.726 mmol), and (1r,4r)-4-(2-methoxyethoxy)cyclohexan-1-amine (830 mg, 4.80 mmol) were added under nitrogen atmosphere and the reaction mixture was stirred for 16 h at RT. After completion (starting material was consumed according to TLC), the reaction mixture was diluted with water (20 mL) and then extracted with EtOAc (2×30 mL). The combined organic layer was washed with brine solution (50 mL), water (50 mL), dried over anhydrous Na₂SO₄, filtered and the filtrate was concentrated under vacuum. The crude residue was purified by flash column chromatography on Biotage Isolera using silica gel (230-400 mesh, 5%-100% EtOAc in pet ether) to get the title compound. Yield: 55% (960 mg, Off-white solid). ¹H NMR (400 MHz, DMSO-d₆): δ 8.79 (d, J=8.8 Hz, 1H), 7.83 (s, 1H), 3.88-3.81 (m, 1H), 3.57-3.54 (m, 2H), 3.44-3.42 (m, 2H), 3.30-3.22 (m, 4H), 2.63 (s, 3H), 2.06-2.03 (m, 2H), 1.85-1.83 (m, 2H), 1.61-1.51 (m, 2H), 1.31-1.21 (m, 2H). LCMS: (Method C) 363.2 (M+H), Rt. 1.02 min. HPLC: (Method A) Rt. 2.34 min. HRMS: C18H25N5O3 (0%), C18H24DN5O3 (0.14%), C18H23D2N5O3 (6.74%), C18H22D3N5O3 (91.95%), C18H21D4N5O3 (1.17%).

Ex. 51: 6-(fluoromethyl)-2-(1H-imidazol-1-yl)-N-((1r,4r)-4-(2-methoxyethoxy)cyclohexyl)pyrimidine-4-carboxamide

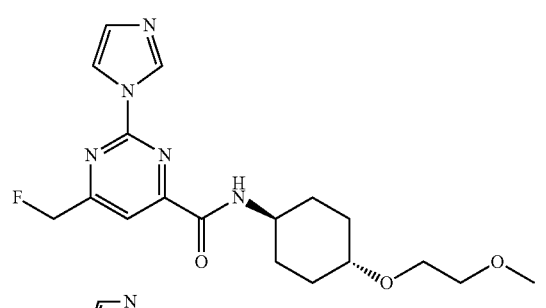

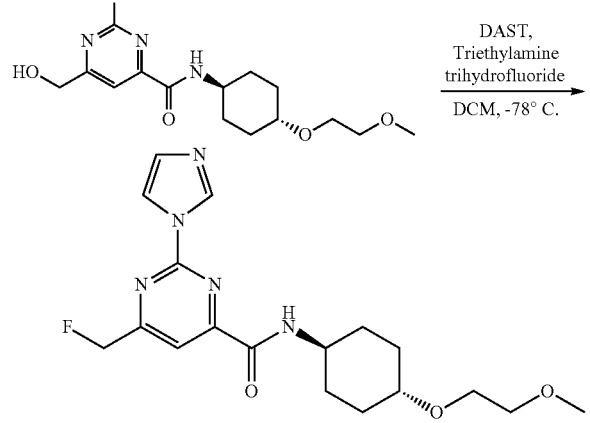

A mixture of 6-(hydroxymethyl)-2-(1H-imidazol-1-yl)-N-((1r,4r)-4-(2-methoxyethoxy)cyclohexyl)pyrimidine-4-carboxamide (150 mg, 0.40 mmol) in DCM (1.5 mL) at −78° C. was added DAST (161 mg, 1.00 mmol) followed by triethylamine trihydrofluoride (161.0 mg, 1.00 mmol) slowly. After complete addition, the reaction mixture was stirred at −78° C. for 30 min while being monitored by TLC. After the starting material was consumed (as analysed by TLC), the reaction mixture was quenched with 10% aq. NaHCO₃ (5 mL) slowly and the reaction mixture was stirred for 10 min at RT. Then DCM (20.0 mL) was added and the mixture was stirred for another 10 min. The layers were separated, and the aqueous layer was extracted with DCM (2×15 mL). The organic phase was washed with water (10.0 mL), followed by brine (10.0 mL), dried over anhydrous Na₂SO₄, and the solvent was evaporated under vacuum. The resulting crude residue was purified by flash column chromatography on Biotage Isolera (using 230-400 mesh silica gel, eluting with 0-10% MeOH in DCM as gradient) to get the title compound. Yield: 14% (20.61 mg, Pale yellow solid). ¹H NMR (400 MHz, DMSO-d₆): δ 8.97 (s, 1H), 8.88 (d, J=8.8 Hz, 1H), 8.20 (s, 1H), 7.91 (s, 1H), 7.19 (s, 1H), 5.73 (s, 1H), 5.62 (s, 1H), 3.90-3.82 (m, 1H), 3.57-3.54 (m, 2H), 3.52-3.49 (m, 2H), 3.30-3.25 (m, 4H), 2.07-2.04 (m, 2H), 1.87-1.84 (m, 2H), 1.62-1.53 (m, 2H), 1.31-1.20 (m, 2H). LCMS: (Method A) 378.0 (M+H), Rt. 1.76 min. HPLC: (Method A) Rt. 2.22 min.

Ex. 52: 6-(Difluoromethyl)-2-(1H-imidazol-1-yl)-N-((1r,4r)-4-(2-methoxyethoxy)cyclohexyl)pyrimidine-4-carboxamide

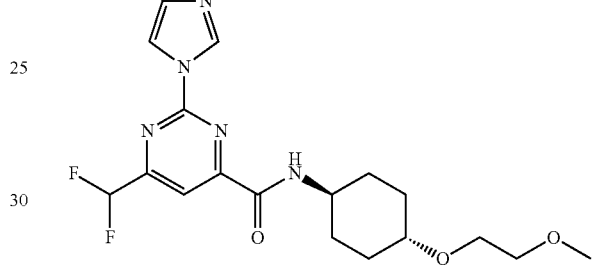

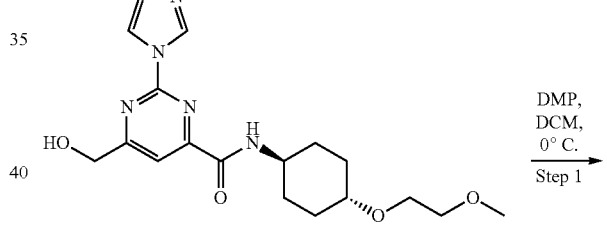

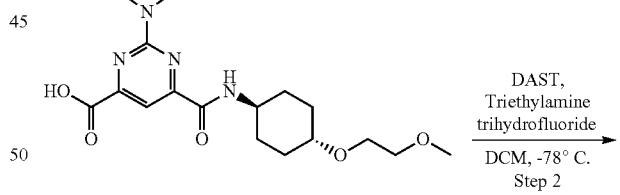

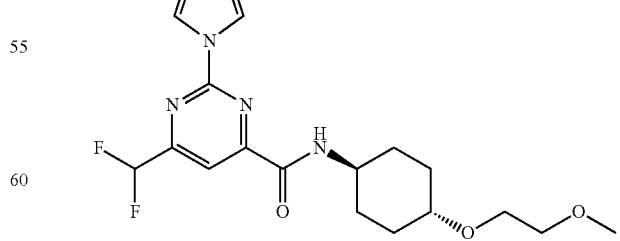

Step 1: 6-formyl-2-(1H-imidazol-1-yl)-N-((1r,4r)-4-(2-methoxyethoxy)cyclohexyl)pyrimidine-4-carboxamide

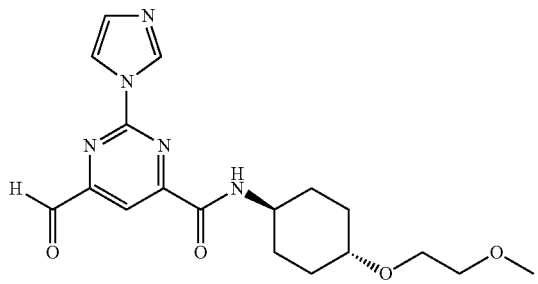

To a mixture of 6-(hydroxymethyl)-2-(1H-imidazol-1-yl)-N-((1r,4r)-4-(2-methoxyethoxy)cyclohexyl)pyrimidine-4-carboxamide (450 mg, 1.20 mmol) in DCM (9.0 mL) at 0° C. was added Dess-Martin periodinane (610.0 mg, 1.44 mmol) slowly. After complete addition, the reaction mixture was stirred at 0° C. for 1.5 h. The reaction was monitored by TLC, and the starting material was consumed. The reaction mixture was quenched by the addition of 10% aq. $Na_2S_2O_3$ solution (15 mL) and 10% $NaHCO_3$ solution (15 mL) slowly. The reaction mixture was stirred for 10 min, DCM (50 mL) was added and the mixture was stirred for another 10 min. The layers were separated, the aqueous layer was extracted with DCM (2×30 mL). The combined organic phase was washed with water (35 mL), brine (35 mL), dried over anhydrous $Na_2SO_4$, and the solvent was evaporated under vacuum to afford the title compound. Yield: 100% (450 mg, Pale yellow solid). LCMS: (Method C) 374.0 (M+H), Rt. 1.06 min.

Step 2: 6-(difluoromethyl)-2-(1H-imidazol-1-yl)-N-((1r,4r)-4-(2-methoxyethoxy)cyclohexyl)pyrimidine-4-carboxamide

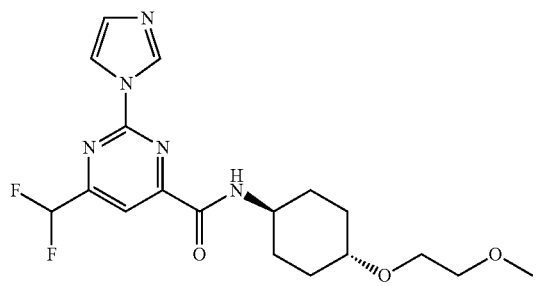

To a mixture of 6-formyl-2-(1H-imidazol-1-yl)-N-((1r,4r)-4-(2-methoxyethoxy)cyclohexyl)pyrimidine-4-carboxamide (450 mg, 1.20 mmol) in DCM (9.0 mL) was added DAST (485.62 mg, 3.01 mmol) followed by triethylamine trihydrofluoride (485.62 mg, 3.01 mmol) at −78° C. slowly and the reaction mixture was stirred at −78° C. for 1 h. The reaction was monitored by TLC. After the starting material was consumed, the reaction mixture was quenched with 10% aq. $NaHCO_3$ solution (5 mL) slowly. The mixture was stirred for 10 min at RT, and then added DCM (200 mL), and the mixture was stirred for another 10 min. The layers were separated, the aqueous layer was extracted with DCM (2×15 mL). The combined organic phase was washed with water followed by brine, dried over anhydrous $Na_2SO_4$, and the solvent was evaporated under vacuum. The resulting crude residue was purified by prep. HPLC (Method A). The prep fractions were concentrated to the aqueous phase. To this residue was added DCM and neutralized with 10% $NaHCO_3$ aqueous solution. The organic phase was washed with brine, water dried over anhydrous $Na_2SO_4$ and concentrated under vacuum to get the title compound. Yield: 6% (27.03 mg, Off-white solid). $^1$H NMR (400 MHz, DMSO-$d_6$): δ 9.00 (s, 1H), 8.94 (d, J=8.8 Hz, 1H), 8.22-8.21 (m, 1H), 8.07 (s, 1H), 7.27-7.00 (m, 2H), 3.92-3.82 (m, 1H), 3.57-3.55 (m, 2H), 3.45-3.43 (m, 2H), 3.30-3.25 (m, 4H), 2.07-2.05 (m, 2H), 1.87-1.85 (m, 2H), 1.62-1.53 (m, 2H), 1.32-1.23 (m, 2H). LCMS: (Method A) 396.0 (M+H), Rt. 1.85 min, HPLC: (Method A) Rt. 2.40 min.

Ex. 53: N-((1r,4r)-4-(ethylsulfonamido)cyclohexyl)-2-(1H-imidazol-1-yl)pyrimidine-4-carboxamide

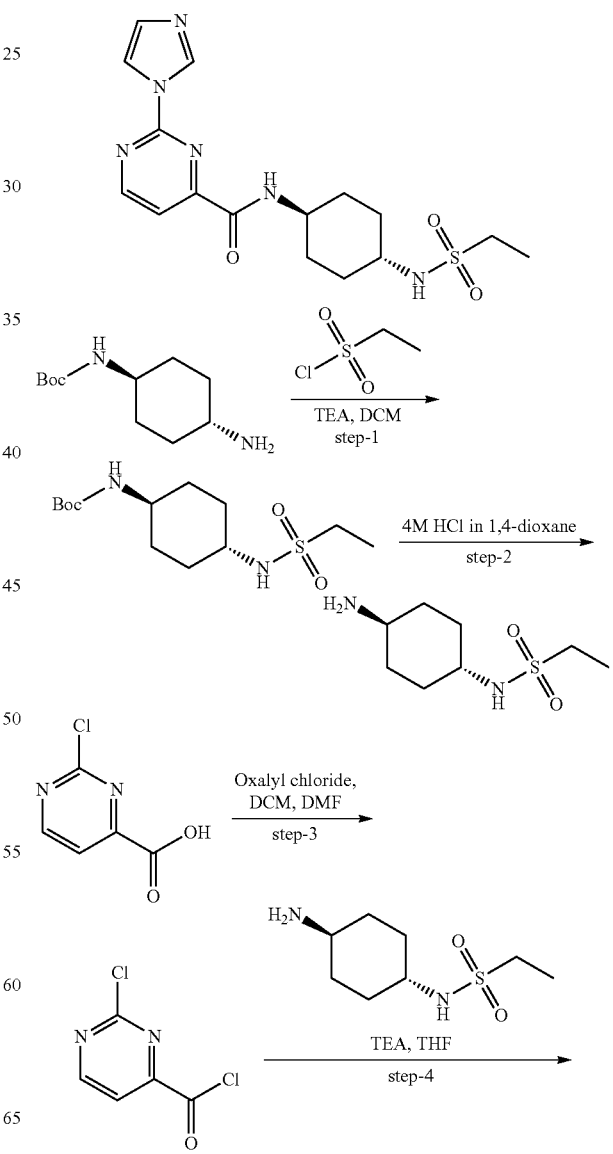

-continued

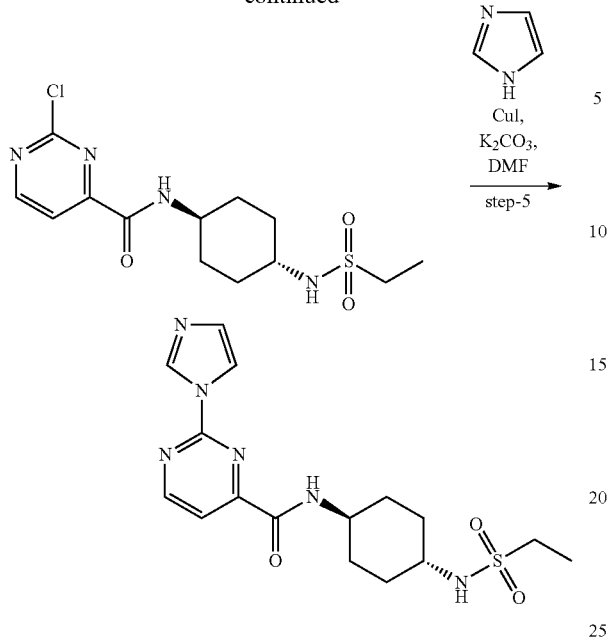

Step 1: tert-butyl ((1r,4r)-4-(ethylsulfonamido)cyclohexyl)carbamate

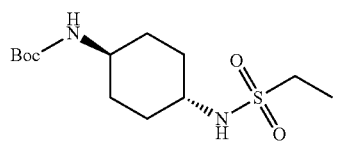 [SMILES: CCS(=O)(=O)N[C@H]1CC[C@H](NC(=O)OC(C)(C)C)CC1]

To a stirred solution of tert-butyl ((1r,4r)-4-aminocyclohexyl)carbamate (0.5 g, 2.33 mmol, Cas no. 177906-48-8) in DCM (10 mL) at 0° C., were added triethylamine (472 mg, 4.66 mmol) followed by ethanesulfonyl chloride (449 mg, 3.49 mmol) and the reaction mixture was stirred at RT overnight. After completion (TLC), the reaction mixture was quenched with water (20 mL), and the suspension was extracted with DCM (50 mL). The organic layer was dried over anhydrous $Na_2SO_4$ and concentrated under vacuum to get the title compound. Yield: 735 mg (White solid). $^1H$ NMR (400 MHz, DMSO-$d_6$): δ 7.00 (d, J=10.0 Hz, 1H), 6.72 (d, J=10.0 Hz, 1H), 3.15-3.04 (m, 1H), 3.01-2.89 (m, 3H), 1.90-1.68 (m, 4H), 1.39-1.12 (m, 16H). LCMS: (Method A) 207.2 (M-Boc), Rt. 2.00 min Step 2: N-((1r,4r)-4-aminocyclohexyl)ethanesulfonamide hydrochloride

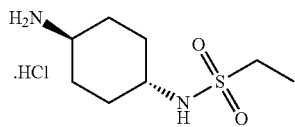

To a stirred solution of tert-butyl ((1r,4r)-4-(ethylsulfonamido)cyclohexyl)carbamate (335 mg, 1.09 mmol) in DCM (20 mL), TFA (0.41 mL, 5.46 mmol) was added at 0° C. under nitrogen atmosphere. After stirring the reaction mixture at RT for 4 h, no reaction was observed by crude LCMS analysis. Then the reaction mixture was concentrated under vacuum. The residue was dissolved in 1,4-dioxane (5 mL), the solution was cooled to 0° C., and then HCl in 1,4-dioxane (4 M, 3 mL) was added. Then the reaction mixture was stirred at RT overnight. After completion (LCMS), the reaction mixture was concentrated under vacuum to get the title compound. Yield: (540 mg, yellow solid). $^1H$ NMR (400 MHz, DMSO-$d_6$): δ 8.20-8.10 (m, 3H), 7.10 (d, J=10.0 Hz, 1H), 3.03-2.89 (m, 3H), 2.05-1.78 (m, 4H), 1.45-1.09 (m, 7H). LCMS: (Method A) 207.2 (M+H), Rt. 0.48 min

Step 3: 2-chloropyrimidine-4-carbonyl chloride

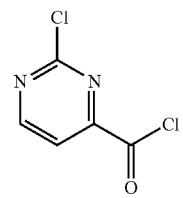

To a stirred solution of 2-chloropyrimidine-4-carboxylic acid (251 mg, 1.58 mmol, cas no 149849-92-3) and one drop of DMF in DCM (5 mL) at 0° C., was added oxalyl chloride (0.40 mL, 4.74 mmol) and the reaction mixture was stirred at the same temperature for 3 h. After completion (monitored by TLC), the reaction mixture was concentrated under vacuum to get the title compound which was immediately used in the next step without any purification. Yield: 310 mg (Black gummy solid).

Step 4: 2-chloro-N-((1r,4r)-4-(ethylsulfonamido)cyclohexyl)pyrimidine-4-carboxamide

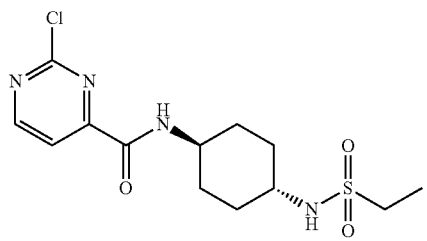 [SMILES: CCS(=O)(=O)N[C@H]1CC[C@H](NC(=O)c2ccnc(Cl)n2)CC1]

To a stirred solution of 2-chloropyrimidine-4-carbonyl chloride (306 mg, 1.72 mmol) and TEA (1.24 mL, 8.64 mmol) in THF (7 mL) at 0° C. was added N-((1r,4r)-4-aminocyclohexyl)ethanesulfonamide hydrochloride (535 mg, 2.59 mmol) and the reaction mixture was stirred at RT for 16 h. The reaction mixture was monitored by TLC and quenched with water (50 mL). The resulting suspension was extracted with EtOAc (100 mL). The combined organic layer was dried over anhydrous $Na_2SO_4$ and concentrated under vacuum. The resulting crude residue was purified by Grace normal phase purification (100-200 mesh silica gel, eluent: 50%-80% EtOAc in petroleum ether) to get the title compound. Yield: 33% (199 mg, yellow solid). LCMS: (Method A) 347.0 (M+H), Rt. 1.23 min.

Step 5: N-((1r,4r)-4-(ethylsulfonamido)cyclohexyl)-2-(1H-imidazol-1-yl)pyrimidine-4-carboxamide

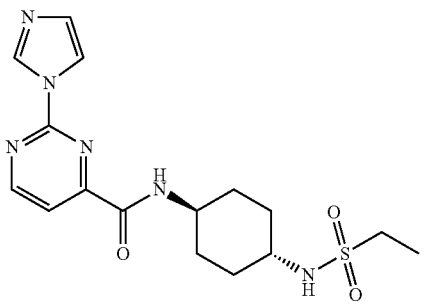 [SMILES: CCS(=O)(=O)N[C@H]1CC[C@H](NC(=O)c2ccnc(-n3ccnc3)n2)CC1]

A stirred solution of 2-chloro-N-((1r,4r)-4-(ethylsulfonamido)cyclohexyl)pyrimidine-4-carboxamide (197 mg, 0.56 mmol) and 1H-imidazole (117 mg, 1.70 mmol) in DMF (3 mL) was purged with $N_2$ gas for 5 min at RT. Then potassium carbonate (235 mg, 1.70 mmol) and CuI (10.8 mg, 0.05 mmol) were added at RT and the reaction mixture was heated at 120° C. overnight. After completion, the reaction mixture was filtered through celite, and the celite bed was washed with 10% MeOH in DCM (50 mL). The combined filtrate was concentrated under vacuum and the resulting crude residue was purified by prep HPLC (method B). The prep-fraction was concentrated under reduced pressure, the residue was diluted with 10% MeOH in DCM (20 mL) and washed with water (2×10 mL). The organic layer was dried over anhydrous $Na_2SO_4$, filtered, concentrated under reduced pressure and finally lyophilized to get the title compound. Yield: 5% (11.75 mg, off white solid). $^1$H NMR (400 MHz, DMSO-$d_6$): 9.07 (d, J=4.8 Hz, 1H), 8.97-8.96 (m, 1H), 8.87 (d, J=8.4 Hz, 1H), 8.23-8.22 (m, 1H), 7.91 (d, J=4.8 Hz, 1H), 7.19-7.18 (m, 1H), 7.10 (d, J=7.6 Hz, 1H), 3.84-3.75 (m, 1H), 3.10-3.04 (m, 1H), 3.00 (q, J=7.2 Hz, 2H), 1.97-1.94 (m, 2H), 1.86-1.83 (m, 2H), 1.64-1.55 (m, 2H), 1.43-1.33 (m, 2H), 1.30 (t, J=7.2 Hz, 3H). LCMS: (Method A) 379.0 (M+H), Rt. 0.46 min, HPLC: (Method A) Rt. 1.87 min.

Ex. 54: 2-(1H-imidazol-1-yl)-N-((1r,4r)-4-methoxy-4-methylcyclohexyl)pyrimidine-4-carboxamide

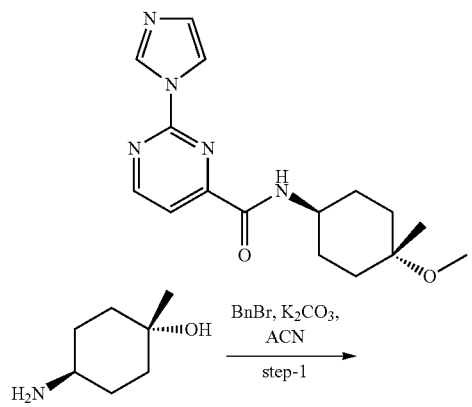

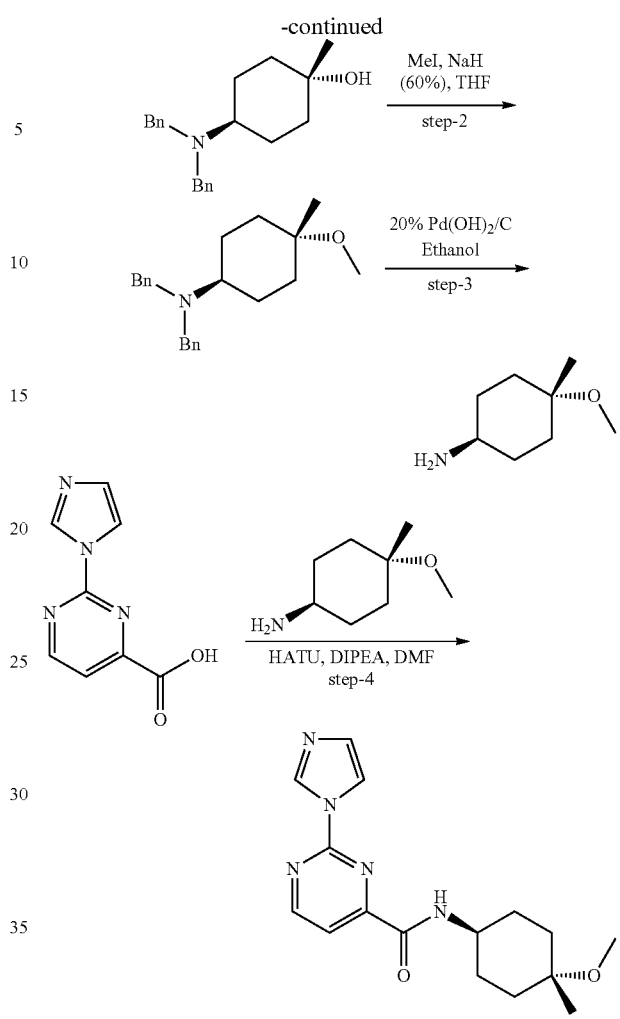

Step 1: (1r,4r)-4-(dibenzylamino)-1-methylcyclohexan-1-ol

To a stirred solution of (1r,4r)-4-amino-1-methylcyclohexan-1-ol (359 mg, 2.77 mmol, cas no-177908-37-1) in acetonitrile (10 mL), potassium carbonate (1.15 g, 8.33 mmol) and benzyl bromide (0.66 mL, 5.55 mmol) were added at RT and the reaction mixture was heated at 75° C. for 16 h. After completion, the reaction mixture was quenched with water (50 mL) and extracted with EtOAc (100 mL). The combined organic layer was washed with water (3×50 mL), dried over anhydrous $Na_2SO_4$, filtered and the filtrate was concentrated under vacuum to get the title compound. Yield: 61% (531 mg, white solid). $^1$H NMR (400 MHz, DMSO-$d_6$): δ 7.36-7.17 (m, 8H), 4.18 (s, 1H), 3.53 (s, 4H), 2.44-2.28 (m, 3H), 1.71-1.66 (m, 2H), 1.57-1.53 (m, 2H), 1.49-1.36 (m, 2H), 1.27-1.17 (m, 2H), 1.10 (s, 3H). LCMS: (Method A) 296.2 (M-OH), Rt. 1.23 min.

Step 2: (1r,4r)-N,N-dibenzyl-4-methoxy-4-methyl-cyclohexan-1-amine

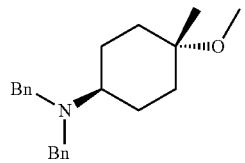 [SMILES: CO[C@]1(C)CC[C@@H](N(Cc2ccccc2)Cc2ccccc2)CC1]

To a stirred solution of (1r,4r)-4-(dibenzylamino)-1-methylcyclohexan-1-ol (399 mg, 1.28 mmol) in THF (5 mL) at 0° C., sodium hydride (128 mg, 3.22 mmol, 60% suspension) was added under nitrogen atmosphere followed by methyl iodide (0.24 mL, 549 mg, 3.86 mmol). After complete addition, the reaction mixture was warmed to RT and stirred at RT overnight. After completion of the reaction, the reaction mixture was slowly poured into ice cold water (50 mL) and the resulting suspension was extracted with EtOAc (50 mL). The organic layer was washed with water (2×50 mL), dried over anhydrous Na$_2$SO$_4$, filtered and the filtrate was concentrated under vacuum. The resulting crude residue was purified by Grace normal phase purification (100-200 mesh silica gel, eluent: 20%-30% EtOAc in petroleum ether) to get the title compound. Yield: 93% (535 mg, colorless liquid). LCMS: (Method C) 324.2 (M+H), Rt. 1.48 min.

Step 3: (1r,4r)-4-methoxy-4-methylcyclohexan-1-amine

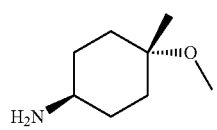

To a stirred solution of (1r,4r)-N,N-dibenzyl-4-methoxy-4-methylcyclohexan-1-amine (705 mg, 2.17 mmol) in absolute ethanol (7 mL) at RT, 20% Pd(OH)$_2$/C (70 mg) was added and the reaction mixture was stirred at RT under hydrogen atmosphere overnight. After completion of the reaction, the reaction mixture was filtered through a celite-bed and the bed was washed with methanol (100 mL). The combined filtrate was concentrated under vacuum to afford the title compound which was used in the next step without further purification. Yield: 323 mg (colorless liquid). LCMS: (Method C) 144.3 (M+H), Rt 0.24 min.

Step 4: 2-(1H-imidazol-1-yl)-N-((1r,4r)-4-methoxy-4-methylcyclohexyl)pyrimidine-4-carboxamide

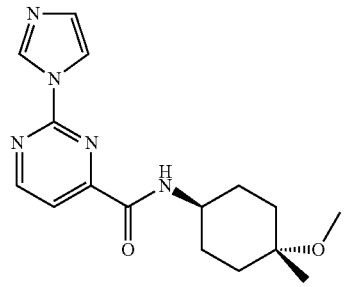 [SMILES: CO[C@]1(C)CC[C@@H](NC(=O)c2ccnc(-n3ccnc3)n2)CC1]

To a stirred solution of 2-(1H-imidazol-1-yl)pyrimidine-4-carboxylic acid (210 mg, 1.10 mmol) in DMF (5 mL) at 0° C., HATU (629 mg, 1.65 mmol) and DIPEA (0.50 mL, 2.76 mmol) were added under nitrogen atmosphere and the reaction mixture was stirred at 0° C. for 5 min. Then (1r,4r)-4-methoxy-4-methylcyclohexan-1-amine (189 mg, 1.32 mmol) was added and the reaction mixture was stirred overnight at RT. After completion (starting material was consumed according to TLC), the reaction mixture was diluted with water (30 mL) and then extracted with 10% MeOH in DCM (50 mL). The organic layer was dried over anhydrous Na$_2$SO$_4$, filtered and the filtrate was concentrated under vacuum. The resulting crude residue was purified by Grace reverse phase purification (Method A). The prep-fraction was concentrated under reduced pressure, the residue was diluted with 10% MeOH in DCM (50 mL) and washed with 10% aq. NaHCO$_3$ solution (20 mL) followed by water (2×20 mL). The organic layer was dried over anhydrous Na$_2$SO$_4$, filtered, concentrated under reduced pressure and finally lyophilized to get the title compound. Yield: 52% (182.65 mg, off white solid). $^1$H NMR (400 MHz, DMSO-d$_6$): 9.07 (d, J=5.2 Hz, 1H), 8.96-8.95 (m, 1H), 8.78 (d, J=8.4 Hz, 1H), 8.22-8.21 (m, 1H), 7.92 (d, J=5.2 Hz, 1H), 7.20-7.19 (m, 1H), 3.91-3.82 (m, 1H), 3.14 (s, 3H), 1.80-1.62 (m, 6H), 1.54-1.47 (m, 2H), 1.23 (s, 3H). LCMS: (Method C) 316.0 (M+H), Rt. 1.22 min. HPLC: (Method A) Rt. 2.08 min.

Ex. 55: N-((1s,4s)-4-hydroxy-4-methylcyclohexyl)-2-(1H-imidazol-1-yl)pyrimidine-4-carboxamide

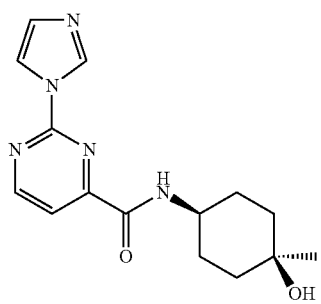

Step 1: 2-(1H-imidazol-1-yl)pyrimidine-4-carboxylic acid

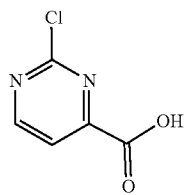
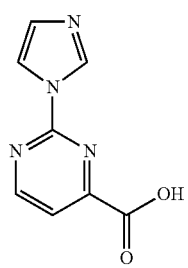 [SMILES: O=C(O)c1ccnc(-n2ccnc2)n1]
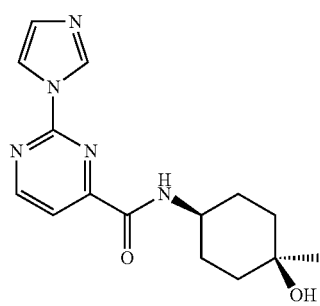

A stirred solution of 2-chloropyrimidine-4-carboxylic acid (400 mg, 2.52 mmol) and 1H-imidazole (514 mg, 7.54 mmol) in DMF (4 mL) at RT was purged with $N_2$ gas for 5 min. Then potassium carbonate (1.046 g, 7.56 mmol) followed by CuI (48.1 mg, 0.24 mmol) were added at RT and the reaction mixture was heated to 120° C. overnight. After completion (LCMS), the reaction mixture was filtered through celite, and the filtrate bed was washed with 10% MeOH in DCM (50 mL). The combined filtrate was concentrated under vacuum and the resulting crude residue was taken to the next step without purification. Yield: 870 mg (Yellow solid). LCMS: (Method A) 191.0 (M+H), Rt. 0.21 min.

Step 2: N-((1s,4s)-4-hydroxy-4-methylcyclohexyl)-2-(1H-imidazol-1-yl)pyrimidine-4-carboxamide

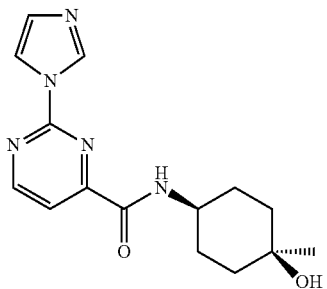 [SMILES: C[C@]1(O)CC[C@@H](NC(=O)c2ccnc(-n3ccnc3)n2)CC1]

To a stirred solution of 2-(1H-imidazol-1-yl)pyrimidine-4-carboxylic acid (200 mg, 1.05 mmol) in DMF (3 mL) at 0° C., were added HATU (599 mg, 1.57 mmol) followed by DIPEA (0.9 mL, 5.25 mmol) under nitrogen atmosphere and the reaction mixture was stirred at 0° C. for 5 min. Then (1s,4s)-4-amino-1-methylcyclohexan-1-ol (135.8 mg, 1.05 mmol, CAS: 177906-46-6) was added and the reaction mixture was stirred at RT overnight. After completion (starting material was consumed according to TLC), the reaction mixture was diluted with water (30 mL) and extracted with 10% MeOH in DCM (50 mL). The organic layer was dried over anhydrous $Na_2SO_4$, filtered and the filtrate was concentrated under vacuum. The resulting crude product was purified by Grace reverse phase purification (Method A). The prep-fraction was concentrated under reduced pressure, the residue was diluted with 10% MeOH in DCM (50 mL) and washed with 10% aq. $NaHCO_3$ solution (20 mL) followed by water (2×20 mL). The organic layer was dried over anhydrous $Na_2SO_4$, filtered, concentrated under reduced pressure and finally lyophilized to get the title compound. Yield: 30% (142 mg, Off white solid). $^1$H NMR (400 MHz, DMSO-$d_6$): δ 9.05 (d, J=5.2 Hz, 1H), 9.01-9.00 (m, 1H), 8.96 (d, J=8.8 Hz, 1H), 8.27-8.27 (m, 1H), 7.91 (d, J=4.8 Hz, 1H), 7.17-7.16 (m, 1H), 4.17 (s, 1H), 3.85-3.78 (m, 1H), 2.08-1.88 (m, 2H), 1.63-1.58 (m, 2H), 1.54-1.51 (m, 2H), 1.43-1.35 (m, 2H), 1.14 (s, 3H). LCMS: (Method A) 302.1 (M+H), Rt. 0.51 min. HPLC: (Method A) Rt. 1.88 min.

Ex. 56: 6-cyclopropyl-2-(1H-imidazol-1-yl)-N-((1r,4r)-4-(2-methoxyethoxy) cyclohexyl) pyrimidine-4-carboxamide

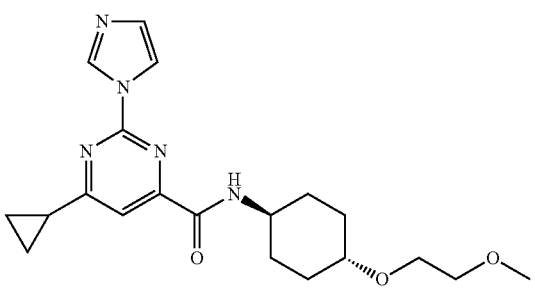

1H), 1.24-1.20 (m, 2H), 1.13-1.11 (m, 2H), LCMS: (Method A) 213.1 (M+H), Rt 2.00 min, 1D NOE effect was observed between the pyrimidine proton (8.04 ppm) and the cyclopropyl CH (2.40-2.36 ppm), confirming the substitution at $6^{th}$ position.

Step 2: 6-cyclopropyl-2-(1H-imidazol-1-yl)pyrimidine-4-carboxylic acid

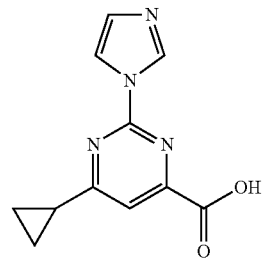

A stirred solution of methyl 2-chloro-6-cyclopropylpyrimidine-4-carboxylate (313 mg, 1.47 mmol) and 1H-imidazole (305 mg, 4.41 mmol) in DMF (5 mL) was purged with nitrogen gas for 5 min at RT. Then K₂CO₃ (610 mg, 4.41 mmol) followed by CuI (28.03 mg, 0.14 mmol) were added at RT. The reaction mixture was heated at 120° C. for 16 h. After completion, the reaction mixture was filtered through celite, and the celite bed was washed with MeOH (100 mL) and water (5 mL). The combined filtrate was concentrated under vacuum. The crude residue was suspended in diethyl ether (20 mL) and acidified with HCl in diethyl ether (20 mL, 2 M). The mixture was concentrated to get the title compound as hydrochloride salt. Yield: crude (535 mg, yellow solid). LCMS: (Method A) 231.1 (M+H), Rt. 0.86 min.

Step 3: 6-cyclopropyl-2-(1H-imidazol-1-yl)-N-((1r,4r)-4-(2-methoxyethoxy)cyclohexyl)pyrimidine-4-carboxamide

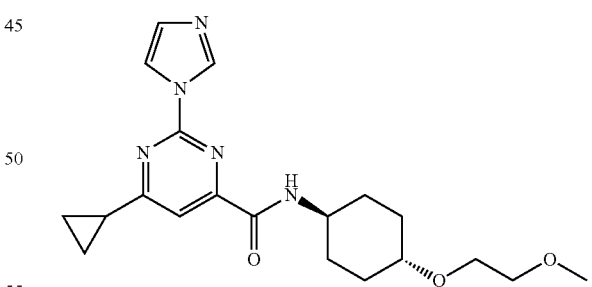

To a stirred mixture of 6-cyclopropyl-2-(1H-imidazol-1-yl)pyrimidine-4-carboxylic acid (530 mg, 2.30 mmol) in DMF (17 mL) at 0° C., HATU (1.31 g, 3.45 mmol) and DIPEA (1.0 mL, 5.75 mmol) were added under nitrogen atmosphere followed by (1r,4r)-4-(2-methoxyethoxy)cyclohexan-1-amine (498 mg, 2.87 mmol). The reaction mixture was stirred for 16 h at RT. After completion (starting material was consumed according to TLC), the reaction mixture was diluted with water (20 mL) and then extracted with 10% MeOH in DCM (150 mL). The resulting organic solution was washed with 10% NaHCO₃ solution (50 mL)

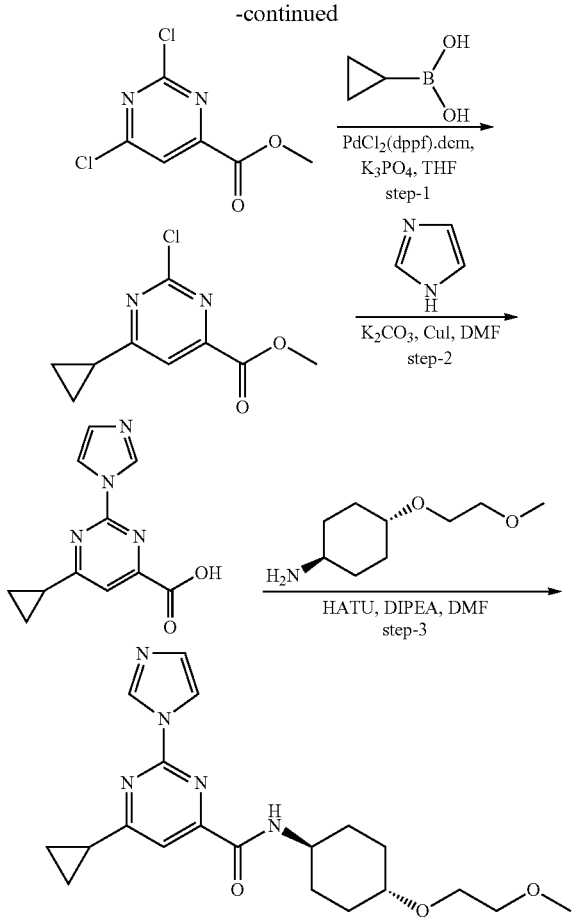

Step 1: methyl 2-chloro-6-cyclopropylpyrimidine-4-carboxylate

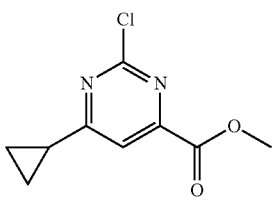

A stirred solution of methyl 2,6-dichloropyrimidine-4-carboxylate (1.20 g, 5.79 mmol) and cyclopropylboronic acid (497 mg, 5.79 mmol) in THF (15 mL) was purged with nitrogen gas for 5 min at RT. Then K₃PO₄ (3.07 g, 14.49 mmol) and Pd(dppf)Cl₂·DCM (473 mg, 0.57 mmol) were added at RT. The reaction mixture was heated at 70° C. for 16 h. After completion, the reaction mixture was filtered through celite, and washed with EtOAc (500 mL). The filtrate was washed with brine solution (2×100 mL) followed by water (2×100 mL). The organic layer was dried over anhydrous Na₂SO₄, filtered, and the filtrate was concentrated under vacuum. The resulting crude residue was purified by Grace instrument using silica gel (100-200 mesh, 20-30% EtOAc/pet ether as eluent) to get the title compound. Yield: 52% (643 mg, yellow solid). ¹H NMR (400 MHz, DMSO-d₆): δ 8.04 (s, 1H), 3.91 (s, 3H), 2.40-2.36 (m, followed by water (2×25 mL). The organic layer was dried over anhydrous Na₂SO₄, filtered, and the filtrate was concentrated under vacuum. The resulting crude product was purified by Grace instrument, reverse phase (Method A). The prep-fraction was concentrated under reduced pressure. The residue was diluted with 10% MeOH/DCM (50 mL) and washed with 10% NaHCO₃ solution (15 mL) followed by water (2×10 mL). The organic layer was dried over anhydrous Na₂SO₄, filtered, concentrated under reduced pressure, and then lyophilized to get the title compound. Yield: 36% (321.12 mg, off white solid). ¹H NMR (400 MHz, DMSO-d₆): δ 8.90-8.89 (m, 1H), 8.75 (d, J=8.4 Hz, 1H), 8.17-8.16 (m, 1H), 7.87 (s, 1H), 7.143-7.137 (m, 1H), 3.87-3.79 (m, 1H), 3.57-3.54 (m, 2H), 3.45-3.42 (m, 2H), 3.30-3.23 (m, 4H), 2.41-2.37 (m, 1H), 2.06-2.03 (m, 2H), 1.85-1.80 (m, 2H), 1.58-1.50 (m, 2H), 1.30-1.19 (m, 2H). LCMS: (Method C) 386.1 (M+H), Rt. 1.25 min. HPLC: (Method A) Rt. 2.61 min.

Ex. 57: 6-(1H-imidazol-1-yl)-N-((1r,4r)-4-(2-methoxyethoxy)cyclohexyl)-4-vinylpicolinamide

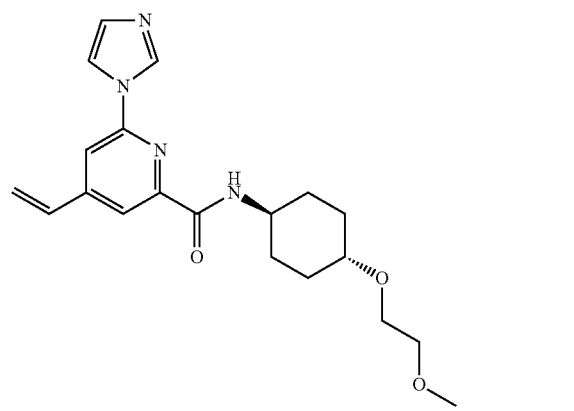

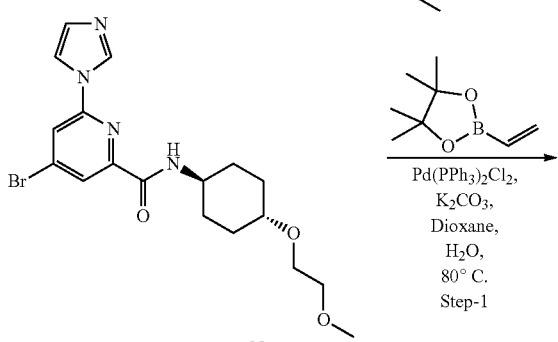

Step 1: 6-(1H-imidazol-1-yl)-N-((1r,4r)-4-(2-methoxyethoxy)cyclohexyl)-4-vinylpicolinamide

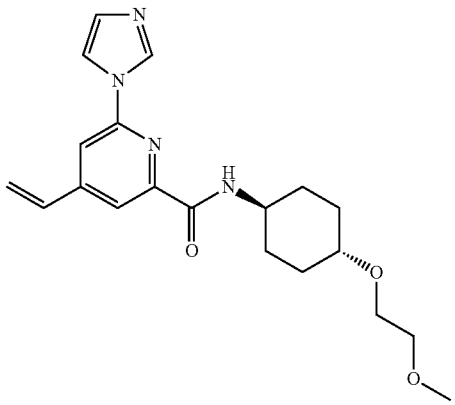 [SMILES: C=Cc1cc(C(=O)N[C@H]2CC[C@H](OCCOC)CC2)nc(-n2ccnc2)c1]

A mixture of 4-bromo-6-(1H-imidazol-1-yl)-N-((1r,4r)-4-(2-methoxyethoxy)cyclohexyl) picolinamide (200 mg, 0.47 mmol), 4,4,5,5-tetramethyl-2-vinyl-1,3,2-dioxaborolane (109.21 mg, 0.71 mmol) in a mixture of 1,4-dioxane-H₂O (4.5 mL: 0.5 mL), K₂CO₃ (163.12 mg, 1.18 mmol), and Pd(PPh₃)₂Cl₂ (38.61 mg, 0.05 mmol) were added at RT and the mixture was purged with nitrogen gas for 5 min at RT. The reaction mixture was heated at 80° C. for 16 h. After completion (TLC shows starting material was consumed), the reaction mixture was filtered through celite bed, and the celite bed was washed with DCM (20 mL). The solvent was evaporated under vacuum to get crude compound which was purified by column chromatography on Biotage Isolera (100-200 mesh silica gel, eluting with 0-10% MeOH in DCM) followed by further purification by prep HPLC (Method A). The prep fractions were concentered to the aqueous phase, added DCM, and then neutralized with 10% NaHCO₃ aqueous solution. The phases were separated. The organic phase was washed with water, brine, dried over anhydrous Na₂SO₄ and evaporated to afford the title compound. Yield: 4.4% (8 mg, pale brown solid). ¹H NMR (400 MHz, DMSO-d₆): δ 8.96 (s, 1H), 8.54 (d, J=8.4 Hz, 1H), 8.29-8.28 (m, 1H), 8.09 (d, J=0.8 Hz, 1H), 7.99 (d, J=0.8 Hz, 1H), 7.17 (s, 1H), 6.95-6.87 (m, 1H), 6.42-6.38 (m, 1H), 5.73-5.70 (m, 1H), 3.89-3.80 (m, 1H), 3.57-3.54 (m, 2H), 3.45-3.42 (m, 2H), 3.29-3.24 (m, 4H), 2.06-2.03 (m, 2H), 1.85-1.83 (m, 2H), 1.62-1.56 (m, 2H), 1.31-1.22 (m, 2H). LCMS: (Method C) 371.2 (M+H), Rt. 1.22 min. HPLC: (Method A) Rt. 2.52 min.

Ex. 58: N-((1r,4r)-4-ethoxycyclohexyl)-2-(1H-imidazol-1-yl)pyrimidine-4-carboxamide

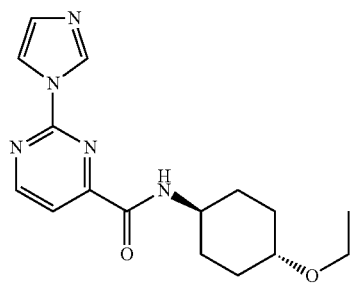 [SMILES: CCO[C@H]1CC[C@H](NC(=O)c2ccnc(-n3ccnc3)n2)CC1]

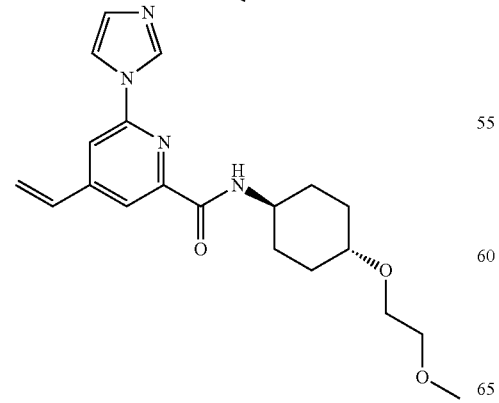

Step 1: (1r,4r)-N,N-dibenzyl-4-ethoxycyclohexan-1-amine

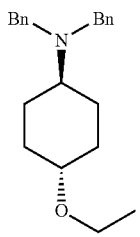

To a stirred solution of (1r,4r)-4-(dibenzylamino)cyclohexan-1-ol (0.5 g, 1.69 mmol) in DMF (10 mL) at 0° C., sodium hydride (169 mg, 4.23 mmol) was added portionwise. Then ethyl iodide (0.27 mL, 3.38 mmol) was added slowly at 0° C. and the reaction mixture was stirred at RT overnight. After completion (monitored by TLC), the reaction mixture was quenched with ice cold water and the resulting mixture was extracted with EtOAc. The organic layer was dried over anhydrous $Na_2SO_4$, filtered and the filtrate was concentrated under vacuum. The crude residue was purified by silica column chromatography on Biotage Isolera using 0-9% EtOAc in petroleum ether to get the title compound. Yield: 82% (0.45 g, colorless liquid). $^1$H NMR (300 MHz, DMSO-$d_6$): 7.35-7.17 (m, 10H), 3.56 (s, 4H), 3.40 (q, J=7.2 Hz, 2H), 3.15-3.10 (m, 1H), 2.43-2.35 (m, 1H), 2.01-1.97 (m, 2H), 1.83-1.79 (m, 2H), 1.46-1.34 (m, 2H), 1.05 (t, J=6.9 Hz, 3H), 1.05-0.89 (m, 2H). LCMS: (Method A) 324.0 (M+H), Rt. 2.13 min.

Step 2: (1r,4r)-4-ethoxycyclohexan-1-amine

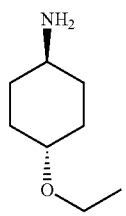

To a stirred solution of (1r,4r)-N,N-dibenzyl-4-ethoxycyclohexan-1-amine (0.45 g, 1.39 mmol) in absolute ethanol (4 mL) at RT, Pd(OH)$_2$ on carbon (45 mg, 20% wt. basis) was added and the mixture was stirred for 16 h under hydrogen atmosphere at RT. After completion (monitored by TLC), the reaction mixture was filtered through celite bed, and the bed was washed with MeOH. The combined filtrate was evaporated under vacuum to afford the title compound which was used in the next step without further purification. Yield: crude (0.23 g, colorless liquid). LCMS: (Method C) 144.3 (M+H), 0.95 min.

Step 3: N-((1r,4r)-4-ethoxycyclohexyl)-2-(1H-imidazol-1-yl)pyrimidine-4-carboxamide

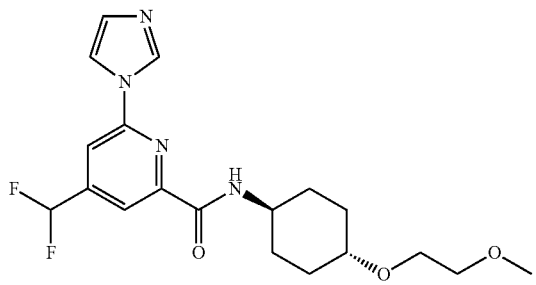

To a stirred solution of 6-(thiazol-5-yl)-1H-indole-4-carboxylic acid (0.252 g, 1.32 mmol) in DMF (3 mL) at 0° C., were added HATU (1.26 g, 3.32 mmol) followed by DIPEA (0.57 mL, 3.31 mmol) under nitrogen atmosphere. Then (1r,4r)-4-ethoxycyclohexan-1-amine (0.19 g, 1.32 mmol) was added at RT and the reaction mixture was stirred at RT for 16 h. After completion (starting material was consumed according to TLC), the reaction mixture was diluted with water and extracted with 10% MeOH in DCM. The resulting organic layer was concentrated under vacuum. The resulting crude residue was purified by reverse phase prep HPLC (method B) to get the title compound. Yield: 7% (25 mg, white solid). $^1$H NMR (400 MHz, DMSO-$d_6$): 9.06 (d, J=5.2 Hz, 1H), 8.97 (s, 1H), 8.85 (d, J=8.8 Hz, 1H), 8.23-8.22 (m, 1H), 7.91 (d, J=4.8 Hz, 1H), 3.91-3.81 (m, 1H), 3.48 (q, J=6.8 Hz, 2H), 3.26-3.21 (m, 1H), 2.06-2.03 (m, 2H), 1.86-1.83 (m, 2H), 1.62-1.53 (m, 2H), 1.30-0.21 (m, 2H), 1.11 (t, J=6.8 Hz, 3H). LCMS: (Method D) 316.2 (M+H), Rt. 1.77 min, HPLC: (Method A) Rt. 2.14 min.

Ex. 59: Synthesis of 4-(difluoromethyl)-6-(1H-imidazol-1-yl)-N-((1r,4r)-4-(2-methoxyethoxy)cyclohexyl)picolinamide

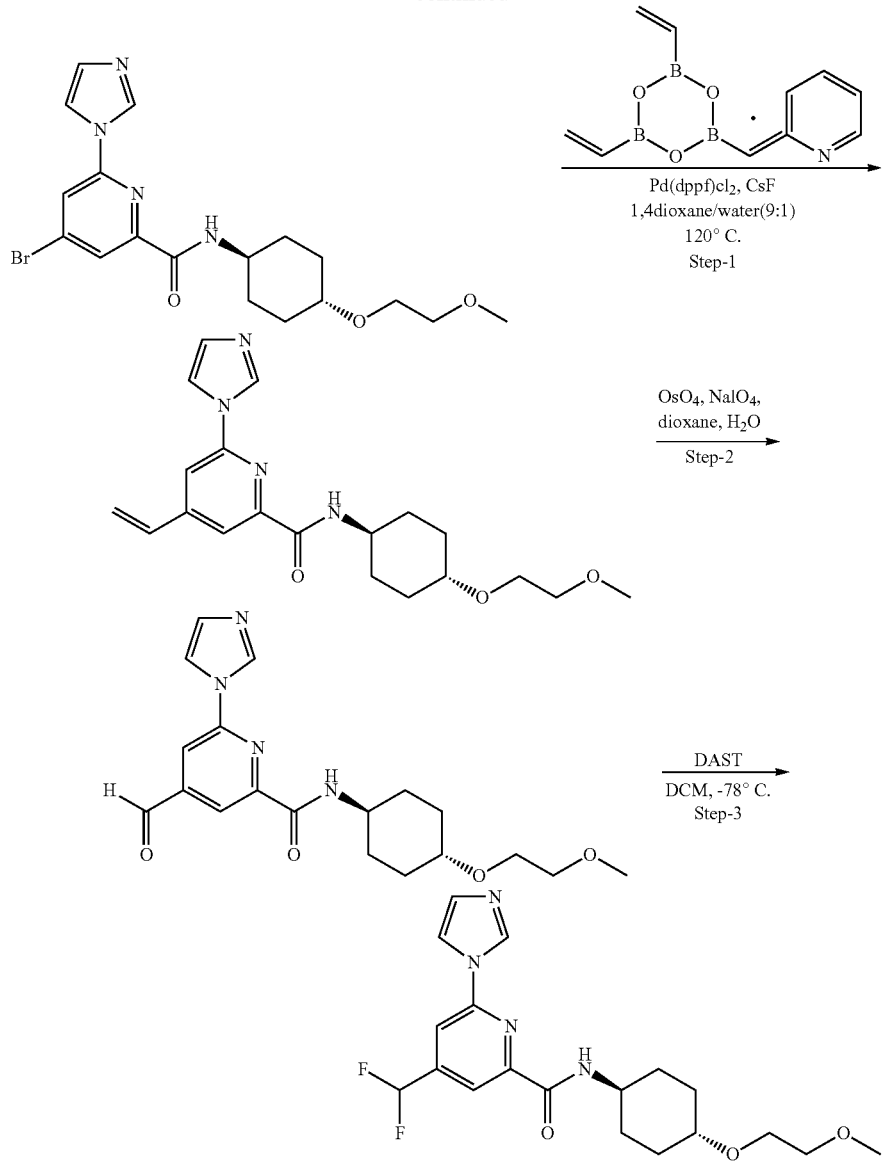

Step 1: Synthesis of 2-(1H-imidazol-1-yl)-N-((1r,4r)-4-(2-methoxyethoxy)cyclohexyl)-6-vinylpyrimidine-4-carboxamide

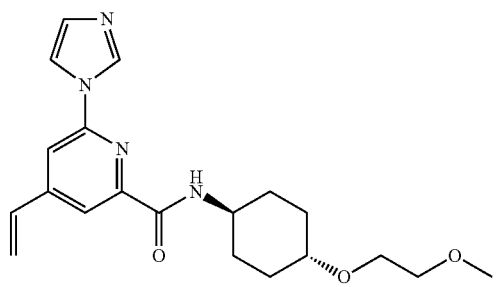 [SMILES: C=Cc1cc(C(=O)N[C@H]2CC[C@H](OCCOC)CC2)nc(-n2ccnc2)c1]

To a briefly degassed solution of 6-bromo-2-(1H-imidazol-1-yl)-N-((1r,4r)-4-(2-methoxyethoxy)cyclohexyl)pyrimidine-4-carboxamide (500 mg, 1.18 mmol) in a mixture of 1,4-dioxane/water (9:1, 10 mL) at room temperature, were added 2,4,6-trivinylboroxine-pyridine complex (470 mg, 1.77 mmol), CsF (530 mg, 3.54 mmol) and the mixture was purged with $N_2$ (gas) for 5 min. Then $PdCl_2$(dppf).DCM complex (96 mg, 0.12 mmol) was added and the reaction mixture was heated at 120° C. for 5 h. The reaction was monitored by TLC, and the starting material was consumed. The reaction mixture was concentrated, water (10 mL) was added, and extracted with DCM (2×10 mL). The combined organic phase was washed with water (20 mL), brine (20 mL), dried over anhydrous $Na_2SO_4$, and the solvent was evaporated under vacuum to afford the title compound. Yield: 75% (330 mg, reddish brown solid). $^1H$ NMR (400 MHz, DMSO-$d_6$): δ 8.97 (s, 1H), 8.55 (d, J=8.4 Hz, 1H), 8.30 (s, 1H), 8.10 (s, 1H), 7.99 (s, 1H), 7.17 (s, 1H), 6.95-6.87 (m, 1H), 6.43-6.38 (m, 1H), 5.77-5.70 (m, 1H), 3.88-3.81 (m, 1H), 3.59-3.51 (m, 2H), 3.48-3.43 (m, 2H), 3.32-3.22 (m, 4H), 2.06-2.03 (m, 2H), 1.85-1.82 (m, 2H), 1.62-1.52 (m, 2H), 1.30-1.21 (m, 2H). LCMS: (Method C) 371.1 (M+H), Rt. 1.18 min.

Step 2: Synthesis of 4-formyl-6-(1H-imidazol-1-yl)-N-((1r,4r)-4-(2-methoxyethoxy)cyclohexyl)picolinamide

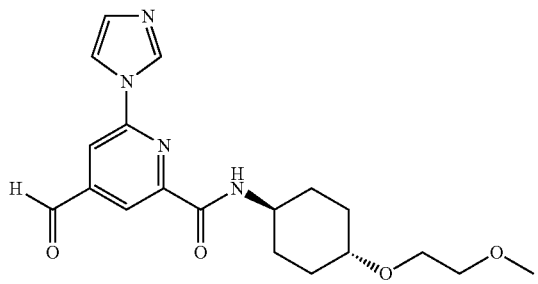 [SMILES: COCCO[C@H]1CC[C@H](NC(=O)c2cc(C=O)cc(-n3ccnc3)n2)CC1]

To a solution of 2-(1H-imidazol-1-yl)-N-((1r,4r)-4-(2-methoxyethoxy)cyclohexyl)-6-vinylpyrimidine-4-carboxamide (330 mg, 0.89 mmol) in a mixture of 1,4-dioxane/water (3:1, 10 mL) at room temperature, were added OsO$_4$ (2.5% in tert-butanol, 0.04 mL, 0.004 mmol), sodium periodate (1.14 g, 5.34 mmol) and 2,6-lutidine (143 mg, 1.33 mmol) and the reaction mixture was stirred at room temperature for 16 h. The reaction was monitored by TLC, and the starting material was consumed. The reaction mixture was quenched by the addition of 10% aq. Na$_2$S$_2$O$_3$ solution (5 mL) and 10% NaHCO$_3$ solution (5 mL) slowly. The reaction mixture was stirred for 10 min, DCM (10 mL) was added and the mixture was stirred for another 10 min. The layers were separated, the aqueous layer was extracted with 10% MeOH/DCM (2×10 mL). The combined organic phase was washed with water (20 mL), brine (20 mL), dried over anhydrous Na$_2$SO$_4$, and the solvent was evaporated under vacuum. The resulting crude was purified by flash column chromatography (silica gel, 230-400 mg) using eluent: 5%-7% MeOH/DCM to afford the title compound. Yield: 45% (150 mg, yellow solid). LCMS: (Method D) 373.1 (M+H), Rt. 1.29 min.

Step 3: Synthesis of 4-(difluoromethyl)-6-(1H-imidazol-1-yl)-N-((1r,4r)-4-(2-methoxyethoxy)cyclohexyl)picolinamide

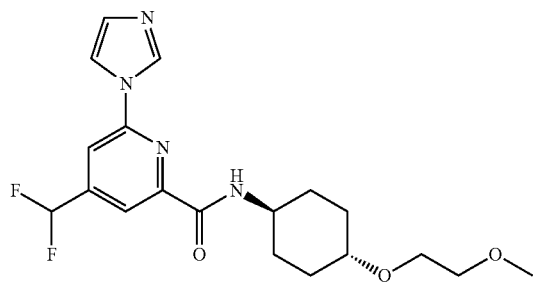

To a solution of 4-formyl-6-(1H-imidazol-1-yl)-N-((1r,4r)-4-(2-methoxyethoxy)cyclohexyl)picolinamide (150 mg, 0.40 mmol) in DCM (4 mL), was added DAST (0.106 mL, 0.8 mmol) at −78° C. slowly dropwise and the reaction mixture was warmed to 0° C. and stirred for 1 h at 0° C. After the starting material was consumed (monitored by TLC), the reaction mixture was quenched with ice water (5 mL) and extracted with DCM (2×5 mL). The combined organic phase was washed with water (10 mL), brine (10 mL), dried over anhydrous Na$_2$SO$_4$, and the solvent was evaporated under vacuum. The resulting crude residue was purified by flash column chromatography (silica gel, 230-400 mg) using eluent: 5%-8% MeOH/DCM to afford the title compound. Yield: 12% (20.1 mg, colorless gummy solid). $^1$H NMR (400 MHz, DMSO-d$_6$): δ 9.04-9.03 (m, 1H), 8.67 (d, J=8.8 Hz, 1H), 8.37-8.36 (m, 1H), 8.22 (s, 1H), 8.08 (s, 1H), 7.38-7.10 (m, 2H), 3.88-3.81 (m, 1H), 3.57-3.54 (m, 2H), 3.45-3.42 (m, 2H), 3.29-3.23 (m, 4H), 2.06-2.03 (m, 2H), 1.85-1.83 (m, 2H), 1.64-1.53 (m, 2H), 1.30-1.22 (m, 2H). LCMS: (Method A) 395.0 (M+H), Rt. 1.78 min. HPLC: (Method A) Rt. 2.40 min.

Ex. 60: 2-(1H-imidazol-1-yl)-N-((1s,4s)-4-(2-methoxyethoxy)cyclohexyl)-6-methylpyrimidine-4-carboxamide

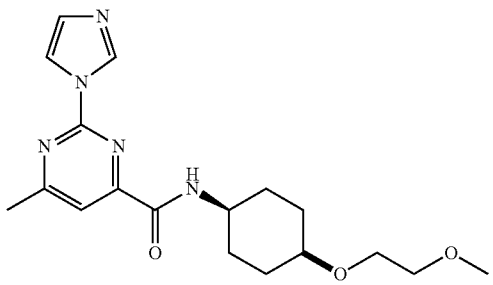

Step 1: (1s,4s)-4-(dibenzylamino)cyclohexan-1-ol

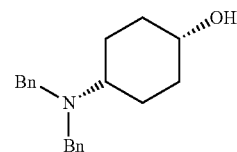

To a stirred solution of (1s,4s)-4-aminocyclohexan-1-ol hydrochloride (1.0 g, 6.59 mmol) in ACN (15 mL) at RT, K$_2$CO$_3$ (2.73 g, 19.78 mmol) and benzyl bromide (1.56 mL, 13.19 mmol) were added and the reaction mixture was heated at 70° C. for 5 h. After completion (starting material was consumed according to TLC analysis), the reaction mixture was diluted with ice cold water (100 mL) and extracted with MTBE (200 mL). The resulting organic layer was washed with water (2×100 mL), brine solution (200 mL), dried over anhydrous Na$_2$SO$_4$, filtered and the filtrate was concentrated under vacuum. The resulting crude residue was used for next the step without further purification. Yield: 76% (1.5 g, pale yellow oil). $^1$H NMR (400 MHz, DMSO-d$_6$): 7.36-7.34 (m, 10H), 4.26 (d, J=3.6 Hz 1H), 3.75-3.70 (m, 1H), 3.59 (s, 4H), 2.41-2.35 (m, 1H), 1.79-1.66 (m, 4H), 1.55-1.51 (m, 2H), 1.25-1.22 (m, 2H). LCMS: (Method C) 296.2 (M+H), Rt. 1.24 min.

Step 2: (1s,4s)-N,N-dibenzyl-4-(2-methoxyethoxy)cyclohexan-1-amine

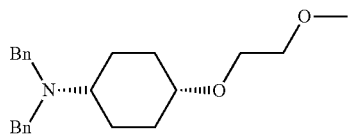

To a stirred solution of (1s,4s)-4-(dibenzylamino)cyclohexan-1-ol (1.5 g, 5.07 mmol) in DMPU (10 mL) at RT, sodium hydride (0.50 g, 12.69 mmol) was added under nitrogen atmosphere with continuous stirring (the mixture was became exothermic). Then 1-bromo-2-methoxyethane (1.76 g, 12.69 mmol) was added at RT over a period of 10 min. During addition of 1-bromo-2-methoxyethane foam formation was observed. After complete addition, the reaction mixture was stirred for 5 h at 50° C. After completion (monitored by TLC), the reaction mixture was cooled to RT and slowly poured into ice cold water (50 mL) with continuous stirring. The suspension was extracted with MTBE (300 mL). The organic layer was washed with water (2×200 mL), dried over anhydrous Na$_2$SO$_4$, filtered and the filtrate was concentrated under vacuum to get a brown oil. The crude residue was dissolved in HCl in dioxane (10 mL, 4 M), stirred for 10 min at RT and then concentrated. The resulting white solid was suspended in diethyl ether (20 mL) and the mixture stirred for 10 min. The mixture was filtered, the filtration cake was washed with diethyl ether (20 mL) and dried. The resulting hydrochloride salt was dissolved in aqueous NaOH solution (50 mL, 10% solution) and extracted with diethyl ether (100 mL). The combined organic layer was dried over Na$_2$SO$_4$, filtered, and then concentrated to get the title compound. Yield: 83% (1.5 g, pale brown oil). LCMS: (Method C) 354.3 (M+H), Rt. 1.39 min.

Step 3: (1s,4s)-4-(2-methoxyethoxy)cyclohexan-1-amine

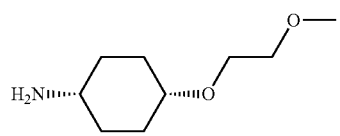

To a stirred solution of (1s,4s)-N,N-dibenzyl-4-(2-methoxyethoxy)cyclohexan-1-amine (1.5 g, 4.24 mmol) in absolute ethanol (10 mL) at RT, Pd(OH)$_2$ on carbon (0.20 g, 20% wt. basis) was added and the mixture was stirred for 16 h under hydrogen atmosphere at RT. After completion (monitored by TLC), the reaction mixture was filtered through celite bed. The filtrate was evaporated under vacuum to afford the title compound which was used in the next step without further purification. Yield: 61% (0.45 g, colorless liquid). LCMS: (Method C) 174.2 (M+H), 0.41 min.

Step 4: 2-(1H-imidazol-1-yl)-6-methylpyrimidine-4-carboxylic acid

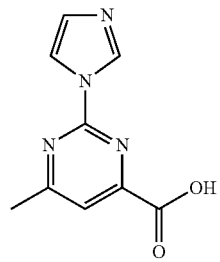

A stirred solution of 2-chloro-6-methylpyrimidine-4-carboxylic acid (5.03 g, 26.95 mmol, cas no: 89581-58-8) and 1H-imidazole (5.50 g, 80.86 mmol) in DMF (75 mL) at RT was degassed gas for 10 min before the addition of potassium carbonate (11.17 g, 80.86 mmol) followed by CuI (513 mg, 2.69 mmol). The reaction mixture was heated at 120° C. for 16 h. After completion (monitored by LCMS), the reaction mixture was filtered through celite, and the celite bed was washed with 10% MeOH in DCM (500 mL) followed by water (100 mL). The combined filtrate was concentrated under reduced pressure. The crude residue was suspended in 1,4-dioxane (30 mL) and acidified with HCl in 1,4-dioxane (50 mL, 4 M) and then concentrated under vacuum to get the title compound which was used in the next reaction without further purification. Yield: crude (11.1 g, yellow solid). LCMS: (Method C) 205.2 (M+H), Rt. 0.31 min, 54.40%, 205.1 (M+H), Rt. 0.38 min, 34.80%.

Step 5: 2-(1H-imidazol-1-yl)-N-((1s,4s)-4-(2-methoxyethoxy)cyclohexyl)-6-methylpyrimidine-4-carboxamide

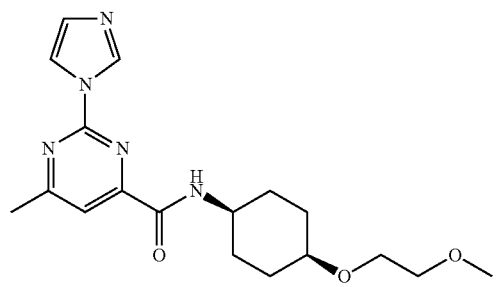

To a stirred solution of 2-(1H-imidazol-1-yl)-6-methylpyrimidine-4-carboxylic acid (93 mg, 0.45 mmol) in DMF (1 mL) at 0° C., were added HATU (259 mg, 0.68 mmol) and DIPEA (0.19 mL, 1.02 mmol) under nitrogen atmosphere. After stirring for 5 min at 0° C., (1s,4s)-4-(2-methoxyethoxy)cyclohexan-1-amine (79 mg, 0.45 mmol) was added and the reaction mixture was stirred at RT for 16 h. After completion (starting material was consumed according to TLC), the reaction mixture was diluted with ice cold water (20 mL) and extracted with EtOAc (3×20 mL). The resulting organic layer was washed with 10% NaHCO$_3$ (20 mL), water (2×20 mL), brine solution (30 mL), dried over anhydrous Na$_2$SO$_4$, filtered and the filtrate was concentrated under vacuum. The crude residue was purified by silica column chromatography on Biotage isolera using 1-2%

MeOH in DCM and to get the title compound. Yield: 9% (14.30 mg, off white solid). $^1$H NMR (400 MHz, DMSO-d$_6$): δ 8.97 (s, 1H), 8.92 (d, J=8.4 Hz, 1H), 8.23 (s, 1H), 7.84 (s, 1H), 7.15 (s, 1H), 3.94-3.82 (m, 1H), 3.54-3.47 (m, 5H), 3.28 (s, 3H), 2.63 (s, 3H), 1.92-1.75 (m, 4H), 1.57-1.46 (m, 4H). LCMS: (Method C) 360.2 (M+H), Rt. 1.34 min. HPLC: (Method A) Rt. 2.34 min.

Ex. 61: 2-(1H-imidazol-1-yl)-N-((1r,4r)-4-(2-methoxy-2-methylpropoxy)cyclohexyl)-6-methylpyrimidine-4-carboxamide

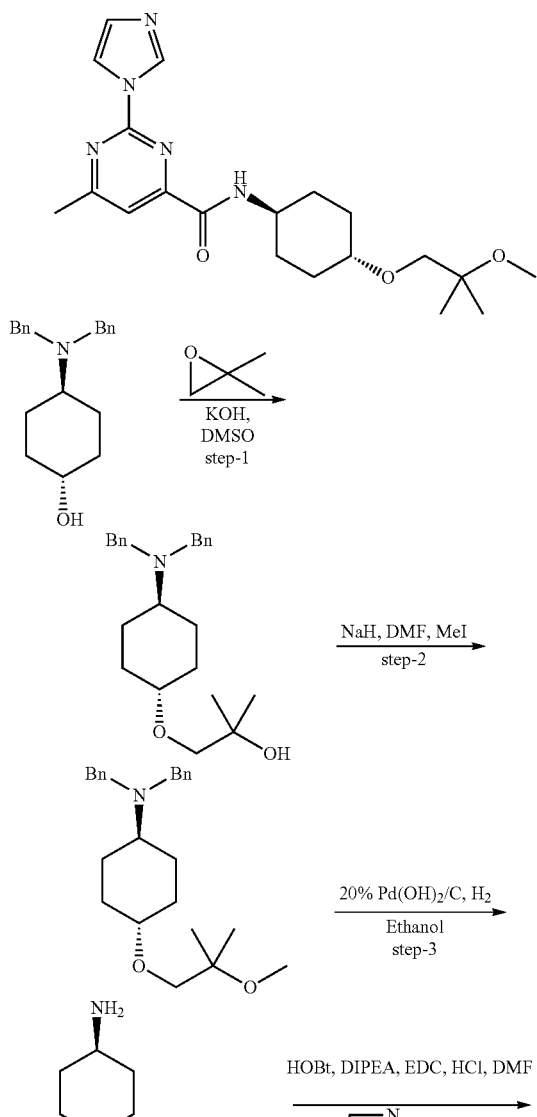

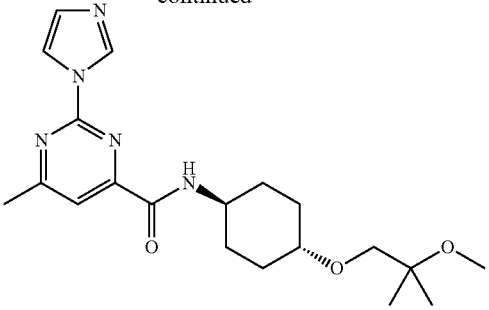

Step 1: 1-(((1r,4r)-4-(dibenzylamino)cyclohexyl)oxy)-2-methylpropan-2-ol

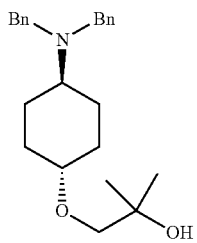

To a stirred solution of (1r,4r)-4-(dibenzylamino)cyclohexan-1-ol (0.5 g, 1.69 mmol) in DMSO (5 mL) at RT, were added 2,2-diemthyloxirane (0.45 g, 6.23 mmol) and KOH (0.285 g, 5.08 mmol) and the reaction mixture was heated to 60° C. in a sealed tube overnight. Additional portion of 2,2-diemthyloxirane (0.45 g, 6.23 mmol) was added and the reaction mixture was heated to 60° C. overnight. After completion (monitored by LCMS), the reaction mixture was diluted with water (10 mL) and extracted with EtOAc (2×10 mL). The combined organic layer was dried over anhydrous Na$_2$SO$_4$, filtered and the filtrate was concentrated under vacuum. The crude residue was purified by silica column chromatography on Biotage Isolera using 0-12% EtOAc in petroleum ether to get the title compound. Yield: 59% (0.37 g, colorless liquid). LCMS: (Method C) 368.3 (M+H), Rt. 1.15 min.

Step 2: (1r,4r)-N,N-dibenzyl-4-(2-methoxy-2-methylpropoxy)cyclohexan-1-amine

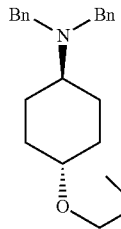

To a stirred solution of 1-(((1r,4r)-4-(dibenzylamino)cyclohexyl)oxy)-2-methylpropan-2-ol (0.35 g, 0.95 mmol) in DMF (3.5 mL) at 0° C., sodium hydride (76 mg, 1.90 mmol, 60% suspension) was added and the reaction mixture was stirred for 0.5 h at 0° C. Then MeI (0.15 mL, 2.36 mmol) was added at 0° C. and the reaction mixture was stirred at RT for 3 h. After completion (monitored by TLC), the reaction mixture was quenched with sat. aq. NH₄Cl. The mixture was diluted with water (5 mL) and extracted with EtOAc (2×10 mL). The combined organic layer was dried over anhydrous Na₂SO₄, filtered and the filtrate was concentrated under vacuum. The crude residue was purified by silica column chromatography on Biotage Isolera using 0-10% EtOAc in petroleum ether to get the title compound. Yield: 85% (0.31 g, colorless liquid). LCMS: (Method C) 382.2 (M+H), Rt. 1.42 min.

Step 3: (1r,4r)-4-(2-methoxy-2-methylpropoxy)cyclohexan-1-amine

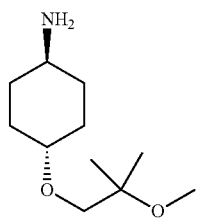

To a stirred solution of (1r,4r)-N,N-dibenzyl-4-(2-methoxy-2-methylpropoxy)cyclohexan-1-amine (0.3 g, 0.79 mmol) in absolute ethanol (3 mL) at RT, Pd(OH)₂ on carbon (60 mg, 20% wt. basis) was added and the mixture was stirred for 24 h under hydrogen atmosphere at RT.

After completion (monitored by TLC and LCMS), the reaction mixture was filtered through celite bed, and the bed was washed with MeOH. The combined filtrate was evaporated under vacuum to afford the title compound which was used in the next step without further purification. Yield: crude (0.1 g, colorless liquid). LCMS: (Method A) 202.3 (M+H), 1.13 min.

Step 4: 2-(1H-imidazol-1-yl)-N-((1r,4r)-4-(2-methoxy-2-methylpropoxy)cyclohexyl)-6-methylpyrimidine-4-carboxamide

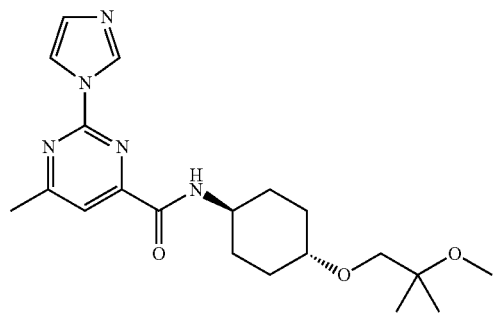

To a stirred solution of sodium 2-(1H-imidazol-1-yl)-6-methylpyrimidine-4-carboxylate (100 mg, 0.44 mmol) in DMF (1 mL) at 0° C., were added HOBt (89.1 mg, 0.66 mmol), EDC·HCl (169 mg, 0.88 mmol) followed by DIPEA (0.08 mL, 0.44 mmol) under nitrogen atmosphere. After stirring for 5 min at 0° C., (1r,4r)-4-(2-methoxy-2-methylpropoxy)cyclohexan-1-amine (88.54 mg, 0.44 mmol) was added and the reaction mixture was stirred at RT for 16 h. After completion (starting material was consumed according to TLC), the reaction mixture was diluted with ice cold water (20 mL) and extracted with EtOAc (3×20 mL). The resulting organic layer was washed with 10% NaHCO₃ (20 mL), water (2×20 mL), brine solution (30 mL), dried over anhydrous Na₂SO₄, filtered and the filtrate was concentrated under vacuum. The crude was purified by silica column chromatography on Biotage isolera using 1-2% MeOH in DCM and followed by prep. HPLC (Method B) get the title compound. Yield: 23% (39.47 mg, off white solid). ¹H NMR (400 MHz, DMSO-d₆): δ 8.95 (s, 1H), 8.79 (d, J=8.4 Hz, 1H), 8.20-8.19 (m, 1H), 7.83 (s, 1H), 7.17-7.16 (m, 1H), 3.89-3.80 (m, 1H), 3.31 (s, 2H), 3.28-3.19 (m, 1H), 3.12 (s, 3H), 2.63 (s, 3H), 2.06-2.03 (m, 2H), 1.86-1.83 (m, 2H), 1.61-1.51 (m, 2H), 1.31-1.24 (m, 2H), 1.08 (s, 6H). LCMS: (Method A) 388.0 (M+H), Rt. 1.91 min. HPLC: (Method A) Rt. 2.68 min.

Ex. 62: 6-(1H-imidazol-1-yl)-4-methoxy-N-((1r,4r)-4-(2-methoxyethoxy)cyclohexyl) picolinamide

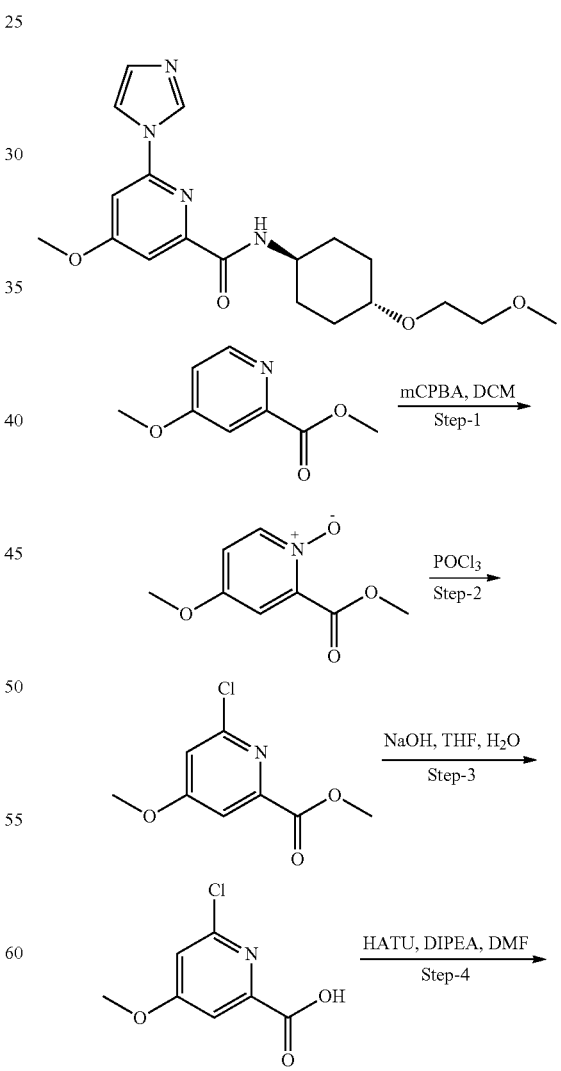

-continued

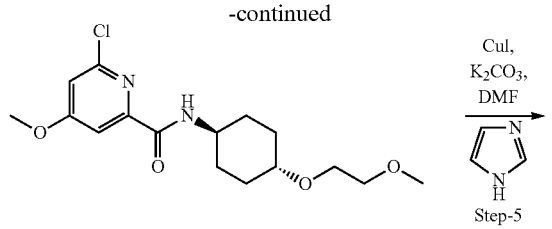

Step-5

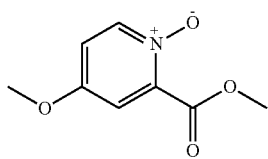

Step 1: 4-methoxy-2-(methoxycarbonyl)pyridine 1-oxide

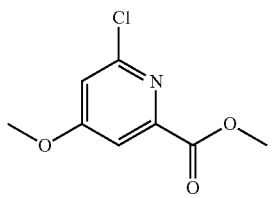

To a stirred solution of methyl 4-methoxypicolinate (1.0 g, 5.98 mmol) in EtOAc (20 mL) at RT, mCPBA (1.54 g, 8.97 mmol) was added and the reaction mixture was stirred at RT for 18 h. After completion, the reaction mixture was adjusted to ~pH 7 with solid NaHCO$_3$, filtered and the filtrate was concentrated under reduced pressure. The resulting crude residue was purified by column chromatography on Biotage Isolera (230-400 mesh silica gel, eluting with 10% MeOH in DCM) to afford the title compound. Yield: 36% (0.4 g, Off white gummy solid). $^1$H NMR (400 MHz, DMSO-d$_6$): δ 8.20 (d, J=9.6 Hz, 1H), 7.36 (d, J=4.8 Hz, 1H), 7.15 (dd, J=4.8, 9.6 Hz, 1H), 3.87 (s, 3H), 3.84 (s, 3H). LCMS: (Method C) 184.1 (M+H), Rt. 0.27 min.

Step 2: methyl 6-chloro-4-methoxypicolinate

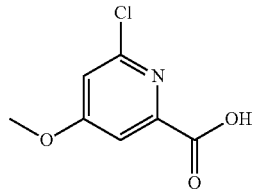

A stirred solution of 4-methoxy-2-(methoxycarbonyl) pyridine-1-oxide (0.4 g) in POCl$_3$ (15 mL) was heated to 100° C. overnight. After completion (monitored by TLC), the reaction mixture was concentrated under reduced pressure. This crude residue was quenched with ice-cold water (20 mL), and the precipitated solid was filtered and dried under vacuum to afford the title compound. Yield: 61% (0.27 g, off white solid). $^1$H NMR (400 MHz, DMSO-d$_6$): δ 7.58-7.54 (m, 1H), 7.41 (d, J=2.4 Hz, 1H), 3.94 (s, 3H), 3.88 (s, 3H). LCMS: (Method C) 202.0 (M+H), Rt. 1.66 min.

Step 3: 6-chloro-4-methoxypicolinic acid

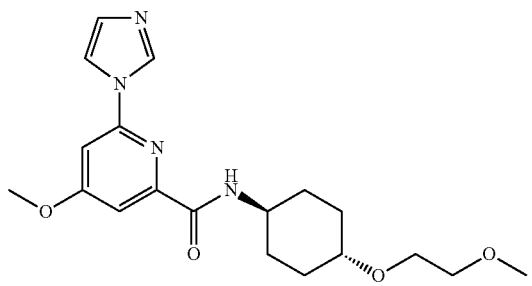

To a stirred solution of methyl 6-chloro-4-methoxypicolinate (0.27 g, 1.33 mmol) in a mixture of THF (8 mL) and water (2 mL) at RT was added NaOH (0.16 g, 4.01 mmol) and the reaction mixture was stirred at RT overnight. After completion (monitored by TLC), the reaction mixture was concentrated under vacuum and acidified with 1.5 N HCl solution to pH-2.0. The precipitated solid was filtered and dried under vacuum to afford the title compound. Yield: 83% (0.21 g, White solid). $^1$H NMR (400 MHz, DMSO-d$_6$): δ 13.54 (s, 1H), 7.53 (d, J=2.0 Hz, 1H), 7.36 (d, J=2.0 Hz, 1H), 3.93 (s, 3H). LCMS: (Method C) 188.1 (M+H), Rt. 0.89 min.

Step 4: 6-chloro-4-methoxy-N-((1r,4r)-4-(2-methoxyethoxy)cyclohexyl)picolinamide To a stirred solution of 6-chloro-4-methoxypicolinic acid (0.21 g, 1.12 mmol) in DMF (2 mL) were added DIPEA (0.6 mL, 3.36 mmol) and HATU (0.64 g, 1.68 mmol) at RT. After stirring for 5 min, a solution of (1r,4r)-4-(2-methoxyethoxy) cyclohexan-1-amine (0.252 g, 1.45 mmol) was added and the reaction mixture was stirred at RT overnight. After completion (monitored by TLC), the reaction mixture was diluted with water (10 mL) and extracted with EtOAc (2×10 mL). The combined organic layer was washed with water (10 mL), brine (10 mL), dried over anhydrous Na$_2$SO$_4$ and concentrated under vacuum. The resulting crude residue was purified by column chromatography on Biotage Isolera (230-400 mesh silica gel, eluting with 55% EtOAc in petroleum ether) to afford the title compound. Yield: 78% (0.3 g, Pale yellow gum). $^1$H NMR (400 MHz, DMSO-d$_6$): δ 8.30 (d, J=8.8 Hz, 1H), 7.51-7.50 (m, 1H), 7.31 (d, J=2.4 Hz, 1H), 3.94 (s, 3H), 3.78-3.71 (m, 1H), 3.55-3.52 (m, 2H), 3.43-3.41 (m, 2H), 3.30-3.21 (m, 4H), 2.01-1.98 (m, 2H), 1.82-1.79 (m, 2H), 1.52-1.48 (m, 2H), 1.27-1.18 (m, 2H). LCMS: (Method C) 343.2 (M+H), Rt. 2.01 min.

Step 5: 6-(1H-imidazol-1-yl)-4-methoxy-N-((1r,4r)-4-(2-methoxyethoxy)cyclohexyl) picolinamide

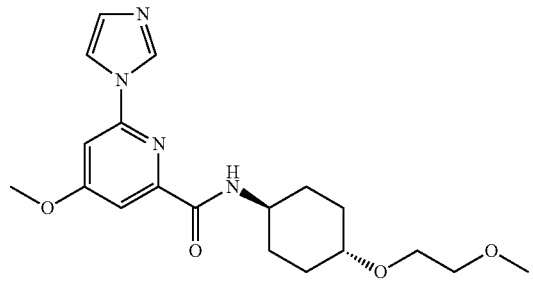

A mixture of 6-chloro-4-methoxy-N-((1r,4r)-4-(2-methoxyethoxy)cyclohexyl)picolinamide (0.15 g, 0.44 mmol), imidazole (89 mg, 1.31 mmol), L-Proline (5 mg, 0.0437 mmol) and $K_2CO_3$ (181 mg, 1.31 mmol) in DMSO (3 mL) was purged with $N_2$ for 2 min at RT before the addition of copper iodide (8 mg, 0.04 mmol). Then the reaction mixture was heated in a sealed tube at 90° C. for 16 h. At which time monitoring by TLC confirmed the presence of unreacted starting material. The reaction mixture was then heated to 120° C. for 5 h. After completion, the reaction mixture was diluted with EtOAc (10 mL) and filtered through a celite-bed. The filtrate was concentrated under vacuum and the resulting crude residue was purified by prep HPLC (Method C). The prep fraction was concentrated under reduced pressure, the residue was diluted with 10% MeOH in DCM (10 mL) washed with 10% aq. $NaHCO_3$ solution (4 mL), brine and water. The organic layer was dried over anhydrous $Na_2SO_4$, filtered, dried under reduced pressure and finally lyophilized to get the title compound. Yield: 8% (12.94 mg, Off white solid). $^1$H NMR (400 MHz, DMSO-$d_6$): δ 8.94 (s, 1H), 8.53 (d, J=8.8 Hz, 1H), 8.27-8.26 (m, 1H), 7.54 (d, J=2.0 Hz, 1H), 7.47 (d, J=2.4 Hz, 1H), 7.14 (s, 1H), 3.99 (s, 3H), 3.89-3.81 (m, 1H), 3.57-3.54 (m, 2H), 3.45-3.42 (m, 2H), 3.30-3.23 (m, 4H), 2.05-2.02 (m, 2H), 1.84-1.81 (m, 2H), 1.61-1.53 (m, 2H), 1.30-1.20 (m, 2H). LCMS: (Method C) 375.0 (M+H), Rt. 1.47 min. HPLC: (Method A) Rt. 2.33 min.

Ex. 63: 2-(1H-imidazol-1-yl)-N-((1r,4r)-4-methoxy-cyclohexyl)pyrimidine-4-carboxamide

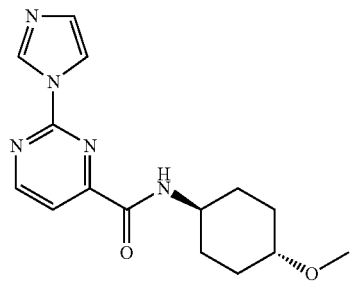

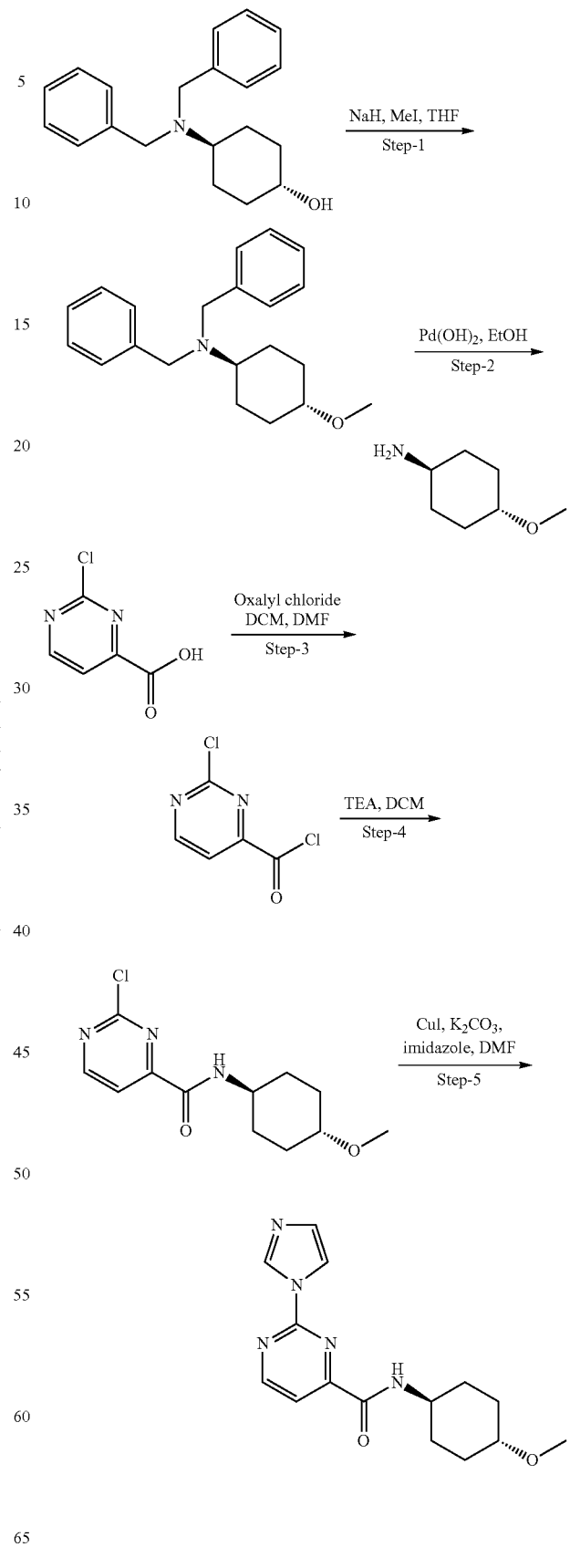

Step 1: (1r,4r)-N,N-dibenzyl-4-methoxycyclohexan-1-amine

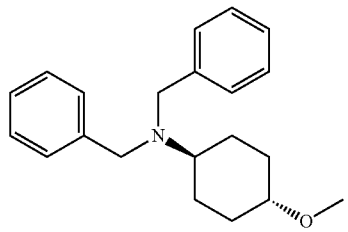 [SMILES: CO[C@H]1CC[C@H](N(Cc2ccccc2)Cc2ccccc2)CC1]

To a stirred solution of ((1r,4r)-4-(dibenzylamino)cyclohexan-1-ol (1.0 g, 3.38 mmol) in THF (20 mL), sodium hydride (0.195 g, 5.08 mmol, 60% in paraffin oil) was added at 0° C. under nitrogen atmosphere (the mixture was became exothermic). Methyl iodide (0.42 mL, 6.77 mmol) was added drop-wise at the same temperature (frothing was observed). After complete addition, the reaction mixture was warmed to RT and stirred at RT for 10 h. After completion, the reaction mixture was slowly poured into ice-water (20 mL) with continuous stirring. The suspension was extracted with EtOAc (2×25 mL). The combined organic layer was washed with water (25 mL), dried over anhydrous Na$_2$SO$_4$, filtered and the filtrate was concentrated under vacuum to get the title compound. product. Yield: 96% (1 g, Pale yellow liquid). $^1$H NMR (400 MHz, DMSO-d$_6$): δ 7.35-7.28 (m, 8H), 7.22-7.18 (m, 2H), 3.57 (s, 4H), 3.19 (s, 3H), 3.07-3.01 (m, 1H), 2.43-2.36 (m, 1H), 2.03-2.00 (m, 2H), 1.84-1.81 (m, 2H), 1.46-1.37 (m, 2H), 0.98-0.86 (m, 2H). LCMS: (Method C) 310.2 (M+H), 1.53 min.

Step 2: (1r,4r)-4-methoxycyclohexan-1-amine

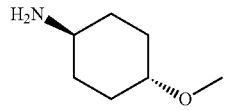

To a stirred solution of (1r,4r)-N,N-dibenzyl-4-methoxycyclohexan-1-amine (1 g, 3.23 mmol) in absolute ethanol (20 mL), Pd(OH)$_2$/C (0.2 g, 20 wt. % loading) was added at RT and the reaction mixture was stirred at RT overnight under hydrogen atmosphere. After completion, the reaction mixture was filtered through celite bed and the filtrate was concentrated under vacuum to afford the title compound that was used in the next step without further purification. Yield: 98% (0.41 g, Pale green liquid). $^1$H NMR (400 MHz, DMSO-d$_6$): δ 3.23 (s, 3H), 3.06-3.01 (m, 1H), 1.93-1.89 (m, 2H), 1.75-1.71 (m, 2H), 1.24-1.05 (m, 4H). LCMS: (Method A) 130.3 (M+H), 0.29 min.

Step 3: 2-chloropyrimidine-4-carbonyl chloride

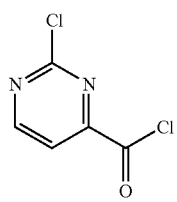

To a stirred solution of 2-chloropyrimidine-4-carboxylic acid (0.2 g, 1.26 mmol) and a drop of DMF in DCM (10 mL) at 0° C. was added oxalyl chloride (0.24 g, 1.89 mmol) and the reaction mixture was stirred at RT for 3 h. After completion (monitored by TLC), the reaction mixture was dried under vacuum to get the title compound which was used in the next step without any purification. Yield: 98% (0.2 g, pale brown gum).

Step 4: 2-chloro-N-((1r,4r)-4-methoxycyclohexyl)pyrimidine-4-carboxamide

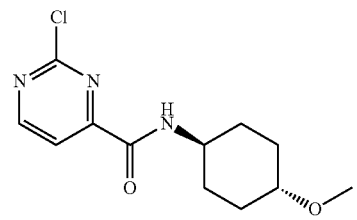 [SMILES: CO[C@H]1CC[C@H](NC(=O)c2ccnc(Cl)n2)CC1]

To a stirred solution of 2-chloropyrimidine-4-carbonyl chloride (0.2 g, 1.13 mmol) and TEA (0.47 mL, 3.39 mmol) in THF (10 mL) at 0° C. was added (1r,4r)-4-methoxycyclohexan-1-amine (Step-2) (0.219 g, 1.69 mmol) and the reaction mixture was stirred at RT overnight. After completion (monitored by TLC), the reaction mixture was quenched with sat. aq. NaHCO$_3$ solution (10 mL). The resulting suspension was extracted with EtOAc (2×25 mL). The combined organic layer was washed with water (10 mL), brine (10 mL), dried over anhydrous Na$_2$SO$_4$, and the solvent was evaporated under vacuum to afford the title compound. Yield: 82% (0.25 g, Brown gummy liquid). LCMS: (Method C) 270.0 (M+H), Rt. 1.85 min.

Step 5: 2-(1H-imidazol-1-yl)-N-((1r,4r)-4-methoxycyclohexyl)pyrimidine-4-carboxamide

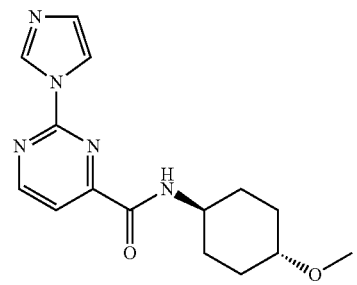 [SMILES: CO[C@H]1CC[C@H](NC(=O)c2ccnc(-n3ccnc3)n2)CC1]

A mixture of 2-chloro-N-((1r,4r)-4-methoxycyclohexyl)pyrimidine-4-carboxamide (0.25 g, 0.93 mmol), imidazole (189 mg, 2.78 mmol) and K$_2$CO$_3$ (0.384 g, 2.78 mmol) in DMF (5 mL) was purged with N$_2$ (gas) for 2 min before the addition of copper iodide (17 mg, 0.09 mmol). The reaction mixture was heated at 120° C. overnight. After completion (monitored by TLC), the reaction mixture was diluted with EtOAc and filtered through celite bed. The filtrate was concentrated under vacuum and the resulting crude residue was purified by prep HPLC (Method A). The prep fraction was concentrated under reduced pressure, the residue was diluted with 10% MeOH in DCM (10 mL) and washed with 10% aq. NaHCO₃ solution (10 mL) followed by brine solution and water. The organic layer was dried over anhydrous Na₂SO₄, filtered, concentrated under reduced pressure and finally lyophilized to get the title compound. Yield: 18% (51.39 mg, Pale brown gummy solid). ¹H NMR (400 MHz, DMSO-d₆): δ 9.07 (d, J=4.8 Hz, 1H), 8.97 (s, 1H), 8.85 (d, J=8.4 Hz, 1H), 8.24-8.23 (m, 1H), 7.92 (d, J=4.8 Hz, 1H), 7.19-7.18 (m, 1H), 3.89-3.82 (m, 1H), 3.27 (s, 3H), 3.18-3.11 (m, 1H), 2.09-2.06 (m, 2H), 1.87-1.84 (m, 2H), 1.63-1.53 (m, 2H), 1.29-1.22 (m, 2H). LCMS: (Method A) 302.1 (M+H), Rt. 0.76 min. HPLC: (Method A) Rt. 1.89 min.

Ex. 64: N-((1r,4r)-4-hydroxy-4-methylcyclohexyl)-2-(1H-imidazol-1-yl)pyrimidine-4-carboxamide

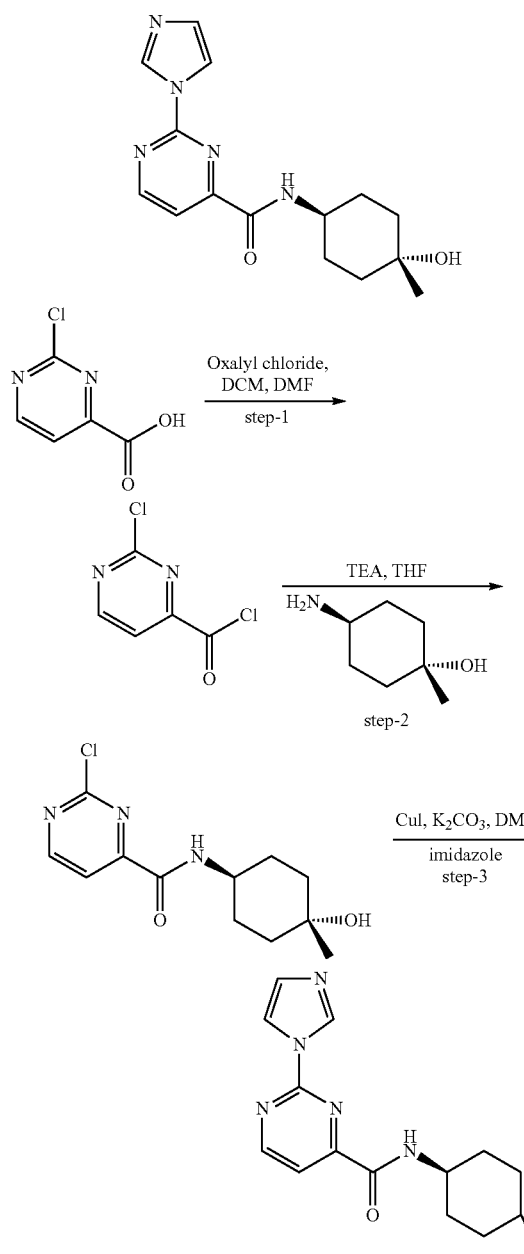

Step 1: 2-chloropyrimidine-4-carbonyl chloride

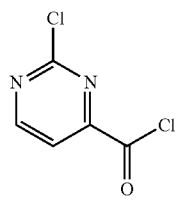

To a stirred solution of 2-chloropyrimidine-4-carboxylic acid (0.2 g, 1.26 mmol) and a drop of DMF in DCM (10 mL) at 0° C. was added oxalyl chloride (0.24 g, 1.89 mmol) and the reaction mixture was stirred at RT for 3 h. After completion (monitored by TLC), the reaction mixture was dried under vacuum to get the title compound which was used in the next step without any purification. Yield: 98% (0.2 g, pale brown gum).

Step 2: 2-chloro-N-((1r,4r)-4-hydroxy-4-methylcyclohexyl)pyrimidine-4-carboxamide

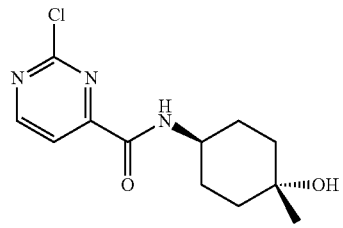 [SMILES: C[C@]1(O)CC[C@H](NC(=O)c2ccnc(Cl)n2)CC1]

To a stirred solution of 2-chloropyrimidine-4-carbonyl chloride (0.2 g, 1.13 mmol) and TEA (0.47 mL, 3.39 mmol) in THF (10 mL) at 0° C. was added (1r,4r)-4-amino-1-methylcyclohexan-1-ol (0.195 g, 1.35 mmol, CAS: 177908-37-1), and the reaction mixture was stirred at RT overnight. After completion (monitored by TLC), the reaction mixture was quenched with sat. aq. NaHCO₃ solution (10 mL). The resulting suspension was extracted with EtOAc (2×25 mL). The combined organic layer was washed with water (10 mL), brine (10 mL), dried over anhydrous Na₂SO₄ and concentrated under vacuum to afford the title compound. Yield: 75% (0.23 g, Off white solid). ¹H NMR (400 MHz, DMSO-d₆): δ 9.00 (d, J=2.0, 6.8 Hz, 1H), 8.69 (d, J=11.6 Hz, 1H), 8.00 (dd, J=2.0, 6.8 Hz, 1H), 4.31 (d, J=1.2 Hz, 1H), 3.88-3.75 (m, 1H), 1.67-1.39 (m, 8H), 1.24 (s, 3H). LCMS: (Method C) 270.0 (M+H), Rt. 1.40 min.

Step 3: N-((1r,4r)-4-hydroxy-4-methylcyclohexyl)-2-(1H-imidazol-1-yl)pyrimidine-4-carboxamide

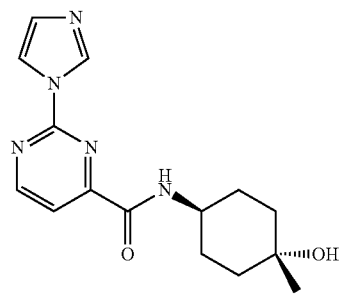 [SMILES: C[C@]1(O)CC[C@H](NC(=O)c2ccnc(-n3ccnc3)n2)CC1]

A mixture of 2-chloro-N-((1r,4r)-4-hydroxy-4-methylcyclohexyl)pyrimidine-4-carboxamide (0.23 g, 0.85 mmol), imidazole (174 mg, 2.56 mmol) and K$_2$CO$_3$ (0.353 g, 2.56 mmol) in DMF (2 mL) at RT was purged with N$_2$ (gas) for 2 min before the addition of copper iodide (16 mg, 0.085 mmol). The reaction mixture was heated at 120° C. overnight. After completion (monitored by TLC), the reaction mixture was diluted with EtOAc and filtered through celite bed. The filtrate was concentrated under vacuum and the resulting crude residue was purified by prep HPLC (Method A). The prep fraction was collected, concentrated under reduced pressure, the crude residue was diluted with 10% MeOH in DCM (10 mL). The mixture was adjusted to neutral pH with solid NaHCO$_3$ and stirred for 30 min. The mixture was filtered, and the filtrate was dried under reduced pressure and finally lyophilized to get the title compound. Yield: 34% (87.92 mg, Off white solid). $^1$H NMR (400 MHz, DMSO-d$_6$): δ 9.07 (d, J=5.2 Hz, 1H), 8.96 (s, 1H), 8.79 (d, J=8.4 Hz, 1H), 8.22-8.21 (m, 1H), 7.91 (d, J=5.2 Hz, 1H), 7.19 (s, 1H), 4.38 (s, 1H), 3.89-3.81 (m, 1H), 1.77-1.45 (m, 8H), 1.22 (s, 3H). LCMS: (Method B) 302.2 (M+H), Rt. 1.49 min. HPLC: (Method A) Rt. 1.52 min.

Ex. 65: 2-(1H-imidazol-1-yl)-N-((1r,3r)-3-(2-methoxyethoxy)cyclobutyl)pyrimidine-4-carboxamide

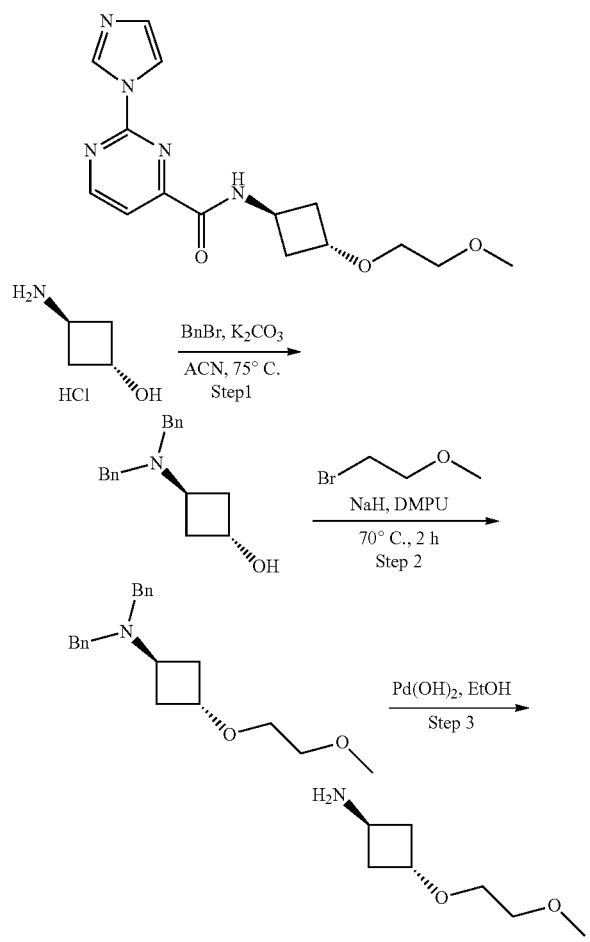

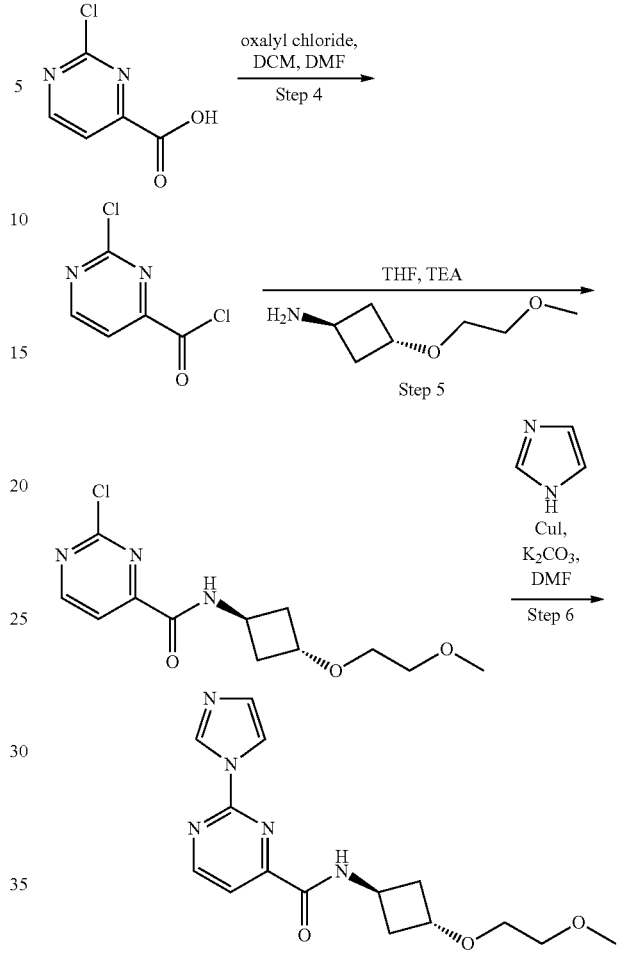

Step 1: (1r,3r)-3-(dibenzylamino)cyclobutan-1-ol

To a stirred solution of trans-3-aminocyclobutanol hydrochloride (1.0 g, 8.09 mmol) in acetonitrile (20 mL), potassium carbonate (4.46 g, 3.23 mmol) and benzyl bromide (2.83 g, 1.66 mmol) were added at RT. Then the reaction mixture was heated at 75° C. overnight. The precipitated solid was filtered, washed with EtOAc and the filtrate was concentrated under vacuum. The resulting crude residue was triturated with pet ether and dried to afford the title compound. Yield: 87% (1.9 g, white solid). $^1$H NMR (400 MHz, DMSO-d$_6$): δ 7.34-7.20 (m, 10H), 4.84 (d, J=6.4 Hz, 1H), 4.18-4.14 (m, 1H), 3.44 (s, 4H), 3.40-3.30 (m, 1H), 2.15-2.06 (m, 2H), 1.88-1.80 (m, 2H). LCMS: (Method A) 268.1 (M+H), Rt. 1.30 min.

Step 2: (1r, 3r)-N,N-dibenzyl-3-(2-methoxyethoxy)cyclobutan-1-amine

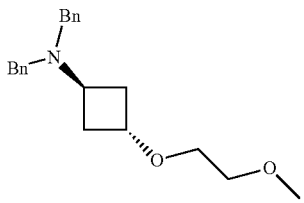 [SMILES: COCCO[C@H]1C[C@H](N(Cc2ccccc2)Cc2ccccc2)C1]

To a stirred solution of (1r,3r)-3-(dibenzylamino)cyclobutan-1-ol (1.8 g, 9.73 mmol) in DMPU (20 mL), sodium hydride (0.64 g, 1.61 mmol, 60% in paraffin oil) was added at RT under nitrogen atmosphere. The mixture became exothermic, 1-bromo-2-methoxyethane (2.33 g, 1.68 mmol) was added over a period of 10 min. During this addition foam formation was observed. After the addition was complete, the reaction mixture was stirred at 65° C. for 2 h. Additional portions of sodium hydride (0.13 g, 3.30 mmol, 60% in paraffin oil) followed by 1-bromo-2-methoxyethane (0.46 g, 3.30 mmol) were added at the heating condition. Further, the reaction was continued at 67° C. for another 2 h. After completion of the reaction, the reaction mixture was cooled to RT and slowly poured into ice (5 g) with continuous stirring. The suspension was extracted with EtOAc (3×30 mL). The combined organic layer was washed with water (2×25 mL), dried over anhydrous Na₂SO₄, filtered and the filtrate was concentrated under vacuum. The resulting residue was dissolved in 1, 4-dioxane (30 mL), to this was added 4 N HCl in dioxane (20 mL). The mixture was stirred for 20 min, concentrated under vacuum to get solid which was dissolved in H₂O, basified with 1 N aq. NaOH solution. The suspension was extracted with EtOAc (3×30 mL). The combined organic layer was washed with water (2×25 mL), dried over anhydrous Na₂SO₄, filtered and the filtrate was concentrated under vacuum to get the title compound. Yield: 91% (2 g, colorless liquid). ¹H NMR (400 MHz, DMSO-d₆): δ 7.34-7.21 (m, 10H), 3.97-3.94 (m, 1H), 3.45 (s, 4H), 3.41-3.34 (m, 4H), 3.32-3.28 (m, 1H), 3.23 (s, 3H), 2.12-2.07 (m, 2H), 2.05-1.93 (m, 2H). LCMS: (Method C) 326.2 (M+H), Rt. 1.55 min.

Step 3: (1r, 3r)-3-(2-methoxyethoxy)cyclobutan-1-amine

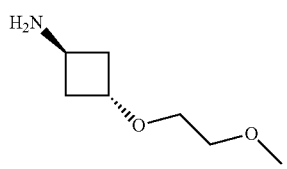

To a stirred solution of (1r,3r)-3-(dibenzylamino)cyclobutan-1-ol (2.0 g, 6.15 mmol) in absolute ethanol (20 mL), Pd(OH)₂/C (0.4 g, 20%) was added at RT and the mixture was stirred overnight under hydrogen atmosphere at RT. After completion of the reaction, the reaction mixture was filtered through celite bed. The filtrate was concentrated under vacuum to afford the title compound. It was used in the next step without further purification. Yield: 90% (0.8 g, colorless liquid). ¹H NMR (400 MHz, DMSO-d₆): 4.05-4.04 (m, 1H), 3.45-3.33 (m, 4H), 3.24 (m, 3H), 3.23-3.18 (m, 1H), 2.09-2.02 (m, 2H), 1.87-1.81 (m, 2H); LCMS: (Method A) 146.2 (M+H), 0.40 min.

Step 4: 2-chloropyrimidine-4-carbonyl chloride

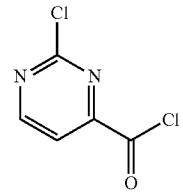

To a stirred solution of 2-chloropyrimidine-4-carboxylic acid (0.2 g, 1.26 mmol) and DMF (catalytic amount) in DCM (10 mL), oxalyl chloride (0.24 g, 1.89 mmol) was added at 0° C. The reaction was slowly warmed to RT and then stirred at RT for 3 h. The reaction was monitored by TLC. After completion, the reaction mixture was dried under vacuum to get the title compound which was immediately carried to the next step. Yield: 98% (0.2 g, pale brown gum).

Step 5: 2-chloro-N-((1r,3r)-3-(2-methoxyethoxy)cyclobutyl)pyrimidine-4-carboxamide

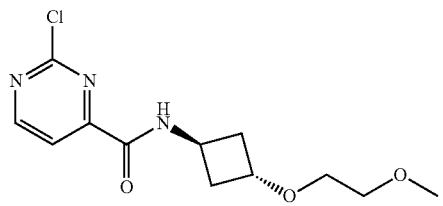 [SMILES: COCCO[C@H]1C[C@H](NC(=O)c2ccnc(Cl)n2)C1]

To a stirred solution of 2-chloropyrimidine-4-carbonyl chloride (0.2 g, 1.13 mmol) and TEA (0.47 mL, 3.39 mmol) in THF (10 mL) at 0° C., (1r, 3r)-3-(2-methoxyethoxy)cyclobutan-1-amine (0.202 g, 1.39 mmol) was added into RM at same temperature. Further reaction was stirred at RT for 16 h. The reaction mixture was monitored by TLC and quenched with sat. aq. NaHCO₃ solution (10 mL). The resulting suspension was extracted with EtOAc (2×25 mL). The combined organic layer was washed with water (10 mL), brine (10 mL), dried over anhydrous Na₂SO₄ and solvent was evaporated under vacuum to afford the title compound. Yield: 75% (0.18 g, off white solid). ¹H NMR (400 MHz, DMSO-d₆): δ 9.25 (d, J=7.6 Hz, 1H), 9.00 (d, J=4.8 Hz, 1H), 7.99 (d, J=4.8 Hz, 1H), 4.52-4.46 (m, 1H), 4.15-4.10 (m, 1H), 3.46-3.41 (m, 4H), 3.34 (s, 3H), 2.43-2.20 (m, 4H); LCMS: (Method A) 286.0 (M+H), Rt. 1.19 min.

Step 6: 2-(1H-imidazol-1-yl)-N-((1r,3r)-3-(2-methoxyethoxy)cyclobutyl)pyrimidine-4-carboxamide

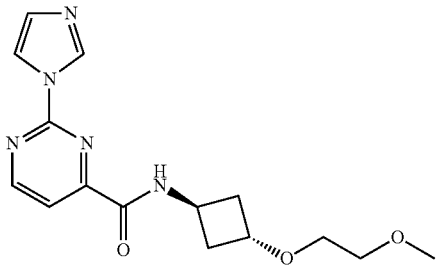 [SMILES: COCCO[C@H]1C[C@H](NC(=O)c2ccnc(-n3ccnc3)n2)C1]

A stirred solution of 2-chloro-N-((1r,3r)-3-(2-methoxyethoxy)cyclobutyl)pyrimidine-4-carboxamide (130 mg, 0.45 mmol) and 1H-imidazole (92.8 mg, 1.36 mmol) in DMF (4 mL) was purged with nitrogen gas for 5 min RT before the addition of potassium carbonate (188 mg, 1.36 mmol) followed by CuI (8.6 mg, 0.04 mmol). The reaction mixture was heated at 120° C. for 16 h. After completion, the reaction mixture was filtered through celite and the celite bed was washed with 10% MeOH in DCM (50 mL). The combined filtrate was concentrated under vacuum and the resulting crude was purified by prep HPLC (method A). The prep-fraction was concentrated under reduced pressure, diluted with DCM (20 mL) and washed with NaHCO$_3$ (15 mL) followed by water (20 mL). The organic layer was dried over anhydrous Na$_2$SO$_4$, filtered, concentrated under reduced pressure and lyophilized to get the title compound. Yield: crude (55 mg, yellow solid). $^1$H NMR (400 MHz, DMSO-d$_6$): δ 9.25 (d, J=7.6 Hz, 1H), 9.00 (d, J=5.2 Hz, 1H), 8.98 (s, 1H), 8.26-8.24 (m, 1H), 7.90 (d, J=5.2 Hz, 1H), 7.20-7.19 (m, 1H), 4.56-4.40 (m, 1H), 4.19-4.16 (m, 1H), 4.48-3.44 (m, 4H), 3.27 (s, 3H), 2.47-2.42 (m, 2H), 2.34-2.28 (m, 2H); LCMS: (Method A) 318.0 (M+H), Rt.0.74 min. HPLC: (Method A) Rt. 1.794 min.

Ex. 66: Assay Protocol for Determination of IC50 Against Human CD38

CD38, a differentiation antigen of B lymphocytes, is a type II integral membrane protein. It is also known as ADP-ribosyl cyclase and nicotinamide adenine dinucleotide (NAD) glycohydrolase. Through its production of cyclic ADP-ribose, CD38 modulates calcium-mediated signal transduction in various cells, including pancreatic cells. The major enzymatic activity of CD38 is the hydrolysis of NAD. CD38 is a prognostic biomarker for acute B lymphoblastic leukemia.

The CD38 Inhibitor Screening Assay Kit (BPS Bioscience, Catalog #: 79287) is designed to measure the glycohydrolase activity of CD38 for screening and profiling applications.

CD38 hydrolase buffer (4×) was thawed on ice and 1×CD38 hydrolase buffer was prepared by diluting 4×CD38 hydrolase buffer with water. CD38 hydrolase enzyme was diluted to 0.5 ng/ml with 1×CD38 hydrolase buffer (10 ng/well). Master mix was prepared by mixing equal volumes of water and CD38 hydrolase buffer (4×) and 10 μl of the mix was added to all the wells. Following master mix addition, 10 μl of the inhibitors and 20 μl of CD38 hydrolase enzyme were added to the wells. For wells designated blank, 10 μl and 20 μl of 1× CD38 hydrolase buffer was added respectively in place of CD38 enzyme and inhibitors. The plate was covered and incubated 30 min at room temperature with slow shaking at 400 rpm. After 30 min incubation, the plate was removed and 10 μl of diluted F-NAD substrate was added to all the wells. The plate is incubated for 10 min, spun at 1200 rpm for 30 secs to remove bubbles and read in Tecan Spark using a fluorometer setting of excitation 300 nm and emission 410 nm. The reading for the blank was subtracted from all the values. IC50 for the test compounds were determined by using Graphpad prism software v7.0.

TABLE 3

| Example No. | Structure | hCD38 IC$_{50}$ (nM) |
|---|---|---|
| Ex. 1 | | 60 |
| Ex. 2 | | >100 |

TABLE 3-continued

| Example No. | Structure | hCD38 IC$_{50}$ (nM) |
|---|---|---|
| Ex. 3 | | 34 |
| Ex. 4 | | 3,500 |
| Ex. 5 | | 256 |
| Ex. 6 | | 53 |
| Ex. 7 | | >10,000 |

TABLE 3-continued

| Example No. | Structure | hCD38 IC$_{50}$ (nM) |
|---|---|---|
| Ex. 8 | | 286 |
| Ex. 9 | | 10,000 |
| Ex. 10 | | 4,900 |
| Ex 11 | | 49 |
| Ex. 12 | | 5 |
| Ex. 13 | | 40 |

TABLE 3-continued

| Example No. | Structure | hCD38 IC$_{50}$ (nM) |
|---|---|---|
| Ex. 14 | | 24 |
| Ex. 15 | | 42 |
| Ex. 16 | | 6.8 |
| Ex. 17 | | 7 |
| Ex. 18 | | 16 |
| Ex. 19 | | 45.9 |

TABLE 3-continued

| Example No. | Structure | hCD38 IC$_{50}$ (nM) |
|---|---|---|
| Ex. 20 | | 21.5 |
| Ex. 21 | | 996 |
| Ex. 22 | | 17.9 |
| Ex. 23 | | 21 |
| Ex. 24 | | 153 |
| Ex. 25 | | 12 |

TABLE 3-continued

| Example No. | Structure | hCD38 IC$_{50}$ (nM) |
|---|---|---|
| Ex. 26 | | 150 |
| Ex. 27 | | 4.2 |
| Ex. 28 | | 8.8 |
| Ex. 29 | | 31 |
| Ex. 30 | | 429 |

TABLE 3-continued

| Example No. | Structure | hCD38 IC$_{50}$ (nM) |
|---|---|---|
| Ex. 31 | | 54 |
| Ex. 32 | | 53 |
| Ex. 33 | | 52 |
| Ex. 34 | | 25.7 |
| Ex. 35 | | 7.4 |
| Ex. 36 | | 39 |
| Ex. 37 | | 42 |

TABLE 3-continued

| Example No. | Structure | hCD38 IC$_{50}$ (nM) |
|---|---|---|
| Ex. 38 | | 310 |
| Ex. 39 | | 137 |
| Ex. 40 | | 1,900 |
| Ex. 41 | | 16 |

TABLE 3-continued

| Example No. | Structure | hCD38 IC$_{50}$ (nM) |
|---|---|---|
| Ex. 42 | | 4.8 |
| Ex. 43 | | 17 |
| Ex. 44 | | 12 |
| Ex. 45 | | 28 |
| Ex. 46 | | 144 |

TABLE 3-continued

| Example No. | Structure | hCD38 IC$_{50}$ (nM) |
| --- | --- | --- |
| Ex. 47 | | 31 |
| Ex. 48 | | 18 |
| Ex. 49 | | 15 |
| Ex. 50 | | 14 |
| Ex. 51 | | 17 |

TABLE 3-continued

| Example No. | Structure | hCD38 IC$_{50}$ (nM) |
| --- | --- | --- |
| Ex. 52 | | 89 |
| Ex. 53 | | 16.6, 8.8 |
| Ex. 54 | | 28 |
| Ex. 55 | | 286 |
| Ex. 56 | | 50 |

TABLE 3-continued

| Example No. | Structure | hCD38 IC$_{50}$ (nM) |
|---|---|---|
| Ex. 57 | | 40 |
| Ex. 58 | | 16.5 |
| Ex. 59 | | 20.9 |
| Ex. 60 | | 2.4 |
| Ex. 61 | | 13.4 |

TABLE 3-continued

| Example No. | Structure | hCD38 IC$_{50}$ (nM) |
| --- | --- | --- |
| Ex. 62 | | 86.7 |
| Ex. 63 | | 12.0 |
| Ex. 64 | | 91.1 |
| Ex. 65 | | 227 |

What is claimed is:

1. A compound represented by the structural formula (I):

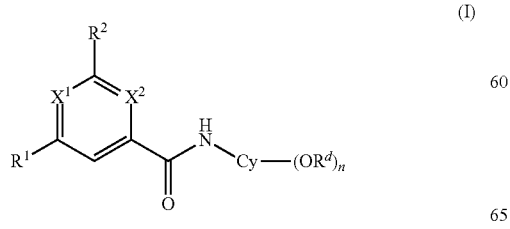

(I)

or a pharmaceutically acceptable salt thereof, wherein:

$X_1$ and $X_2$ are independently CH or N, provided that $X_1$ and $X_2$ are not both CH;

Cy is $C_{3-7}$cycloalkyl optionally substituted with an oxo group or with one or two $R^x$ groups, wherein $R^x$ is halo, $C_{1-4}$alkyl, $C_{1-4}$haloalkyl, $C_{1-4}$hydroxyalkyl, —NHSO$_2$C$_1$-C$_4$alkyl, or —SO$_2$C$_1$-C$_4$alkyl;

$R^1$ is —H, —NR$^a$R$^b$, halo, —CN, —C(=O)NH$_2$, —COOH, C$_1$-C$_4$alkyl, C$_1$-C$_4$haloalkyl, C$_1$-C$_4$hydroxyalkyl, C$_2$-C$_4$alkenyl, C$_1$-C$_4$alkoxy, C$_1$-C$_4$alkoxyalkyl, C$_1$-C$_4$alkylthio, C$_1$-C$_4$alkylsulfone, C$_1$-C$_4$alkoxyalkylthio, C$_1$-C$_4$haloalkylthio, C$_1$-C$_4$haloalkoxy, C$_3$-C$_4$cycloalkyl, or a 5-membered heteroaryl, wherein the 5-membered heteroaryl is optionally substituted with one, two or three C$_{1-4}$alkyl groups;

R² is a 5-membered heteroaryl optionally substituted with one, two or three deuterium or $C_{1-4}$alkyl groups;

R$^d$ is $C_{1-4}$haloalkyl, $C_{1-4}$hydroxyalkyl, or $C_{1-4}$alkyl optionally substituted with $C_{1-4}$alkoxy;

R$^a$ and R$^b$ independently are —H or $C_1$-$C_4$alkyl; and n is 1.

2. The compound of claim 1 or a pharmaceutically acceptable salt thereof, wherein:

$X_1$ and $X_2$ are independently CH or N, provided that $X_1$ and $X_2$ are not both CH;

Cy is $C_{3-7}$cycloalkyl optionally substituted with an oxo group or with one or two R$^x$ groups, wherein R$^x$ is halo, $C_{1-4}$alkyl, $C_{1-4}$haloalkyl, $C_{1-4}$hydroxyalkyl or $SO_2Me$;

R¹ is —H, —NR$^a$R$^b$, halo, —CN, $C_1$-$C_4$alkyl, $C_1$-$C_4$haloalkyl, $C_1$-$C_4$alkoxy, $C_1$-$C_4$alkoxyalkyl, $C_1$-$C_4$alkylthio, $C_1$-$C_4$alkoxyalkylthio, $C_1$-$C_4$haloalkylthio, $C_1$-$C_4$haloalkoxy or a 5-membered heteroaryl, wherein the 5-membered heteroaryl is optionally substituted with one, two or three $C_{1-4}$alkyl groups;

R² is a 5-membered heteroaryl optionally substituted with one, two or three $C_{1-4}$alkyl groups;

R$^d$ is $C_{1-4}$alkyl optionally substituted with $C_{1-4}$alkoxy;

R$^a$ and R$^b$ independently are —H or $C_1$-$C_4$alkyl; and n is 1.

3. The compound of claim 2, wherein the compound is represented by the structural formula (IIa), (IIb), (IIc), (IIIa), (IIIb), (IIIc), (IVa), (IVb), or (IVc):

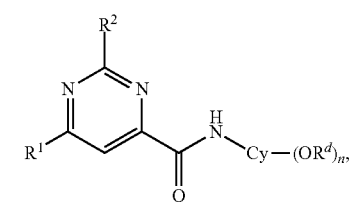
(IIa)

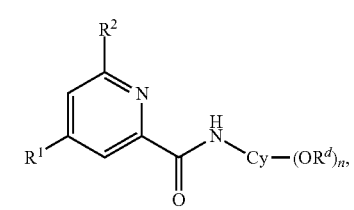
(IIb)

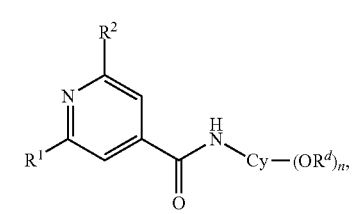
(IIc)

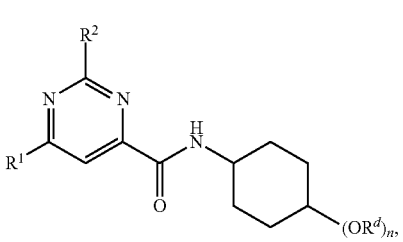
(IIIa)

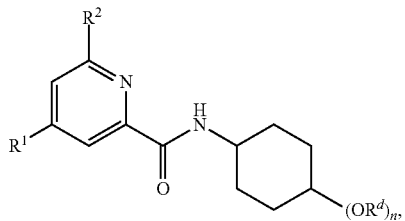
(IIIb)

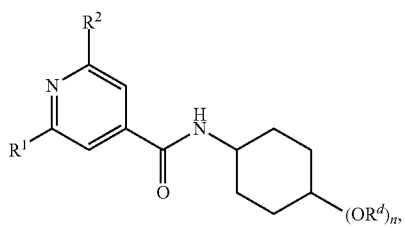
(IIIc)

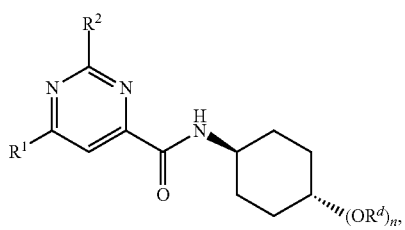
(IVa)

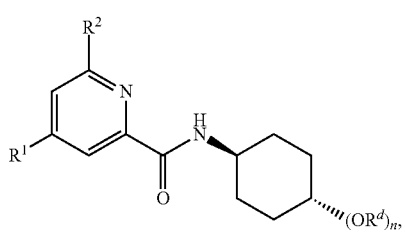
(IVb)

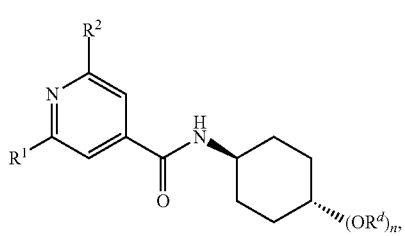
(IVc)

or a pharmaceutically acceptable salt thereof.

4. The compound or pharmaceutically acceptable salt thereof of claim 1, wherein R$^d$ is $C_{1-4}$alkyl optionally substituted with $C_{1-4}$alkoxy.

5. The compound or pharmaceutically acceptable salt thereof of claim 1, wherein R$^d$ is —$CH_2CH_2OCH_3$.

6. The compound or pharmaceutically acceptable salt thereof of claim 2, wherein R$^d$ is —$CH_3$ or —$CH_2CH_2OCH_3$.

7. The compound or pharmaceutically acceptable salt thereof of claim 6, wherein R¹ is a 5-membered heteroaryl optionally substituted with one, two or three $C_{1-4}$alkyl groups.

8. The compound or pharmaceutically acceptable salt thereof of claim 6, wherein R¹ is selected from the group consisting of

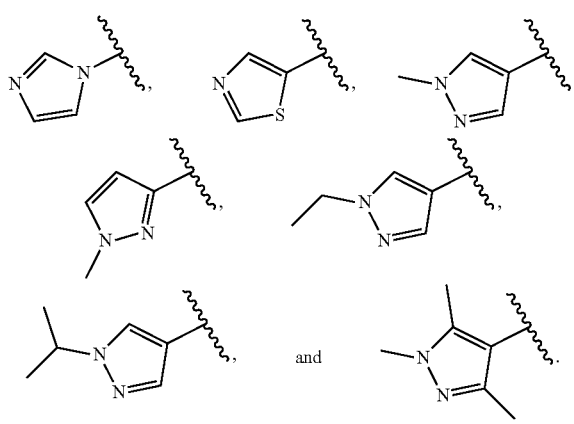

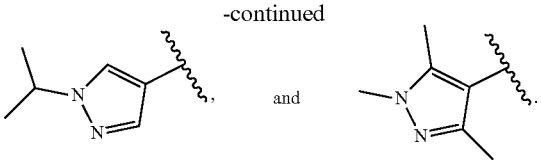

9. The compound or pharmaceutically acceptable salt thereof of claim 4, wherein $R^1$ is —H, —$NR^aR^b$, halo, —CN, $C_1$-$C_4$alkyl, $C_1$-$C_4$haloalkyl, $C_1$-$C_4$alkoxy, $C_1$-$C_4$alkoxyalkyl, $C_1$-$C_4$alkylthio, $C_1$-$C_4$alkoxyalkylthio or $C_1$-$C_4$haloalkylthio.

10. The compound or pharmaceutically acceptable salt thereof of claim 5, wherein $R^1$ is —H, —$CH_3$, —$CF_3$, —$OCH_3$, —$SCH_3$, —F, —Cl, —Br or —$NH_2$.

11. The compound or pharmaceutically acceptable salt thereof of claim 9, wherein $R^2$ is imidazole, pyrazole, triazole, thiazole, isothiazole, oxazole, isoxazole, thiadiazole or oxadiazole, optionally substituted with one, two or three $C_{1-4}$alkyl groups.

12. The compound or pharmaceutically acceptable salt thereof of claim 10, wherein $R^2$ is selected from the group consisting of

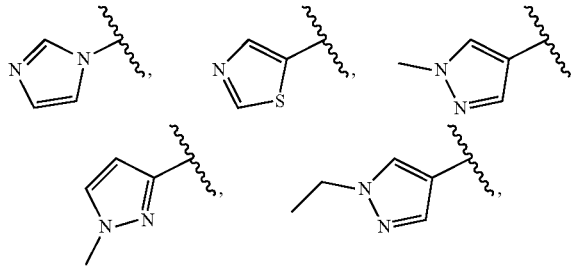

13. The compound or pharmaceutically acceptable salt thereof of claim 1 wherein
$R^1$ is —C(=O)$NH_2$, —COOH, $C_1$-$C_4$haloalkyl, $C_1$-$C_4$hydroxyalkyl, $C_2$-$C_4$alkenyl, —CN, $C_1$-$C_4$alkylsulfone, or $C_3$-$C_4$cycloalkyl; and/or
$R^2$ is a 5-membered heteroaryl substituted with one, two, or three deuterium; and/or
$R^d$ is $C_{1-4}$haloalkyl or $C_{1-4}$hydroxyalkyl; and/or
Cy is cyclohexyl substituted with —NHSO$_2$($C_1$-$C_4$alkyl).

14. The compound or pharmaceutically acceptable salt thereof of claim 13, wherein
$R^1$ is —C(=O)$NH_2$, —COOH, —$CHF_2$, —$CH_2F$, —CH(OH)$CH_3$, —C(OH)($CH_3$)$_2$, —$CH_2OH$, —CH=$CH_2$, —$SO_2Me$, or cyclopropyl; and/or
$R^2$ is imidazole substituted with one, two, or three deuterium; and/or
$R^d$ is —$CHF_2$ or —$CH_2CH_2OH$; and/or
Cy is cyclohexyl substituted with NHSO$_2$Et.

15. A pharmaceutical composition comprising a pharmaceutically acceptable carrier or excipient and the compound of claim 1, or a pharmaceutically acceptable salt thereof.

16. A method of inhibiting an enzymatic activity of CD38 in a cell, comprising administering to the cell an effective amount of a compound of claim 1, or a pharmaceutically acceptable salt thereof.

17. The compound of claim 1, wherein the compound is:

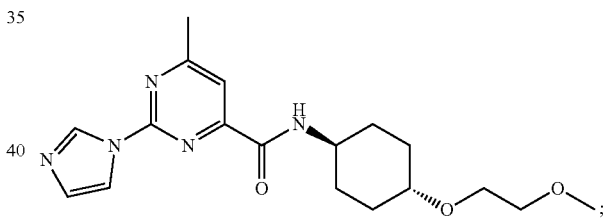

or a pharmaceutically acceptable salt thereof.

18. A pharmaceutical composition comprising a pharmaceutically acceptable carrier or excipient and the compound of claim 17, or a pharmaceutically acceptable salt thereof.

* * * * *